United States Patent [19]
Wallach et al.

[11] Patent Number: 5,008,901
[45] Date of Patent: Apr. 16, 1991

[54] ASYMMETRICAL DUPLEX ERROR-CONTROLLED MODEM

[75] Inventors: Clifford H. Wallach, Lincolnshire; Robert C. Suffern, Chicago; Dale M. Walsh, Burr Ridge, all of Ill.

[73] Assignee: U.S. Robotics, Inc., Skokie, Ill.

[21] Appl. No.: 115,354

[22] Filed: Oct. 29, 1987

[51] Int. Cl.[5] .................... H04L 5/14
[52] U.S. Cl. .................... 375/8; 375/122; 370/32; 370/30
[58] Field of Search .................... 375/7, 8, 9, 46, 48, 375/122; 370/30, 31, 32

[56] References Cited

U.S. PATENT DOCUMENTS

| | | | |
|---|---|---|---|
| 4,597,073 | 6/1986 | Staples | 375/7 |
| 4,748,638 | 5/1988 | Friedman et al. | 375/8 |
| 4,771,417 | 9/1988 | Maxwell et al. | 370/31 |
| 4,780,883 | 10/1988 | O'Connor et al. | 375/7 |
| 4,835,731 | 5/1989 | Nazalenko et al. | 455/14 |

*Primary Examiner*—Douglas W. Olms
*Assistant Examiner*—Christopher O. Edwards
*Attorney, Agent, or Firm*—Allegretti & Witcoff, Ltd.

[57] ABSTRACT

A modem for connecting data terminal equipment (DTE) to a remote DTE via a general switched telephone network or leased lines at data rates of 300, 1200 and 2400 bps using standard modulation techniques, and additonally providing virtual full duplex transmission capability at 9600 bps using trellis code modulation (TCM). The high-speed 9600 bps path is implemented by asymmetrical frequency division of the available bandwidth into a high speed, wideband forward channel (9600 bps) and a low speed, narrowband backchannel (300 bps). The high speed transmitting channel is assigned to that modem having the greatest data demand and the direction is dynamically reversed whenever the amount of data awaiting transmission over the low speed channel exceeds a predetermined maximum backlog, provided that a direction reversal has not taken place for at least a specified minimum interval during which use of the forward channel is guaranteed. To improve the efficiency of the backchannel, extended data formats are added to the MNP link protocol for use in backchannel transmission and to control direction reversals on the line. The modem is implemented with three available general purpose microprocessors with interprocessor communications being synchronized by a timer driven interrupt mechanism. A hardware timer/counter built into one of these processors is used to monitor the signals on the telephone line to detect and distinguish answer tones, voice signals, busy signals, ringback signals and dial tones. A hardware counter/timer is also used to measure the width of the start bit from the serial port to form the basis for a calculation of the baud rate being used by the DTE.

5 Claims, 5 Drawing Sheets

LD FRAME

| | | | | | |
|---|---|---|---|---|---|
| FLAG | 02 | REASON | CRC HI | CRC LO | FLAG |

LT FRAME

| | | | | | | | |
|---|---|---|---|---|---|---|---|
| FLAG | 04 | SEQ | DATA | ..... | CRC HI | CRC LO | FLAG |

LA FRAME

| | | | | | | |
|---|---|---|---|---|---|---|
| FLAG | 05 | SEQ | CREDIT | CRC HI | CRC LO | FLAG |

LTA FRAME

| | | | | | | | | | |
|---|---|---|---|---|---|---|---|---|---|
| FLAG | 08 | LT SEQ | LA SEQ | CREDIT | DATA | .... | CRC HI | CRC LO | FLAG |

NAK FRAME

| | | | | | | |
|---|---|---|---|---|---|---|
| FLAG | 03 | SEQ | CREDIT | CRC HI | CRC LO | FLAG |

LN FRAME

| | | | | | | |
|---|---|---|---|---|---|---|
| FLAG | 06 | SEQ | TYPE | CRC HI | CRC LO | FLAG |

LNA FRAME

| | | | | | |
|---|---|---|---|---|---|
| FLAG | 07 | SEQ | CRC HI | CRC LO | FLAG |

LT1 FRAME

| | | | | | |
|---|---|---|---|---|---|
| FLAG | SEQ/9 | DATA | CRC HI | CRC LO | FLAG |

LT2 FRAME

| | | | | | | |
|---|---|---|---|---|---|---|
| FLAG | SEQ/A | DATA | DATA | CRC HI | CRC LO | FLAG |

LT3 FRAME

| | | | | | | | |
|---|---|---|---|---|---|---|---|
| FLAG | SEQ/B | DATA | DATA | DATA | CRC HI | CRC LO | FLAG |

LTR FRAME

| | | | | |
|---|---|---|---|---|
| FLAG | SEQ/C | CRC HI | CRC LO | FLAG |

LTDR FRAME

| | | | | |
|---|---|---|---|---|
| FLAG | SEQ/D | CRC HI | CRC LO | FLAG |

LTO FRAME

| | | | | | |
|---|---|---|---|---|---|
| FLAG | 04 | SEQ | CRC HI | CRC LO | FLAG |

FIG. 5

ASYMMETRICAL DUPLEX ERROR-CONTROLLED MODEM

SUMMARY OF THE INVENTION

This invention relates to digital communication systems and more particularly to a modem for communicating at high speed over voice-grade, dial-up telephone circuits.

A modem capable of transmitting data at higher speeds offers significant advantages. Long distance telephone charges are reduced because large files can be sent in less time, and the consequent savings can soon exceed the cost of the modem. Less obvious but nonetheless significant savings result from the reduced time spent supervising file transfers and waiting for data which must arrive before other tasks can be begun.

Although arbitrarily high transmission speeds can be attained over special-purpose, wideband transmission circuits, such links are typically unavailable and transmission must accordingly be handled by conventional, voice-grade, dial-up telephone lines. Such standard phone lines have severely limited bandwidth, are subject to line noise, and typically exhibit line irregularities and poor termination, making them echo-prone. These factors severely complicate the task of improving modem transmission speeds over dial-up lines.

Better use of the roughly 3,000 Hz bandwidth available on the dial-up network may be realized by using advanced modulation and equalization techniques. The widely used Bell standard 103 modems operate at speeds only up to 300 bps., comfortably within the available bandwidth. The faster, full-duplex Bell 212A type modems use phase modulation and require about half of the available bandwidth for each of the two channels which send data at approximately 1200 bps in both directions simultaneously. Modems capable of operating at 2400-bps, such as those conforming to the CCITT V.22 bis standard, achieve improved speeds by using a modulation method called "quadrature amplitude modulation" (QAM), in which both the amplitude and phase of the signal are modulated. It would, however, normally be impossible for a 2400-baud QAM modem to simultaneously transmit in both directions at the designed speed over voice-grade lines if a technique, called "adaptive equalization," were not used to automatically adjust the modem to the unique characteristics of each phone line encountered. The 2400-baud transmission speed achieved by adaptively equalized modems is thought to be about the maximum practical speed for truly full-duplex (bidirectional) transmission over non-overlapping, frequency-divided channels in voice-grade phone lines.

It is, however, possible to attain even higher speeds by allowing the channels to overlap. One such scheme is found in the CCITT V.32 recommendation for a full-duplex 9600-bps modem in which the modem simultaneously receives information over the same passband on which it is transmitting. To make this work, each modem must be able to substantially cancel out the echoes of its own transmitted signal. The echo cancellation mechanism required is exceedingly complex, however, and modem designers have accordingly sought a less costly solution.

One widely adopted approach for avoiding the echo cancellation problem operates the high-speed modem in a half-duplex, one-direction at a time, mode. This method emulates full-duplex (true bidirectional) capabilities by repeatedly switching the transmission direction; that is, by "ping-ponging" the data back and forth over the line, but always in only one direction at any one time. The turn-around time for such a switched half-duplex system is relatively long, however, and makes the compromise unsuitable for many highly interactive applications. Moreover, in a further effort to cut costs, typical "ping-ponging" modems have employed the modulation scheme used in the CCITT V.29 standard which can be implemented with relatively inexpensive integrated circuit "chip sets" widely used for facsimile transmission. However, V.29 modulation is demonstrably inferior to the more advanced "trellis code modulation" (TCM) technique used in the CCITT full-duplex V.32 standard noted earlier.

It is therefor a general object of the present invention to provide an improved modem capable of dependable, high-speed performance at low cost. It is a more particular object to improve the interactive communication capability of a high-speed modem, and to use trellis coded modulation, without dramatically increasing the cost of the modem.

The underlying architecture of the modem to be described is based on the recognition that, while the modem needs to operate interactively in both directions at once, transfer high-speed data transfers is normally needed in one direction only. When entire files are being transferred from one location to another, a high-speed channel is needed in that direction while, in the other direction, the data to be sent is normally limited to the combination of the interactive data being keyboarded and the error-control signals needed to confirm the accuracy of the transmission occurring in the high-speed direction.

In accordance with a principal feature of the modem contemplated by the present invention, simultaneous bi-directional transmission occurs over a wide-band, high-speed channel in one direction and a narrow-band, low-speed backchannel in the reverse direction, and direction of the high-speed channel is dynamically reversed whenever the modem currently transmitting over the backchannel accumulates more that a predetermined maximum backlog of untransmitted data. Because each channel has its own assigned band of frequencies, the modem may distinguish the signals being received from those being transmitted without expensive echo cancellation mechanisms. Since, in typical use, the need for the high-speed transmission exists in only one direction at a time (when a file is to be sent), the dynamically assigned high and low speed channels provide virtual full-duplex capabilities for interactive data while simultaneously providing a high-speed passband for file transfers comparable to that of a "ping-ponging" half-duplex system.

In the preferred embodiment of the invention to be described, means are employed for transmitting data over the low speed channel in both fixed and variable length frames with error detecting cyclic redundancy values in each frame. In order to reduce the round trip delay times (the combined data transmission and acknowledgement transmission times), means are employed for transmitting data over the back channel in the form of high-efficiency, fixed-length frames from which redundant bytes are removed. Because of their preassigned fixed length, these high-efficiency frames may be processed by an error detection algorithm to verify the integrity of the data without waiting for the receipt of a frame-ending flag signal.

In accordance with a further feature of the invention, when the accumulated data to be transmitted over the backchannel exceeds the maximum capacity of a backchannel data frame, the modem experiencing the high backchannel demand initiates a reversal of the high speed channel direction on the additional condition that such a reversal was not previously requested by the remote channel for at least a predetermined minimum time duration.

According to still another feature of the present invention, the modem is implemented with three general-purpose microprocessors which perform the functions of modem supervision, transmission, and reception respectively, the three processors being organized in a linear topology and communications between them being synchronized by means of a timer-generated interrupt which causes the receiving processor to read and write to its port to the transmission processor, and to then interrupt the transmission processor. The transmission processor responds by reading and writing to its port to the receiving processor, then reading and writing to its port to the supervisory processor, and then interrupting the supervisory processor so that it can perform a read and write at its port to the transmission processor.

In accordance with still another feature of the present invention, the hardware timers built into the microprocessors provide mechanisms for monitoring the status of the telephone line network. Analog detection circuits are used to derive a call progress signal which is a two state signal indicating whether the amplitude of the signal at the telephone line is above or below a predetermined threshold value, and a further signal (used as a carrier detect signal) which indicates whether a high level signal is present in the passband of interest. These two analog signals are fed to the supervisory processor which includes an internal timer which is used to count the transitions of the call progress signal during the presence of high signal levels as indicated by the carrier detect signal. According to a further aspect of this feature of the invention, the frequency indication thus obtained by the internal timer is processed by an algorithm which discriminates between answer tones, voice signals, dial tones, ring back signals, and busy signals based on the duration and repetition of various frequencies detected.

In accordance with yet another feature of the invention, the hardware time built into the supervisory processor is used as a gated counter which independently measures the width of a start bit from the DTE sent to the modem over the serial port and, based upon this measured start bit width, the supervisory processor calculates the baud rate being used by the DTE.

These and other objects, features and advantages of the present invention may be more clearly understood through a consideration of the following detained description of a specific embodiment of the invention. In the course of this description, reference will frequently be made to the attached drawings, in which:

BRIEF DESCRIPTION OF THE DRAWINGS

FIG. 5 illustrates the data formats of the various frames used to transmit data under the link protocol used by the present invention.

DETAILED DESCRIPTION

DIGITAL ARCHITECTURE

Figure 1:
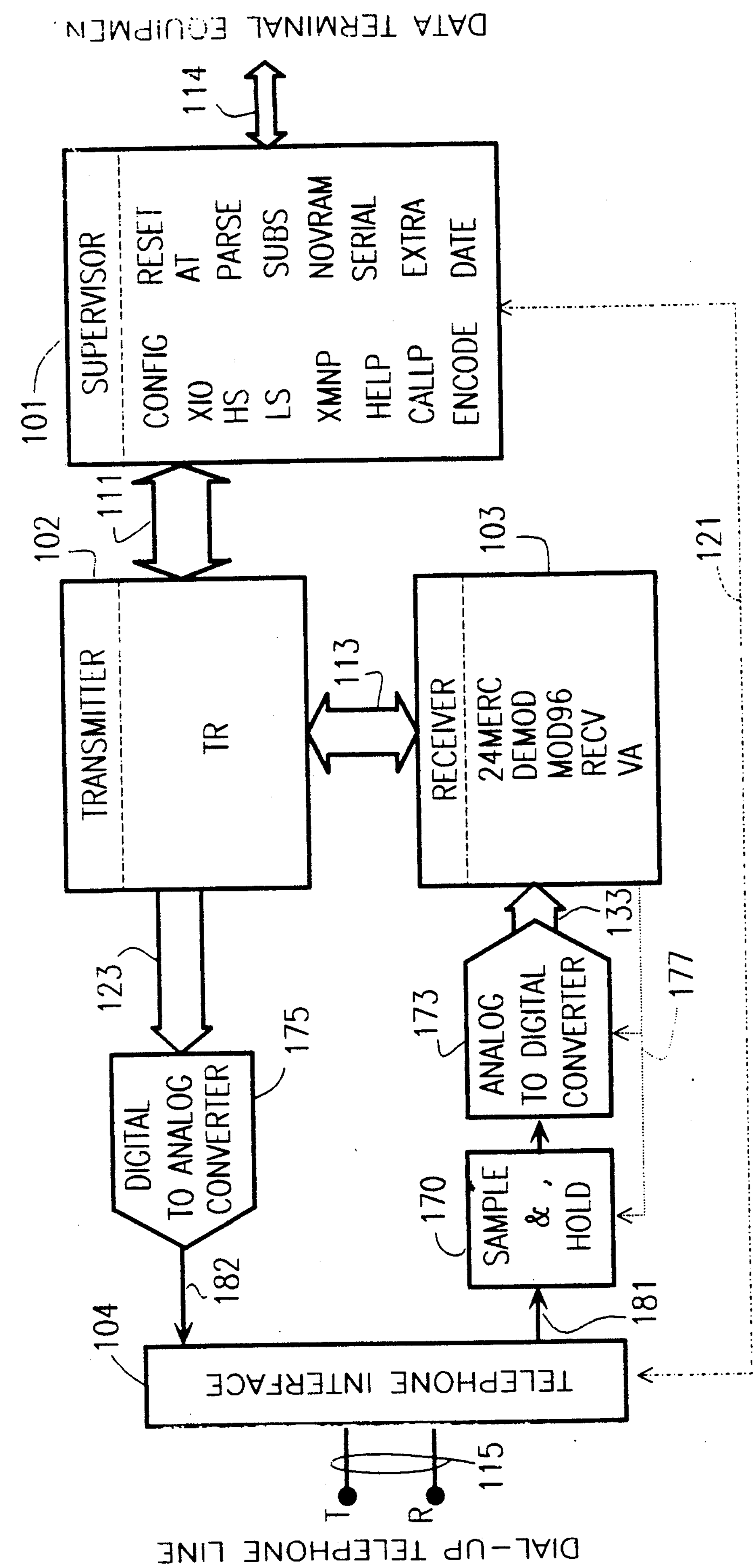
FIG. 1 is a block diagram of a preferred form of high-speed modem which embodies the principles of the present invention.

FIG. 1 of the drawings is a block diagram illustrating the general hardware architecture of a preferred high-speed modem which embodies the principles of the invention. The modem comprises three independent digital processors 101, 102 and 103, and an analog telephone interface 104 (which will be described in more detail in connection with FIG. 2 of the drawings). Processor 101, called the "Supervisor", controls both processors 102 and 103. Processor 102, called the "Transmitter", and processor 103, called the "Receiver", both wait for and execute commands from Supervisor 101.

The three processors 101–103 advantageously take the form of available general-purpose microprocessors. Supervisor 101 and Transmitter 102 may be implemented using type 8031 processors supported by conventional read-only memory for program storage and by dynamic random-access memory for buffering data and for storing process variables. Because of the lighter program storage requirements imposed on Transmitter 102, that processor may be advantageously implemented with a type 8051 processor (which executes the same instruction set as the 8031 but has built-in ROM memory).

Receiver 103 bears the greatest computational burden of the three processors and is preferably implemented with a TMS 32020 high-speed 16-bit arithmetical processor operating at a clock-speed of 19.8144 Mhz. The arithmetic capabilities of this device and its high clock speed allow it to decode a 9600 bps trellis-coded signal when the modem is receiving data at its highest-rated speed. The 8031 which implements Supervisor 101 operates at 11.232 Mhz while the 8051 Transmitter 102 operates at 8.98 Mhz.

The program modules which control the three processors 101–103 have been divided, along essentially functional lines, into the routines indicated in FIG. 1 within the block indicating each processor. The routines which are executed by the Supervisor 101 are called CONFIG, XIO, HS, LS, XMNP, HELP, CALLP, RESET, AT, PARSE, SUBS, NOVRAM, SERIAL and EXTRA. The Transmitter 102 executes the routine named TR (not further subdivided), and the Receiver 103 performs the routines named 24MERC, DEMOD, MOD96, RECV, and VA. Each of these routines will be described generally below, and each is set forth in full in commented assembly language at the conclusion of this specification.

The Supervisor 101 and the Transmitter 102 are directly coupled (data port 1 of the 8031 Supervisor processor 101 is wired directly to port 2 of the 8051 Transmitter processor 102) as illustrated by the bus 111 shown in FIG. 1. Data port 1 of the 8051 Transmitter processor 102 is connected to the 8 low-order bit positions of the data port of the TMS 32020 Receiver processor 103 via an interprocessor latch as depicted by the bus 113. This linear topology, with the Transmitter 102 serving as an interface between Supervisor 101 and Receiver 103 provides a high-speed 8-bit parallel (half-duplex) path for all interprocessor transfers, permits the Receiver 103 (a high-speed arithmetic processor) to be directly connected to the Transmitter 102 so that it may act as a slave mathematical processor provided high-speed demodulation filtering functions when the modem is in its high-speed transmit mode.

The use of three conventional microprocessors organized in a linear topology significantly reduces the manufacturing cost of the modem by eliminating the need for special-purpose devices and by minimizing the interconnection circuity needed to allow the plural processors to function together.

Transmitter 102 and Receiver 103 send and receive information to the telephone interface 104 by way of analog/digital conversion circuits. Port 2 of the 8051 Transmitter processor 102 is connected via a parallel bus 123 to the input of a conventional 8-bit digital-to-analog converter (DAC) seen at 175 in FIG. 1. DAC 175 exhibits a settling time of 100 nanoseconds. Telephone interface 104 is connected to the output of the DAC 175 via line 182. The low order 8 bits of the data port of the TMS 32020 Receiver processor 103 are connected via a bus 133 to the output of an analog-to-digital converter (ADC) 173. The ADC 173 receives analog signal samples from a sample-and-hold circuit 170 which in turn has its input connected to the telephone interface circuit 104 via line 181. The sample-and-hold circuit 270 employed in the present embodiment has a capture time of 4 microseconds and operates in lock step with the ADC 173, both of which are synchronized by a clocking signal from the Receiver 103 which is supplied via line 177 seen in FIG. 1. The ADC 173 is an 8-bit analog-to-digital converter of conventional design having a conversion time of less than 100 microseconds.

ANALOG ARCHITECTURE

Both Transmitter 102 and Receiver 102 are interconnected to the telephone network (normally a conventional two-wire dial-up telephone T and R circuit seen at 115 in FIG. 1) by means of the analog/digital converters 173 and 175, discussed above, and an analog telephone interface 104. The interface 104 operates under the control of, and supplies telephone network status information to, Supervisor 101 via the control link 121 seen in FIGS. 1 and 2.

Figure 2:
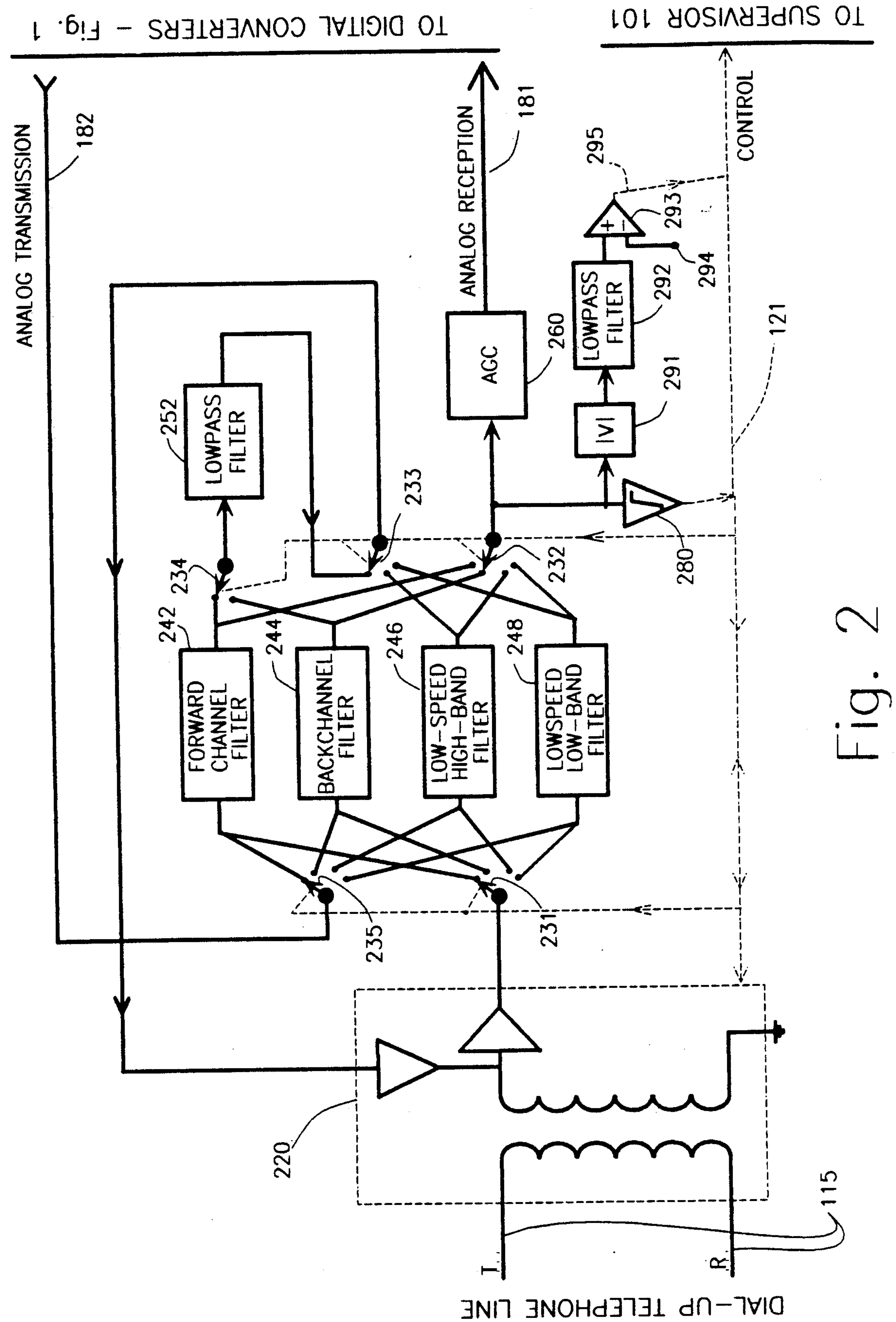
FIG. 2 is depicts in more detail the analog telephone interface seen at 104 in FIG. 2.

The analog interface is shown in more detail in the block diagram, FIG. 2, of the drawings. The telephone lines 115 are connected (typically by means of a standard RJ11C phone connector) to a telephone line circuit indicated generally at 220 in FIG. 2. The line circuit 220 includes: a hybrid transformer and amplifiers for separating the transmitted and received signals; a conventional ring detection circuit (not shown) for detecting ringing signals from the central office which appear across the telephone lines 115; and a line relay (not shown) for taking the modem OFF-HOOK (connected) and ON-HOOK (disconnected), and for pulsing the line to provide conventional dial-pulse signalling. The ringing signal is supplied as a network status signal via the control link 121 to the Supervisor 101, and the OFF-HOOK control signal is supplied to the circuit 220 via the same link.

Supervisor 101 provides control signals over the link 121 to control five electronic switches 231–235. These switches connect the appropriate filters between the line circuit 220 and the DAC 175 when the modem is transmitting, or between the line circuit 220 and the ADC 173 when the modem is receiving. Five different filters are used: a wideband, forward channel filter 242 for defining the passband over which data is transmitted at 9600 bps; a narrowband, backchannel filter 244, and high-band and lowband filters 246 and 248 for use at 300, 1200 and 2400 bps. An additional lowpass filter 252 is used to further filter the transmitted forward and back channel signals when the high-speed mode is being used.

The low-speed high and low band filters 246 and 248 are conventional and comply with the CCITT specifications for V.22. These two filters are employed for transmission at 300, 1200 and 2400 bps, with the lower band being assigned as the transmission channel to the modem which originates the call in the normal fashion.

The filters 242, 244 and 252 provide the asymmetrical frequency division needed to created the high-speed forward channel (9600 bps) and the lower speed (300 bps) backchannel used in the high-speed mode by the disclosed embodiment of the present invention. These filters may be of any conventional design suitable for providing the transfer functions defined by the following equations.

The wideband filter 242 operates as notch filter which suppresses frequencies within the low-frequency passband of the narrow-band backchannel filter 244. The preferred amplitude vs. frequency transfer function $H_1(S)$ for this wideband filter is:

$$H_1(S) = \frac{(S^2 + W_{Z1}^2)(S^2 + W_{Z2}^2)(S + W_{Z3}^2)}{(S^2 + \frac{W_{P1}}{Q_1} S + W_{P1}^2)(S^2 + \frac{W_{P2}}{Q_2} S + W_{P2}^2)(S^2 + \frac{W_{P3}}{Q_3} S + W_{P3}^2)}$$

WHERE $W_{Z1} = 2\pi(445)$;

$W_{Z2} = 2\pi(396)$;

$W_{Z3} = 2\pi(320)$;

$W_{P1} = 2\pi(568)$;

$Q_1 = 2$;

$W_{P2} = 2\pi(562)$;

$Q_2 = 2$;

$W_{P3} = 2\pi(534)$; and $Q_3 = 1$.

The preferred narrowband transfer function $H_2(S)$ for the backchannel filter 244 is:

$$H_2(S) = \frac{(S^2 + W_{Z1}^2)(S^2 + W_{Z2}^2)(S)}{\left(S^2 + \frac{W_{P1}}{Q_1} S + W_{P1}^2\right)\left(S^2 + \frac{W_{P2}}{Q_2} S + W_{P2}^2\right)\left(S^2 + \frac{W_{P3}}{Q_3} S + W_{P3}^2\right)}$$

WHERE $W_{Z1} = 2\pi(550)$;
$W_{Z2} = 2\pi(750)$;
$W_{P1} = 2\pi(463)$;
$Q_1 = 4$;
$W_{P2} = 2\pi(463)$;
$Q_2 = 4$;
$W_{P3} = 2\pi(302)$; and
$Q_3 = 2.5$.

In order to suppress the high-frequency components of the signals passing through filters 242 and 244, the lowpass filter 252 should have a transfer function $H_3(S)$ which obeys the relation:

$$H_3(S) = \frac{1}{\left(S^2 + \frac{W_{P1}}{Q_1} S + W_{P1}^2\right)}$$

WHERE $W_{P1} = 2\pi(3100)$ and $Q_1 = .87$

As seen in FIG. 2, input of lowpass filter 252 is connected, in the high-speed mode, by the switch 234 to either the output of wideband filter 242 or the output of narrowband filter 244, depending on whether the modem is transmitting over the forward channel or the backchannel respectively. In either case, filter 252 suppresses the level of high-frequency signals applied via the line circuit 220 to the telephone lines 115. Signals being received via the telephone network do not require lowpass filtering and are passed directly to the switch 232 which selects the appropriate receiving filter output (switch 231 having selected the input of the same filter for reception). The switches 231–235 are controlled by Supervisor 101 acting over control link 121. As an example, the switches 231–235 are shown in FIG. 2 positioned as they would be if the modem were transmitting over the high-speed forward (9600 bps) channel and receiving over the narrowband backchannel. Note that, in the example switch settings shown in FIG. 2, the lowpass filter 252 is serially connected with the wideband filter 242 between the input to switch 235 and the output of switch 233.

The received signals from switch 232 are passed via an automatic gain control (AGC) circuit 260 and the line 181 to the input of sample-and-hold circuit 170 (seen if FIG. 1). The AGC of the present embodiment has an amplitude dynamic range of 45 db., and RMS voltage output of 600 millivolts, and a time constant of 15 milliseconds for the forward channel and a longer time constant of 1.5 seconds when used with the backchannel (the output response time of the AGC 260 is controlled by the Supervisor 101 to correspond to the operating mode of the modem).

During transmission, the analog output signal developed by the DAC 175 seen in FIG. 1 is passed via line 182 to the switch 235 which connects line 182 to the input of one of the filters 242–248. The output of the low-speed filters 246 and 248, when they are used for transmission, is passed via the switch 233 to the line network 220. When the modem is operating in its high-speed mode, the output of either filter 242 or 244 is additionally passed through the filter 252 as noted earlier as determined by switches 233 and 234.

The telephone interface arrangement 104 shown in detail in FIG. 2 also develops a pair of additional line monitoring signals: a CALL PROGRESS SIGNAL developed by the threshold amplifier 280 and a CARRIER DETECT signal produced by the combination of a rectification circuit 291, a lowpass filter 292 and a threshold detector 293. Both of these status signals are passed via the control link 121 to the Supervisor 101. The lowpass filter 292 should have a transfer function $H_4(S)$ as defined by the following relation:

$$H_4(S) = \frac{1}{(S + W_{P1})}$$

where $W_{P1}=2\pi(1591)$ for reception on the forward channel (defined by filter 248) and where $W_{P1}=2\pi(30)$ for reception on the backchannel (defined by filter 244).

The cutoff frequency of the lowpass filter 292 is adjusted by a signal supplied from Supervisor 101 over control link 121.

SYNCHRONIZATION

As noted earlier in connection with the discussion of the preferred linear topology of the three processors 101, 102 and 103 seen in FIG. 1, the three processors exchange information via their respective I/O ports as illustrated by the bus connections 111 and 113 in FIG. 1. Communication between the processors is synchronous and is initiated by the Receiver 101 which is periodically interrupted by a hardware timer. The Receiver 103 first read the data at the port to bus 113, writes any pending data back to that port, and then interrupts the Transmitter 102 (See FIG. 3).

The Transmitter 102 responds by reading the data supplied via bus 113 and then writing any new command to be passed to the Receiver 103. Recall that commands to both the Transmitter 102 and the Receiver 103 originate with the Supervisor 101, and the commands that are destined for Receiver 103 are passed through Transmitter 102 which operates as a messenger. A timer interrupt in the Transmitter 102 causes it to read the data supplied to the port connected to Supervisor 101 via bus 111, to then write the appropriate response back to the same port, and then to interrupt the Supervisor 101.

The Supervisor 101 responds by reading the port connected to bus 111 and then writing any command or data to the same port.

Figure 3:
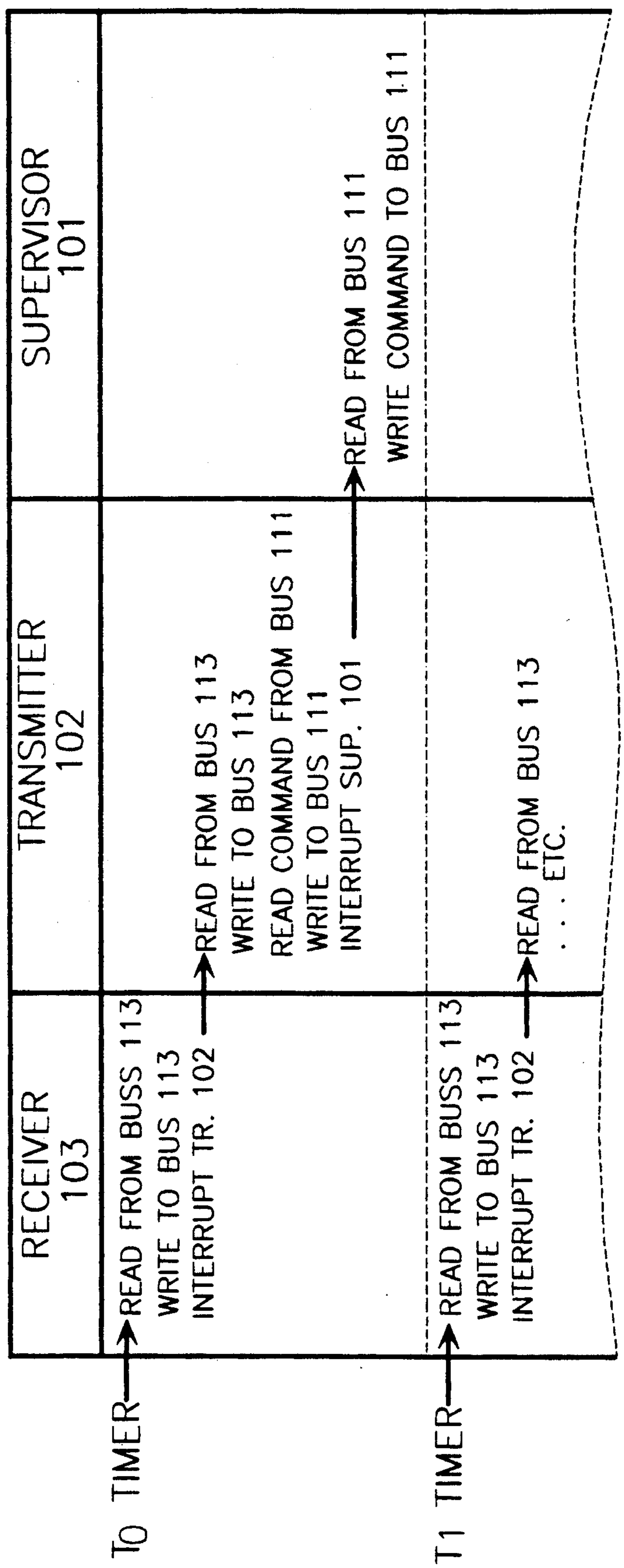
FIG. 3 is a chart which illustrates the interrupt driven sequence of events by which interprocessor communications are synchronized in accordance with the invention.

This method of synchronizing the three processors is shown graphically in FIG. 3 of the drawings. It may be noted that, using this mechanism, each of the three processors has essentially the full cycle time (the duration between two consecutive interrupts as illustrated by $T_0$ and $T_1$ in FIG. 3) in which to complete its processing task; consequently, processor collisions are unlikely since the Transmitter 102 and Supervisor 101 need only read their respective ports before the next interrupt occurs. Moreover, it is unnecessary for the processors to acknowledge interprocessor commands.

SUPERVISOR 101

Although the modem is synchronized by the timer interrupt which is supplied the Receiver 103, the high-level control of the modem is provided by the Supervisor 101, which executes routines which will be generally described below. These routines, as well as the routines performed by the other two processors, are described in alphabetical order in the assembly language listings which appear at the conclusion of this specification. The names of the routines appear in full capital letters and these names correspond to the names which appear in boxed labels at the beginning of each program listing. In the description which follows, it is assumed that the reader has a working knowledge of assembly language and the instruction sets of the processors used, and that information is not repeated here. These assembly language listings provide a complete description of function of the present embodiment and are introduced by the following general description which highlights the general organization of the invention and the function of selected novel features which it embodies.

Before describing generally describing individual routines and other mechanisms, the overall function of the modem will be summarized.

USER COMMANDS

The present modem supports an extended version of the industry standard "AT Command Set" and the various commands from the DTE to which the modem responds are summarized in the following listings. The first listing summarizes the standard commands and the second listing summarizes the extensions to the command set which have been employed in connection with additional functions, such as software and data rate control, flow control, error control and control over the non-volatile memory (NRAM) used to store user-defined parameters and default values.

AT STANDARD COMMANDS SUMMARY

A: Force Answer Mode when modem has not received an incoming call.

A/: Re-execute last command one time. AT prefix not required.

A>: Re-execute last command continuously until cancelled. AT prefix not required.*

AT: Attention. Mandatory command prefix except for A/, A> and +++.

Bn: Switch between U.S. and CCITT answer sequence.*
- B0—CCITT (overseas)*
- B1—US (default)*

Cn: Transmitter enabled/disabled
- C0—transmitter disabled (receive only mode)
- C1—transmitter enabled (default)

D: Dial the number that follows. Options are specified by the following:
- P—pulse dialing
- T—tone dialing
- ,—pause for two seconds
- ;—return to command mode after dialing
- ". . .—dial the letters that follow
- !—transfer call (flash the switch hook)
- W—wait for second dial tone (options X3 or higher, see X below)
- @—wait for answer
- R—reverse frequencies (answer becomes originate)
- Sn—dial number stored in NRAM at location n*

En: Command Mode local echo-dip switch sets "factory default"
- E0—echo OFF
- E1—echo ON Fn: Online local echo (duplex setting)
- F0—online echo ON (half duplex)
- F1—online echo OFF (full duplex, default)

Hn: On/off hook control
- H0—hang up
- H1—go off hook

In: Inquiry-display one of following
- I0—product code
- I1—ROM checksum results
- I2—RAM test results
- I3—call duration or real time (see Kn)
- I4—current modem settings
- I5—current NRAM settings
- I6—link diagnostics Kn: Modem clock operations
- K0—return call duration in response to I3, supra
- K1—return actual time in response to I3, supra Mn: Speaker control
- M0—speaker always OFF
- M1—speaker on until carrier established
- M2—speaker always ON M3—speaker ON until last digit dialed and carrier established
O: Go online after command execution
Qn: Quiet mode
Q0—result codes displayed
Q1—result codes suppressed
Sr=n: S-Register commands where r is register number and n is 0–255
Sr?: Display contents of register r
Vn: Return code format
V0—return numeric codes
V1—return verbal codes
Xn: Result code options
X0–X7 selects which subset of possible codes are to be returned
Z: Reset modem to NRAM settings
+++: escape to command mode
&: extended commands (see summary to follow)
$: Help command summary request
D$: Help summary of dialing commands
S$: Help summary of S-register usage
Ctrl-S: Help screen stop/restart toggle
Ctrl-C: Help screen display cancel
Ctrl-K: Help screen display cancel

AT EXTENDED COMMANDS SUMMARY

&An: ARQ result code enable/disable*
&A0—suppress ARQ result codes
&A1—display ARQ result codes
&Bn: Terminal/modem data rate
&B0—DTE/DCE rate follows link connection rate (default)
&B1—DTE/DCE rate fixed at DTE setting (19.2 k, 9600, 2400, 1200, 300)
&F: Load factory default (rom settings) into RAM~
&Hn: Transmit data flow control
&H0—disabled (default)
&H1—hardware (CTS, pin 5) flow control
&H2—software (XON/XOFF) flow control
&H3—hardware and software control
&In: Receive data flow control
&I0—disabled (default)
&I1—XON/XOFF sent to both local modem and remote system
&I2—XON/XOFF to local modem only
&I3—Host mode (Hewlett Packard protocol)
&I4—Terminal mode (Hewlett Packard protocol)
&Mn: Error control mode
&M0—Normal mode (error control disabled)
&M1-&M3—not used
&M4—Attempt ARQ connection, then switch to normal if not possible
&M5—ARQ mandatory (hang up if ARQ connection cant be made)
&Nn: Link data rate
&N0—normal-negotiate highest available speed with remote modem
&N1—300 bps
&n2—1200
&N3—2400
&N4-5—reserved
&N6 9600
&Pn: Dial pulse make/break ration
&P0—North American standard (default)
&P1—British Commonwealth standard
&Rn: Received data hardware flow control
&R0—reserved
&R1—ignore RTS (default)
&R2—Received data to terminate on RTS high
&Sn: DSR (Pin 6) override
&S0—DSR always ON (default)
&S1—modem controls DSR
&W: Write current settings to NRAM~
&Yn: Break handling. Destructive breaks clear the buffer. Expedited breaks are sent immediately to the remote modem.
&Y0—destructive (don't send break)
&Y1—destructive, expedited
&Y2—Non-destructive, expedited
&Y3—non-destructive, non-expedited
&Zn=s Write dial string s to NRAM at location n
&Zn? Display phone number in NRAM at location n~

SUPERVISOR 101 ROUTINES

The Supervisor 101 responds to the above-noted commands and provides the high-level control over the modem. The procedures for reading and writing data between the Supervisor 101 and the serial port 101 and for managing the buffer are contained in the serial interrupt handler SERIAL.

The Supervisor 101 additionally controls and responds to the serial port 114 by sending and receiving signals on its various control lines, and controls other portions of the modem including particularly the analog telephone interface network 104 which is controlled via control lines (indicated diagrammatically by 121 in FIGS. 1 and 2). The software/hardware interface for these controls is provided by the individual pins of the data ports of the Supervisor 101 as set (and read) by the interface routines listed in XIO.

AT commands from the DTE supplied to the Supervisor 101 via the serial port 114 are handled by the routine PARSE which interprets the command and calls the appropriate routine for performing the requested function. Additional command line parsing and user interface procedures are contained in the collection of subroutines named SUBS.

For modem users who may be unfamiliar with the form and function of the various standard and extended AT commands listed earlier, the command $ (as detected by PARSE) causes the modem to send back to the DTE, for display on the user's screen or console, a basic summary of the AT commands, while &$ produces a summary of the extended commands, D$ produces a summary of the dial commands and S$ produces a summary of the S-register commands. The procedure PUTSTRING in the routine HELP sends the requested summary to the DTE and the code for the summaries themselves is also contained in the routine HELP.

The Supervisor 101 is provided with a read only memory for program storage and for the storage of a variety of "factory default" values for use by the software. The modem further advantageously includes a programmable, nonvolatile random access memory (NRAM-not shown in the drawings) for storing a number of user-defined default values. When the modem is powered ON, these user-defined default values are loaded from NRAM for use by the software, or alternatively the factory-defined defaults in ROM storage are loaded, depending on the setting of a DIP-switch option. The parameters which may be stored in the NRAM may be displayed at any time by means of the Inquiry AT command I5. The routine NOVRAM contains the program for managing the default values and the NRAM memory.

In addition to selecting the appropriate default parameters, the Supervisor 101 also executes the initialization routines contained in the routine RESET upon power up and after the receipt of the AT reset command ATZ (which also resets the modem to the NRAM or ROM defaults).

The overall supervision of the modem when operating in its high-speed (9600 bps) mode is handled by the routine HS while the routine LS handles the same function for the low-speed (300, 1200 and 2400 bps) modes. The routine LS also handles the initial "handshaking" which takes place with the remote modem.

It is the task of the Supervisor 101 to monitor certain conditions in the "outside world" as evidenced by the signals appearing at the serial port 114 to the DTE and at the telephone line circuit 115. To do this rapidly and without significant additional hardware, the present invention makes use of the hardware timer/counters built into the Supervisor 101 8031 processor to provide signal detection services without tying down the processor itself. The timer/counters are used to provide call monitoring functions (handled by the CALLP routine) and to detect the rate at which data is being supplied from the DTE via the serial port 114 (handled by the AT_DETECT routine.

CALL PROGRESS DETECTION

Supervisor 101, working with analog signal detection circuits, monitors the status of the telephone line and includes a mechanism for detecting and distinguishing between answer tones generated by the remote modem, voice signals, dial tones, ring back signals, and busy signals.

This mechanism utilizes two signals developed by the analog telephone network 104 seen generally in FIG. 1 and described in detail in connection with FIG. 2. The two signals are the CALL PROGRESS SIGNAL produced at the output of threshold amplifier 280, and the CARRIER DETECT signal produced at the output 295 of the threshold amplifier 293. The CALL PROGRESS SIGNAL is a two level (e.g. 0 or 5 volt) signal depending upon whether the received signal from the telephone is above or below a predetermined threshold level.

By counting the number of transitions from level to level of the CALL PROGRESS SIGNAL during an interval of predetermined duration (such as 100 milliseconds), it is possible to obtain a measure of the average (principal) frequency of the signal.

Secondly, the CARRIER DETECT signal provides a second two-level logical signal which indicates whether or not the full-wave-detected (absolute value) of the received signal within the passband of the low-pass filter 292 is above or below the threshold level applied the threshold input 294 of the threshold amplifier 293.

The frequency determination is made by employing a hardware timer/counter (Timer 0) built into the 8031 processor utilized to implement the Supervisor 101. The CALL PROGRESS signal is applied to pin p3.4 of the 8031 Supervisor processor and the CARRIER DETECT SIGNAL is applied to pin p3.5. As seen by the routine entered at GETFREQ in the listing for CALLP (which shows all of the call progress code executed by the Supervisor 101), the 8031's TIMER 0 is set to monitor the CALL PROGRESS SIGNAL and counts transitions in that signal for a 100 millisecond period. During the same period, the CARRIER DETECT signal at pin p3.5 is monitored to verify that a high-level signal is present at each ten millisecond interval within the overall 100 millisecond interval during which that Timer 0 is counting CALL PROGRESS SIGNAL transitions.

The resulting frequency count is then used to indicate the line status in accordance with the following algorithm:

(1) if the frequency is between 2150 and 2500 Hz, an ANSWER TONE is deemed to be present;

(2) if the frequency is between 1130 and 2000 Hz, and continues for 4 100 millisecond periods (0.4 seconds), a VOICE signal is indicated;

(3) if the frequency is between 300 and 800 Hz and continues for more than 2.7 seconds (27 periods) then a DIAL TONE is indicated;

(4) if the frequency is between 300 and 800 Hz., and exists for at least 0.7 seconds (7 periods) but less than 2.7 seconds, a RING BACK signal is detected; and (5) if the frequency is between 300 and 800 Hz., and exists for between 0.2 and 0.6 seconds (2–6 periods in a row), followed by an indication of frequency count of less than 100 Hz. for at least one period, and that pattern happens 2 times in a row, a BUSY signal is indicated.

BAUD RATE DETECTION

The Supervisor 101 also uses the internal hardware timer/counter Timer 0 to automatically detect the rate at which data is being supplied to the modem via the standard RS-232C serial port (seen at 114 in FIG. 1) from the connected computer ("Data Terminal Equipment" or "DTE"). Baud rate detection is accomplished by using the internal counter Timer 0 in Supervisor 101 to measure the width of the start bit in the "A" character of each "AT" command received from over the serial port 114.

The AT routine executed by Supervisor 101 sets Timer 0 in the Supervisor 101 8031 processor to start counting at the beginning of each start bit (the main loop for doing baud rate sensing (ONLINE_JMP) repeatedly calls the procedure ONLINE_CHECK. The routine AT_REGULAR sets Timer 0 so that it will be gated OFF by the trailing edge of the start bit from the serial port, and then begins counting after resetting Timer 0 to a zero value. The resultant count is then available when it is determined that the start bit measured is the leading start bit in the AT command, to provide a measure of the serial port speed.

By utilizing a hardware timer which is directly controlled by the start bit, it is possible to detect higher baud rates (shorter start bits) up to the 19200 bps maximum port speed, a rate which could not be detected if the processor were to take repeated samples of the received data line and perform the count in software. In the illustrative embodiment, Timer 0 of the 8031 Supervisor processor is set up as a gated timer (by the statement MOV TMOD, #00101001b in AT_REGULAR) which then directly controlled by the start bit from the data port (which is inverted and applied to processor pin p3.4 [CD_PIN]). In this way, Timer 0 is turned ON by the SETB TR0 statement in AT_REGULAR and then is gated OFF at the trailing edge of the start bit to form the basis for the baud rate calculation.

DATA RATE AND FLOW CONTROL

The detected rate at which the DTE is sending information to the modem is used, along with other information, to ultimately determine the rate at which data will flow over the phone lines. The mechanism for compensating for the differences in the data flow rates between the phone link and the modem on the one hand, and between the modem and the DTE on the other, is generally called "flow control" and is enabled by means of the transmit data flow control commands (&Hn) and received data flow control commands (&In, &Rn), by which the user can specify whether the flow control commands between the modem and the DTE are sent via hardware control lines (CTS for transmit and RTS for receive), or by means of software control (XON/XOFF signals sent via the data line). Using the &Bn command, the user can set the data rate between the DTE and the modem to follow the phone link rate, or to be fixed at the DTE rate as determined by the AT_DETECT routine. Similarly, using the &Nn commands, the user can instruct the modem to use a predetermined phone line rate, or to operate in the normal (&N0) mode in which the highest rate is negotiated with the remote modem.

Initially, the modem detects its rate be detecting the rate at which the AT command is sent by the DTE using the routine AT_DETECT. (That rate is determined by the setting of the DTE itself, for example by a "mode" command in computer operating under MS/PC-DOS). When originating or answering a call, the modem and the remote modem negotiate the highest possible link rate. For example, if the AT_DETECT routine detects an AT command at 9600 bps and the modem calls a remote modem which is operating at 1200 bps, the originating modem automatically falls back to 1200 bps, and notifies the DTE of the link rate by sending a result code (e.g., "CONNECT 1200") to the DTE. When the modem re-enters the command mode (typically in response to a "+++" escape to command mode signal being detected in the data stream), it again detects the data rate on the serial port when the next AT command is received and returns to that rate (9600 bps in the example).

If the flow rate on the phone link is lower than the data rate at the serial port, the modem buffers the data from the serial port to enable the phone link to catch up. The modem monitors how full the buffer is, and sends the agreed (hardware or software) flow control command to the DTE to terminate the reciept of further data until more room is available in the buffer.

DYNAMIC DIRECTION ASSIGNMENT

The foregoing control mechanism controls the flow of data over the serial link. Still another mechanism for managing the flow of data occurs on the data link itself when the modem is operation in its asymmetric, high-speed mode in which data is sent at 9600 bps in one direction over the wideband channel (defined by forward channel filter 242 seen in FIG. 1) and at 300 bps in the opposite direction over the backchannel defined by filter 244 (FIG. 1). This mechanism, which operates automatically, is illustrated in FIG. 4 of the drawings.

Figure 4:
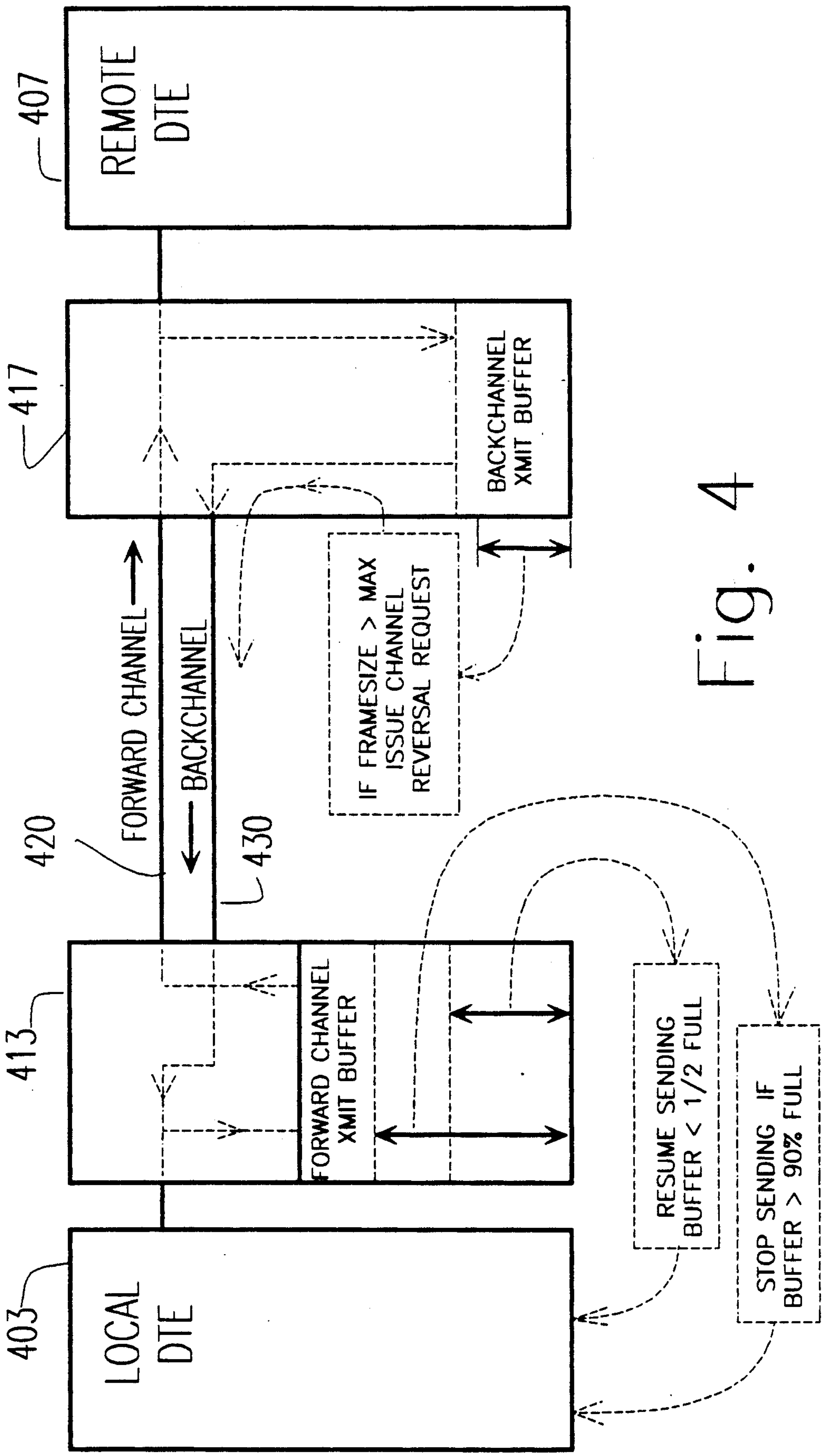
FIG. 4 is a block diagram which illustrates the manner in which the forward and backchannels of the modem are switched in the high speed mode in response to the level of demand placed on the backchannel.

As seen in FIG. 4, a local DTE 403 is shown communicating with a remote DTE 407 by a link created by the local modem 413 and the remote modem 417. These two modems are shown operating in the high speed mode with local modem 413 sending over the high speed channel (illustrated by the path 420) at 9600 bps. and receiving over the backchannel illustrated at 430 at 300 bps.

Since the local modem has been assigned the highest speed channel for transmission, it merely needs to monitor the amount of data in its forward channel transmit buffer to insure that buffer is not being overloaded. As seen in FIG. 4, if the forward channel buffer becomes filled to more than 90% of its capacity, it signals the connected DTE (by lowering CTS in hardware, or with a software XOFF signal) to stop sending data until the modem catches up. When the transmit buffer is emptied to less than half-full, the modem 413 signals the DTE 403 to resume transmitting.

At the remote end, the modem 413 also monitors the amount of data pending for transmission in the reverse direction over the backchannel 430. As will be discussed later, under the extended MNP protocol used in the present invention, data is transmitted in frames over the backchannel and largest frame that can be sent contains 64 bytes. In the event that more than 64 bytes of data is ready to be sent over the backchannel, the modem using the backchannel for transmission just verifies that the far modem has had the benefit of the high speed channel for transmission for at least a predetermined minimum period of time (e.g. 2 seconds), and if it has, the backlogged modem issues a link command (a type 4 LN Link Protocol Data Unit to be described below) to initiate a direction reversal, which is essentially transparent to the remainder of the link management protocol.

EXTENDED LINK PROTOCOL

The routines for supervising the transmission of information under the extended MNP protocol are found in the routine XMNP which is executed by the Supervisor 101.

In the standard MNP protocol, all data transmissions take place in groups formally termed "Link Protocol Data Units" (LDPU's) or simply "frames". In standard MNP, there are six types of frames:

(1) Link Request (LR) which communicates link-connection parameter information;
(2) Link Disconnect (LD) which signals termination of the data link and communicates the source and reason for the disconnection;
(3) Link Data (LT) is the frame which transfers link-user data over the link to another user;
(4) Link Acknowledgment (LA) which indicates the correct or incorrect receipt of data from the link, and which also sends flow-control information;
(5) Link Attention (LN) which is used to communicate a signal from one link-user to another; and
(6) Link Attention Acknowledgment (LNA) which acknowledges the receipt of an LA frame.

As in all error checking protocols, the standard MNP protocol maintains a continuous dialogue between the two ends of the data link to insure the integrity of the data transmission. Error detection is achieved by dividing the information into the above-noted LPDU's or frames, each of which begins and ends with a unique flag codes and each of which includes CRC (cyclic redundancy checking) codes. In standard MNP as well as in the protocol used in connection with the present invention, every frame of data being sent is processed by a cyclic algorithm which computes a 16-bit check value and inserts it into the frame being transmitted. At the receiving end, the same cyclic computation is performed on the received data and the resulting computed value is then compared against the received check value. The receiving station then transmits either a positive or negative acknowledgment based on the result of the comparison. If errors are detected, the receiving station accepts no more data until the defective frame is retransmitted and correctly received.

Under standard MNP, data is transferred over the link using the Link Data (LT) and Link Acknowledgment (LA) frames in a two-way exchange. In the simplest case, one LT frame is sent in a first direction over the link and an LA frame is then returned in the opposite direction over the link to communicate correct receipt of the LT frame. In the more general case, a single LA may acknowledge the receipt of several LT frames. Moreover, in addition to simple data transfer over the link, additional mechanisms control the flow of data to pace transmission so that the receiver is not overwhelmed with data, and a retransmission mechanism is employed to prompt the sender to retransmit frames which were received in error. These mechanisms are described in detail in the literature, including the MNP NETWORK SPECIFICATION, VERSION 1.0 (Version 1.0 dated Aug. 15, 1983), by Microcom, Inc., 1400A Providence Highway, Norwood, Mass. 02062. See also, ONE FILE-TRANSFER PROTOCOL SERVES ALL PERSONAL COMPUTERS, by James Dow, *Electronics*, Vol. 16, N. 16 (Aug. 11, 1983).

In accordance with a feature of the present invention, improved error-rates are achieved under the control of an extension of this MNP link protocol without the degradation in speed exhibited by other systems. The present modem's use of trellis coded modulation (TCM) makes the data transmitted less vulnerable to errors cause by telephone network impairments (TCM can tolerate twice the telephone channel noise power as conventional quadrature amplitude modulation and consequently requires fewer error-correcting transmissions). Moreover, the asymmetric architecture of the system (a wide forward passband and narrow backchannel passband) allows error-control retransmission requests to be sent from the high-speed receiver to the high-speed transmitter without requiring the "ping-ponging" direction reversals which characterize of half-duplex systems.

An improved control protocol is used to for more efficient error signalling over the limited bandwidth backchannel, allowing the backchannel to simultaneously supervise the operation of the highspeed forward channel while handling interactive communication (at keyboarding speeds). The improved error control protocol contemplated by the present invention is compatible with, and represents an extension to, the Microcom Networking Protocol (MNP) which is widely used in the industry, particulary in 2400 bps systems, and which is described in *MNP Networking Protocol Specification*, cited above. To reduce signalling overhead, frame formats have been streamlined to eliminate redundant bytes and new frame types not present in the standard protocol have been added for use on the back channel.

The basic structure and operation of the standard MNP protocol operates in the usual way in the present invention and, with the exception of the differences noted below, standard MNP rules and formats are followed. The differences will be more apparent by comparing the frame formats of the present, extended version (depicted in FIG. 5 of the drawings) with standard MNP formats. In particular, it may be noted that:

Frame formats are streamlined to eliminate redundant bytes. This is similar to standard MNP level 4, except that the process applies to all frame types, and the first Length indicator byte found in standard MNP has been removed.

Several new frame types are added to the extended version used by the present modem; namely, the NAK, the LTA, and (for the back channel only), LT1, LT2, LT3, LTR, LTDR. Various new Link Attention types (LN) are added to handle the line reversal and data rate switching.

The newly added NAK frame functions as a double ACK frame. It implies that the particular LT was the last correctly received, and that later incorrectly sequenced LTs were detected.

The newly added LTA is a combined Data frame (LT) and Ack frame (LA). Its purpose is to provide extra bandwidth for the back channel, and improved efficiency.

The LT1 is only transmitted by the backchannel. It is a fixed size data frame with only one (1) data byte. The lower 4 bits of the LT sequence number is sent in the upper nybble of the frame id byte as shown in FIG. 5.

The LT2 is only transmitted by the backchannel. It is a fixed size data frame with only two (2) data bytes. The lower 4 bits of the LT sequence number is sent in the upper nybble of the frame id byte as in the case of the LT1 format.

The LT3 is only transmitted by the backchannel. It is a fixed size data frame with only three (3) data bytes. The lower 4 bits of the LT sequence number is sent in the upper nybble of the frame id byte.

The LTR and LTDR are only transmitted by the backchannel. These are fixed size data frames with a special meaning: repeat (or double repeat for the LTDR) the last data frame. They are sent only if the last data frame was <5 bytes. In order to increase the Hamming distance of the FCS, A phantom OFFH is shifted into the CRC before transmitting it. This is done only because of the extremely small size of the frame.

Whenever a LT1, LT2, LT3, LTR, LTDR has to be retransmitted, it is reformatted into a standard LT frame. Because these frame types are fixed length, the receiver doesn't wait for the closing flag. It checks the first byte in a frame for one of the above types. If it is, then it verifies the CRC without waiting for the closing flag. This allows a reduction in the trasfer time.

These Frame types were added to decrease the round trip delay under interactive applications. "Most" use of the backchannel is likely to be for interactive use. The LTR and LTDR are intended for cases when a human holds down a key, and it auto-repeats. Many terminals have arrow keys that generate a two or three char escape sequence, literally starting with the ascii ESC char. So when the back channel transmitter detects an ESC, it waits a few ms to determine if a valid ESC sequence is pending. The LTR and LTDR help to keep up with repeated arrow keys.

A LN type 4 indicates a channel reversal at the current speed. It is sent by the back channel. A LNA is sent at the current speed, and then the reversal takes place.

The formats for all of the above-discussed LPDUS is graphically shown in FIG. 5 of the drawings.

TRANSMITTER 102 ROUTINES

All of the routines performed by the 8051 Transmitter processor 102 are contained in the Transmit module TR which is listed in full at the conclusion of this specification.

These routines perform initialization, the transfer of commands and data between the Supervisor 101 and the Receiver 103, and the interpretation of commands from the Supervisor 101 to the Transmitter 102. In addition, the routines in the TR module perform ring detection and dial tone generation.

The main task of the Transmitter 101 is the conversion of bits from the DTE into a digital signal which is supplied via the bus 123 to the DAC 175 (FIG. 1) for conversion into analog form for transmission.

The routine TR, when operating in its low speed mode, converts the digital information from the DTE into compatible 300, 1200 and 2400 (V.22 bis standard) signals for transmission over the phone lines. In its high speed mode, the TR routine performs the trellis encoding function specified in the V.32 standard (see "A FAMILY OF 2-WIRE, DUPLEX MODEMS OPERATING AT DATA SIGNALLING RATES OF UP TO 9600 BITS/S FOR USE ON THE GENERAL SWITCHED TELEPHONE NETWORK AND ON LEASED TELEPHONE-TYPE CIRCUITS, CCITT Recommendation V.32 (Malaga-Torremolinos, 1984).

RECEIVER 103 ROUTINES

The Receiver 103 is a high speed fixed point processor whose principal function is low-level processing of the received signal, converting the received signal samples from the ADC 173 into the bit stream to be sent to the DTE. In the high speed mode when the modem is transmitting on the high speed channel and receiving on the low speed back channel, the Receiver 103 assists the Transmitter 102 by doing some of the high speed transmitted signal filtering (it acts as a slave math processor and performs the routine MOD96 in this mode).

When Receiver 103 is receiving the high speed 9600 bps signal, it performs the routines listed under the headings DEMOD and VA in the assembly language which follows. VA is the routine for performing the "Viterbi Algorithm," the decision used logic used to perform the inverse trellis function defined in the V.32 standard, while the routine DEMOD contains the 9600 demodulàtor or "data pump" code.

The routine labeled 24MERC performs the data pump demodulation function at the lower speeds; that is, reception at 300, 1200 and 2400 bps, as well as reception over the 300 bps backchannel in the high speed mode.

ASSEMBLY LANGUAGE LISTINGS

The programs which are executed by the three processors are presented in the fully commented assembly language in the following listings, which have been organized in alphabetical order by module or routine name.

```
          UNL
*****************************************************
*
*         NAME:      24MERC
*         PURPOSE:   Backchannel, 300, 1200 and 2400, BAUD RECEIVER
*
*****************************************************
          IDT        '24MERC'

*** System Constants
TAPNUM    EQU        10

*** Port Definitions
OUT51     EQU        5                    ; output data port
IN51      EQU        4                    ; input data port
ADC       EQU        6                    ; analog to digital converter port
LATCHP    EQU        7                    ; latch port

*** Special Function Registers
DRR       EQU        0                    ; serial recv reg
DXR       EQU        1                    ; serial tx reg
TIM       EQU        2                    ; timer reg
PRD       EQU        3                    ; period reg
IMR       EQU        4                    ; interrupt mask reg
GREG      EQU        5                    ; global memory reg

*** Memorry Mapped Registers    Page 0
VECTOR    EQU        >60                  ; interrupt service vector
BOOST     EQU        >61                  ; long line boost value
FCODE     EQU        >62                  ; holds rcvr command
RESULT    EQU        >63                  ; sv data
SAMPL0    EQU        >64                  ; a/d sample 0
SAMPL1    EQU        >65                  ; a/d sample 1
SAMPL2    EQU        >66                  ; a/d sample 2
LATCH     EQU        >67                  ; output latch image
TIMER     EQU        >68                  ; baud timer
SYSFLG    EQU        >69                  ; system flags
T0        EQU        >6A                  ; temp timer
T1        EQU        >6B                  ; temp timer
X0        EQU        >6C                  ; temp reg
X1        EQU        >6D                  ; temp reg
X2        EQU        >6E                  ; temp reg
X3        EQU        >6F                  ; temp reg
ONE       EQU        >70                  ; useful constant
FEE       EQU        >71                  ; temp phi reg

*** Low Speed Receiver Variables    Page 7
INBUF     EQU        >380                 ; Physical location of input buffer
SAMPLS    EQU        >0                   ; relocatable input buffer

NEWQ0     EQU        SAMPLS+>0            ; baud times first P
```

```
NEWP0     EQU      SAMPLS+>1
NEWQ1     EQU      SAMPLS+>2
NEWP1     EQU      SAMPLS+>3

FLAG      EQU      INBUF+>4
FLAGS     EQU      >4                    ; receiver mode flags
*
*         bit 0 --- 1 = Phase Splitter Data Available
*         bit 1 --- 1 = Receive High Band
*         bit 2 --- 1 = 2400 Baud Mode
*         bit 3 --- 1 = 1100 Pattern Detect Mode
*         bit 4 --- 1 = 300 Baud Mode
*         bit 5 --- 1 = Save in B buffer during fast baud sync
*         bit 6 --- 1 = Back Channel Signal Detect Loop Flag
*         bit 7 --- 1 = Back Channel Receive Mode
*         bit 8 --- 1 = Back Channel Mode Two
*         bit 9 --- 1 = Back Channel Mode Three
*         bit 10 -- 1 = Back Channel Got Retrain Signal ( 400 hz )
*         bit 11 -- 1 = Detected 300 Hz on the back channel
*         bit 12 -- 1 = Use Four Taps for the back channel
*         bit 13 -- 1 = Slow alpha of phase corrector down to 1/2
*
*

RXLINE    EQU      INBUF+>5  ; real equilizer delay line
RXBASE    EQU      SAMPLS+>5
RX0       EQU      RXBASE+>0
RX1       EQU      RXBASE+>1
RX2       EQU      RXBASE+>2
RX3       EQU      RXBASE+>3
RX4       EQU      RXBASE+>4
RX5       EQU      RXBASE+>5
RX6       EQU      RXBASE+>6
RX7       EQU      RXBASE+>7
RX8       EQU      RXBASE+>8
RX9       EQU      RXBASE+>9
RXEND     EQU      RXLINE+TAPNUM-1       ; point to delay line end for equilizer shift

IXLINE    EQU      RXLINE+TAPNUM
IXBASE    EQU      RXBASE+TAPNUM         ; imaginary equilizer delay line
IX0       EQU      IXBASE+>0
IX1       EQU      IXBASE+>1
IX2       EQU      IXBASE+>2
IX3       EQU      IXBASE+>3
IX4       EQU      IXBASE+>4
IX5       EQU      IXBASE+>5
IX6       EQU      IXBASE+>6
IX7       EQU      IXBASE+>7
IX8       EQU      IXBASE+>8
IX9       EQU      IXBASE+>9
IXEND     EQU      IXLINE+TAPNUM-1       ; point to delay line end for equilizer shift
```

```
RWTAPS   EQU   IXLINE+TAPNUM      ; real taps
RWBASE   EQU   IXBASE+TAPNUM
RW0      EQU   RWBASE+>0
RW1      EQU   RWBASE+>1
RW2      EQU   RWBASE+>2
RW3      EQU   RWBASE+>3
RW4      EQU   RWBASE+>4
RW5      EQU   RWBASE+>5
RW6      EQU   RWBASE+>6
RW7      EQU   RWBASE+>7
RW8      EQU   RWBASE+>8
RW9      EQU   RWBASE+>9

IWTAPS   EQU   RWTAPS+TAPNUM
IWBASE   EQU   RWBASE+TAPNUM      ; imaginary taps
IW0      EQU   IWBASE+>0
IW1      EQU   IWBASE+>1
IW2      EQU   IWBASE+>2
IW3      EQU   IWBASE+>3
IW4      EQU   IWBASE+>4
IW5      EQU   IWBASE+>5
IW6      EQU   IWBASE+>6
IW7      EQU   IWBASE+>7
IW8      EQU   IWBASE+>8
IW9      EQU   IWBASE+>9

VBASE    EQU   IWTAPS+TAPNUM
VARBAS   EQU   IWBASE+TAPNUM      ; misc. variables
ALPHA    EQU   VARBAS+>0
RZN      EQU   VARBAS+>1
IZN      EQU   VARBAS+>2
TMPSUM   EQU   VARBAS+>3
INPTR    EQU   VARBAS+>4          ; pointer to input buffer
PHI      EQU   VARBAS+>5
COSPHI   EQU   VARBAS+>6
SINPHI   EQU   VARBAS+>7
ONE2     EQU   VARBAS+>8
RYM      EQU   VARBAS+>9          ; RYM & IYM are the demodulated V22 point
IYM      EQU   VARBAS+>A
ERROR    EQU   VBASE+>B           ; base for next four variables
REN      EQU   VARBAS+>B          ; REN & IEN are the error vector
DR       EQU   VARBAS+>C          ; DR & DI are the closest V22 point
IEN      EQU   VARBAS+>D
DI       EQU   VARBAS+>E
CON22    EQU   VARBAS+>F          ; useful constants
DECISN   EQU   VARBAS+>10         ; demodulated data
RERR     EQU   VARBAS+>11         ; real error vector
IERR     EQU   VARBAS+>12         ; imaginary error vector
AREN     EQU   VARBAS+>13         ; ALPHA * counter rotated Error Vector
AIEN     EQU   VARBAS+>14
PHCOR    EQU   VARBAS+>15         ; phase corrector sum
```

```
COMND    EQU  VARBAS+>16   ; command from supervisor
SVCMD    EQU  VARBAS+>17   ; command to supervisor
TEMP     EQU  VARBAS+>18   ; temporary input command
BAUDCT   EQU  VARBAS+>19   ; counts baud times
BAUDLP   EQU  VARBAS+>1A   ; second order baud loop counter
LOOP2    EQU  VARBAS+>1B   ; second order baud time counter
BDSUM    EQU  VARBAS+>1C
TEMP2    EQU  VARBAS+>1D
DICNT    EQU  VARBAS+>1E   ; 1100 pattern detect counter
RETRAN   EQU  VARBAS+>1F   ; poor signal quality counter

P        EQU  VARBAS+>20   ; back channel pattern detect variables
Q        EQU  VARBAS+>21
P1       EQU  VARBAS+>22   ; Pn-1
Q1       EQU  VARBAS+>23   ; Qn-1
U        EQU  VARBAS+>24
V        EQU  VARBAS+>25
UVSQRD   EQU  VARBAS+>26   ; U^2 + V^2
S400CT   EQU  VARBAS+>27   ; 400 Hz SDET counter
THRESH   EQU  VARBAS+>28   ; current SDET threshold
STRTFG   EQU  VARBAS+>29   ; flag from high speed TX saying got carrier
S300CT   EQU  VARBAS+>2A   ; 300 Hz detect counter
U300     EQU  VARBAS+>2B   ; U for the 300 Hz counter
V300     EQU  VARBAS+>2C
UV300    EQU  VARBAS+>2D   ; U300^2 + V300^2
LIM300   EQU  VARBAS+>2E   ; current 300 hz threshold
CLOCK    EQU  VARBAS+>2F
PQSQRD   EQU  VARBAS+>30   ; amplitude calcualtion result

RREN     EQU  VARBAS+>31
RIEN     EQU  VARBAS+>32

BRTIME   EQU  >36          ; 9600 TX counter

LVL1     EQU  >180         ; test level for pattern detect
LVL2     EQU  >300
AMPLIM   EQU  >500

*** Fast baud sync variables
ABUF     EQU  >390
ABUFR    EQU  >10
APTR     EQU  ABUFR+>8
BPTR     EQU  ABUFR+>9
WAITCT   EQU  ABUFR+>A     ; points to what sample to wait for
ACNT     EQU  ABUFR+>B
BCNT     EQU  ABUFR+>C
ASUM     EQU  ABUFR+>D     ; sum of A samples
BSUM     EQU  ABUFR+>E
AABS     EQU  ABUFR+>F     ; absolute value of ASUM
BBUF     EQU  >3A0
BBUFR    EQU  >20
```

```
QUTRCT     EQU     BBUFR+>8          ; quarter baud time counter

*** 300 Baud Definitions
VAR300     EQU     >10
FILOUT     EQU     VAR300+>0
SIGNS      EQU     VAR300+>1
SAMPZ0     EQU     VAR300+>2
SAMPZ1     EQU     VAR300+>3
SAMPZ2     EQU     VAR300+>4
OLDFIL     EQU     VAR300+>5
FILIN      EQU     VAR300+>6
OUT        EQU     VAR300+>7
OUTZ1      EQU     VAR300+>8
FILZ1      EQU     VAR300+>9
FILZ2      EQU     VAR300+>A
FILZ3      EQU     VAR300+>B
FILZ4      EQU     VAR300+>C
TMP        EQU     VAR300+>D

*** Bit Definitions
B0         EQU     >0F               ; LSB
B1         EQU     >0E
B2         EQU     >0D
B3         EQU     >0C
B4         EQU     >0B
B5         EQU     >0A
B6         EQU     >09
B7         EQU     >08
B8         EQU     >07
B9         EQU     >06
B10        EQU     >05
B11        EQU     >04
B12        EQU     >03
B13        EQU     >02
B14        EQU     >01
B15        EQU     >00               ; MSB

*** External Variables
           REF     RETURN,WAIT,TSIDLE,GETCOS,DISBOX,EXEC,INIT,CLRMOD

           DEF     ORG3,ORG12,ORG24,ANS3,ANS12,ANS24
           DEF     DIBITO,DIBITA,BCRCV,START,STOP,AGCHI,AGCLOW
           DEF     BCRCV2,BCRCV3

*****************************************************
*
*          Interrupt Service Routines
*
*****************************************************

           UNL
```

```
* High Band Routine
*
*   SAMPLE & HOLD
*           *ATTENTION - FREQUENCY CHART MISSING*****
*           105         25          Q0          P       (Q0-Q1)/2
*
*
*   SAMPLE & HOLD
*             210sF         210sf     210sf          210sf
* READ:          Q0        P         (Q0-Q1)/2
*
            LIST

* Contains High and Low Band Interrupt Routines.
* High band counts:       TIMER -- 645   (525uS)
*                                    T0    -- 129   (105uS)
*
* Low band counts :       TIMER -- 258   (210uS)
*                                    T0    -- 258
*
* Back Channel Counts:  TIMER -- 1032
*                                    T0    -- 1032
*
* T1 holds TIMER reload value

STARTC
            RXF                                ; start sample time
            LALK        GETQ0
            SACL        VECTOR
*           RPTK        14
            RPTK        28
            NOP                                ; sample for 4 us
            SXF                                ; start conversion
            B           RETURN

GETQ0
            RXF                                ; start sample time
            LALK        GETP
            SACL        VECTOR
            IN          SAMPL0,ADC             ; read in Q0
            LAC         SAMPL0,8
            XORK        >8000,0                ; invert the sign bit
            SACL        SAMPL0
*           RPTK        8
            RPTK        22
            NOP                                ; finish 4 us
            SXF                                ; start conversion
            B           RETURN

GETP
            RXF                                ; start sample time
```

```
        LALK    GETQ1
        SACL    VECTOR
        IN      SAMPL1,ADC          ; read in P
        LAC     SAMPL1,8
        XORK    >8000,0             ; invert sign bit
        SACL    SAMPL1
        LAC     TIMER               ; skip 5 9600 samples ( high band )
        SACL    PRD
        LAC     T1
        SACL    TIMER
*       RPTK    4
        RPTK    18
        NOP                         ; wait out 4us
        SXF                         ; start conversion
        B       RETURN

GETQ1
        LALK    STARTC
        SACL    VECTOR
        IN      SAMPL2,ADC          ; read in Q0
        LAC     SAMPL2,8   ; invert sign bits
        XORK    >8000,0
        SACL    SAMPL2
        LAC     SAMPL0,0   ; get (Q0-Q1)/2
        SUB     SAMPL2
        SFR
        LDPK    >7                  ; point to data page 7
        SAR     AR1,*,1             ; push AR1
        LAR     AR1,INPTR  ; get buffer pointer
        SACL    *+                  ; push Q
        LDPK    >0                  ******** could put samples in page 7
        LAC     SAMPL1
        LDPK    >7
        SACL    *+,0,4              ; push P and set to AR4 ( stack pointer )
        SAR     AR1,INPTR
        LAR     AR1,*               ; pop AR1
        LAC     INPTR,0             ; set to beginning of input buffer
        ANDK    >FFFB
        SACL    INPTR
        ANDK    >0003
        BNZ     HALFBD              ; if first P&Q then don't set baud end flag
        LAC     FLAGS
        ORK     >0001               ; set baud end flag
        SACL    FLAGS
HALFBD
        BIT     FLAGS,B7
        BBNZ    NOCOMM              ; if back channel then no communication
        BIT     FLAGS,B0   ; check 1/2 baud time for commands
        BBNZ    SNDDAT              ; if half baud time send commands
        IN      TEMP,IN51
        OUT     SVCMD,OUT51         ; send any commands
```

```
        LALK    >FFFF
        SACL    SVCMD

        LDPK    >0
        LAC     LATCH
        ANDK    >FF7F           ; clear test line
        SACL    LATCH

        B       OUTIT
SNDDAT
        IN      TEMP,IN51
        OUT     DECISN,OUT51    ; send the demodulated data
OUTIT
        LDPK    >0
        LAC     LATCH
        ANDK    >FFFE           ; lower TX interrupt line
        SACL    LATCH
        OUT     LATCH,LATCHP
        ORK     >0081           ; raise TX interrupt line
        SACL    LATCH
        RPTK    5
        NOP                     ; give TX time to be interupted
        OUT     LATCH,LATCHP
        LDPK    >7

***** NOTE!!!!!!!!!
***** Cannot send commands to the Supervisor faster than
***** 600 times per second while on line.

        BIT     TEMP,B7
        BBNZ    NOCOMM          ; check for valid command
        LAC     TEMP
        ANDK    >00FF
        SACL    COMND
NOCOMM
        LDPK    >0
        LAC     T0              ; set for 9600 baud samples ( hi band )
        SACL    PRD
        B       RETURN

*******************************************************
*
*       300 baud interrupt routine
*
*******************************************************
FSKINT
        RXF                     ; start sample time
        LDPK    >7
        IN      SAMPZ0,ADC      ; read in Q0
        LAC     SAMPZ0,8
        XORK    >8000,0         ; invert the sign bit
```

```
          SACL      SAMPZ0
*         RPTK      10
          RPTK      24
          NOP                           ; finish 4 us
          SXF                           ; start conversion
          LAC       FLAGS
          ORK       >0001               ; set baud end flag
          SACL      FLAGS
          IN        TEMP,IN51
          OUT       DECISN,OUT51        ; send the demodulated data
          LDPK      >0
          LAC       LATCH
          ANDK      >FFFE               ; lower TX interrupt line
          SACL      LATCH
          OUT       LATCH,LATCHP
          ORK       >0081               ; raise TX interrupt line
          SACL      LATCH
          RPTK      5
          NOP                           ; give TX time to be interupted
          OUT       LATCH,LATCHP
          LDPK      >7
          BIT       TEMP,B7
          BBNZ      NOCMD               ; check for valid command
          LAC       TEMP
          ANDK      >00FF
          SACL      COMND
NOCMD
          LACK      >FF
          SACL      DECISN
          B         RETURN

*****************************************************
*
*         PROCESS RECEIVER COMMANDS
*
* Receiver Commands:
*         >61.........Originate 300 Baud
*         >62.........Originate 1200 Baud
*         >63.........Originate 2400 Baud
*         >64.........Answer 300 Baud
*         >65.........Answer 1200 Baud
*         >66.........Answer 2400 Baud
*         >67.........Originate Mode Dibit Detect
*         >68.........Answer Mode Dibit Detect
*         >69.........Back Channel Receive Mode
*         >6a.........Stop
*         >6b.........Restart Receiver
*         >6c.........Go 2400
*         >6d.........Raise the AGC line
*         >6e.........Lower the AGC line
*         >6f.........Back Channel Two Receive Mode
```

```
*           >70.........Back Channel Three Receive Mode
*
*****************************************************

ORG3
        POP                         ; get the return address of the stack
        LDPK    >0
        LACK    146                 ; 8482.19 Hz
        DINT
        SACL    PRD
        SACL    TIM
        LDPK    >7
        LACK    >12                 ; set to receive high band 300 baud
        SACL    FLAGS
        B       FSK                 ; jump to 300 baud receiver loop

ORG12
        POP
        LDPK    >7
        LACK    >02                 ; set 1200 baud high band
        SACL    FLAGS
        B       BDSYNC

ORG24
        POP
        LDPK    >7
        LACK    >06                 ; set 2400 baud high band
        SACL    FLAGS
        B       BDSYNC

ANS3
        POP
        LALK    265                 ; 4673.2 Hz
        DINT
        SACL    PRD
        SACL    TIM
        LDPK    >7
        LACK    >10                 ; set 300 baud low band
        SACL    FLAGS
        B       FSK

ANS12
        POP
        LDPK    >7
        ZAC                         ; set 1200 baud low band
        SACL    FLAGS
        B       BDSYNC

ANS24
        POP
        LDPK    >7
```

```
        LACK    >04          ; set 2400 baud low band
        SACL    FLAGS
        B       BDSYNC

DIBITO
        POP
        LDPK    >7
        LACK    >0A          ; set high band dibit detect
        SACL    FLAGS
        B       DEMOD

DIBITA
        POP
        LDPK    >7
        LACK    >08          ; set low band dibit detect
        SACL    FLAGS
        B       DEMOD

BCRCV
        POP
        LDPK    >7
        LACK    >80          ; set back channel receive
        SACL    FLAGS

        CALL    CLRMOD       ; 9600 TX setup
        LDPK    >0
        LACK    >0A
*       LACK    >08
        SACL    IMR          ; enable timer and external ints
        B       DEMOD

BCRCV2
        POP
        LDPK    >7
        LALK    >180         ; set back channel two receive
        SACL    FLAGS

        CALL    CLRMOD       ; 9600 TX setup
        LDPK    >0
        LACK    >0A
*       LACK    >08
        SACL    IMR          ; enable timer and external ints
        B       DEMOD

BCRCV3
        POP
        LDPK    >7
        LALK    >280         ; set back channel two receive
        SACL    FLAGS

*       CALL    CLRMOD       ; 9600 TX setup
```

```
            LDPK    >0
            LACK    >02
*           LACK    >08
            SACL    IMR            ; enable timer and external ints
            LDPK    >7
            ZAC                    ; zero the start flag
            SACL    STRTFG
            LALK    LVL1
            SACL    THRESH
            SACL    LIM300
WAITFG
            BIT     STRTFG,B6
            BBZ     WAITFG

            LDPK    >6                     ; delay 5 ms for AGC to settle
            LACK    12
            ADD     BRTIME
            LDPK    >7
            SACL    TMPSUM
            LAR     AR0,TMPSUM
            LDPK    >6
            LARP    1
LOOP
            LAR     AR1,BRTIME
            CMPR    0
            BBZ     LOOP

            LDPK    >0
            LACK    >0A
            SACL    IMR
            DINT
            B       DEMOD

STOP
            POP
            CALL    AGCLOW
            DINT
            LDPK    >0
            LACK    >08
            SACL    IMR            ; disable ext. interrupt
            EINT
            B       INIT

AGCLOW
            LDPK    >0
            DINT
            LAC     LATCH
            ANDK    >FFFB
            SACL    LATCH
            EINT
            RET
```

```
START
          DINT
          LDPK      >7
          LAC       FLAGS
          ANDK      >FFFE               ; reset      baud end flag
          SACL      FLAGS
          B         DEMOD

AGCHI
          LDPK      >0
          DINT
          LAC       LATCH
          ORK       >04
          SACL      LATCH
          EINT
          RET

REDOBC
          LALK      >280                ; retrain back channel two
          SACL      FLAGS
          LDPK      >0
          DINT
          LAC       LATCH
*         ORK       >04
          ANDK      >FFFB               ; set AGC wideband
          SACL      LATCH
          B         SETBC2

*****************************************************
*
*   DEMODULATE THE RECEIVE SIGNAL ALL MODES
*
*****************************************************

DEMOD
*** Set up timers depending on band
          DINT

*         LDPK      >0
*         LAC       LATCH
*         ANDK      >FFFB
*         ORK       >04                 ; set AGC narrow band
*         SACL      LATCH
          LDPK      >7

          BIT       FLAGS,B7    ; check for back channel
          BBZ       NOTBAK

          BIT       FLAGS,B9
          BBNZ      SETBC2
```

```
        BIT     FLAGS,B8   ; check back channel 2
        BBZ     BACK1
SETBC2
        LDPK    >0

        LALK    3537
        SACL    TIMER
        SACL    T1

        LALK    885
        SACL    T0
        SACL    TIM

        LRLK    AR1,STARTC
        B       SETVEC

BACK1
        LALK    1032                ; set for 1/1200 sec. samples
        LDPK    >0
        SACL    TIM
*
        LRLK    AR1,STARTC
        B       SETTIM
NOTBAK
        BIT     FLAGS,B1
        BBZ     SETLOW
        LDPK    >0
        LALK    645
        SACL    TIMER
        SACL    T1                  ; timer reload count
        LACK    129                 ; set for 1/9600 sec. samples
        SACL    T0
        LRLK    AR1,STARTC          ; setup first interrupt vector
        B       SETVEC
SETLOW
        LALK    258                 ; set for 1/4800 sec. samples
        LRLK    AR1,GETQ0 ; correct first interrupt after fast baud sync
SETTIM
        LDPK    >0
        SACL    TIMER
        SACL    T0
        SACL    T1
SETVEC
        SACL    PRD
        SAR     AR1,VECTOR
        LACK    >1
        SACL    ONE

        EINT

        LDPK    >7
```

```
        SACL    ONE2
        LALK    22,8
        SACL    CON22
        LALK    >FFFF
        SACL    COMND
        SACL    DECISN
        SACL    SVCMD
        LRLK    AR1,RXLINE          ; zero out equilizer delay line
        LARP    1
        ZAC
        RPTK    (TAPNUM*2)-1        ; clear 20 words
        SACL    *+
        RPTK    (TAPNUM*2)-1
        SACL    *+                  ; clear the taps

        SACL    PHI                 ; reset PHI
        SACL    BAUDCT
        SACL    BAUDLP
        SACL    PHCOR
        SACL    DICNT
        SACL    RETRAN

        LALK    >4000
        SACL    CLOCK
        LACK    60                  ; let second order baud loop
        SACL    LOOP2               ; execute after 120 baud times

        BIT     FLAGS,B7
        BBNZ    SET23
        LAC     ONE2,14             ; set center tap to .5+j0
        SACL    RW5
        LAC     ONE2,12             ; init alpha
        SACL    ALPHA               ; to 1/8
        B       NOCLRT
SET23
        BIT     FLAGS,B8
        BBNZ    INITA

        BIT     FLAGS,B9
        BBNZ    INITA

        LALK    >2CCC               ; set taps 2 & 3 to .35 +j0 for back channel
        SACL    RW2
        SACL    RW3
INITA
        LALK    >7FFF               ; init alpha
        SACL    ALPHA               ; to 1 for back channel
NOCLRT
        LALK    INBUF               ; init phase splitter input pointer
        SACL    INPTR
```

```
INSHFT
        BIT     FLAGS,B0   ; begin main demod loop
        BBZ     INSHFT              ; check for input samples completed
        LAC     FLAGS
        ANDK    >FFFE               ; reset baud done flag
        SACL    FLAGS

*** move the new phase splitter samples into the delay lines

        LRLK    AR1,IXEND-2         ; shift twice to make room for new Ps and Qs
        LARP    >1
        RPTK    17                  ; shifting RX and IX at same time
        DMOV    *-
        LRLK    AR1,IXEND-1
        RPTK    17
        DMOV    *-
        LAC     NEWP0               ; put new samples in delay line
        SACL    RX1
        LAC     NEWP1
        SACL    RX0
        LAC     NEWQ0
        SACL    IX1
        LAC     NEWQ1
        SACL    IX0

        LAC     CLOCK
        NEG
        SACL    CLOCK
        LAC     BAUDCT              ; increment baud counter
        ADD     ONE2
        SACL    BAUDCT

        BIT     FLAGS,B9   ; check back channel 2
        BBZ     TAPCT
        BIT     FLAGS,B13
        BBNZ    DODIS

        LAC     BAUDCT              ; slow phase corrector after 2 sec.
        SBLK    200
        BNZ     CHK10

        LAC     FLAGS
        ORK     >2000
        B       DODIS

CHK10
        BIT     FLAGS,B12  ; slow ALPHA after ten baud times
        BBNZ    DODIS

        LAC     BAUDCT
        SBLK    11                  ; count starts at 1
```

```
        BNZ     DODIS
        LAC     FLAGS
        ORK     >1000
        SACL    FLAGS

        LALK    >1FFF                   ; alpha = 1/4
        SACL    ALPHA

        LDPK    >0
        LAC     LATCH
*       ANDK    >FFFB
        ORK     >04                     ; set AGC narrow band
        SACL    LATCH
        LDPK    >7
        B       DODIS

TAPCT
        BIT     FLAGS,B14
        BBNZ    DODIS

        LAC     BAUDCT                  ; slow tap update speed after 2 sec.
        SBLK    1200
        BNZ     DODIS

        LAC     FLAGS
        ORK     >4000
        SACL    FLAGS

        LAC     ONE2,11                 ; 1/16
        SACL    ALPHA

DODIS

************************
* xfer eye to p4
        LAC     RYM
        LAR     AR0,IYM
        LDPK    4
        SAR     AR0,>1D
        SACL    >1C
************************

        CALL    DISBOX
        LDPK    >7                      ; restore after DISBOX

*******************************************************
*
*       Check for commands from the supervisor
*
*       Command >6c is the only one processed on the fly
*
```

```
*****************************************************

         BIT       COMND,B7
         BBNZ      BAUDTM                ; if bit 7 = 1 then not a command
         LAC       COMND
         SBLK      >006C                 ; check for GO 2400
         BZ        GO24
         LAC       COMND
         LDPK      0                     ; put the command into FCODE
         SACL      FCODE
         CALL      EXEC                  ; jump to execute commands
         B         BAUDTM
GO24
         LACK      >FF
         SACL      COMND                 ; reset COMND
         LAC       PHI                   ; counter rotate PHI
         SBLK      >12E4                 ; by 26.56 degrees
         SACL      PHI
         LAC       FLAGS
         ORK       >04                   ; set flags to 2400 baud
         SACL      FLAGS

*****************************************************
*
*        First Order Baud Loop Calculation
*
*        Equation:
*                  RX0^2 + IX0^2 - RX1^2 - IX1^2 + RX2^2.......
*
*****************************************************

BAUDTM
*        B         CHKDI

         BIT       FLAGS,B7
         BBNZ      DOBAUD

         LAC       BAUDCT                ; Do baud calc every 4 baud times
         ANDK      >0003
         BNZ       BAUD2
DOBAUD
         LRLK      AR2,IXLINE
         LRLK      AR1,RXLINE
****
**** Make sure only do filter computation on eight and only eight taps
****
         LRLK      AR0,RXEND-1
         ZAC
         LARP      >1
         MPYK      >0                    ; P ---> 0
```

```
SQUARE
*                                         ; Get the sum of the squares
        SQRS     *+,2                     ; RX0^2
        SQRA     *+,1                     ; IX0^2   ACC = RX0^2
        SQRA     *+,2                     ; RX1^2   ACC = RX0^2 + IX0^2
        SQRS     *+,1                     ; IX1^2   ACC = RX0^2 + IX0^2 - RX1^2
        CMPR     0
        BBZ      SQUARE
        SPAC
        SACH     BDSUM
        BIT      FLAGS,B7     ; set TC bit to value of back channel
        LDPK     >0
        BGEZ     SHORT
        LAC      TIMER                    ; lengthen the baud time
        BBNZ     ADD4
        ADD      ONE
        SACL     TIMER
        B        UPDCNT
ADD4
        ADD      ONE,2
        SACL     TIMER
        LDPK     >7
        LAC      BAUDLP                   ; subtract 4 from the integrator
        SUB      ONE2,2
        SACL     BAUDLP
        B        CKLIM
SHORT
*                                         ; shorten the baud time by one count
        LAC      TIMER
        BBNZ     SUB4
        SUB      ONE
        SACL     TIMER
        B        UPDCNT
SUB4
        SUB      ONE,2
        SACL     TIMER
        LDPK     >7
        LAC      BAUDLP                   ; add 4 to the integrator
        ADD      ONE2,2
        SACL     BAUDLP
        B        CKLIM
UPDCNT
        LDPK     >7
        ZALH     BAUDLP
        ADD      BDSUM,8                  ; add 1/64*filter sum to the counter
        SACH     BAUDLP
        LAC      BAUDLP
CKLIM
        SBLK     >F00
        BLZ      CKUNDR
        LALK     >EFF                     ; limit the count to + - 15
```

```
        SACL    BAUDLP
        B       BAUD2
CKUNDR
        LAC     BAUDLP
        ADLK    >E00
        BGEZ    BAUD2
        LALK    >F200
        SACL    BAUDLP

BAUD2
*                                   ; second order baud loop
        LAC     LOOP2               ; DJNZ LOOP2
        SUB     ONE2
        BNZ     SAVCNT
        BIT     FLAGS,B7  ; set TC to back channel mode
        LAC     BAUDLP
        LDPK    >0
        BLZ     ADDTM               ; if BAUDLP < 0 then lengthen baud loop
        ANDK    >FF00               ; if between 0 and 00FF then don't adjust
        BZ      GETCNT
        LAC     TIMER
        BBNZ    SUBB4
        SUB     ONE
        B       SAVTIM
SUBB4
        SUB     ONE,2
        B       SAVTIM
ADDTM
        LAC     TIMER
        BBNZ    AD4
        ADD     ONE
        B       SAVTIM
AD4
        ADD     ONE,2
SAVTIM
        SACL    TIMER
GETCNT
        LDPK    >7
        LAC     BAUDLP,8  ; get upper 8 bits of BAUDLP
        SACH    LOOP2
        LAC     LOOP2
        ABS                         ; ranges from 0 to 14
        ADLK    BAUDTB              ; do table read of LOOP2
        TBLR    LOOP2
        B       CHKDI

BAUDTB
        DATA    60
        DATA    60
        DATA    30
        DATA    20
```

```
        DATA    15
        DATA    12
        DATA    10
        DATA    9
        DATA    8
        DATA    7
        DATA    6
        DATA    5
        DATA    4
        DATA    3
        DATA    2

SAVCNT
        SACL    LOOP2

*****************************************************
*
*       1100 Pattern Detect
*
*       Compare P's from Two Baud Times Apart.
*       If the difference is < 20 then add
*       one to the count else subtract four.
*       The count threshold is 20.
*
*****************************************************

CHKDI
        LDPK    >7
        BIT     FLAGS,B7
        BBNZ    SDET            ; if back channel do 318.75 hz detect
        LAC     RX0
        SUB     RX4
        ABS
        SBLK    20,8
        BLZ     ADDONE          ; difference less than 20?
        LAC     DICNT
        SUB     ONE2,2          ; subtract 4
        BGEZ    STORCT
        ZAC                     ; lower limit = 0
STORCT
        SACL    DICNT
        B       DIDONE
ADDONE
        LAC     DICNT
        ADD     ONE2
        SACL    DICNT
        SBLK    20
        BLZ     DIDONE          ; count less than 20
        LACK    20
        SACL    DICNT           ; upper limit = 20
        LAC     SVCMD
```

```
         ADD     ONE2                ; check SVCMD = >FFFF
         BNZ     DIDONE              ; if not >FFFF then don't send
         LACK    >01                 ; 1100 dectect command to sup
         SACL    SVCMD
         B       DIDONE

SDET
         LAC     RX1                 ; shift into correct variable locations
         SFR
         SACL    P

         LAC     IX1
         SFR
         SACL    Q

         LAC     RX2
         SFR
         SACL    P1

         LAC     IX2
         SFR
         SACL    Q1

         SQRA    RX1        ; get P^2 + Q^2 for amplitude test
         ZAC
         SQRA    IX1
         APAC
         SACH    PQSQRD,1

*        S pattern detect routine to notch out 400 Hz.
*        C1 is a constant defined during the equate section

SCOMP

         LAC     P
         SUB     P1
         SACL    U

* calculate V
         LAC     Q
         SUB     Q1
         SACL    V

         LAC     P
         ADD     P1
         SACL    U300

         LAC     Q
         ADD     Q1
         SACL    V300
```

```
         SQRA    V           ; get U^2 + V^2
         ZAC
         SQRA    U
         APAC
         SACH    UVSQRD,1

         SQRA    V300        ; get U300^2 + V300^2
         ZAC
         SQRA    U300
         APAC
         SACH    UV300,1

         LAC     UVSQRD
         SUB     THRESH
         BGZ     CNT0

         LAC     S400CT
         ADD     ONE2
         SACL    S400CT
         SBLK    8
         BLZ     CHK300

         LACK    8
         SACL    S400CT
         LAC     FLAGS
         ORK     >400                ; send pattern detect with next decision
         SACL    FLAGS
         LALK    LVL2
         SACL    THRESH
         B       CHK300

CNT0
         ZAC
         SACL    S400CT
         LALK    LVL1
         SACL    THRESH

CHK300
         LAC     UV300
         SUB     LIM300
         BGZ     NO300

         LAC     S300CT
         ADD     ONE2
         SACL    S300CT

         SBLK    8
         BLZ     CHKAMP
         LACK    8
         SACL    S300CT
         LAC     FLAGS
```

```
        ORK     >800        ; send pattern detect with next decision
        SACL    FLAGS
        LALK    LVL2
        SACL    LIM300
        B       CHKAMP

NO300
        ZAC
        SACL    S300CT
        LALK    LVL1
        SACL    LIM300

CHKAMP
        LAC     PQSQRD      ; check for low amplitude, if yes zero out the counts
        SBLK    AMPLIM
        BGZ     CHKLP
        ZAC
        SACL    S300CT
        SACL    S400CT
        LALK    LVL1
        SACL    LIM300
        SACL    THRESH

CHKLP
        BIT     FLAGS,B6
        BBNZ    CMPEND
        LAC     FLAGS
        ORK     >40
        SACL    FLAGS

        LAC     RX0
        SFR
        SACL    P

        LAC     IX0
        SFR
        SACL    Q

        LAC     RX1
        SFR
        SACL    P1

        LAC     IX1
        SFR
        SACL    Q1

        SQRA    RX0         ; get P^2 + Q^2 for amplitude test
        ZAC
        SQRA    IX0
        APAC
        SACH    PQSQRD,1
```

```
        B          SCOMP

CMPEND
        LAC        FLAGS
        ANDK       >FFBF                ; clear SCOMP flag
        SACL       FLAGS

DIDONE

*****************************************************
*
*       Equilizer Update ( Calculate RZN + j IZN )
*
*       RZN = ( RX * RW ) - ( IX * IW ) summed over all taps
*       IZN = ( RX * IW ) + ( RW * IX )
*
*****************************************************

UPDEQ
        LARP       >1
        LRLK       AR2,RWTAPS           ; AR2 ----> RW0
        LRLK       AR1,RXLINE           ; AR1 ----> RX0
        LRLK       AR0,RXEND+1          ; used to see if end of multiply loop

        ZAC
        SACL       RZN
        SACL       IZN
        MPYK       0                    ; zero P reg.
        SPM        0

RXRW
        LTA        *+,2                 ; T = RX
        MPY        *+,1                 ; RX * RW
        CMPR       0                    ; see if AR0=AR1
        BBZ        RXRW
        APAC
        MPYK       0
        LRLK       AR0,IXEND+1

IXIW
        LTS        *+,2                 ; T = IX
        MPY        *+,1                 ; IX * IW
        CMPR       0
        BBZ        IXIW
        SPAC
        SFL
        SACH       RZN,1

        ZAC
        MPYK       0                    ; P = 0
        LRLK       AR2,IXLINE
```

```
        LRLK    AR0,IWTAPS          ; AR0 ---> RW end

RWIX
        LTA     *+,2                ; T = RW
        MPY     *+,1                ; IX * RW
        CMPR    0
        BBZ     RWIX
        LRLK    AR0,IWTAPS+10       ; AR0 ---> IW end
        LRLK    AR2,RXLINE          ; AR2 ---> RX

RXIW
        LTA     *+,2                ; T = IW
        MPY     *+,1                ; RX * IW
        CMPR    0
        BBZ     RXIW
        APAC
        SFL
        SACH    IZN,1

*** Get the COSINE and SINE of PHI
        LAC     PHI
        CALL    GETCOS
        LDPK    >0
        LAR     AR0,X2              ; get SIN(PHI)
        LAC     X3                  ; get COS(PHI)
        LDPK    >7
        SACL    COSPHI
        SAR     AR0,SINPHI

*****************************************************
*
*       Phase Rotation
*
*       RYM = ( RZN * COSPHI ) - ( IZN * SINPHI )
*       IYM = ( RZN * SINPHI ) + ( IZN * COSPHI )
*
*****************************************************

        LT      RZN
        MPY     COSPHI
        LTP     IZN
        MPY     SINPHI
        SPAC
        SFL                         ; take into account sin and cos
*                                   ; are half what they should be
        SACH    RYM,1

        MPY     COSPHI              ; IZN ---> T
        LTP     RZN
        MPY     SINPHI
        APAC
```

```
        SFL
        SACH        IYM,1

*******************************************************
*
*   Derive the Error Vector and the V22 point
*
*   Error Vector --- REN + j IEN
*   V22 Point    --- DR  + j DI
*
*******************************************************

        ZAC
        SACL        DECISN
        LAC         RYM
        LRLK        AR1,ERROR ; REN, IEN, DR, DI base

        BIT         FLAGS,B9
        BBNZ        BC3PT

        BIT         FLAGS,B2    ; check for 1200 baud
        BBZ         D1200
        BIT         ONE2,B15               ; reset TC
CKSIGN
        BLZ         NEGATV
        SUB         CON22,1                ; subtract 44
        BLZ         LILPOS
        SUB         CON22                  ; subtract 22
        SACL        *+                     ; store in REN
        LALK        66,8
        SACL        *+                     ; V22 point = +66 (DR)
        LACK        >03                    ; used for data lookup ranges from
        B           GETIEN                 ; very neg to very pos. 00,01,10,11
LILPOS
        ADD         CON22
        SACL        *+
        LAC         CON22
        SACL        *+
        LACK        >02
        B           GETIEN
NEGATV
        ADD         CON22,1                ; add 44
        BGZ         LILNEG
        ADD         CON22                  ; add 22
        SACL        *+
        LALK        66,8
        NEG
        SACL        *+
        ZAC
        B           GETIEN
LILNEG
```

```
        SUB     CON22
        SACL    *+
        LAC     CON22
        NEG
        SACL    *+
        LACK    >01
GETIEN
        BBNZ    GOTALL
        OR      DECISN
        SACL    DECISN
        LAC     IYM
        BIT     ONE2,B0          ; set TC bit
        B       CKSIGN           ; redo for IYM
D1200
        BLZ     NOTPOS
        SBLK    49,8             ; subtract 49
        SACL    *+
        LALK    49,8
        SACL    *+
        LACK    >03
        B       DOIEN
NOTPOS
        ADLK    49,8             ; add 49
        SACL    *+
        LALK    49,8
        NEG
        SACL    *+
        ZAC
DOIEN
        BBNZ    GOTALL
        OR      DECISN
        SACL    DECISN
        LAC     IYM
        BIT     ONE2,B0          ; set TC
        B       D1200

GOTALL
        SFL
        SFL
        OR      DECISN
        ADLK    DTATBL
        TBLR    DECISN           ; got the receive data
        LAC     DECISN
        LDPK    >0
        SACL    RESULT
        LDPK    >7
        B       ROTATE

*********************************************************
*
*  Derive the Back Channel Three Data Point
```

```
*
*    Error Vector --- REN + j IEN
*    V22 Point    --- DR  + j DI
*
****************************************************
BC3PT
           BGZ        QUAD03
           BIT        IYM,B15
           BBNZ       QUAD2
QUAD1
           ABS
           SUB        IYM
           BLZ        PT2
PT3
           LAC        RYM
           ADLK       41,8
           SACL       *+
           LALK       41,8
           NEG
           SACL       *+
           LAC        IYM
           SBLK       17,8
           SACL       *+
           LALK       17,8
           SACL       *+
           LACK       >83
           B          SAVPT
PT2
           LAC        RYM
           ADLK       17,8
           SACL       *+
           LALK       17,8
           NEG
           SACL       *+
           LAC        IYM
           SBLK       41,8
           SACL       *+
           LALK       41,8
           SACL       *+
           LACK       >82
           B          SAVPT
QUAD2
           ABS
           SACL       *
           LAC        IYM
           ABS
           SUB        *
           BGZ        PT5
PT4
           LAC        RYM
           ADLK       41,8
           SACL       *+
           LALK       41,8
           NEG
           SACL       *+
           LAC        IYM
           ADLK       17,8
           SACL       *+
           LALK       17,8
           NEG
           SACL       *+
           LACK       >84
           B          SAVPT
PT5
           LAC        RYM
           ADLK       17,8
           SACL       *+
           LALK       17,8
           NEG
           SACL       *+
           LAC        IYM
           ADLK       41,8
           SACL       *+
           LALK       41,8
           NEG
           SACL       *+
           LACK       >85
           B          SAVPT
QUAD03
           BIT        IYM,B15
           BBNZ       QUAD3
QUAD0
           SUB        IYM
           BLZ        PT1
PT0
           LAC        RYM
           SBLK       41,8
           SACL       *+
           LALK       41,8
           SACL       *+
           LAC        IYM
           SBLK       17,8
           SACL       *+
           LALK       17,8
           SACL       *+
           LACK       >80
           B          SAVPT
PT1
           LAC        RYM
           SBLK       17,8
           SACL       *+
           LALK       17,8
```

```
          SACL      *+
          LAC       IYM
          SBLK      41,8
          SACL      *+
          LALK      41,8
          SACL      *+
          LACK      >81
          B         SAVPT
QUAD3
          LAC       IYM
          ABS
          SUB       RYM
          BLZ       PT7
PT6
          LAC       RYM
          SBLK      17,8
          SACL      *+
          LALK      17,8
          SACL      *+
          LAC       IYM
          ADLK      41,8
          SACL      *+
          LALK      41,8
          NEG
          SACL      *+
          LACK      >86
          B         SAVPT

PT7
          LAC       RYM
          SBLK      41,8
          SACL      *+
          LALK      41,8
          SACL      *+
          LAC       IYM
          ADLK      17,8
          SACL      *+
          LALK      17,8
          NEG
          SACL      *+
          LACK      >87

SAVPT
          BIT       FLAGS,B10
          BBZ       CK300
          ORK       >10
CK300
          BIT       FLAGS,B11
          BBZ       NOSDET
          ORK       >20
NOSDET
```

```
          SACL      *+
          LALK      41,8
          NEG
          SACL      *+
          LAC       IYM
          ADLK      17,8
          SACL      *+
          LALK      17,8
          NEG
          SACL      *+
          LACK      >84
          B         SAVPT
PT5
          LAC       RYM
          ADLK      17,8
          SACL      *+
          LALK      17,8
          NEG
          SACL      *+
          LAC       IYM
          ADLK      41,8
          SACL      *+
          LALK      41,8
          NEG
          SACL      *+
          LACK      >85
          B         SAVPT.
QUAD03
          BIT       IYM,B15
          BBNZ      QUAD3
QUAD0
          SUB       IYM
          BLZ       PT1
PT0
          LAC       RYM
          SBLK      41,8
          SACL      *+
          LALK      41,8
          SACL      *+
          LAC       IYM
          SBLK      17,8
          SACL      *+
          LALK      17,8
          SACL      *+
          LACK      >80
          B         SAVPT
PT1
          LAC       RYM
          SBLK      17,8
          SACL      *+
          LALK      17,8
```

```
          SACL     DECISN
          LDPK     >0
          SACL     RESULT
          LDPK     >7
          LAC      FLAGS                ; clear the SDET flags
          ANDK     >F3FF
          SACL     FLAGS

****************************************************
*
*  Rotate the Error Vector to the Real Plane
*
*  Equation = ( RYM + j IYM ) * ( DR - j DI )
*  RERR =   (( RYM * DR ) + ( IYM * DI )) * 2
*  IERR = j (( IYM * DR ) - ( RYM * DI )) * 2
*
****************************************************
ROTATE
          LT       RYM
          MPY      DR
          LTP      IYM
          MPY      DI
          APAC
          SFL
          SACH     RERR,1
          MPY      DR                   ; IEN ---> T
          LTP      RYM
          MPY      DI
          SPAC
          SFL
          SACH     IERR,1

****************************************************
*
*  Poor Signal Quality Detection.
*
*  REN and IEN must be below the limit
*  or the count is incremented by 2.
*  The limit is 22 for 1200 baud and 11
*  for 2400 baud.  The count limit before
*  calling for a retrain is 120.
*
****************************************************

          LAC      BAUDCT                    ; Do bad signal calc every 4 baud times
          ANDK     >0003
          SUB      ONE2
          BNZ      NORETR

          BIT      FLAGS,B3             ; don't do check if looking for 1100
          BBNZ     NORETR
```

```
         BIT     FLAGS,B2          ; check 12/2400 baud
         BBZ     SHFT1
         ZAC
         SACL    TMPSUM            ; TMPSUM holds the test limit
         LT      TMPSUM
         B       GETLIM
SHFT1
         LT      ONE2              ; if 1200 baud shift the limit
*                                  ; (11) left once.
GETLIM
         LALK    >B00              ; limit = 11
         SACL    TMPSUM
         LAC     REN
         ABS
         SUBT    TMPSUM
         BLEZ    RENOK             ; | REN | <= LIMIT
         LAC     RETRAN
         ADD     ONE2,1            ; add two to the counter
         B       CHKIEN
RENOK
         LAC     RETRAN
         SUB     ONE2              ; subtract one from the counter
CHKIEN
         SACL    RETRAN
         LAC     IEN
         ABS
         SUBT    TMPSUM
         BLEZ    IENOK
         LAC     RETRAN
         ADD     ONE2,1            ; add two
         B       CHKLIM
IENOK
         LAC     RETRAN
         SUB     ONE2
CHKLIM
         BLZ     SAV0
         SACL    RETRAN
         SBLK    120               ; check against count limit
         BLZ     NORETR
         LACK    120
         SACL    RETRAN
         LACK    >02               ; poor signal quality command
         SACL    SVCMD
         BIT     FLAGS,B7
*        BBZ     NORETR
         B       NORETR
         BIT     FLAGS,B8
         BBZ     BCRCV
         B       BCRCV2

SAV0
```

```
            ZAC
            SACL        RETRAN
NORETR

*****************************************************
*
*  Counter Rotate the Error Vector and Multiply
*  by ALPHA
*
*  Equation = ALPHA * (( REN + j IEN ) * ( COSPHI - j SINPHI))
*
*  AREN = ALPHA * (( REN * COSPHI ) + ( IEN * SINPHI ))
*  AIEN = ALPHA * (( IEN * COSPHI ) - ( REN * SINPHI ))
*
*****************************************************

            LT          REN
            MPY         COSPHI
            LTP         IEN
            MPY         SINPHI
            APAC
            SACH        AREN,1              ; REN*COSPHI + IEN*SINPHI
            SACH        RREN,1
            MPY         COSPHI
            LTP         REN
            MPY         SINPHI
            SPAC
            SACH        AIEN,1              ; IEN*COSPHI - REN*SINPHI
            SACH        RIEN,1
            LT          ALPHA
            MPY         AREN
            PAC
            SACH        AREN,1              ; ALPHA*AREN
            MPY         AIEN
            PAC
            SACH        AIEN,1              ; ALPHA*AIEN
*****************************************************
*
*           Tap Update Loop
*
*  Equation = RW - (( RX * AREN ) + ( IX * AIEN ))
*           IW - (( RX * AIEN ) - ( IX * AREN ))
*
*****************************************************

*** If 1100 Detect Mode Then Don't Do Tap Updates

            BIT         FLAGS,B3
            BBNZ        PHUPD
```

```
*** Setup Pointers For Real Tap Update
            BIT     FLAGS,B7    ; if back channel don't bleed the taps
            BBZ     CKBLED

            BIT     FLAGS,B12
            BBNZ    SETBC1              ; after 10 baud times do 0-5
            LRLK    AR0,RXLINE+3
            LRLK    AR1,RXLINE+1        ; AR1 ---> RX
            LRLK    AR2,IXLINE+1        ; AR2 ---> IX
            LRLK    AR3,RWTAPS+1        ; AR3 ---> real taps
            SPM     1
            B       UPDRW

SETBC1
            LRLK    AR0,RXLINE+6        ; used to test end of loop
            LRLK    AR1,RXLINE
            LRLK    AR2,IXLINE
            LRLK    AR3,RWTAPS

            LAC     RW0                 ; test outer taps for >.1 if so retrain
            ABS
            SBLK    >1FFF
            BGEZ    REDOBC

            LAC     RW5
            ABS
            SBLK    >1FFF
            BGEZ    REDOBC

            LAC     IW0
            ABS
            SBLK    >1FFF
            BGEZ    REDOBC

            LAC     IW5
            ABS
            SBLK    >1FFF
            BGEZ    REDOBC

            SPM     1
            B       UPDRW

CKBLED
            LAC     BAUDCT
            ANDK    >000F               ; every 16 baud times bleed the taps
            BNZ     UPDTAP
            B       BLEED
UPDTAP
            LRLK    AR0,RXEND+1         ; used to test end of loop
INITPT
            LRLK    AR1,RXLINE          ; AR1 ---> RX
```

```
            LRLK      AR2,IXLINE  ; AR2 ---> IX
            LRLK      AR3,RWTAPS                 ; AR3 ---> real taps
            SPM       1
*** Real Tap Update Loop
UPDRW
            LT        *+,3                       ; get RX
            MPY       AREN
            ZALH      *,2                        ; get the tap
            LTS       *+,3                       ; get IX
            MPY       AIEN
            SPAC                                 ; subtract from RW
            SACH      *+,0,1
            CMPR      0                          ; check for end of loop
            BBZ       UPDRW

*** Note: AR0 same, AR1 -> IXLINE, AR2 -> RWTAPS, AR3 -> IWTAPS
***       AR2 changed to RX

            LRLK      AR2,RXLINE

            BIT       FLAGS,B7
            BBZ       LOADPT

            LAC       FLAGS                      ; only taps 2 & 3 used in back channel 2 & 3
            ANDK      >0300
            BZ        BC1SET

            BIT       FLAGS,B12  ; update only taps 1 & 2 for fist 10 baud times
            BBNZ      BC1SET
            LRLK      AR0,IXLINE+3
            LRLK      AR1,IXLINE+1
            LRLK      AR2,RXLINE+1
            LRLK      AR3,IWTAPS+1
            B         UPDIW

BC1SET
            LRLK      AR0,IXLINE+6               ; taps 0 through 5
            LRLK      AR1,IXLINE
            LRLK      AR2,RXLINE
            LRLK      AR3,IWTAPS
            B         UPDIW

LOADPT
            LRLK      AR0,IXEND+1
UPDIW
            LT        *+,3                       ; get IX
            MPY       AREN
            ZALH      *,2
            LTA       *+,3                       ; get RX
            MPY       AIEN
            SPAC
```

```
          SACH      *+,0,1
          CMPR      0
          BBZ       UPDIW
          SPM       0

*******************************************************
*
*         Phase Corrector
*
*         Equations:
*                   PHCOR = PHCOR + ( IERR * 1/128 )
*                   PHI = PHI + (( PHCOR + IERR ) * -1/8 )
*
*******************************************************

PHUPD
          BIT       FLAGS,B9   ; TC = back channel 2
          BBNZ      BC3PH
*         ZAC
*         LT        IERR
*         MPYK      32                  ; IERR * 1/128
*         MPYK      256                 ; IERR * 1/16
*         APAC
*         SACH      TMPSUM,4
*         LAC       TMPSUM
*         ADD       PHCOR
*         SACL      PHCOR               ; PHCOR = PHCOR + (IERR * 1/128)
*         SFR
*         SFR                           ; 1/4
*         ADD       IERR                ; PHCOR + IERR
*         SACL      TMPSUM
*         ZAC
*         LT        TMPSUM
*         MPYK      -1024               ; -1/4
*         APAC
*         SACH      TMPSUM,4
*         LAC       TMPSUM
*         ADD       PHI
*         SACL      PHI
*         B         INSHFT

          ZAC
          LT        IERR
          BIT       FLAGS,B2   ; if 2400 them times 1/512
          BBNZ      MUL512
          MPYK      32                  ; 1/128
          B         BETA
MUL512
          MPYK      8                   ; 1/512
BETA
          APAC
```

```
        SACH    TMPSUM,4
        LAC     TMPSUM
        ADD     PHCOR
        SACL    PHCOR
        ADD     IERR
        SACL    TMPSUM
        ZAC
        LT      TMPSUM
*       MPYK    -410            ; -1/10
        MPYK    -512
        APAC
        SACH    TMPSUM,4
        LAC     TMPSUM
        ADD     PHI
        SACL    PHI
        B       INSHFT

BC3PH
        ZAC
        LT      IERR
        BIT     FLAGS,B13
        BBZ     MULT1
        MPYK    -2048           ; -1/2
        B       SUM2
MULT1
        MPYK    -4096           ; - 1
SUM2
        APAC
        SACH    TEMP2,4
        ZAC
        LT      TEMP2
        MPYK    1024            ; 1/4
*       MPYK    4095            ; + 1
        APAC
        SACH    TMPSUM,4

        LAC     TMPSUM

        ADD     PHCOR
        SACL    PHCOR
        ZAC
        LT      PHCOR
        MPYK    683             ; 1/6
        APAC
        SACH    TMPSUM,4
        LAC     TMPSUM
        ADD     TEMP2
        ADD     ONE2,15
        ADD     PHI
        SACL    PHI
        B       INSHFT
```

```
DTATBL
        DATA    >008B
        DATA    >008A
        DATA    >008D
        DATA    >008F
        DATA    >0089
        DATA    >0088
        DATA    >008C
        DATA    >008E
        DATA    >0086
        DATA    >0084
        DATA    >0080
        DATA    >0081
        DATA    >0087
        DATA    >0085
        DATA    >0082
        DATA    >0083

BLEED
****    Check taps 0,1,2,3,8, and 9 for bad values.
****    If bad, send poor signal quality to the sup.
        LARP    >1
        LACK    32
        SACL    TMPSUM          ; tempsum holds the tap limit

        LRLK    AR1,RWTAPS      ; Check real taps 0 to 2
        LRLK    AR0,RWTAPS+3
        CALL    CHKBAD

        LRLK    AR1,RWTAPS+8    ; Check real taps 8 and 9 and imginary 0 to 2
        LRLK    AR0,IWTAPS+3
        CALL    CHKBAD

        LRLK    AR1,IWTAPS+8    ; Check imaginary taps 8 and 9
        LRLK    AR0,VBASE
        CALL    CHKBAD

        LACK    40
        SACL    TMPSUM

        LRLK    AR1,RWTAPS+3    ; Check real tap 3
        LRLK    AR0,RWTAPS+4
        CALL    CHKBAD

        LRLK    AR1,IWTAPS+3    ; Check imaginary tap 3
        LRLK    AR0,IWTAPS+4
        CALL    CHKBAD

****    pull the taps four LSB toward 0 every 16 baud times
        LRLK    AR1,RWTAPS
        LRLK    AR0,VBASE ; IW9 + 1
```

```
        LARP    >1
DEC
        LAC     *
        BLZ     INC
        SUB     ONE2,2          ; subtract 4
        B       SAVEIT
INC
        ADD     ONE2,2          ; add 4
SAVEIT
        SACL    *+
        CMPR    0
        BBZ     DEC
        B       UPDTAP

**** Bad tap value check
CHKBAD
        LAC     *+              ; get the tap
        ABS
        SUB     TMPSUM,8
        BLZ     NOTBAD          ; if tap is less than limit OK
        LACK    02
        SACL    SVCMD
NOTBAD
        CMPR    0               ; check loop done
        BBZ     CHKBAD
        RET


*** Fast baud sync routine
BDSYNC
        LAC     LATCH
        ORK     >04
*       ANDK    >FFFB           ; set AGC wideband
        SACL    LATCH
        DINT
        LDPK    >7
        LALK    ABUF
        SACL    APTR
        LALK    BBUF
        SACL    BPTR
        BIT     FLAGS,B1  ; check high or low band
        LDPK    >0
        BBNZ    HIBAND
        LALK    LOSYNC
        SACL    VECTOR
        LALK    258             ; 1/4800 Second interrupts
        B       SAVIT
HIBAND
        LALK    HISYNC
        SACL    VECTOR
        LACK    129             ; 1/9600 Second interrupts
```

```
SAVIT
        SACL    PRD
        SACL    TIM
        ZAC
        SACL    SAMPL0
        SACL    SAMPL1
        SACL    SAMPL2
        LACK    >1
        SACL    ONE
        LDPK    >7
        LACK    >8
        SACL    WAITCT                  ; wait 8 samples to fill buffers
        LACK    >1
        SACL    ONE2
        ZAC
        SACL    ACNT
        SACL    BCNT
        SACL    ASUM
        SACL    BSUM
        SACL    QUTRCT
        EINT

FILL
        LAC     WAITCT                  ; wait till ACNT = WAITCT
        SUB     ACNT
        BNZ     FILL
        LRLK    AR1,ABUF
        LRLK    AR0,ABUF+8
        ZAC
        LARP    AR1
ADDSUB
        SUB     *+                      ; do the filter calculation
        ADD     *+
        CMPR    0
        BBZ     ADDSUB
        SFR                             ; divide by eight
        SFR
        SFR
        ADD     ASUM
        SACL    ASUM
WAITB
        LAC     WAITCT
        SUB     BCNT
        BNZ     WAITB
        LRLK    AR1,BBUF
        LRLK    AR0,BBUF+>8
        ZAC
BLOOP
        SUB     *+
        ADD     *+
        CMPR    0
```

```
        BBZ     BLOOP
        SFR                     ; divide by eight
        SFR
        SFR
        ADD     BSUM
        SACL    BSUM

        LAC     WAITCT
        ADD     ONE2,1          ; add 2 to wait count
        SACL    WAITCT
        SBLK    24              ; total of 11 baud times to get baud calc
        BNZ     FILL

        LAC     ASUM
        ABS
        SACL    AABS
        LAC     BSUM
        ABS
        SUB     AABS
        BLZ     ABIGR
        LAC     BSUM
        BLZ     NEGB
        LACK    >0
        B       WAIT1
NEGB
        LACK    >2
        B       WAIT1
ABIGR
        LAC     ASUM
        BLZ     NEGA
        LACK    >3
        B       WAIT1
NEGA
        LACK    >1
WAIT1
        BIT     FLAGS,B1
        BBNZ    NODEC
        SUB     ONE2
        ANDK    >3
NODEC
        SACL    WAITCT
WASTE1
        LAC     QUTRCT          ; wait for quarter baud count to get to zero
        SBLK    48
        BNZ     WASTE1
WTJUMP
        LAC     QUTRCT          ; wait till quarter count equals WAITCT
        ANDK    >3
        SUB     WAITCT
        BNZ     WTJUMP
        B       DEMOD
```

```
*** Fast baud sync interrupts
*** High band interrupts at 9600 times per second
*** Low band at 4800/sec

HISYNC
        RXF                      ; start sample time
        LALK    READQ
        SACL    VECTOR
*       RPTK    14
        RPTK    28
        NOP                      ; sample for 4 us
        SXF                      ; start conversion
        B       RETURN

READQ
        RXF                      ; start sample time
        LALK    READP
        SACL    VECTOR
        IN      SAMPL0,ADC       ; read in Q0
        LAC     SAMPL0,8
        XORK    >8000,0          ; invert the sign bit
        SACL    SAMPL0
*       RPTK    8
        RPTK    22
        NOP                      ; finish 4 us
        SXF                      ; start conversion
        B       RETURN

READP
        RXF                      ; start sample time
        LALK    INSQR
        SACL    VECTOR
        IN      SAMPL1,ADC       ; read in P
        LAC     SAMPL1,8
        XORK    >8000,0          ; invert sign bit
        SACL    SAMPL1
*       RPTK    7
        RPTK    21
        NOP                      ; wait out 4us
        SXF                      ; start conversion
        B       RETURN

INSQR
        LALK    HISYNC
        SACL    VECTOR
        IN      SAMPL2,ADC
        LAC     SAMPL2,8
        XORK    >8000
        SACL    SAMPL2
        LAC     SAMPL0           ; old_Q
```

```
         SUB     SAMPL2              ; old_Q - new_Q
         SFR                         ; divide by 2
         SACL    SAMPL0
         ZAC
         MPYK    >0                  ; zero the acc. and P
         SQRA    SAMPL0              ; get P^2 + Q^2
         SQRA    SAMPL1
         APAC
         SFR                         ; divide by 4 to prevent overflow
         SACH    SAMPL0,0
         LDPK    >7
         LAC     QUTRCT              ; increment quarter baud counter
         ADD     ONE2
         SACL    QUTRCT
         LDPK    >0
         LAC     SAMPL0
         LDPK    >7
SAVSPL
         SAR     AR1,*,1             ; push AR1
         BIT     FLAGS,B5   ; save ABUF or BBUF?
         BBNZ    SAVB
         LAR     AR1,APTR
         SACL    *+,0,4              ; store the result in ABUF
         SAR     AR1,APTR
         LAR     AR1,*               ; pop AR1
         LAC     APTR
         ANDK    >FFF7
         SACL    APTR
         LAC     ACNT
         ADD     ONE2
         SACL    ACNT
         LAC     FLAGS
         ORK     >0020               ; next time save B
         SACL    FLAGS
         LDPK    >0
         B       RETURN
SAVB
         LAR     AR1,BPTR
         SACL    *+,0,4              ; store the result in BBUF
         SAR     AR1,BPTR
         LAR     AR1,*               ; pop AR1
         LAC     BPTR
         ANDK    >FFF7
         SACL    BPTR
         LAC     BCNT
         ADD     ONE2
         SACL    BCNT
         LAC     FLAGS
         ANDK    >FFDF
         SACL    FLAGS
         LDPK    >0
```

```
        B       RETURN

LOSYNC
        RXF
        LALK    LOWP
        SACL    VECTOR
        IN      SAMPL0,ADC
        LAC     SAMPL0,8
        XORK    >8000
        SACL    SAMPL0          ; new Q
        LAC     SAMPL2          ; old Q
        SUB     SAMPL0          ; old_Q - new_Q
        SFR                     ; divide by 2
        SACL    SAMPL2
        MPYK    >0
        ZAC
*
        RPTK    14
        NOP
*
        SXF
        SQRA    SAMPL2          ; Q^2
        SQRA    SAMPL1          ; P^2
        APAC
        SFR                     ; divide result by 4 to prevent overflow
        SACH    SAMPL1,0
        LAC     SAMPL0
        SACL    SAMPL2          ; move new_Q into old_Q
        LAC     SAMPL1
        LDPK    >7
        B       SAVSPL

LOWP
        RXF
        LALK    LOSYNC
        SACL    VECTOR
        IN      SAMPL1,ADC
        LAC     SAMPL1,8
        XORK    >8000
        SACL    SAMPL1          ; save P
        LDPK    >7
        LAC     QUTRCT
        ADD     ONE2            ; increment tha quarter baud counter
        SACL    QUTRCT

        RPTK    14
        NOP

        SXF
        LDPK    >0
        B       RETURN
```

```
*GETCOS
*         LDPK     >0          ; this routine uses X0,X1,X2, and X3
*         SACL     FEE         ; on page 0.  Also uses the TC bit.
*         ANDK     >3FFF
*         SACL     X0,1
*         BIT      ONE,B15     ; clear the TC bit
SQUAR
*         SPM      1
*         SQRA     X0
*         PAC
*         SACH     X1          ; X^2
*         SQRA     X1
*         PAC
*         SACH     X2          ; X^4
*         SPM      2
*         LAC      ONE,14      ; .5
*         LT       X1
*         MPYK     -2512
*         LTA      X2          ; .5 + ALPHA*X^2
*         MPYK     465
*         APAC                 ; .5 + ALPHA*X^2 + BETA*X^4
*         SPM      0
*         BBNZ     STRSIN
*         SACH     X3
*         LALK     >7FFF       ; 1
*         SUB      X0          ; 1 - X
*         SACL     X0          ; used to find SIN(PHI)
*         BIT      ONE,B0      ; set TC
*         B        SQUAR
STRSIN
*         SACH     X2          ; SIN ---> X2
*         BIT      FEE,B15     ; COS ---> X3
*         BBNZ     QUAD1X
*         BIT      FEE,B14
*         BBNZ     QUAD01
*         RET

QUAD01
*         LAC      X3          ; quadrant 01
*         SACL     X1          ; COS = -SIN
*         LT       X2          ; SIN = COS
*         MPYK     -4096
*         PAC
*         SACH     X3,4
*         LAC      X1
*         SACL     X2
*         RET

QUAD1X
```

```
*       BIT     FEE,B14
*       BBNZ    QUAD11
*       LT      X2              ; quadrant 10
*       MPYK    -4096           ; COS = -COS
*       LTP     X3
*       SACH    X2,4
*       MPYK    -4096
*       PAC
*       SACH    X3,4
*       RET

QUAD11
*       SACL    X1              ; quadrant 11
*       LT      X3              ; COS = SIN
*       MPYK    -4096           ; SIN = -COS
*       PAC
*       SACH    X2,4
*       LAC     X1
*       SACL    X3
*       RET


FSK
        LDPK    >0
        LALK    FSKINT
        SACL    VECTOR
        DINT                    ; AGC wideband
        LAC     LATCH
        ANDK    >FFFB
        SACL    LATCH
        EINT
        LDPK    >7
        LALK    >FFFF
        SACL    COMND
        ZAC
        SACL    BAUDCT
        SACL    SIGNS
        SACL    OLDFIL
        SACL    PHI
        SACL    COSPHI
        ROVM
        EINT
WAITSP
        BIT     FLAGS,B0
        BBNZ    FILTER
        BIT     COMND,B7
        BBNZ    WAITSP
        LAC     COMND
        LDPK    0               ; put the command into FCODE
        SACL    FCODE
        CALL    EXEC            ; jump to execute commands
```

```
        B       WAITSP
FILTER
        LAC     FLAGS
        ANDK    >FFFE
        SACL    FLAGS

        LAC     BAUDCT
        ADLK    >1
        SACL    BAUDCT

        LT      COSPHI                  ; multiply the sample by the cosine
        MPY     SAMPZ0
        ZAC
        APAC
        SFL                             ; cosine is half what it should be
        SACH    SAMPZ0,1

        ZALH    SAMPZ0
        ADDH    SAMPZ2                  ; get z0/2 + z1 + z2/2
        SFR
        ADDH    SAMPZ1
        SACH    FILOUT
        SACH    FILIN

        LAC     SAMPZ1                  ; shift down the delay line
        SACL    SAMPZ2
        LAC     SAMPZ0
        SACL    SAMPZ1

        BIT     FLAGS,B1    ; chech high band
        BBNZ    HIFIL

        LAC     FILIN
        SFR
        SFR
        SACL    FILIN
        ADD     FILZ2
        SACL    OUT
        LAC     FILZ1
        SACL    FILZ2
        LAC     FILIN
        SACL    FILZ1

        ZAC
        LT      OUTZ1
        MPYK    3072
        APAC
        SACH    OUTZ1,4
        LAC     OUTZ1
        ADD     OUT
        SACL    OUT
```

```
        SACL    OUTZ1

        ADD     OLDFIL
        SFR                     ; ( result + result-1 )/2

        BGEZ    SEND1
        LAC     SIGNS
        SFL                     ; puts a 0 in bit 0
        B       FILSFT

SEND1
        LAC     SIGNS
        SFL
        ORK     >1

FILSFT
        SACL    SIGNS
        LAC     OUT
        SACL    OLDFIL
        B       NOAVG

HIFIL
        ZAC
        LT      FILIN
        MPYK    512             ; 1/8
        APAC
        SACH    FILIN,4
        LAC     FILIN
        ADD     FILZ4
        SACL    OUT
        LAC     FILZ3
        SACL    FILZ4
        LAC     FILZ2
        SACL    FILZ3
        LAC     FILZ1
        SACL    FILZ2
        LAC     FILIN
        SACL    FILZ1
        ZAC
        LT      OUTZ1
        MPYK    3072            ; 3/4
        APAC
        SACH    OUTZ1,4
        LAC     OUTZ1
        ADD     OUT
        SACL    OUTZ1
        SACL    OUT

NOAVG
        BGEZ    SND1
```

```
        LAC     SIGNS
        SFL
        B       SEND

SND1
        LAC     SIGNS
        SFL
        ORK     >1

SEND
        SACL    SIGNS           ; recv low band send two samples
        LAC     BAUDCT          ; recv high send four samples
        BBNZ    CHKDAT          ; 1 = high band

        ANDK    >1
        BNZ     NOSND
        B       SENDIT

CHKDAT
        ANDK    >3
        BNZ     NOSND

SENDIT
        LAC     SIGNS
        ORK     >80
        SACL    DECISN
        ZAC
        SACL    SIGNS

NOSND
        ZAC
        LT      FILOUT          ; filter out / 8
        BBNZ    M18             ; recv high alpha = 1/8
        MPYK    1024
*       MPYK    410
        B       ADDPHI
M18
        MPYK    512
ADDPHI
        APAC
        SACH    TMP,4
        LAC     TMP
        ADLK    >4000           ; add 1/2
        ADD     PHI
        SACL    PHI
        CALL    GETCOS
        LDPK    >0
        LAC     X3              ; get COS(PHI)
        LDPK    >7
        SACL    COSPHI
        CALL    DISBOX
        LDPK    >7              ; restore after DISBOX
        B       WAITSP

END
```

```
$TITLE(AT baud rate detection)
%SET(RACK,0)
;************************************************
;
;
;           NAME                AT_DETECT
;
;
;
;           PURPOSE             Auto baud rate detection
;
;************************************************

            using       0
half_bith   set         r0
half_bitl   set         r1
sample_cnt  set         r2
cr          set         r2
bs          set         r3
startb_l    set         r3
startb_h    set         r4
baud_calc_h set         r5
baud_calc_l set         r6
ring_cnt    set         r7          ; counts ring cycles

test_pin    bit         p3.5
cd_pin                  bit         p3.4

dseg        at          23h

inbyte:     ds          1
t_byte:     ds          1
at_flags:   ds          1

abort       bit         at_flags.0
got_a       bit         at_flags.1
checking_t  bit         at_flags.2
got_19200   bit         at_flags.3
got_it      bit         at_flags.4
bits_11     bit         at_flags.5
lcase       bit         at_flags.6
first_int   bit         at_flags.7

at_bits     segment     bit
rseg        at_bits
parity_yes: dbit        1
even_odd_par: dbit      1
repeat:     dbit        1                       ; got a/ or a>
buf_err:    dbit        1
t_timing:   dbit        1                       ; sending touch tones
clear_s1:   dbit        1                       ; S1 timeout in progress
pring:      dbit        1                       ; 1= print ring
```

```
resp_ok                 equ         0
resp_connect            equ         1
resp_error              equ         4
resp_connect_1200       equ         5
resp_connect_2400       equ         10

ring_h_to_l             equ         3
ring_l_to_h             equ         4
tx_stop                 equ         00101000b
rcv_stop                equ         01101010b

            public      getat,send_result,compute_parity,repeat
            public      dial_ds0

            public      parity_yes,even_odd_par,out_cr_lf,t_timing,first_int
            public      respond

            extrn       code(putc,parse_it,out_1_digit,out_2_digits,rsetsys)
            extrn       code(on_hook,ring_on,ring_off)
            extrn       code(dsr_off,cdet_false,wait5)
            extrn       code(porta_out,portb_out)
            extrn       code(upcase,out_a_string,echo_off)
            extrn       code(xdelay_125ms,delay_125ms,clock,send_1224_data)
            extrn       code(go_off_hook,check_for_9600)
            extrn       code(get_novram,set_ndefaults)
            extrn       code(get_x_spkr,save_repeat_cnt)

            extrn       data(timer50,tr_data,timer5,timer_tics)
            extrn       data(secs,ticks,time50,cd_count)
            extrn       data(rvalue,sv_cmd,rack,rack_z1)

            extrn       bit(at_quiet,at_verbose,got_reset,flag50,timer_on)
            extrn       bit(tr_flag,flag5,ring_pin,orig,at_dumb,at_dtr)
            extrn       bit(cdet_pin,ls_pin,oh_pin,dsr_pin)
            extrn       bit(sv_flag,cd_false)
            extrn       bit(clock_on,clock_mode,cmd_echo,echo_pin,transfg,oa_pin)

            extrn       xdata(sreg,tx_version)
            extrn       xdata(amp_xa,amp_xb,x_spkr,repeat_cnt)

            extrn       number(read_ring_pin)

            %*define(get_extrn(xval)) (
            mov         dptr,#%xval
            movx        a,@dptr
            )
$eject
;***************************************************
            cseg        at          TIMER0

            jmp         tmr0_int
```

```
tmr0_code  segment   code
           rseg      tmr0_code

tmr0_int:
           clr       tr0
           mov       th0,startb_h
           mov       tl0,startb_l
           setb      tr0
           jbc       first_int,flag_it
           push      PSW
           jb        checking_t,get_t
           nop
           nop
;          cpl       test_pin
           mov       c,rxd
;          cpl       test_pin
           xch       a,inbyte
           rrc       a
           xch       a,inbyte
           inc       sample_cnt
           cjne      sample_cnt,#05,$+3      ; first four samples must be 0
           jnc       still_ok
           jnb       inbyte.7,still_ok
           setb      abort
           pop       PSW
           reti
still_ok:
           cjne      sample_cnt,#08,not_done              ; don't allow TX
           clr       EX1
           clr       IE1
           clr       TR0                                  ; don't allow any more ints
           setb      got_a
not_done:
           pop       PSW
           reti
flag_it:
           jb        t_timing,count_clock
           mov       TMOD,#00100001b                      ; set T0 to 16 bit counter
           reti

get_t:                                                    ; input next 8 bits 'T,t,/,>'
           cjne      sample_cnt,#08,store_it
;****** important must check stop bit ASAP
           clr       TR0
           nop
           nop
;          cpl       test_pin
           jnb       rxd,got_11_bits                      ; make sure stop bit = 1
;          cpl       test_pin
           setb      got_it
           clr       EX1
           pop       PSW
```

```
            jnb       inbyte.7,set_11_bits
            mov       SCON,#01010010b              ; 10 bit variable baud rate
            reti

store_it:
            nop
            nop
;           cpl       test_pin
            mov       c,RXD
;           cpl       test_pin
            xch       a,t_byte          ; store the bit
            rrc       a
            xch       a,t_byte
            inc       sample_cnt
            cjne      sample_cnt,#03,got_the_sample
            jb        t_byte.7,got_the_sample
            setb      abort                        ; third bit must=1 or abort
got_the_sample:
            pop       PSW
            reti
got_11_bits:
;           cpl       test_pin
            setb      bits_11
            setb      got_it
            clr       EX1
            pop       PSW
set_11_bits:
            jnb       rxd,$;********************************************
            mov       SCON,#11010010b              ; 11 bit variable
            reti

;************************************************
count_clock:                                       ; used as the clock during touch
            setb      first_int
            call      clock                        ; tones
            reti

$eject

;************************************************
at_code     segment   code
rseg        at_code

;************************************************
;           If online command mode and carrier is
;           then hang up turn off the TX and RECVR
;************************************************
online_check:
            clr       cd_false
            mov       cd_count,#0

            call      dsr_off                      ;** check &S0
```

```
        call    cdet_false

        call    on_hook

        jb      clock_mode,clockon
        clr     clock_on
clockon:
        clr     ea
        mov     sv_cmd,#rcv_stop
        setb    sv_flag
        setb    ea
        jb      sv_flag,$

        clr     ea
        mov     sv_cmd,#tx_stop
        setb    sv_flag
        setb    ea
        jb      sv_flag,$

        mov     rvalue,#0ffh

        mov     a,#30
        call    wait5
        clr     tr_flag

        ret

$eject
;**************************************************
getat:                                  ;GET 'AT' entry point
        jnb     got_reset,chk_repeat
        clr     got_reset
        call    online_check            ; if online and get ATZ then hangup
        call    rsetsys

        mov     r0,#00                  ; setup nul command for a/
        clr     a
        mov     p2,#0
        movx    @r0,a
chk_repeat:
        jnb     repeat,at_setup
        mov     dptr,#sreg+8            ; get repeat time
        movx    a,@dptr
        clr     ea
        jnz     set_sec
        inc     a
set_sec:
        mov     secs,a
        mov     ticks,#120
        mov     time50,#20
        setb    timer_on
        setb    ea
```

```
repchk_loop:
        jb      ri,at_setup             ;abort repeat if start bit
        mov     a,secs
        jnz     repchk_loop

        jmp     repeat_it
at_setup:
        clr     repeat
;       mov     repeat_cnt,#10
        mov     a,#10
        call    save_repeat_cnt

at_regular:
        mov     IE,#00000100b                   ; turn off ES & ET0
        mov     TMOD,#00101001b                 ; set T0 to gate, 16 bit timer
        mov     TH0,#00                         ; reset T0
        mov     TL0,#00
        clr     TF0
        setb    TR0
        clr     REN
atsetup_cont:                                   ;MERGE initialization for two modes.
        setb    EA
        mov     at_flags,#10000000b     ; reset all flags except first_int
;       clr     repeat
        mov     sample_cnt,#00
        mov     inbyte,#00
        mov     t_byte,#00
        mov     startb_h,#0ffh
        mov     startb_l,#0dbh                  ; default bit time to 19200
        mov     baud_calc_h,#00h
        mov     baud_calc_l,#30h
        clr     tr_flag
        setb    pring
        jnb     cdet_pin,online_loop

; Because Cliff screwed up the read ring pin command,
; we can't check for manual rings with version 0 transmitters

check_manual_ring:
        mov     dptr,#tx_version
        movx    a,@dptr
        jz      wait_for_start

        clr     ea
        clr     tr_flag
        mov     tr_data,#0ffh
        mov     sv_cmd,#read_ring_pin
        setb    sv_flag
        setb    ea

        jb      sv_flag,$               ; wait for command to be set
```

```
        jnb     tr_flag,$               ; wait for the reply

        clr     ea
        clr     tr_flag
        mov     a,tr_data
        setb    ea

        mov     tr_data,#0ffh
        jb      acc.0,wait_for_start
        call    low_for_5               ; check for manual rings
        jmp     wait_for_start

; only here if DTR drops
chk_s13:
        mov     dptr,#sreg+13                   ; check dial on DTR low to high
        movx    a,@dptr
        jb      acc.3,dtr_wait
        jbc     tr_flag,got_ring
        jnb     at_dtr,chk_s13
        jmp     getat

dtr_wait:
        jbc     tr_flag,got_ring
        jnb     at_dtr,dtr_wait
        setb    ren
        jmp     dial_ds0

$eject
;*****************************************************
;* Main loop for when doing baud rate sensing -- waiting for start bit

online_jmp:
        call    online_check
        sjmp    wait_for_start

got_ring:
        call    check_for_ring
        sjmp    wait_for_start

online_loop:
        jnb     at_dtr,online_jmp
        jb      cd_false,online_jmp
        mov     a,TL0
        jnz     got_startb
        sjmp    online_loop             ; look and see if the timer started

wait_for_start:                                 ; main loop for baud rate detect.
                                                ; wait for start bit or incoming ring
        jnb     at_dtr,chk_s13
        jbc     tr_flag,got_ring
        mov     a,TL0
        jnz     got_startb              ; look and see if the timer started
```

```
%IF(%RACK) THEN (
        mov     a,rack_z1
        cjne    a,rack,rack_switches
        ) FI
        jb      clear_s1,wait_for_start    ; in case ints made this code miss

        mov     a,secs
        jnz     wait_for_start
        clr     a
        mov     dptr,#sreg+1
        movx    @dptr,a
        setb    clear_s1
        sjmp    wait_for_start

$eject
;*****************************************************
;
%IF ( %RACK ) THEN (
rack_switches:
        clr     ea
        mov     a,rack_z1
        xrl     a,rack
        setb    ea                         ; if bit is a one then that
        mov     b,a                        ; switch changed
        mov     a,rack
        jnb     b.1,chk_alb                ; just check busy and ALB
; BUSY switch moved
        jnb     acc.1,go_busy
        orl     rack_z1,#02
        jnb     cdet_pin,return_decision ; ignore busy if online cmd mode
        setb    oh_pin
        sjmp    return_decision
go_busy:
        clr     oh_pin
        anl     rack_z1,#0fdh
        sjmp    return_decision
chk_alb:
        jnb     b.2,return_decision        ; DLB must have changed
        jnb     acc.2,go_alb
; Come out of analog loop back
        orl     rack_z1,#04h
        jb      cdet_pin,return_decision; shouldn't happen either
        call    online_check               ; hang up
        jmp     getat
go_alb:
        jnb     at_dtr,return_decision     ; ignore if DTR is down
        anl     rack_z1,#0fbh
        jnb     cdet_pin,return_decision ; ignore if already online
        setb    ren
        jmp     send_alb

return_decision:
        jnb     cdet_pin,online_loop
```

```
        jmp     wait_for_start


        ) FI

got_startb:
        clr     EX1                          ; disable EXT1
        jnb     at_dtr,$+6          ;ignore everything if dtr down
        jnb     at_dumb,$+6                  ;ignore everything if dumb mode
        ljmp    getat                        ;reset get at stuff.


$eject
;*****************************************************************
        jnb     rxd,check_too_long  ; if start done shorten bit time
        mov     startb_l,#0ddh
        sjmp    start_done

check_too_long:                              ;Here got start bit.  Test time.

        mov     a,TH0                        ; check for start bit too long
        cjne    a,#0fh,$+3          ; if greater than start bit of
        jc      not_too_long                 ; 110 baud then too long
        jnb     rxd,$;*************************************************
getat_jmp:
        jmp     getat
not_too_long:
        mov     a,TL0
        cjne    a,#140,$+3          ; don't enable EXT1 until
        jc      baud_too_fast                ; baud rate < 7200
        setb    EX1
baud_too_fast:
        jnb     rxd,check_too_long
start_done:
        clr     EA
        clr     TR0
        jb      EX1,bit_long_enuf   ; debounce RXD
        mov     a,TL0
        cjne    a,#40,$+3           ; bit must be around 19200 or greater
        jc      getat_jmp                    ; not long enough
bit_long_enuf:
        mov     a,TH0                        ; divide by 2 to get 1/2 bittime
        jnz     do_calc
        xch     a,tl0
        cjne    a,#70,$+3
        jc      setup_19200
        xch     a,tl0
do_calc:
        mov     baud_calc_h,a
        clr     c
        rrc     a
        cpl     a
```

```
            mov     half_bith,a
            xch     a,TL0                          ; hi byte in TL0
            mov     baud_calc_l,a
            rrc     a
            jnz     no_ovflow             ; if TL0=0 then inc TH0
            inc     TL0
            mov     half_bith,TL0
            sjmp    setup_t0
no_ovflow:
            cpl     a
            inc     a
setup_t0:
            mov     half_bitl,a
;           clr     c
            add     a,#31
            jnc     start_time
            inc     TL0
            sjmp    start_time
setup_19200:
            clr     first_int
            mov     TL0,#0ffh             ; if 19200 then skip first sample
            mov     a,#0f6h
            setb    got_19200
start_time:
            xch     a,TL0
            mov     TH0,a
            mov     TMOD,#00100001b
            setb    TR0
            mov     IP,#00000010b
            mov     IE,#10000010b
            jb      got_19200,wait_for_rest  ; startb_l & hi already setup
            clr     c
            mov     a,half_bitl
            rlc     a
            mov     startb_l,a
            mov     a,half_bith
            rlc     a
            mov     startb_h,a
            mov     a,startb_l
            add     a,#14                          ; take into account timer reload
            mov     startb_l,a
            jnc     wait_for_rest
            inc     startb_h
wait_for_rest:
            jbc     abort,not_a
            jnb     got_a,wait_for_rest
            clr     EA
            jb      got_19200,set_up_halfb
            mov     TL0,half_bitl
            mov     TH0,half_bith
            sjmp    got_half_time
set_up_halfb:
```

```
                mov     TH0,#0ffh               ; half bit time of 19200 plus
                mov     TL0,#0fah               ; timer 0 reload time
                mov     startb_l,#0ddh                  ; make bit time smaller
got_half_time:
                mov     TMOD,#00101001b                 ; set up gate function
                setb    TR0
                setb    checking_t
                setb    first_int
                mov     sample_cnt,#00
                clr     IE1                             ; make sure we don't get a TX int
                mov     IE,#10000110b                   ; enable EXT1 and T0 ovrflow
                sjmp    check_for_a

not_a:
                clr     EA
                mov     IP,#00000100b
                mov     IE,#10000100b
                jmp     getat

check_for_a:
                jnb     inbyte.5,not_a
                jnb     inbyte.4,check_A
                setb    lcase
;;              sjmp    got_an_a                ; got lower case a
check_A:
;;              jnb     inbyte.5,not_a
got_an_a:
                mov     a,baud_calc_l
                add     a,#08h                          ; for rounding
                jnc     no_overflow
                inc     baud_calc_h
no_overflow:
                swap    a                               ; get serial time value
                anl     a,#0fh                          ; by dividing by 16.25
                                                        ; the .25 only matters for
                                                        ; baud rates < 1200
                xch     a,baud_calc_h
                swap    a
                anl     a,#0f0h
                orl     a,baud_calc_h
                jnb     acc.7,not_less_1200
                anl     a,#0f0h                         ; correct for .25 in divide
not_less_1200:
                cpl     a                               ; negate the time
                inc     a
                mov     TH1,a                           ; set serial reload
                clr     pring                           ; if comes now don't print RING
                clr     tr_flag
wait_on_t:
                jb      abort,not_a
                jnb     tr_flag,chk_got
                jnb     cdet_pin,chk_got
```

```
            call        check_for_ring
chk_got:
            jnb         got_it,wait_on_t
            clr         EA
;
; Data format 10 bits:
;           inbyte.0 - inbyte.5 = DATA
;           inbyte.6 = PARITY
;           inbyte.7 = STOP BIT
;
;           t_byte.0 - t_byte.6 = DATA
;           t_byte.7 = PARITY
;           bits_11  = NOT( STOP BIT )
;
; Data format 11 bits:
;           inbyte.0 - inbyte.6 = DATA
;           inbyte.7 = PARITY
;
;           t_byte.0 - t_byte.7 = DATA
;           bits_11  = NOT ( PARITY )
;
serial_ok:
            mov         IE,#10000100b               ; enable serial and TX ints
            mov         a,t_byte
            anl         a,#7fh                      ; get rid of parity
            cjne        a,#'T',chk_t
            jb          lcase,not_a
            clr         buf_err
            jmp         get_parity
chk_t:
            cjne        a,#'t',chk_slash
            jnb         lcase,not_a
            clr         buf_err
            clr         parity_yes
            clr         even_odd_par
            jb          bits_11,parity_11b          ; check 11 bits
            jnb         inbyte.7,parity_11b
            jb          inbyte.6,set_7E_7M
            jnb         t_byte.7,cant_get_parity
set_7O:
            setb        parity_yes
            sjmp        cant_get_parity
set_7E_7M:
            jb          t_byte.7,set_7M
            setb        parity_yes
            setb        even_odd_par
            sjmp        cant_get_parity
set_7M:
            setb        even_odd_par
            sjmp        cant_get_parity
chk_slash:
            anl         a,#07fh
```

```
            cjne    a,#'/',chk_greater

            setb    repeat
            jb      lcase,cant_get_parity
            jmp     get_parity
long_to_not_a:
            jmp     not_a
chk_greater:
            cjne    a,#'>',long_to_not_a
            setb    repeat
            push    acc
            mov     a,#10
            call    save_repeat_cnt
            pop     acc
;           mov     repeat_cnt,#10          ;cnt for repeat of 'ATD' cmd
            jb      lcase,cant_get_parity
get_parity:
            clr     parity_yes
            clr     even_odd_par
            jb      bits_11,parity_11b      ; if 11 bits use bits_11
            jnb     inbyte.7,parity_11b     ; & inbyte.7 to get parity
            jb      inbyte.6,set_7O_7M
            jnb     t_byte.7,cant_get_parity
set_7E:
            setb    parity_yes
            setb    even_odd_par
            sjmp    cant_get_parity
set_7O_7M:
            jb      t_byte.7,set_7M
            setb    parity_yes
            sjmp    cant_get_parity

parity_11b:
            jb      lcase,get_at_par
            jnb     bits_11,set_7E
            jnb     inbyte.7,cant_get_parity
set_8O:
            setb    parity_yes
            sjmp    cant_get_parity
get_at_par:
            jnb     bits_11,set_8O
            jb      inbyte.7,set_7E

cant_get_parity:
            jb      inbyte.7,flag_end
            setb    bits_11
flag_end:
            jb      repeat,chk_ok
            mov     r0,#00h                 ; in pointer to command buffer
            clr     tr_flag

            mov     dptr,#sreg+3            ; setup cr & bs
```

```
        movx    a,@dptr
        mov     cr,a
        inc     dptr
        inc     dptr
        movx    a,@dptr
        mov     bs,a
;*******************************************
;       jnb     oh_pin,get_command
;       call    check_for_9600
;       cpl     c
;       mov     ls_pin,c
;       call    porta_out
;*******************************************

get_command:
        jnb     tr_flag,chk_inchar
        jnb     cdet_pin,chk_inchar
        call    check_for_ring
chk_inchar:
        jnb     ri,get_command              ; wait till input character
        clr     ri
        mov     a,sbuf
        anl     a,#7fh                      ; get rid of parity
        cjne    a,ar2,chk_BS                ; check for CR
        clr     a
        mov     p2,#0
        movx    @r0,a                       ; store end of buff char
        sjmp    chk_ok
chk_BS:
        cjne    a,ar3,chk_valid_char    ; check for a Back Space
        cjne    r0,#00h,delete_char
        sjmp    get_command
delete_char:                            ; if a BS then send space BS
        jb      buf_err,get_command
        mov     a,#' '
        call    putc
        mov     a,bs
        call    putc
        dec     r0
        sjmp    get_command
chk_valid_char:
        cjne    a,#21h,$+3
        jc      get_command                 ; space off anything below a SP
        cjne    a,#7fh,get_case
        jmp     get_command                 ; space off deletes
get_case:
        call    upcase
        cjne    r0,#40,$+3              ; check buffer end
        jc      buf_it
        setb    buf_err
        sjmp    get_command
buf_it:
```

```
        mov     p2,#0
        movx    @r0,a
        inc     r0
        sjmp    get_command
chk_ok:
        call    echo_off
        call    delay_125ms
        clr     ri
        jb      buf_err,send_error
        jb      bits_11,send_error
        jb      repeat,check_slash
        jmp     parse_it
check_slash:
        mov     a,t_byte
        anl     a,#7fh                          ; clear parity
        cjne    a,#'/',repeat_it
        clr     repeat
repeat_it:
        jmp     parse_it
send_error:
        mov     a,#04                           ; result code for ERROR
send_result:
        call    respond
        jmp     getat
$EJECT
;************************************************************
;
;   RESPOND
;
;************************************************************
respond:

        mov     r1,a                            ; clear echo pin
        call    echo_off
        mov     a,r1

        jb      at_quiet,reset_echo     ; if quiet don't send

        jz      wait_125ms
        cjne    a,#resp_error,wait_done ; wait 125ms if error or ok

wait_125ms:
        call    xdelay_125ms

wait_done:

        mov     dptr,#amp_xa                    ;see if displaying ARQ result codes
        movx    a,@dptr
        jnz     respond_arq                     ;jump if using ARQ set.
        mov     dptr,#nonarq_table      ;convert to non-ARQ result code set.
        mov     a,r1
```

```
        movc    a,@a+dptr
        mov     r1,a

respond_arq:
        call    get_x_spkr
;       mov     a,x_spkr                ; check x0 and connect 12 or 24
        anl     a,#0f0h
        jnz     ok_to_send
        mov     a,r1                            ; get the result code

        cjne    a,#resp_connect_1200,chk_2400
        sjmp    say_connect
chk_2400:
        cjne    a,#resp_connect_2400,chk_arq
        sjmp    say_connect
chk_arq:
        cjne    a,#14,$+3               ;14 start of ARQ set.
        jc      ok_to_send

say_connect:

        mov     r1,#1                           ;print 'CONNECT' for all connections
ok_to_send:
        mov     a,r1
        jb      at_verbose,verbose_response
        add     a,#-10
        jnb     acc.7,two_digits
        mov     a,r1
        call    out_1_digit
        sjmp    send_cr
two_digits:
        mov     a,r1
        call    out_2_digits
send_cr:
        mov     dptr,#sreg+3
        movx    a,@dptr
        call    putc
        sjmp    reset_echo
verbose_response:
        mov     dptr,#rtab
        movc    a,@a+dptr
        add     a,dpl
        mov     dpl,a
        jnc     $+4
        inc     dph

        call    out_cr_lf
        call    out_a_string
        call    out_cr_lf
reset_echo:
        mov     c,cmd_echo
        mov     echo_pin,c
```

```
        call     portb_out
        mov      a,r1
        jnb      ti,$                   ; wait till last char gets sent
        anl      scon,#01111111b        ; reset to 10 bits
        ret

nonarq_table:                           ;conversion table for non-ARQ.
        db       0,1,2,3,4,5,6,7,8,9,10,11,12,13
        db       1,5,10,13
;*********************
slash_arq equ    0dah
connect          equ     0f0h
;*********************

rtab:
        db       m0-rtab,m1-rtab,m2-rtab,m3-rtab,m4-rtab,m5-rtab
        db       m6-rtab,m7-rtab,m8-rtab,m9-rtab,m10-rtab,m11-rtab
        db       m12-rtab,m13-rtab,m14-rtab,m15-rtab,m16-rtab,m17-rtab

;RTBL:                                  ;Table for Verbose responses.
;       DW       m0,m1,m2,m3,m4,m5,m6,m7,m8,m9,m10,m11,m12,m13
;       DW       m14,m15,m16,m17

m0:     DB       'OK',0
m1:     DB       'CONNECT',0
m2:     DB       'RING',0
m3:     DB       'NO CARRIER',0
m4:     DB       'ERROR',0
m5:     DB       'CONNECT 1200',0
m6:     DB       'NO DIAL TONE',0
m7:     DB       'BUSY',0
m8:     DB       'NO ANSWER',0
m9:     DB       0
m10:    DB       'CONNECT 2400',0
m11:    DB       'RINGING',0
m12:    DB       'VOICE',0
m13:    db       'CONNECT 9600',0
m14:    DB       'CONNECT/ARQ',0
m15:    DB       'CONNECT 1200/ARQ',0
m16:    DB       'CONNECT 2400/ARQ',0
m17:    DB       'CONNECT 9600/ARQ',0


out_cr_lf:
        push     dph
        push     dpl
        mov      dptr,#sreg+3           ; get s3
        movx     a,@dptr
        call     putc
        inc      dptr                   ; get s4
        movx     a,@dptr
```

```
        call    putc
        pop     dpl
        pop     dph
        ret

compute_parity:
        jb      bits_11,get_11_par
        jb      parity_yes,get_p
        jb      even_odd_par,set_bit7
        ret
set_bit7:
        setb    acc.7
        ret
get_p:
        mov     c,p
        jb      even_odd_par,put_in
        cpl     c
put_in:
        rl      a
        rrc     a                       ; insert c into acc.7
        ret
get_11_par:
        jb      parity_yes,use_p
        clr     c
        mov     tb8,c                   ; tb8 is the parity bit
        ret
use_p:
        mov     c,p
        jb      even_odd_par,even_par
        cpl     c
even_par:
        mov     tb8,c
        ret

$eject
;*************************************************
;
;
;       Ring Detection routine
;
;       Transitions of ring pin are sent back
;       by the transmitter.
;
;       03 = ring pin high to low transition
;       04 = low to high transition
;
;       The ring line should not be up for more than 31ms
;       Should not be low for less than 4.8ms
;
;*************************************************
not_valid:
        jmp     get_in_at
check_for_ring:                         ; must be a high to low transition of ring pin
```

```
            clr     tr_flag
            mov     a,tr_data
            cjne    a,#ring_h_to_l,not_valid
            mov     ring_cnt,#5  ; 5 cycles for valid ring
wait_low:
            clr     ea
            mov     timer_tics,#12
            mov     timer5,#1    ; must be low for at least 5ms
            clr     flag5
            setb    timer_on
            setb    ea
wait_out_5:
            jbc     flag5,low_for_5
            jnb     rxd,get_in_at
            jb      ri,get_in_at
            jnb     tr_flag,wait_out_5
            clr     tr_flag
            sjmp    get_in_at
low_for_5:
            clr     ea
            mov     timer_tics,#12
            mov     timer5,#7    ; see if manual ring is on
            clr     flag5
            setb    timer_on
            setb    ea                         ; already low for 5ms

wait_to_go_hi:                                 ; must go high before 35ms or manual ring
            jnb     flag5,look1
            clr     flag5
            jmp     manual_ring_chk
look1:
            jnb     rxd,get_in_at
            jb      ri,get_in_at
            jnb     tr_flag,wait_to_go_hi

            clr     tr_flag
            clr     ea
            mov     timer_tics,#19
            mov     timer5,#6    ; cant be high longer than 32.7ms
            clr     flag5                      ; or ring is over
            setb    ea
wait_out_high:
            jbc     flag5,end_of_ring
            jnb     rxd,get_in_at
            jb      ri,get_in_at
            jnb     tr_flag,wait_out_high
            clr     tr_flag
            djnz    ring_cnt,wait_low; get next cycle
            sjmp    valid_ring
end_of_ring:
            djnz    ring_cnt,get_in_at         ; not a valid ring
valid_ring:
```

```
        call        ring_on

        cpl         oa_pin                          ; complement the auto answer line
        call        portb_out
setup_175:
        clr         ea
        mov         timer_tics,#12
        mov         timer5,#35              ; wait for 175ms after end of ring
        clr         flag5
        setb        timer_on
        setb        ea
wait_for_end:
        jbc         flag5,lower_ri
        jnb         rxd,get_in_at
        jb          ri,get_in_at
        jbc         tr_flag,setup_175
        sjmp        wait_for_end

get_in_at:
        clr         timer_on
        mov         dptr,#sreg+0                    ; reset the oa_pin to indicate s0
        movx        a,@dptr
        clr         oa_pin
        jz          send_port
        setb        oa_pin
send_port:
        call        portb_out
        ret

lower_ri:
        cpl         oa_pin
        call        portb_out
        call        ring_off

        clr         ea
        mov         timer_tics,#12
        mov         timer5,#50  ; wait 250 ms before printing ring
        setb        ea
wait_out_250ms:
        jnb         rxd,get_in_at
        jb          ri,get_in_at
        jnb         flag5,wait_out_250ms
        jnb         pring,update_s1
        mov         a,#2                    ; send RING
        call        respond
update_s1:
        jnb         at_dtr,need_more_rings
        mov         dptr,#sreg+0
        movx        a,@dptr
        jz          need_more_rings
        mov         b,a
        inc         dptr
```

```
        movx    a,@dptr
        inc     a
        movx    @dptr,a
        cjne    a,b,need_more_rings

manual_ring:
        jnb     at_dtr,need_more_rings
        clr     orig                    ; answer mode
        clr     a                       ; reset S1
        mov     dptr,#sreg+1
        movx    @dptr,a
        setb    ren
        pop     acc
        pop     acc
        call    go_off_hook

        mov     dptr,#sreg+13           ; answer in originate mode?
        movx    a,@dptr
        jnb     acc.1,no_orig
        setb    orig
no_orig:
        jmp     send_1224_data

need_more_rings:                ; S1 < S0 so setup 9 second ring timeout
        clr     ea
        mov     ticks,#120
        mov     time50,#20
        mov     secs,#9
        setb    ea
        clr     clear_s1        ; S1 needs to checked for timeout
        ret

manual_ring_chk:                ; make sure of manual ring must stay low 200ms
        clr     ea
        mov     timer_tics,#12
        mov     timer5,#40
        clr     flag5
        setb    timer_on
        setb    ea
wait_low_loop:
        jbc     tr_flag,went_high
        jnb     flag5,wait_low_loop
        clr     timer_on
        sjmp    manual_ring
went_high:
        jmp     get_in_at       ; got something other than manual ring or ring

dial_ds0:                       ; sets up DS0 in the command buffer
        mov     p2,#0
        mov     r0,#0
        mov     a,#'D'
        movx    @r0,a
```

```
        mov     a,#'S'
        inc     r0
        movx    @r0,a
        clr     a
        inc     r0
        movx    @r0,a
        jmp     parse_it

send_alb:
        mov     p2,#0                    ; send ATS16=1D or A
        mov     r0,#0
        mov     a,#'S'
        movx    @r0,a
        inc     r0
        mov     a,#'1'
        movx    @r0,a
        inc     r0
        mov     a,#'6'
        movx    @r0,a
        inc     r0
        mov     a,#'='
        movx    @r0,a
        inc     r0
        mov     a,#'1'
        movx    @r0,a
        inc     r0
        jnb     orig,ans_alb
        mov     a,#'D'
        sjmp    insert
ans_alb:
        mov     a,#'A'
insert:
        movx    @r0,a
        clr     a
        inc     r0
        movx    @r0,a
        jmp     parse_it

        END
```

```
$TITLE ( CALL PROGRESS FOR MERCURY MODEM )
;***************************************************
;
;
;        NAME:              CALL PROGRESS FOR MERCURY MODEM
;
;        PURPOSE            DETECT ANS TONE, VOICE, BUSY, RINGING, DIAL TONE
;                           '@' SILENCE.
;
;        INPUTS:            oa_pin- ASSUME 0 (ANS MODE) AT START
;                           SECS      - UPDATED IN INT FOR TIMEOUT
;                           X_SPKR    - HIGH NIBBLE gives result code set being used
;                           SREG 7    - SECONDS TIMEOUT VALUE FOR ANS TONE
;                           B.0       - SET IF DOING '@' ANSWER CHECK
;                           RING1     - SET IF WE GET AT LEAST 1 RING BACK
;                                       FOR '@' COMMAND.
;
;        OUTPUTS:   C       - CLEAR IF WE GOT ANSWER TONE
;                           ACC       - ERROR RESULT CODE IF NO ANS TONE
;                           B.1       - SET IF WE GOT DIAL TONE (EG, IF 'W' CMD)
;                           SECS      - (SEE ABOVE) CALL_PROG1 ONLY
;                           RING1     - (SEE ABOVE)
;                           B.0       - clear if success with '@' command
;
;        LOCAL VARS:        B.2       - SET IF WE RX'ED AT LEAST 1 RING BACK.
;                                       CANNOT BE BUSY IF SET.
;                           silence_cnt - DURATION OF CONTINUOUS SILENCE IN UNITS
;                                       OF 100 MSEC.  -- FOR '@' COMMAND.
;                           R6        - COUNTS # TIMES get_freq RETURNS FREQ. BETW
;                                       300 AND 800 HZ. ONCE WE GET 7 TIMES, WE HAVE
;                                       EITHER DIAL TONE OR RING BACK. ELSE WE MAY
;                                       HAVE BUSY. -- IS RESET IF 100 < FREQ < 300
;                                       OR FREQ > 800.
;                           consec_cnt - # CONSEC CALLS OF get_freq W/ RET OF 300-800
;                                       -- FOR BUSY
;                           busy_cnt  - # CONSEC TIMES WE GET 300 - 800 HZ RETS
;                                       2-6 TIMES IN A ROW FOLLOWED BY 0-100HZ
;                                       RETURNS. - FOR BUSY
;                           FLAG_X012 - Set if using X0 - X2 result codes
;                           FLAG_X56 - Set if using X5 - X6 result codes
;
;
;        determination is as follows:
;                           ans tone:    2150 <= freq  < 2500
;                           voice:                 1130 <= freq  < 2000 4 times
;                           dial tone    300  <= freq  < 800  27 times in a row
;                           ring back    300  <= freq  < 800  for < 27 in row
;                           but >= 7 in row
;                           busy                   300  <= freq  < 800  2-6
;                                        times in row followed by >= 1
;                                         returns at 0-100 hz.  Must happen 2 times.
;
;***************************************************
;
```

```
$eject
        extrn   number(voice_cnt)

        extrn   code(chk_timeout,get_s,echo_off)
        extrn   code(set_answer,set_originate)
        extrn   code(respond,wait5)
        extrn   code(set_mercury,set_courier)
        extrn   code(enable_novram,disable_novram)
        extrn   code(dtmf_on,dtmf_off)
        extrn   code(get_x_spkr)

        extrn   xdata(sreg,x_spkr)

        extrn   data(ticks,time50,secs)
        extrn   data(timer_tics,timer5)
        extrn   data(portb)

        extrn   bit(flag5,timer_on)
        extrn   bit(oa_pin,ring1)

        public  callprog1
        public  callprog
        public  cp_ret                          ;for debugging
        public  getfreq

RESP_NO_CARRIER         EQU     3
RESP_VOICE              EQU     12
RESP_RINGING            EQU     11
RESP_BUSY               EQU     7

GOT_SEVEN       EQU     0f4h                    ;B.4
FLAG_X012 EQU   0f5h            ;B.5
FLAG_X56  EQU   0f6h            ;B.6
FLAG_X567 EQU   0f7h            ;B.7

busy_cnt        equ     r2
consec_cnt      equ     r3
confidence      equ     r4
silence_cnt     equ     r5
hz300_800       equ     r6
confidence_cnt          equ     r7

cp_code segment code
rseg    cp_code

$eject
CALLPROG1:
        mov     dptr,#sreg+7                    ;SET CONNECT TIMEOUT to sreg #7
        movx    a,@dptr
        CLR     EA
        MOV     TICKS,#120
        mov     time50,#20
```

```
        mov     secs,a
        setb    ea

callprog:
;       mov     p2,#3
;       mov     r1,#0

        mov     dptr,#voice_cnt
        clr     a
        movx    @dptr,a

        call    set_mercury
        call    set_originate
        call    dtmf_on
        call    del_20_ms

        call    get_x_spkr
;       mov     a, x_spkr              ;set consec_cnt to hold working xreg val
        swap    a
        anl     a,#0fh

        add     a,#3                          ;FLAG_X567 reference if X5 - X7
        mov     c,acc.3
        mov     FLAG_X567,c

        cpl     acc.1                         ;FLAG_X56 reference if X5 - X6
        anl     c,acc.1
        mov     FLAG_X56,c
        cpl     acc.1

        add     a,#-6                         ;FLAG_X012 reference if X0 - X2
        mov     c,acc.7
        mov     FLAG_X012,c

        mov     silence_cnt,#50               ; 5 sec
        mov     busy_cnt,#0
        mov     consec_cnt,#0
        clr     got_seven
        clr     B.2                           ;No ring back's rx'ed yet
        mov     r6,#7                         ;count down for ring back and dial tone
        clr     B.1                           ;have not gotten a dial tone

;-----------------------------------------
cp_loop:                                      ;Main Loop
                                              ;do 1 100 msec freq test on each pass
        call    chk_timeout            ;see if abort or timeout
        jnc     cp_sample

cp_ret_ncarrier:
        mov     a,#RESP_NO_CARRIER     ;We had timeout or abort!
cp_ret:                                       ;Here for FAILURE return
        mov     r2,a
```

```
            call      set_courier
            call      dtmf_off
            call      del_20_ms
            mov       a,r2
            setb      c                                    ;error return code
            ret

cp_sample:                                     ;HERE DO ACTUAL ANS TONE CHECK
            call      getfreq                              ; get a sample
;           movx      @r1,a
;           inc       r1
            jc        got_anstone
            jb        f0,got_anstone
            cjne      a,#20,$+3
            jc        silence
            mov       silence_cnt,#50
            sjmp      cp_not_anstone
silence:
            djnz      silence_cnt,cp_not_anstone           ; 5 sec?
            jnb       b.0,rset_at              ; doing '@' cmd?
            jnb       ring1,rset_at                        ; > 1 ring?
            clr       b.0                                  ; phew!
            jmp       cp_ret
rset_at:
            mov       silence_cnt,#50
            sjmp      cp_not_anstone

got_anstone:
            clr       c                                    ;SUCCESSFUL RETURN!
            ret

; look for busy, ringing
cp_not_anstone:
            cjne      r4,#6,$+3                ; energy must be valid for count
            jc        good_count
            clr       a
good_count:                                                ; to be good
            cjne      a,#30,$+3                ;DIAL TONE, RINGING, and BUSY in
            jc        cp_not_dial              ;300 - 800 Hz. range
            cjne      a,#80,$+3
            jnc       cp_not_dial
            inc       consec_cnt               ;for BUSY detection
            djnz      r6,cp_loop               ;If not 7 times in row, go to main loop
            setb      got_seven                ; got seven times in a row
            inc       r6
cp_wait_ring:                                  ;loop. We have RINGING or DIAL TONE.
                                               ;If 20 consec freq checks in this
                                               ;range, it's dial tone, else ringing.
            cjne      consec_cnt,#27,cp_loop   ;20th time means dial tone
            setb      b.1                      ;signals dial tone was found
            jnb       flag_x012,cp_ret_ncarrier
            mov       consec_cnt,#00
```

```
        mov     r6,#7
        sjmp    cp_loop


cp_ring:                                ;here we got ring back - RINGING
        setb    ring1                           ;for '@' command
        jnb     FLAG_X567,cp_ringx      ;jump if not X5 - X7
        mov     a,#RESP_RINGING                 ;print 'RINGING' to screen

        push    b                               ;respond changes B
        call    respond
        call    echo_off
        pop     b
cp_ringx:
        mov     r6,#7                           ;ring back, busy, dial tone counter
        setb    b.2                             ;can't be busy now.
        mov     silence_cnt,#50
        mov     dptr,#voice_cnt
        clr     a
        movx    @dptr,a
        sjmp    cp_loop                         ;return to main loop

cp_not_dial:                            ;do '@' answer success check here
; check voice here??
        jbc     got_seven,cp_ring       ; got seven in a row
no5secck:                               ;do busy check over here
        jb      b.2,cp_no_busy                  ;cannot be busy if we rx'ed ring back
        cjne    consec_cnt,#3,$+3       ;check length of low tone
        jc      cp_no_busy              ;must have > .5 sec of 300-800 for busy
        inc     busy_cnt                ;inc busy tone count
        mov     a,busy_cnt              ;must have at least 2 separate busy
        cjne    a,#2,cp_no_busy                 ;tones.  If so, then BUSY!
        jb      flag_x012,cp_no_busy
        mov     a,#RESP_BUSY
        jmp     cp_ret

cp_no_busy:                                     ;inconclusive.
        mov     r6,#7                           ;not in dial tone or ring back
        mov     consec_cnt,#0                           ;not in busy tone


        jnb     FLAG_X56,cp_not_voice   ;jump if not X5 or X6
        cjne    a,#113,$+3              ;VOICE between 1130 and 2000 Hz.
        jc      cp_not_voice
        cjne    a,#200,$+3
        jnc     cp_not_voice
        mov     dptr,#voice_cnt
        movx    a,@dptr
        inc     a
        cjne    a,#6,save_voice_cnt
send_voice:
        mov     a,#RESP_VOICE                   ;here we ret VOICE
```

```
        jmp     cp_ret
save_voice_cnt:
        movx    @dptr,a
cp_not_voice:
        jmp     cp_loop


$eject
del_20_ms:
        mov     a,#4
        jmp     wait5


;****************************************

getfreq:
; returns freq/10 in acc
; cy = 1 if 215 < freq/10 <230
        setb    p3.4                    ; t0 as input
        clr     ea
        clr     et0                     ; disable timer0 overflow
        push    tmod
        mov     tmod,#00100101b         ; timer0 is counter mode
        mov     th0,#0                  ; reset counter0
        mov     tl0,#0
        setb    tr0                     ; start count

;       mov     a,#20
;       call    wait5
        mov     r7,#10
        mov     r4,#0
gf_loop:
        setb    ea
        mov     a,#2                    ; wait 100 msec
        call    wait5
        clr     ea
        jnb     p3.5,$+4
        inc     r4
        djnz    r7,gf_loop

        clr     tr0                     ; stop timer0
        setb    ea
        mov     a,th0                   ; if > 0
        clr     c                       ;   then very high freq
        jz      $+3
        setb    c
        mov     a,tl0                   ; acc = freq/10
        mov     th0,#0                  ; reset timer
        mov     tl0,#0
        pop     tmod

        clr     f0
```

```
        jnc     good_reading
        clr     a                       ; zero if no cd
        clr     c
        ret

good_reading:
        cjne    a,#220,$+3              ; check for valid answer tone
        jc      gf_ret
        cjne    a,#230,$+3
        jnc     gf_ret
        cjne    r4,#3,$+3               ; make sure energy_detect was low
        ret                                     ; most of the time
gf_ret:
        cjne    a,#205,$+3
        jc      not_2100
        cjne    a,#215,$+3
        jnc     not_2100
        cjne    r4,#3,$+3
        jnc     not_2100
        setb    f0
not_2100:
        clr     c
        ret


        end
```

```
****************************************
*
*               NAME:       DATE
*
****************************************


date_seg    segment code
                        rseg        date_seg

            public      datestr


datestr:
            db          13
$include(d:date.txt)

            db          0
            end
```

```
$TITLE(Link Diagnostics)
;*******************************************************************
;
;
;          Name:     EXTRA:                  DIAG
;
;
;
;*******************************************************************
;
;
crlf       equ       0edh                                 ; <cr><lf>
_char      equ       0f3h                                 ; " Char"


           extrn     code(putc)
           extrn     code(putstring,out_a_string)
           extrn     code(out_cr_lf,out_2_digits,out_3_digits)
           extrn     code(get_in)
           extrn     xdata(sreg)
           extrn     xdata(last_cd_count)

           public    clear_ld_strings
           public    inc_ld_string
           public    add_ld_string
           public    print_ld_string
           public    go_do_i6


;diag_data segment   xdata     inpage
;                    rseg      diag_data
                     xseg      at        200h

dd_start:
ld_chars_sent:                 ds        4
ld_chars_recv:                 ds        4
ld_chars_lost:                 ds        4
ld_lts_sent:         ds        4
ld_lts_resent:                 ds        4
ld_retrains:         ds        4
ld_reversals:                  ds        4
ld_naks:             ds        4
ld_lt_timeouts:                ds        4
dd_end:

           public    ld_chars_sent,ld_chars_recv,ld_chars_lost
           public    ld_lts_sent,ld_lts_resent
           public    ld_retrains,ld_reversals
           public    ld_naks,ld_lt_timeouts

diag_code  segment   code
                     rseg      diag_code
```

```
;---------------------------------------
clear_ld_strings:
            mov     dptr,#dd_start
            mov     r1,#low (dd_end-dd_start)
            clr     a
cls_loop:
            movx    @dptr,a
            inc     dptr
            djnz    r1,cls_loop
            ret

;---------------------------------------
add_ld_string:
            mov     b,#100
            div     ab
            push    acc
            mov     a,#10
            xch     a,b
            div     ab
            swap    a
            orl     b,a
            movx    a,@dptr
            add     a,b
            da      a
            movx    @dptr,a
            inc     dptr
            pop     b
            movx    a,@dptr
            addc    a,b
            sjmp    ils_next

inc_ld_string:
            movx    a,@dptr
            add     a,#01
            da      a
            movx    @dptr,a
            inc     dptr
            movx    a,@dptr
            addc    a,#0
ils_next:
            da      a
            movx    @dptr,a
            inc     dptr
            movx    a,@dptr
            addc    a,#0
            da      a
            movx    @dptr,a
            inc     dptr
            movx    a,@dptr
            addc    a,#0
            da      a
            movx    @dptr,a
```

```
        ret

;----------------------------------------
print_ld_string:
        inc     dptr                    ; move to msb
        inc     dptr
        inc     dptr
        mov     r1,#4
        clr     f0
pbs_loop:
        movx    a,@dptr
        swap    a
        clr     c
        call    putdigit
        movx    a,@dptr
        setb    c
        call    putdigit
        dec     dpl
        djnz    r1,pbs_loop
        jmp     out_cr_lf


putdigit:
        anl     a,#0fh
        jnz     pd_not_blank
        jb      f0,pd_not_blank
        mov     a,#' '
        jnc     putc_jmp
        cjne    r1,#1,putc_jmp
        clr     a
pd_not_blank:
        setb    f0
        add     a,#'0'
putc_jmp:
        jmp     putc
pd_ret:
        ret

;----------------------------------------
go_do_i6:
        call    putstring
        db      crlf,'Chars sent',80h+19,0
        mov     dptr,#ld_chars_sent
        call    print_ld_string

        call    putstring
        db      'Chars received',80h+15,0
        mov     dptr,#ld_chars_recv
        call    print_ld_string

        call    putstring
```

```
        db      'Chars lost',80h+19,0
        mov     dptr,#ld_chars_lost
        call    print_ld_string

        call    putstring
        db      'Data blocks transmitted',80h+6,0
        mov     dptr,#ld_lts_sent
        call    print_ld_string

        call    putstring
        db      'Data blocks retransmitted',80h+4,0
        mov     dptr,#ld_lts_resent
        call    print_ld_string

        call    putstring
        db      'Retrains',80h+21,0
        mov     dptr,#ld_retrains
        call    print_ld_string

        call    putstring
        db      'Line Reversals',80h+15,0
        mov     dptr,#ld_reversals
        call    print_ld_string

        call    putstring
        db      'Link Timeouts',80h+16,0
        mov     dptr,#ld_lt_timeouts
        call    print_ld_string

        call    putstring
        db      'Link Naks',80h+20,0
        mov     dptr,#ld_naks
        call    print_ld_string


;       call    putstring
;       db      'Receive Level',80h+21,'-',0
;       mov     dptr,#last_cd_count
;       movx    a,@dptr
;       mov     b,#9
;       div     ab
;       add     a,#30
;       call    out_3_digits
;       call    putstring
;       db      'Dbm',crlf,0

        call    out_cr_lf
        call    out_cr_lf
        mov     dptr,#sreg+20
        movx    a,@dptr
        cjne    a,#10,$+3
        jc      $+3
```

```
        clr     a
        jz      no_reason

        push    acc
        call    putstring
        db      'Disconnect Reason is ',0
;       mov     dptr,#sreg+20
;       movx    a,@dptr
;       cjne    a,#9,$+3
;       jc      $+3
;       clr     a
        pop     acc

no_reason:
        mov     dptr,#ldc_tab
        movc    a,@a+dptr
        add     a,dpl
        mov     dpl,a
        clr     a
        addc    a,dph
        mov     dph,a
        call    out_a_string
;;      call    out_cr_lf

        mov     dptr,#sreg+17
        movx    a,@dptr
        jz      i6_end
        push    acc
        call    putstring
        db      crlf,'LD Reason is ',0
        pop     acc
        cjne    a,#7,$+3
        jc      ld_continue
        cjne    a,#254,ld_user
        mov     a,#7
        sjmp    ld_continue
ld_user:
        cjne    a,#255,ld_undef
        mov     a,#8
        sjmp    ld_continue
ld_undef:
        clr     a
ld_continue:
        mov     dptr,#ldm_tab
        movc    a,@a+dptr
        add     a,dpl
        mov     dpl,a
        clr     a
        addc    a,dph
        mov     dph,a
        call    out_a_string
```

```
i6_end:
        call    out_cr_lf
        jmp     get_in

ldc_tab:
        db      dc_0 - ldc_tab
        db      dc_1 - ldc_tab
        db      dc_2 - ldc_tab
        db      dc_3 - ldc_tab
        db      dc_4 - ldc_tab
        db      dc_5 - ldc_tab
        db      dc_6 - ldc_tab
        db      dc_7 - ldc_tab
        db      dc_8 - ldc_tab
        db      dc_9 - ldc_tab

ld_reasons:
dc_0:   db      'No Connection',0
dc_1:   db      'DTR dropped',0
dc_2:   db      'Escape code',0
dc_3:   db      'Loss of Carrier',0
dc_4:   db      'Inactivity',0
dc_5:   db      'MNP Incompatibility',0
dc_6:   db      'Retransmit Limit',0
dc_7:   db      'LD Received',0
dc_8:   db      'Unable to Retrain',0
dc_9:   db      'User Test Abort',0


ldm_tab:
        db      dm_x - ldm_tab
        db      dm_1 - ldm_tab
        db      dm_2 - ldm_tab
        db      dm_3 - ldm_tab
        db      dm_4 - ldm_tab
        db      dm_5 - ldm_tab
        db      dm_6 - ldm_tab
        db      dm_254 - ldm_tab
        db      dm_255 - ldm_tab

dm_x:   db      'Undefined',0
dm_1:   db      'Received LPDU not Link Request',0
dm_2:   db      'Incompatible Protocol Level',0
dm_3:   db      'Unknown Link Parameters',0
dm_4:   db      '> 12 Retries',0
dm_5:   db      'Remote Inactivity Timeout',0
dm_6:   db      'Destination User Not Found',0
dm_254: db      'Peer Protocol Error',0
dm_255: db      'Remote User Initiated',0

        End
```

```
$TITLE(Help Screen Module)
;*********************************************************************
;
;
;           Name                    Help
;           Purpose                 Contains putstring and all help screen code.
;
;
;*********************************************************************
;
;
            using       0


            public      putstring,out_a_string
            public      help_gen,help_dial,help_s,help_amp
            public      do_help,help_go
            extrn       code(putc)
            extrn       xdata(sreg)
            extrn       bit(ctrl_c,space_off)

;----------------------------
help_code   segment     code
rseg                    help_code

do_help:
help_go:
            setb        ctrl_c
            clr         space_off
            sjmp        out_a_string

;----------------------------
putstring:
            pop         dph
            pop         dpl
            call        out_a_string
            jmp         @a+dptr


;----------------------------
out_a_string:                                                   ;out the msg in
dptr
            clr         a
            movc        a,@a+dptr
            inc         dptr
            jnz         put_cr
            ret

put_cr:
            cjne        a,#0dh,put_lf                           ;CR, use S-3
            push        dpl
            push        dph
            mov         dptr,#sreg+3
            movx        a,@dptr
            pop         dph
```

```
        pop     dpl
        sjmp    puts_go
put_lf:
        cjne    a,#0ah,put_token                ;LF, use S4
        push    dpl
        push    dph
        mov     dptr,#sreg+4
        movx    a,@dptr
        pop     dph
        pop     dpl
puts_go:
        call    putc
        sjmp    out_a_string

put_token:
        jnb     acc.7,puts_go                   ;macro ?
        jnb     acc.6,not_macro                 ; C0 - FF are maros
;       cjne    a,#0dfh,$+3                     ;above df is macro
;       jc      not_macro                       ;jump if space expans.

        push    dph
        push    dpl
        clr     c
        subb    a,#0d0h                         ;convert to 0 - 1f
;;      xrl     a,#00010000b                    ;????
        mov     dptr,#mactbl
        rl      a
        mov     r1,a
        movc    a,@a+dptr
        xch     a,r1
        inc     a
        movc    a,@a+dptr

        mov     dpl,a
        mov     dph,r1
        call    out_a_string                    ;be very careful here!
        pop     dpl                             ;recursion in progress
        pop     dph     sjmp    out_a_string

not_macro:                                      ;here space expansion
        anl     a,#3fh
        mov     r1,a
space_exp:
        mov     a,#' '
        call    putc
        djnz    r1,space_exp
        sjmp    out_a_string
```

```
off             equ     0d0h            ; "Off"
on              equ     0d1h            ; "On"
repeat          equ     0d2h            ; "Repeat"
_config         equ     0d3h            ; " Configuration"
_duplex         equ     0d4h            ; " duplex"
echo            equ     0d5h            ; "echo"
_digits         equ     0d6h            ; " Digits"
store_          equ     0d7h            ; "Store "
h_bps           equ     0d8h            ; "00 bps"
hone_number     equ     0d9h            ; "hone Number"
slash_arq   equ 0dah            ; "/ARQ"
arq             equ     0dbh            ; "ARQ"
_nequals0__     equ     0dch            ; "   n=0  "
nequals0__  equ 0ddh            ; "n=0  "
_nequals1__     equ     0deh            ; "      n=1  "
ing             equ     0dfh            ;"ing"

_code           equ     0e0h
_result_codes   equ     0e1h
nequals         equ     0e2h
speaker_    equ 0e3h
_responces  equ 0e4h
_register   equ 0e5h
secp            equ     0e6h
_command    equ 0e7h
_time           equ     0e8h
dial            equ     0e9h
wait            equ     0eah
_tone           equ     0ebh
_test           equ     0ech
crlf            equ     0edh
_ctrl_s         equ     0eeh
transmitter equ 0efh

connect         equ     0f0h
usrobotics  equ 0f1h
help            equ     0f2h
_char           equ     0f3h
carrier         equ     0f4h
call_duration   equ     0f5h
clock           equ     0f6h
answer          equ     0f7h
re              equ     0f8h
_hook           equ     0f9h
_to_            equ     0fah
an              equ     0fbh
analog_loopback equ     0fch
test_pattern equ 0fdh
_mode           equ     0feh
```

```
mactbl:
        dw      tt0,tt1,t2,t3,t4,t5,t6,t7
        dw      t8,t9,ta,tb,tc,td,te,tf
        dw      mc0,mc1,mc2,mc3,mc4,mc5,mc6,mc7,mc8
        dw      mc9,mca,mcb,mcc,mcd,mce,mcf
        dw      mc10,mc11,mc12,mc13,mc14,mc15,mc16,mc17,mc18
        dw      mc19,mc1a,mc1b,mc1c,mc1d,mc1e


tt0:    db      'Off',0
tt1:    db      'On',0
t2:     db      'Repeat',0
t3:     db      ' Configuration',0
t4:     db      ' duplex',0
t5:     db      'echo',0
t6:     db      ' Digits',0
t7:     db      'Store ',0
t8:     db      '00 bps',0
t9:     db      'hone Number',0
ta:     db      '/'
tb:     db      'ARQ',0
tc:     db      ' '
td:     db      83h,'n=0',82h,0
te:     db      86h,'n=1',82h,0
tf:     db      'ing',0


MC0:    DB      ' Code',00
MC1:    DB      ' Result Codes',00
MC2:    DB      'n=',00
MC3:    DB      'Speaker ',00
MC4:    DB      ' Responses',00
MC5:    DB      ' Register',00
MC6:    DB      'sec)',00
MC7:    DB      ' Command',00
MC8:    DB      ' Time',00
MC9:    DB      'Dial',00
MCA:    DB      'Wait',00
MCB:    DB      ' Tone ',00
MCC:    DB      ' Test',00
MCD:    DB      13,10,00
MCE:    DB      ' (CTRL-S to Stop, CTRL-C to Cancel)',00
MCF:    DB      'Transmitter ',00

MC10:   DB      'CONNECT',00
MC11:   DB      'USRobotics Courier 9600 HST ',00
MC12:   DB      'HELP, ',00
MC13:   DB      ' Char',00
MC14:   DB      'Carrier ',00
MC15:   DB      'Call Duration',00
```

```
MC16:   DB      'Clock',00
MC17:   DB      'Answer ',00
MC18:   DB      'Re',00
MC19:   DB      ' Hook',00
MC1A:   DB      ' to ',00
MC1B:   DB      'an',00
MC1C:   DB      'Analog Loopback',00
MC1D:   DB      'Test Pattern',00
MC1E:   DB      ' Mode',00

Help_s:

 DB crlf,help,'S',_register,'  Functions',_ctrl_s,crlf,crlf
 DB 'S0',82H,'R',ing,_to_,answer,on,80H+16
 DB 'S11 Touch',_tone,'Spac',ing,'  (m',secp
 DB crlf
 DB 'S1',82H,'Counts  # of R',ing,'s',80H+16
 DB 'S12 Escape',_code,_time,'  (1/50',secp
 DB crlf
 DB 'S2',82H,'Escape',_code,_char,80H+17
 db 'S13 Bit Mapped'
 DB crlf
 DB 'S3',82H,'Carriage  ',re,'turn',_char,80H+13
 DB 'S16 Test',_mode,'s'
 DB crlf
 DB 'S4',82H,'Line  Feed',_char,80H+19
 db 'S17 LD Reason'
 DB crlf
 DB 'S5',82H,'Backspace',_char,80H+19
 db 'S19 Inactivity Timeout (min)'
 DB crlf
 DB 'S6',82H,wait,_time,'/',dial,_tone,'(',secp,80H+8
 db 'S20 Disconnect Reason'
 DB crlf
 DB 'S7',82H,wait,_time,'/',carrier,'(',secp,80H+10
 db 'S21 Break Length'
 db crlf
 DB 'S8',82H,'Comma  ',an,'d  ',repeat,'  Pause (',secp,80h+5
 db 'S22 Xon',_char
 DB crlf
 DB 'S9',82H,carrier,'Detect',_time,'  (1/10',secp,80h+4
 db 'S23 Xoff',_char
 DB crlf
 DB 'S10 ',carrier,'Loss',_time,'  (1/10',secp
 DB crlf
 db 0

Help_gen:

 DB crlf,help,_command,' Quick ',re,'ference',_ctrl_s,crlf,crlf
```

```
db '&$',84h,help,'Extended  Commands',80h+8
db 'In',84h,nequals,'5',82h,'NRAM  Sett',ing,'s',crlf
; db 86h,nequals,'5',82h,'NRAM  Sett',ing,'s',crlf

DB 'A',85H,answer,'Call',80H+20
db 86h,nequals,'6',82h,'Link  Diagnostics',crlf

DB 'A/',84H,repeat,' Last',_command,80H+12
DB 'Kn',_nequals0__,call_duration,_mode,crlf

DB 'Bn',_nequals0__,'CCITT  ',answer,'Sequence',80H+5
DB _nequals1__,re,'al Time ',clock,_mode,crlf

DB _nequals1__,'Bell ',answer,'Sequence',80h+6
DB 'Mn',_nequals0__,speaker_,off,crlf


DB 'Cn',_nequals0__,transmitter,off,80H+11
DB _nequals1__,speaker_,'On Until CD',crlf


DB _nequals1__,transmitter,on,80H+18
DB nequals,'2  ',speaker_,'Always  On',crlf


DB 'Dn',84H,dial,'  a Telep',hone_Number,88H+6
DB nequals,'3  ',speaker_,Off,' Dur',ing,'  ',dial,crlf

DB 86H,'n=0..9#*TPR,;"W@!()-',80H+11
DB 'O',85H,re,'turn  On-Line',crlf

db 'DSn',83h,'Dial  Stored P',hone_number,80h+7
DB 'Qn',_nequals0__,'Result',_code,'s  Sent',crlf

DB 'D$',84H,help,dial,_command,'s',80H+12
DB _nequals1__,'Quiet (No',_result_codes,')',crlf

DB 'En',_nequals0__,'Do  not ',Echo,_char,'s',89H
DB 'Sr=n',82H,'Sets',_register,'  "r"',_to_,'"n"',crlf

DB _nequals1__,Echo,_command,_char,'s',88H
DB 'Sr?',83H,'Query',_register,'  "r"',crlf

DB 'Fn',_nequals0__,'Half',_Duplex,80H+15
DB 'S$',84H,help,'S',_register,'s',crlf

DB _nequals1__,'Full',_Duplex,80H+15
DB 'Vn',_nequals0__,'Numeric',_responces,crlf

DB 'Hn',_nequals0__,on,_hook,'  (H',an,'g Up)',89H
DB _nequals1__,'Verbal',_responces,crlf
```

```
DB _nequals1__,off,_hook,80H+18
DB 'Xn',_nequals0__,'Basic',_result_codes,crlf

DB 'In',_nequals0__,'Product',_code,80H+14
DB _nequals1__,'Extended',_result_codes,crlf

DB _nequals1__,'Checksum',80H+24
DB nequals,'2-7',82H,'Adv',an,'ced',_result_codes,crlf

DB 86H,nequals,'2',82H,'RAM',_test,80H+18
DB 'Z',85H,'Software ',re,'set',crlf

DB 86H,nequals,'3',82H,call_duration,'/',clock,80H+7
; DB 'I3=s',82H,'Sets the ',clock,80H+17
DB '>',85H,repeat,_command,' Str',ing,crlf

; DB 86H,'s=Hours:Mins:Secs',80H+14
DB 86H,nequals,'4',82h,'Current',' Sett',ing,'s',80H+10
DB '$',85H,help,_command,' Summary'

DB 0


Help_dial:
DB crlf,help,dial,_command,'s',_ctrl_s,crlf,crlf
DB '0-9',_Digits,_to_,dial,crlf
DB '*#',82H,'Auxiliary',_Digits,crlf
DB 'T',82H,_tone,dial,ing,crlf
DB 'P',83H,'Pulse ',dial,ing,crlf
DB 'R',83H,'Call ',an,' Originate Only',_mode,'m',crlf
DB ',',83H,'Pause',crlf
DB ';',83H,re,'main in',_command,_mode,crlf
DB '"',83H,'Used',_to_,dial,' Alpha Phone #',39,'s',crlf
DB 'W',83H,wait,' for 2nd ',dial,_tone,'(X3-X7)',crlf
DB '@',83H,wait,' for ',an,' ',answer,'(X3-X7)',crlf
DB '!',83H,'Flash Switch',_hook,crlf
db      0

Help_amp:
DB crlf,help,'Extended',_command,'s',_ctrl_s,crlf,crlf

DB '&An',nequals0__,'Disable ',slash_arq,' ',_result_codes,85h
DB '&Nn',nequals0__,'Highest Link Speed',crlf

db _nequals1__,'Allow ',slash_arq,' ',_result_codes,87h
db _nequals1__,'3',h_bps
db 86h,nequals,'3',82h,'24',h_bps,crlf

DB '&Bn',nequals0__,'Variable DTE Speed',80h+13
db 86h,nequals,'2',82h,'12',h_bps
db 85h,nequals,'6',82h,'96',h_bps,crlf
```

```
DB _nequals1__,'Fixed DTE Speed',80h+16
db '&Pn',nequals0__,'USA Pulse ',dial,crlf

DB '&F',84H,'Load Factory',_Config,80h+10
db _nequals1__,'UK Pulse ',dial,crlf

db '&Hn',nequals0__,'Disable TX data flow control',80h+3
DB '&Rn',83h,nequals,'1',82h,'Ignore RTS',crlf

db _nequals1__,'CTS',80h+28
db 86h,nequals,'2',82h,'RX Data',_to_,'DTE / RTS high',crlf

db 86h,nequals,'2',82h,'Xon/Xoff',80h+23
db '&Sn',nequals0__,'DSR always ',on,crlf

db 86h,nequals,'3',82h,'CTS and Xon/Xoff',80h+15
db _nequals1__,'Modem controls DSR',crlf

db '&In',nequals0__,'Disable RX data flow control',80h+3
DB '&W',84H,Store_,'Current',_Config,crlf

db _nequals1__,'Xon/Xoff',80h+23
db '&Yn',nequals0__,'Destructive Break',crlf

db 86h,nequals,'2',82h,'Xon/Xoff chars filtered',80h+8
db _nequals1__,'Destructive/Expedited',crlf

db 86h,nequals,'3',82h,'HP Enq/Ack Host',_mode,80h+11
db 86h,nequals,'2',82h,'Nondestructive/Expedited',crlf

db 86h,nequals,'4',82h,'HP Enq/Ack Terminal',_mode,80h+7
db 86h,nequals,'3',82h,'Nondestructive/Unexpedited',crlf

DB '&Mn',nequals0__,'Normal',_mode,80h+20
DB '&Zn=s ',Store_,'P',hone_Number,crlf

db 86h,nequals,'4',82h,'ARQ/Normal',_mode,80h+16
DB '&Zn?',82H,'Query P',hone_Number,crlf

db 86h,nequals,'5',82h,arq,_mode,crlf

db 0


end
```

```
$TITLE(High speed bit parsing module)
%SET(U101,0)
%SET(NEWBAK,1)
%SET(DIAG,1)
%SET(ASYNC,1)
%SET(COMPRESS,1)
%SET(FAX,1)
%SET(FALLBACK,1)
%SET(FREQ_3200,1)
;*********************************************************************
;
;
;           Name                HS
;
;           Purpose             Contains primitive 9600 receive intr functions
;
;*********************************************************************
;
;
;---- I/O Mappings
tr                  equ     P1
porta               equu    20h                     ; output addr = A000h
portb               equ     21h                     ; output addr = 8000h
atswitch    equ     22h                     ; input addr = 9000h
cdet                bit     p3.5                    ; carrier detect


;---- Serial Buffer Constants
tx_bufend   equ     1000h                   ; so end +1
tx_bufstart equ     800h                    ; so start
rx_bufend   equ     2000h                   ; si end +1
rx_bufstart equ     1000h                   ; si start


;---- Transmitter Commands
t_s_2100hz  equ     00101011b       ; tx 2100 hz
t_xmit96    equ     00010001b
t_stop              equ     00010000b
t_int_4800  equ     00010011b       ; change int rate to 4800
t_version   equ     00011011b       ; return version
t_retrain   equ     00011100b       ; xmit 400 hz
t_int_3200  equ     00011000b       ; change int rate to 7200


;---- Receiver Commands
r_reset             equ     01000000b       ; reset  receiver
r_back1             equ     01000001b       ; tx9600 w backch1
r_recv96    equ     01000010b       ; start receiving 9600
r_back3             equ     01000100b
r_stop_tap  equ     01010000b       ; stop updating taps
r_do_tap    equ     01010001b       ; resume updating taps
r_tone0             equ     01001000b       ; 9600
r_tone1             equ     01001001b       ; 2400
r_setorg    equ     01001010b       ; recv96
```

```
r_setans      equ     01001011b          ; xmit96
r_recv48      equ     01001100b          ; recv 4-phase data
r_recv72      equ     01001101b          ; recv 7200 data
r_set_boost   equu    01011010b          ; set long line boost
r_clr_boost   equ     01011011b          ; reset long line boost


;---- Compressed Frame Types
ff_lt1            equ    9          ; link char, compressed
ff_lt2            equ    10         ; lt 2 chars, compressed
ff_lt3            equ    11         ; lt 3 chars, compressed
ff_ltr            equ    12         ; repeat last lt, compressed
ff_ltdr           equ    13         ; 2*repeat last lt, compressed


;         E X T E R N A L   D E C L A R A T I O N S

          extrn     code(init_serial,init_mnp)
          extrn     code(set_mercury,set_courier)
          extrn     code(set_answer,set_originate)
          extrn     code(alb_off,arq_on)
          extrn     code(dsr_on,dtmf_on,dtmf_off)
          extrn     code(echo_on,echo_off)
          extrn     code(speaker_off,cdet_true)
          extrn     code(reset_micros)
          extrn     code(cpl_watchdog)

          extrn     code(tx_frame,data_scan,ack_scan,update_timers)
          extrn     code(can_ln_timer,scan_rts)
          extrn     code(respond)
          extrn     code(rst_reverse_timer)
          extrn     code(trans_int,wait5)
          extrn     code(break_nocarr,getfreq)
          extrn     code(mr_on,mr_off)
          extrn     code(putc_int,get_tx_char)
          extrn     code(test_pattern,get_x_spkr)

          extrn     data(vectorl,vectorh)
          extrn     data(sv_cmd,tr_data,rvalue)
          extrn     data(dtr_count,cd_count,plus_cnt,plus_time)
          extrn     data(dstate,descram,baud_size)
          extrn     data(ticks,time50,secs)
          extrn     data(timer_tics,timer5,timer50,esc_timer)

          extrn     bit(xmit_lr)           ; tx a link request
          extrn     bit(xmit_la)           ; tx a link ack
          extrn     bit(ln_busy)           ; 1 = sending a ln
;;        extrn     bit(xmit_nak)                 ; tx a nak
          extrn     bit(pure_mnp)                 ; 0 = streamlined protocol
          extrn     bit(send_frame)               ; 1 = sending frame
```

```
         extrn     bit(send_data)                              ; 1 = send data bytes
         extrn     bit(send_rpt)                               ; 1 = send condensed frame
         extrn     bit(brokenf)                      ; 1 = invalid CRC
         extrn     bit(clocktick)                              ; provide mnp timeing
         extrn     bit(disco_pending)                ; 1 = start disconnect
         extrn     bit(tx_busy)                      ; 1 = serial transmitter busy
         extrn     bit(orig)                         ; 1 = originate mode
         extrn     bit(cd_false)
         extrn     bit(recv_off)
         extrn     bit(ok_2send)
         extrn     bit(just_marks)
         extrn     bit(sync_async)                             ; 0 = sync,  1 = async

         extrn     bit(send_full_dup)
         extrn     bit(sv_flag,tr_flag)
         extrn     bit(at_rts,at_dtr,at_dumb,at_esc)
         extrn     bit(echo_pin,watchdg_pin)
         extrn     bit(ls_pin)                       ; 0 = 9600
         extrn     bit(cdet_pin)                               ; 0 = carrier true
         extrn     bit(alb_pin)                      ; 1 = analog loopback
         extrn     bit(flag5,flag50,clock_on,clock_mode)

         extrn     xdata(rxrec,tnybble_buf,theader_buf)
         extrn     xdata(baseptr)
         extrn     xdata(send_ln)                              ; = 4 if line reversal
         extrn     xdata(ln_send_seq)                ;** experimental
         extrn     xdata(sreg)
         extrn     xdata(seconds)
         extrn     xdata(amp_xb,amp_xm,amp_xn)
         extrn     xdata(reverse_timer)              ;** debug
         extrn     xdata(tx_version)                 ; transmitter version
         extrn     xdata(common_speeds)
         extrn     xdata(x_spkr)

         extrn     number(stack_start)


;        . P U B L I C   D E C L A R A T I O N S
         public    go_fast,fast_train
         public    to_transmitter,from_transmitter
         public    check_for_9600,gen_speed_vector
%IF(%FAX) THEN(
         public    monitor_disco,des1
         public    no_carrier
         public    r96_retrain,x96_retrain
         public    tr_s10,tx_s10,init_hs_int
         public    mon_count,test_count
         public    txfreq
         public    new_dataf
         public    retrain_signal,hlr,last_nybble
)FI
```

```
;           R E C E I V E   V A R I A B L E S

hs_data             segment     data
rseg                hs_data

last_nybble: ds     1
r_new_data: ds      1
speed_map:          ds          1


;-----------------------
                    extrn       data(r_crc_l,r_crc_h,inpl,inph,rxptr)
                    extrn       data(rcountl,rcounth)


;           T R A N S M I T T E R   V A R I A B L E S
t_load_ptr:         ds          1                       ; ptr to nybble buffer
t_store_ptr:        ds          1                       ; ptr to nybble buffer
t_nybble_cnt:                   ds          1                       ; #bytes in nybble buffer
t_get_ptr:          ds          1                       ; ptr to header byte buffer
txfreq:                         ds          1                       ; tx counter
timerfreq:          ds          1                       ; long term timers
testp:                          ds          1                       ; test ptr
test_count:         ds          1                       ; test count
mon_count:          ds          1                       ; counts 5ms

                    extrn       data(t_crc_l,t_crc_h)
                    extrn       data(t_hbyte_cnt,t_xbyte_cnt)

;           R E C E I V E   F L A G S
hs_flags    segment     bit
rseg                    hs_flags
hlr:                    dbit        1                               ; high/low nybble, receive
marking_state:          dbit        1
fz_busy:    dbit        1                                       ; signals overlapped intr
fz_pending: dbit        1                                       ; signals overrun occured
new_dataf:  dbit        1                                       ; 1 = new byte from recv
r_parse:    dbit        1                                       ;* 1 = parse recv bits
tx9600:                 dbit        1                               ; 1 = tx9600, 0 = rc9600
loss_of_carr:           dbit        1                               ; 1 = loss of carrier
cd_found:   dbit        1                                       ; 1 = cd found
retrain_signal:         dbit        1                               ; 1 = retrain ind
reverse_channel:
                        dbit        1                               ; 1 = switch 9600/300
parse_4800: dbit        1                                       ; 1 = doing 4800
parse_7200: dbit        1                                       ; 1 = doing 7200

                        public      tx9600,reverse_channel
                        public      loss_of_carr,cd_found


;           T R A N S M I T T E R   F L A G S
```

```
;send_frame:            dbit        1                      ; 1 = send a frame
;send_data: dbit        1                        ; 1 = send data byte
send_crcl:  dbit        1                        ; 1 = send low crc
send_crch:  dbit        1                        ; 1 = send high crc
send_flag:  dbit        1                        ; 1 = send flag
send_close: dbit        1                        ; 1 = send flag

;           R E C E I V E   R E G I S T E R S
                        using       2
r_bit1_cnt  set         r7                       ; counts input bits
r_bit2_cnt  set         r6                       ; counts filtered bits
r_input_byte            set         r5                     ; holds filtered bits
r_mcount    set         r4                       ; max #chars expected
r_one_cnt   set         r3                       ; count marks
r_next_byte set         r2                       ; holds overlapped byte
_r_bit2_cnt set         ar6
_r_next_byte            set         ar2

;           T R A N S M I T T E R   R E G I S T E R S
                        using       3
t_out_cnt   set         r7                       ; counts bits in t_out_nybble
t_out_nybble            set         r6                     ; holds formatted bits
t_one_cnt   set         r4                       ; counts 1 bits
tptr_h                  set         r3                     ; high xmit data ptr
tptr_l                  set         r2                     ; low xmit data ptr
_t_out_cnt  set         ar7
_t_one_cnt  set         ar4
_tptr_h                 set         ar3
_tptr_l                 set         ar2
            public      _tptr_l,_tptr_h

;           E X T E R N A L   R E C E I V E   D A T A   V A R S

hs_xdata    segment     xdata
                        rseg        hs_xdata
retrain_kludge_count:   ds          1
rmode:                              ds          1
last_cd_count:                      ds          1
speed_mask:                         ds          1

cnt_lo                  set         r6                     ; baud counter

global_flags segment    bit
rseg                    global_flags
enable_cnt: dbit        1                        ; 1 = do baud count

%IF(%DIAG) THEN(
            extrn       code(clear_ld_strings)
            extrn       code(inc_ld_string)
;           extrn       code(add_ld_string)

;           extrn       xdata(ld_chars_sent)
```

```
;           extrn       xdata(ld_chars_recv)
            extrn       xdata(ld_retrains)
            extrn       xdata(ld_reversals)
            public      last_cd_count
)FI


;           M A C R O S
%*DEFINE(LDA(loc))(
            mov         dptr,#%loc
            movx        a,@dptr)
%*DEFINE(STA(loc))(
            mov         dptr,#%loc
            movx        @dptr,a)
%*DEFINE(LD_DPTR(loc))(
            mov         r0,#low %loc
            movx        a,@r0
            inc         r0
            mov         dpl,a
            movx        a,@r0
            mov         dph,a)
%*DEFINE(SAVE_DPTR(loc))(
            mov         r0,#low %loc
            mov         a,dpl
            movx        @r0,a
            inc         r0
            mov         a,dph
            movx        @r0,a)
%*DEFINE(INC_TPTR)(
            inc         dptr
            xch         a,dph
            cjne        a,#high tx_bufend,$+5
            mov         a,#high tx_bufstart
            xch         a,dph)
%*DEFINE(INC_RPTR)(
            inc         dptr
            xch         a,dph
            cjne        a,#high rx_bufend,$+5
            mov         a,#high rx_bufstart
            xch         a,dph)
%*DEFINE(DEC_DPTR)(
            inc         dpl
            djnz        dpl,$+5
            dec         dph
            dec         dpl)
%*DEFINE(STX(ADDR,VAL))(
            mov         r0,#low %addr
            mov         a,%val
            movx        @r0,a)
%*define(sel_rb(n))(
            using       %n
            mov         psw,#(%n shl 3))
```

```
%*define(wait5(n))(
            mov         a,#%n
            call        wait5)



hs_code                 segment     code
rseg                    hs_code

$EJECT
;*****************************************
;
;
; NAME                  HS_TRAIN_INT
; PURPOSE  transfer data with transmitter
; FREQUENCY             on tx int   ( 2400 hz)
; SOURCE   EXT0
;*****************************************
;
;
hs_train_int:
            push        psw
            push        acc
            push        dpl
            push        dph
            jnb         enable_cnt,hti_next
            djnz        cnt_lo,hti_next
            clr         enable_cnt
hti_next:
;           mov         tr,#0ffh                          ; read port
;           nop                                                     ; cmos delay
            jb          tr.6,hti_next1                              ;** experimental
            mov         tr_data,tr                        ; save recv data
            setb        tr_flag                                     ; flag new data
hti_next1:

            clr         f0
;;          jbc         sv_flag,hti_1
            mov         tr,rvalue
            jb          tx9600,hti_1
            jnb         retrain_signal,hti_1

            djnz        txfreq,hti_1

            mov         txfreq,#32                        ; 3200/100
            jb          parse_7200,$+6
            mov         txfreq,#48                        ; 3200/100

            mov         tr,#10001111b                               ; send marks
            sjmp        hti_cd

hti_1:      jnb         sv_flag,hti_cd
            clr         sv_flag
            mov         tr,sv_cmd
```

```
        mov     sv_cmd,#0ffh
        setb    f0
hti_cd:
        cpl     watchdg_pin                     ; reset watchdg
        mov     dptr,#8000h
        mov     a,portb
        movx    @dptr,a

        jnb     cdet,$+5
        inc     cd_count                        ; # of false counts
        djnz    test_count,hti_exit
        mov     test_count,#24                          ; 5 ms tick
        clr     cd_found                        ; reset flags
        clr     loss_of_carr

        mov     a,cd_count
;;      add     a,#-(1*24/5)                            ; 20 percent
        add     a,#-19
        jnc     $+4
        setb    loss_of_carr

;;      mov     a,cd_count
;;      add     a,#-(6)                                 ; 80 percent, was -5
        mov     a,#240                                  ;** magic number
        add     a,cd_count
        jc      $+4
        setb    cd_found

        mov     testp,cd_count                          ;** experimental
        mov     cd_count,#0
        setb    clocktick                       ; cnt 5 ms, 10ms when tx9600
        call    monitor_disco

        jb      tx9600,hti_exit
        jnb     retrain_signal,hti_exit

        djnz    r7,hti_exit
        jb      f0,hti_wait
        mov     dptr,#rmode
        movx    a,@dptr
        jz      hti_exit
        mov     a,#00
        movx    @dptr,a
        mov     tr,#1dh                                 ; switch back to data mode
        sjmp    hti_exit
hti_wait:
        inc     r7

hti_exit:
        pop     dph
        pop     dpl
        pop     acc
```

```
            pop         psw
            reti


init_hs_int:
            clr         ea
            mov         vectorl,#low hs_train_int
            mov         vectorh,#high hs_train_int
            setb        ea
            ret


to_trans:
            push        acc                             ;** experimental
            mov         a,#0ffh
            call        to_transmitter
            pop         acc

to_transmitter:
            push        b
            mov         b,#00
tt_loop:
            jnb         sv_flag,tt_continue
            djnz        b,tt_loop
            pop         b
            pop         acc                             ;** check this
            pop         acc
            jmp         no_carrier

tt_continue:
            mov         sv_cmd,a
            setb        sv_flag
            clr         tr_flag                                   ;** exp
            pop         b
            ret


from_transmitter:
            jbc         tr_flag,from_t_data
            djnz        acc,from_transmitter
            call        cpl_watchdog
            sjmp        from_transmitter

from_t_data:
;           clr         tr_flag
            mov         a,tr_data
            anl         a,#0f0h                                   ;** filter out ring stuff
            jz          from_transmitter
            mov         a,tr_data
from_t_ret:
            ret
```

```
;-----------------------------------------------
check_for_9600:
            jb      alb_pin,not_9600
            mov     dptr,#amp_xn                    ; &n must be either
            movx    a,@dptr
            jz      check_xm                  ;  0, continue checking
;;          cjne    a,#6,not_9600                   ;   6, go 9600
            cjne    a,#4,$+3
            jc      not_9600

go_9600:
            setb    c                               ; cy = 1 --> go for 9600
            setb    f0
            ret
check_xm:
            mov     dptr,#amp_xm
            movx    a,@dptr
            jz      not_9600                        ; must have Arq enabled
            jnb     orig,go_9600                            ; go up if answer mode
            mov     a,th1                                   ; baud rate must be
            add     a,#7                                    ; 9600 or 19200
            jc      go_9600
not_9600:
            mov     dptr,#sreg+13
            movx    a,@dptr
            mov     c,acc.5
            anl     c,/acc.6
            mov     f0,c
            clr     c                                       ; cy = 0 --> skip 9600
            ret


gen_speed_vector:
            mov     a,#00011111b                            ; all speeds if answering
            jnb     orig,check_xn                           ; go up if answer mode
            mov     a,#00000011b                            ; default to 12/24

            mov     r0,th1                                  ; check current baud rate
            cjne    r0,#-3h,$+5                     ; 19200
            mov     a,#00011111b
            cjne    r0,#-6h,$+5                     ; 9600
            mov     a,#00011111b
            cjne    r0,#-8h,$+5                     ; 7200
            mov     a,#00001111b
            cjne    r0,#-0Ch,$+5                            ; 4800
            mov     a,#00000111b
            cjne    r0,#-18h,$+5                            ; 2400
            mov     a,#00000011b

check_xn:
            mov     r0,a
            mov     dptr,#amp_xn
```

```
        movx    a,@dptr
        xch     a,r0                    ; r0 = xn,  acc = vector
        cjne    r0,#01,$+4
        clr     a                       ; serious error
        cjne    r0,#02,$+5
        anl     a,#00000001b
        cjne    r0,#03,$+5
        anl     a,#00000010b
        cjne    r0,#04,$+5
        anl     a,#00000100b
        cjne    r0,#05,$+5
        anl     a,#00001000b
        cjne    r0,#06,$+5
        anl     a,#00010000b


check_alb:
        jnb     alb_pin,check_version
        anl     a,#00000011b            ; No hs when alb
        ret

check_version:
        mov     r0,a
        mov     dptr,#tx_version
        movx    a,@dptr
        jnz     new_version
        mov     a,r0
        anl     a,#00010011b            ; clear unsupported speeds
        ret

new_version:
        mov     a,r0
        ret


determine_speed:
        mov     dptr,#amp_xm
        jz      ds_noarq

        mov     dptr,#common_speeds
        movx    a,@dptr
        jb      acc.4,ds_set96
        jb      acc.3,ds_set72
        jb      acc.2,ds_set48

        setb    disco_pending           ; should never reach here
        mov     dptr,#sreg+20
        mov     a,#05                   ; mnp incompatibility
        movx    @dptr,a
        ret

ds_noarq:
```

```
            mov         dptr,#amp_xn
            movx        a,@dptr
            cjne        a,#04,ds_n5
ds_set48:
            mov         baud_size,#02
            setb        parse_4800
            clr         parse_7200
            ret
ds_n5:
            cjne        a,#05,ds_n0
ds_set72:
            mov         baud_size,#03
            setb        parse_7200
            clr         parse_4800
            ret
ds_n0:
ds_set96:
            mov         baud_size,#04
            clr         parse_7200
            clr         parse_4800
            ret

;----------------------------------------------


$EJECT
;******************************************
;
;
; Name                    Monitor_disco
; Purpose     checks various disconnect reasons
; Frequency   called every 5 ms
;******************************************
;
;
; format of ms nybble of status latch
;-------------------
;7  | 6  | 5  | 4  |
;   |    |    |    |
;rts |dtr |esc |dumb|
;-------------------
;
;
; 1 = rts false
; 1 = dtr false
;

monitor_disco:
            djnz        ticks,mon_latch
            mov         ticks,#200              ; count 1 sec
            mov         a,secs                          ;S30 timeout
            jz          md_clock
            djnz        secs,md_clock
            setb        disco_pending                   ; disco on various timeouts
            mov         dptr,#sreg+20                   ; disco reason is...
```

```
        mov     a,#3                    ; no carrier
        movx    @dptr,a
md_clock:
        jnb     clock_on,mon_latch
        mov     dptr,#seconds           ; update real time clock
        movx    a,@dptr                 ; seconds
        inc     a
        cjne    a,#60,clock_done
        clr     a
        movx    @dptr,a
        inc     dptr
        movx    a,@dptr                 ; minutes
        inc     a
        cjne    a,#60,clock_done
        clr     a
        movx    @dptr,a
        inc     dptr
        movx    a,@dptr                 ; hours
        inc     a
        cjne    a,#24,clock_done
        clr     a
clock_done:
        movx    @dptr,a                 ; store updated value

mon_latch:
        cpl     watchdg_pin             ; reset watchdg
        mov     dptr,#8000h
        mov     a,portb
        movx    @dptr,a

        mov     dptr,#9000h             ; read rts, dtr
        movx    a,@dptr
;       rlc     a                       ; cy = rts
        jnb     at_rts,md_dtr           ; if 1-0 rts transition
;       jc      md_dtr
        jb      acc.7,md_dtr            ; acc.7 = rts
        clr     at_rts

        clr     ea
        jb      tx_busy,$+5
        setb    ti                      ; restart serial int
        setb    ea
md_dtr:
;       rlc     a
;       jc      $+5
        jb      acc.6,$+6       ; acc.6 = dtr
        mov     dtr_count,#9            ; 45 ms at 200 hz
        djnz    dtr_count,md_carrier
        inc     dtr_count
        setb    disco_pending
        clr     at_dtr                  ; needed?
        mov     dptr,#sreg+20
```

```
        mov     a,#1
        movx    @dptr,a
;       sjmp    md_esc
md_carrier:
;       rlc     a                       ; update esc, dumb
;       mov     at_esc,c                ; switches?
;       rlc     a
;       mov     at_dumb,c
md_esc:
        djnz    timer5,$+5              ; misc 5 sec counter
        setb    flag5

        mov     a,esc_timer
        add     a,#-12
        mov     esc_timer,a
        jnz     md_ret
        mov     esc_timer,#48           ; for ls compatibility
        djnz    timer50,md_ret          ; holds S12 value
        mov     timer50,plus_time       ; reload S12
        clr     a
        xch     a,plus_cnt              ; check int levels
        setb    flag50                  ; note-- order is important
        cjne    a,#03,md_ret            ; S12 timeout and +++
; +++ received
        mov     dptr,#sreg+20           ; no online command mode
        mov     a,#2                    ;** check this
        movx    @dptr,a
        setb    disco_pending
md_ret:
        jnb     cdet_pin,md_exit        ; abort if
        jnb     ri,md_exit              ;   keypress and
        setb    disco_pending           ;   not connected yet
md_exit:
        ret

$EJECT
;**************************************************
;
; this interrupt routine does all of the low level
; bit manipulation.
;
; there are 2 entry pts
;
; in receive 9600 / transmit 300 mode
; the interrupt rate is 4800 Hz
; with a received nybble at 2400 HZ
; and transmitting at 150 Hz
;
; in receive 300/ transmit 9600 mode
; the interrupt rate is 2400 Hz
; with a received dibit at 300 Hz
```

```
; and transmitting at 2400 Hz
;
; update clocktick timer
; data is exchanged with the transmitter
; the transmitter buffers are reloaded if necessary,
; and then receive buffers are updated
;
; note-- an entire frame is received and validated
; with no intervention
;
; the transmit frame process requires some control
;
;** CHECK REENTRANCY

hst_int:
        push    psw
        push    acc
        push    dpl
        push    dph

; transmit 9600 mode
; xfer data with transmitter,  freq = 2400 hz
;       mov     tr,#0ffh                ; read port
;       nop                                     ; cmos delay
        jb      tr.6,hst_continue
        setb    new_dataf               ; indicate new byte
        mov     r_new_data,tr                   ; save the byte
;***********************************************

        mov     dptr,#retrain_kludge_count
        clr     a
        jnb     tr.4,hst_reset
        jb      tr.5,hst_reset
        movx    a,@dptr
        inc     a
        cjne    a,#3,hst_reset
        setb    retrain_signal
hst_reset:
        movx    @dptr,a
;***********************************************

hst_continue:
        mov     tr,sv_cmd
        mov     sv_cmd,#0ffh

        djnz    mon_count,hst_nomon
        mov     mon_count,#12                   ; 5 ms
        call    monitor_disco
        djnz    timerfreq,hst_nomon
        mov     timerfreq,#10
        setb    clocktick
```

```
hst_nomon:
            jnb         cdet,$+5
            inc         cd_count                        ; # of cd false counts
            djnz        test_count,hst_xmit
            mov         test_count,#60                                  ; 25 ms tick
            mov         a,cd_count                      ; look for loss of carr
            add         a,#-(48)                        ; if cd is >80 percent false
            jnc         $+4                                             ;    then loss of energy
            setb        loss_of_carr

            mov         a,cd_count                      ; look for return of carr
            add         a,#-(12)                        ; if cd is >80 percent true
            jc          $+4                                             ;    then return of energy
            setb        cd_found

;----------------------------------------------
;           push        dpl
;           push        dph
;           mov         dptr,#last_cd_count
;           clr         a
;           xch         a,cd_count
;           rl          a
;           movx        @dptr,a
;           pop         dph
;           pop         dpl
;----------------------------------------------
            mov         cd_count,#0                                     ; reset counter


hst_xmit:
            %sel_rb(3)
            mov         r0,t_load_ptr
            movx        a,@r0                                           ; get nybble..
            orl         a,#80h                                          ;** check this
;;;         anl         A,#10001111b                                    ;** not needed?

            mov         sv_cmd,a                        ; send to transmitter
            inc         t_load_ptr
            anl         t_load_ptr,#11110111b
            djnz        t_nybble_cnt,hst_recv           ; necessary to reload?
            call        t_load
            jmp         hst_exit                        ;** experimental
hst_recv:
            jbc         new_dataf,hst_decode
            sjmp        hst_exit

t_hang:
            clr         ea
            sjmp        $

hst_decode:
            %sel_rb(2)
```

```
        mov     a,r_new_data
        xch     a,dstate                    ; differential decode
        cpl     a
        inc     a
        add     a,dstate

        anl     a,#07h                              ; for new back channel
        add     a,#gray_tab -($+3)
        movc    a,@a+pc
        swap    a
        mov     r_new_data,a
        mov     c,acc.6
        call    des1
        mov     a,r_new_data
        mov     acc.0,c
        mov     c,acc.5
        mov     r_new_data,a
        call    des1
        mov     a,r_new_data
        mov     acc.1,c
        mov     c,acc.4
        mov     r_new_data,a
        call    des1
        mov     a,r_new_data
        mov     acc.2,c
        jnb     r_parse,hst_exit
        anl     a,#07h                              ; needed?
        mov     r_bit1_cnt,#3                       ; # databits
        call    iret                                ;** experimental
%IF(%ASYNC) THEN(
        jnb     sync_async,$+6                      ;**
        ljmp    ap_loop
)FI     ljmp    fz_loop
gray_tab:
        db      1
        db      0
        db      2
        db      3
        db      7
        db      6
        db      4
        db      5


; for older back channel,
; code kept for reference
;       jb      acc.3,$+5                   ; gray decode
;       xrl     a,#04h                              ; faster than cpl
;       mov     r_new_data,a
;       mov     c,acc.3
;       call    des1
;       mov     a,r_new_data
```

```
;		mov	acc.0,c
;		mov	c,acc.2
;		mov	r_new_data,a
;		call	des1
;		mov	a,r_new_data
;		mov	acc.1,c
;		jnb	r_parse,hst_exit
;		anl	a,#03h				;** debug
;		mov	r_bit1_cnt,#2			; # databits
;		call	iret				;** experimental
;		jmp	fz_loop

hst_exit:
		pop	dph
		pop	dpl
		pop	acc
		pop	psw
		reti

$EJECT

%IF(%FALLBACK) THEN(

r72_hang:
		nop
		clr	ea
		sjmp	$


; receive 7200 mode
r72_int:
		push	psw				; allow cmos delay
		push	acc				; while saving regs.

		jnb	tr.6,r72_data			; data?
		jmp	hsr_continue
r72_data:
		mov	a,tr				; yes... read it
		jnb	tr.4,r72_proc			; retrain?
		setb	retrain_signal
r72_proc:
		mov	tr,sv_cmd		; send any new data

; differential decode...
		xch	a,dstate		; diff decode nybble
		cpl	a				; 4's complement
		inc	a
		add	a,dstate		; (new - last) mod 4
		anl	a,#03h				; only 2 lsbs decoded

		mov	sv_cmd,a
		mov	a,dstate
```

```
        anl     a,#04h
        orl     a,sv_cmd                        ; regenerate nybble
        CLR     F0

; parse...
        rrc     a
        xch     a,last_nybble
        rrc     a
        jnc     r72_1
        mov     _r_next_byte,a
        setb    F0
        mov     a,#80h
r72_1:
        xch     a,last_nybble
        rrc     a
        xch     a,last_nybble
        rrc     a
        jnc     r72_2
        mov     _r_next_byte,a
        setb    F0
        mov     a,#80h
r72_2:
        xch     a,last_nybble
        rrc     a
        xch     a,last_nybble
        rrc     a
        jnc     r72_done
        mov     _r_next_byte,a
        setb    F0
        mov     a,#80h
r72_done:
        xch     a,last_nybble
        jnb     F0,hsr_mon_jmp


        mov     a,_r_next_byte
; now acc = a scrambled byte...
;-----------------------------------------------
        xch     a,descram
        xch     a,descram+1
        mov     c,acc.0
        xch     a,descram+2

        mov     sv_cmd,a
        rrc     a
        xrl     a,descram
        mov     _r_next_byte,a                  ; temp
        mov     a,sv_cmd
        rlc     a
        mov     a,descram+2
        rlc     a
        xch     a,sv_cmd
```

```
        mov     c,acc.6
        xch     a,sv_cmd
        rlc     a
        xrl     a,_r_next_byte
        mov     _r_next_byte,a
;       jnb     r_parse,hsr_mon_jmp
;----------------------------------------------
;       push    dpl
;       push    dph
;       mov     dpl,inpl
;       mov     dph,inph
;       movx    @dptr,a                         ; reload the char
;       inc     inpl                            ; inc ptr
;       inc     dptr
;       xch     a,dph
;       cjne    a,#high tx_bufend,$+5     ; check for wrap
;       mov     a,#high tx_bufstart
;       mov     inph,a
;       pop     dph
;       pop     dpl


;;      jb      new_dataf,r72_hang
;;      jb      fz_busy,r72_hang

        jnb     fz_busy,r72_set                 ; reentrancy check
        setb    fz_pending
        mov     sv_cmd,#0ffh
        jmp     hsr_mon

r72_set:
        setb    new_dataf

hsr_mon_jmp:
        mov     sv_cmd,#0ffh
        jmp     hsr_mon


; receive 4800 mode
r48_int:
        push    psw                             ; allow cmos delay
        push    acc                             ; while saving regs.

        jnb     tr.6,r48_data                   ; data?
        jmp     hsr_continue
r48_data:
        mov     a,tr                            ; yes... read it
        jnb     tr.4,r48_proc                   ; retrain?
        setb    retrain_signal
r48_proc:
        mov     tr,sv_cmd                 ; send any new data
```

```
            call     diff_decode
            rrc      a
            mov      sv_cmd,a                        ; temp store
            call     vdes1
            mov      a,last_nybble
            rrc      a
            mov      last_nybble,a
            mov      a,#0ffh
            xch      a,sv_cmd
            rrc      a
            call     vdes1

            mov      a,last_nybble
            rrc      a
            mov      last_nybble,a
            jnc      hsr_mon
            mov      last_nybble,#80h                ; signal a byte
; now acc = a descrambled byte...
;;          jb       fz_busy,r48_hang                ; reentrancy check
            mov      _r_next_byte,a
            jnb      r_parse,hsr_mon
            setb     new_dataf
            sjmp     hsr_mon
)FI

hsr_int:
;           mov      tr,#0ffh                        ; read port
            push     psw                                     ; allow cmos delay
            push     acc                                     ; while saving regs.

; receive 9600 mode
; xfer data with transmitter   freq = 4800hz
            jb       tr.6,hsr_continue               ; data?
            mov      a,tr                                    ; yes... read it
            jnb      tr.4,hsr_proc                           ; retrain?
            setb     retrain_signal
hsr_proc:
            mov      tr,sv_cmd                       ; send any new data

            xch      a,dstate                        ; diff decode nybble
            cpl      a                                       ; 4's complement
            inc      a
            add      a,dstate                        ; (new - last) mod 4
            anl      a,#03h                                  ; only 2 lsbs decoded

            mov      sv_cmd,a
            mov      a,dstate
            anl      a,#0ch
            orl      a,sv_cmd                        ; regenerate nybble
            mov      sv_cmd,#0ffh

            jbc      hlr,hsr_descram
```

```
        mov     last_nybble,a
        setb    hlr
        sjmp    hsr_mon

hsr_descram:
        swap    a
        orl     a,last_nybble
        xch     a,descram
        xch     a,descram+1
        mov     c,acc.0
        xch     a,descram+2

        mov     last_nybble,a
        rrc     a
        xrl     a,descram
        mov     _r_next_byte,a                  ; temp
        mov     a,last_nybble
        rlc     a
        mov     a,descram+2
        rlc     a
        xch     a,last_nybble
        mov     c,acc.6
        xch     a,last_nybble
        rlc     a
        xrl     a,_r_next_byte
        mov     _r_next_byte,a
        jnb     r_parse,hsr_mon
        jnb     fz_busy,hsr_set                 ; reentrancy check
        setb    fz_pending
        sjmp    hsr_mon
hsr_set:
        setb    new_dataf
        sjmp    hsr_mon

hsr_continue:
        mov     a,#0ffh                         ; save 1 cycle
        xch     a,sv_cmd
        mov     tr,a
hsr_mon:
        djnz    mon_count,hsr_nomon
;***************
;       inc     mon_count               ; skip if not
;       jb      fz_busy,hsr_back        ; enough time
;***************
        mov     a,#24                           ; 5 ms
        jnb     parse_7200,$+5
        mov     a,#16                           ; 5 ms
        mov     mon_count,a

        push    dpl
        push    dph
        call    monitor_disco
```

```
            pop     dph
            pop     dpl
            djnz    timerfreq,hsr_nomon
            mov     timerfreq,#10
            setb    clocktick
hsr_nomon:
            jnb     cdet,$+5
            inc     cd_count                        ; # of false counts
            djnz    test_count,hsr_back
            mov     test_count,#120                          ; 25 ms tick

            mov     a,cd_count
            add     a,#-(24)                        ; if cd > 80 percent true
            jc      $+6
            setb    cd_found
            sjmp    hsr_ncount


            mov     a,#-118
            add     a,cd_count

;           mov     a,cd_count
;           add     a,#-108 ; was(96)               ; if cd > 80 percent false

            jnc     $+4
            setb    loss_of_carr

hsr_ncount:
;-----------------------------------------------
;           push    dpl
;           push    dph
;           mov     dptr,#last_cd_count
;           clr     a
;           xch     a,cd_count
;           movx    @dptr,a
;           pop     dph
;           pop     dpl
;-----------------------------------------------
            mov     cd_count,#0
hsr_back:
            djnz    txfreq,decode_data
            mov     a,#48
            jnb     parse_7200,$+5
            mov     a,#32
            mov     txfreq,a

; reload transmitter buffer for next intr
            %sel_rb(3)
            djnz    t_nybble_cnt,hsr_write          ; necessary to reload?
;x          push    dpl
;x          push    dph
            call    iret
```

```
            setb        ea
            call        t_load
;x          pop         dph
;x          pop         dpl
hsr_write:
            mov         r0,t_load_ptr
            movx        a,@r0                                  ; get nybble..
            orl         a,#80h                                 ;** check this
            anl         A,#10001111b                           ;** not needed?
            mov         sv_cmd,a                       ; send to transmitter
            inc         t_load_ptr
            anl         t_load_ptr,#11110111b

;------------------------------------------------------
; start decoding recv 9600 data
; a subr?
            using       2

decode_data:
; experimental  ( even faster!)
; descrambles data a byte at a time
; entry:  a.3 - a.0 = received nybble
; uses r0 as temp
            jb          new_dataf,dd_continue
;?          sjmp        hsr_exit
            pop         acc
            pop         psw
iret:       reti

dd_continue:
            clr         ea
            clr         new_dataf
            mov         a,_r_next_byte
            %sel_rb(2)

$EJECT
;-----------------------------------------------
;
; Note-- this code jumps around because of relative jumps
;
; a whole byte has been decoded, so it is necessary
; too filter inserted zeros
; a sequence of [0111110] is converted to [011111]
; a sequence of [0111111] is a flag byte, which indicates
;  end of frame
; a sequence of [1111110] is an open flag byte, which indicates
;  start of frame
;
; if not in frame
;           if 1  then skip it
;           else Start of frame
; else      if last 5 bits were 1s
```

```
;                       if 0 then skip it
;                       else End of Frame
; else  collect bit
;               if 8 bits
;                       store byte
;                       CRC byte
;                       inc store ptr
;
;               F I L T E R   Z E R O S

fz_pre:
                push    dpl
                push    dph
                setb    fz_busy                         ; stop overruns
                call    iret                            ; reset intr controll level
filter_zeros:
; removing extra 0's after 5 ones
; dont use r0
                setb    ea                              ; change to specific mask
                mov     r_bit1_cnt,#8                   ; bits in a byte
%IF(%ASYNC) THEN(
                jnb     sync_async,fz_loop
                jmp     ap_loop
)FI

;               L O O P
fz_loop:
                rrc     a
                jnb     marking_state,fz_inblock
                jc      fz_next                         ; skip filler marks
                clr     marking_state                   ; signal block start
                mov     r_bit2_cnt,#8
                mov     r_one_cnt,#6
                mov     r_crc_l,#0ffh                   ; reset crc
                mov     r_crc_h,#0ffh
                mov     rcountl,#0
                mov     rcounth,#0
                mov     r_mcount,#0ffh                  ;** experimental
                sjmp    fz_next

;               C O U N T   O N E S
fz_inblock:
                djnz    r_one_cnt,fz_normal     ; check for 5 ones
                mov     r_one_cnt,#6                    ; yes...
                jnc     fz_next                         ; delete 0
                setb    marking_state                   ; signal block end

                inc     rcountl                         ; check for non-zero length
                djnz    rcountl,check_crc
                mov     r_one_cnt,#1                    ;** debug
                sjmp    fz_next
```

```
;            VERIFY CRC
check_crc:
;;           clr          ea                                    ;** needed??
             mov          r1,a                                  ; save it
             mov          a,r_crc_l                ; verify crc = mirror image
             cjne         a,#0f0h,bad_block        ;   of 1d0f
             mov          a,r_crc_h
             cjne         a,#0b8h,bad_block
             sjmp         good_block

;            DISCARD BROKEN BLOCK
bad_block:
; a non-zero crc --> bad frame received
;--------------------------------------
;            mov          r0,#low reverse_timer
;            movx         a,@r0
;            jnz          bb_continue
;            clr          ea
;            sjmp         $
;bb_continue:
;--------------------------------------
             setb         brokenf                               ; indicate invalid frame
             mov          r0,#low baseptr                       ; reset input ptr
             movx         a,@r0
             inc          r0
             mov          inpl,a
             movx         a,@r0
             mov          inph,a
             mov          a,r1
             setb         ea
             sjmp         fz_next

;            SAVE BIT
fz_normal:
             jc           fz_store
             mov          r_one_cnt,#6
fz_store:
             xch          a,r_input_byte
             rrc          a
             djnz         r_bit2_cnt,fz_continue
             mov          r_bit2_cnt,#8
             jmp          save_rdata                  ; save stack space
fz_continue:
             xch          a,r_input_byte
fz_next:
             djnz         r_bit1_cnt,fz_loop
             clr          ea
             mov          a,r_next_byte
             jnb          fz_pending,fz_exit
             clr          fz_pending
             jmp          filter_zeros
fz_exit:
```

```
        clr     fz_busy
        pop     dph
        pop     dpl
        pop     acc
        pop     psw
        setb    ea
        reti


;       RECORD VALID BLOCK
good_block:
        mov     a,rxptr
        inc     rxptr
        anl     a,#0fh
        rl      a
        rl      a
        add     a,#low rxrec
        mov     r0,a

        push    ar1
        mov     r1,#low baseptr
        movx    a,@r1
        inc     r1
        movx    @r0,a
        inc     r0
        movx    a,@r1
        movx    @r0,a
        inc     r0
        mov     a,rcountl
        movx    @r0,a
        inc     r0
        mov     a,rcounth
        movx    @r0,a                           ; for full compatibility

        mov     a,inph                          ; save new start ptr
        movx    @r1,a
        dec     r1
        mov     a,inpl
        movx    @r1,a

        pop     acc                             ; note-- Acc := r1
        setb    ea                              ;** experimental
        sjmp    fz_next                         ; check for null block


;       SAVE RECEIVED BYTE
save_rdata:
; entry: a = byte
; note-- non-data bytes have been filtered before reaching here
; if first byte, then do special parse check

;       STORE BYTE IN EXTERNAL RAM
```

```
        mov     dpl,inpl                    ; load input store ptr
        mov     dph,inph
        movx    @dptr,a                     ; save the char

;       C R C   R E C E I V E D   B Y T E
        xrl     a,r_crc_h
        xch     a,r_crc_l
        mov     r_crc_h,a
        mov     a,r_crc_l
        swap    a
        anl     a,#0f0h
        xrl     a,r_crc_l

        mov     r_crc_l,a
        swap    a
        anl     a,#0fh
        xrl     r_crc_h,a

        rr      a
        anl     a,#07h
        xch     a,r_crc_l
        xrl     r_crc_l,a

        swap    a
        rr      a
        anl     a,#0f8h
        xrl     r_crc_h,a


;       I N C R E M E N T   S T O R E   P O I N T E R
        movx    a,@dptr                     ; reload the char
        inc     inpl                        ; inc ptr
        inc     dptr
        xch     a,dph
        cjne    a,#high tx_bufend,$+5       ; check for wrap
        mov     a,#high tx_bufstart
        mov     inph,a
        inc     rcountl                     ; count the byte
%IF(%COMPRESS) THEN(
        djnz    r_mcount,isp_continue
;--- max count here, check the crc
        clr     ea
        mov     r_one_cnt,#6                ;** needed?
        mov     a,r_input_byte
        setb    marking_state
        mov     r1,a
        jmp     check_crc

isp_continue:
        mov     a,rcountl                   ; check for >255
        cjne    a,#01,isp_next
        JNB     TX9600,ISP_NEXT
```

```
                mov     a,dph
                anl     a,#0fh
                cjne    a,#ff_lt1,isp_2
                sjmp    isp_setup
isp_2:
                cjne    a,#ff_lt2,isp_3
                sjmp    isp_setup
isp_3:
                cjne    a,#ff_lt3,isp_r
                sjmp    isp_setup
isp_r:
                cjne    a,#ff_ltr,isp_dr
                sjmp    isp_stuff
isp_dr:
                cjne    a,#ff_ltdr,tjmp
isp_stuff:
; now shift a 0ffh through the crc poly
                mov     a,#0ffh
                mov     r_mcount,#2 +1                  ; count in 2 crc bytes
                jmp     save_rdata              ;** kludgey

isp_setup:
                add     a,#(-ff_lt1) +3                 ; expected frame length here
                mov     r_mcount,a
isp_next:
)ELSE(
                mov     a,rcountl
)FI
                jnz     tjmp
                inc     rcounth
tjmp:
                jmp     fz_continue

;***************************
; async non-arq parse
a_parse:
                mov     r_bit1_cnt,#8
ap_loop:
                rrc     a                       ; grab bit
                jnb     marking_state,ap_inbyte
                jc      ap_next1
                clr     marking_state
                mov     r_bit2_cnt,#8
                sjmp    ap_next1
ap_inbyte:
                xch     a,r_input_byte
                rrc     a
                djnz    r_bit2_cnt,ap_next
                setb    marking_state
                clr     ea
                call    putc_int
                setb    ea
```

```
ap_next:
        xch     a,r_input_byte
ap_next1:
        djnz    r_bit1_cnt,ap_loop

        clr     ea
        mov     a,r_next_byte
        jbc     fz_pending,a_parse
        jmp     fz_exit

;****************************



$EJECT
;-------------------------------------------------------
;       R E L O A D   T R A N S M I T T E R   B U F F E R
        using   3
t_load:
%IF(%ASYNC) THEN(
        jnb     sync_async,$+6
        ljmp    a_load
)FI
        jb      send_frame,$+6                          ; sending frame?
        ljmp    tl_flag
        mov     a,t_hbyte_cnt                           ; send header byte?
        jz      tl_data
        mov     r0,t_get_ptr
        movx    a,@r0
        inc     t_get_ptr
        djnz    t_hbyte_cnt,tl_0
        setb    send_crch
        mov     t_get_ptr,#low theader_buf
tl_0:
        jmp     t_crc_data

tl_data:
        jnb     send_data,tl_crch               ; get external byte?
        djnz    t_xbyte_cnt,tl_1                ; any more?
        clr     send_data                       ; no
tl_1:
        PUSH    DPL
        PUSH    DPH
        mov     dph,tptr_h                      ; load byte from
        mov     dpl,tptr_l                      ; serial in buffer
        movx    a,@dptr
        POP     DPH
        POP     DPL
        inc     tptr_l
        cjne    tptr_l,#00,tl_2
        inc     tptr_h
        cjne    tptr_h,#high rx_bufend,tl_2
```

```
          mov       tptr_h,#high rx_bufstart
tl_2:
          jmp       t_crc_data


tl_crch:
          jnb       send_crch,tl_crcl            ; high crc?
          clr       send_crch
          setb      send_crcl
          mov       a,t_crc_h                    ; xmit high byte first
          cpl       a                                      ; 1's complement
          jmp       t_data

tl_crcl:
          jnb       send_crcl,tl_close           ; low crc?
          clr       send_crcl
          setb      send_flag
;;        setb      send_close                   ;** experimental
          mov       a,t_crc_l
          cpl       a                                      ; 1's complement
          jmp       t_data

tl_close:
          jnb       send_close,tl_flag
          clr       send_close
          mov       a,#07eh
          jmp       t_flag

tl_flag:
          mov       a,#07eh                                ; usual flag
          jb        send_flag,$+5
          mov       a,#0ffh                                ; alt flag
          mov       t_crc_l,#0ffh
          mov       t_crc_h,#0ffh
          clr       send_frame                   ; signal control
          jmp       t_flag                                 ;   module


;         C R C   T R A N S M I T T E D   B Y T E
t_crc_data:
          mov       r1,a                         ; save the byte
; do bytewide crc ccitt calculation
; refer to 2/86 issue of Dr. Dobbs Journal of Software Tools
; entry:  a = byte
          xrl       a,t_crc_h
          xch       a,t_crc_l
          mov       t_crc_h,a

          mov       a,t_crc_l
          swap      a
          anl       a,#0f0h
```

```
        xrl     a,t_crc_l

        mov     t_crc_l,a
        swap    a
        anl     a,#0fh
        xrl     t_crc_h,a

        rr      a
        anl     a,#07h
        xch     a,t_crc_l
        xrl     t_crc_l,a

        swap    a
        rr      a
        anl     a,#0f8h
        xrl     t_crc_h,a

        mov     a,r1                            ; restore byte

;       I N S E R T   Z E R O S   I N T O   T X   B Y T E
; after a sequence of 5 ones, insert a zero
; also format bits into message for transmitter
t_data:
        mov     r1,#8                           ; # data bits
td_loop:
        rrc     a                               ; get next bit
        jnc     td_reset
        djnz    t_one_cnt,td_store      ; 5 ones?
        clr     c                               ; insert a zero
        rlc     a                               ; yes...
        inc     r1                              ; back up count
        setb    c                               ; restore the mark
td_reset:
        mov     t_one_cnt,#5                    ; reset one counter
td_store:
        xch     a,t_out_nybble                  ; get partial nybble
        rrc     a                               ; store bit
        djnz    t_out_cnt,td_next       ; a nybbles worth?
        mov     t_out_cnt,baud_size     ; #4
        jb      tx9600,td_store1
        rr      a                               ; right justify 3 bits
        mov     t_out_cnt,#3
        swap    a                               ; format
        anl     a,#0fh
        sjmp    td_store3
td_store1:
        swap    a                               ; format
        anl     a,#0fh
%IF(%FALLBACK) THEN(
        jnb     parse_4800,td_store2
        rr      a
        rr      a
```

```
        anl     a,#03h
        orl     a,#18h
        sjmp    td_store3
td_store2:
        jnb     parse_7200,td_store3
        rr      a
        anl     a,#07h
        orl     a,#28h                          ;** experimental
td_store3:
)FI
        mov     r0,t_store_ptr
        movx    @r0,a                                   ; save formatted byte
        inc     t_store_ptr
        anl     t_store_ptr,#11110111b
        inc     t_nybble_cnt
td_next:
        xch     a,t_out_nybble                          ; resave partial nybble
        djnz    r1,td_loop                      ; more bits in byte?
        jbc     send_rpt,$+4
        ret

        clr     send_data               ;** kludgey
        mov     a,#0ffh                         ; some fill char
        xrl     a,t_crc_h
        xch     a,t_crc_l
        mov     t_crc_h,a
        mov     a,t_crc_l
        swap    a
        anl     a,#0f0h
        xrl     a,t_crc_l
        mov     t_crc_l,a
        swap    a
        anl     a,#0fh
        xrl     t_crc_h,a
        rr      a
        anl     a,#07h
        xch     a,t_crc_l
        xrl     t_crc_l,a
        swap    a
        rr      a
        anl     a,#0f8h
        xrl     t_crc_h,a
        ret


t_flag:
; stores a flag byte,   NO zero insertions
; similar to the above code
;       mov     a,#7eh                                  ; the flag octant
        mov     t_one_cnt,#5
        mov     r1,#8                                   ; #bits in byte
```

```
tf_loop:
        rrc     a                                       ; get next bit
        xch     a,t_out_nybble
        rrc     a
        djnz    t_out_cnt,tf_next
        mov     t_out_cnt,baud_size             ; #4
        jb      tx9600,tf_store1
        rr      a                                       ; right justify 3 bits
        mov     t_out_cnt,#03                           ; 3 = 4 - 1
        swap    a
        anl     a,#0fh
        sjmp    tf_store3
tf_store1:
        swap    a
        anl     a,#0fh
%IF(%FALLBACK) THEN(
        jnb     parse_4800,tf_store2
        rr      a
        rr      a
        anl     a,#03h
        orl     a,#18h
        sjmp    tf_store3
tf_store2:
        jnb     parse_7200,tf_store3
        rr      a
        anl     a,#07h
        orl     a,#28h                          ;** experimental
tf_store3:
)FI
        mov     r0,t_store_ptr
        movx    @r0,a
        inc     t_store_ptr
        anl     t_store_ptr,#11110111b
        inc     t_nybble_cnt
tf_next:
        xch     a,t_out_nybble
        djnz    r1,tf_loop
        ret


;*****************************
; async,  non-error corrected load
a_load:
        call    get_tx_char             ; saves dptr
        jc      al_marks
        mov     r1,#10
        clr     c                       ; start bit
        rlc     a
al_loop:
        rrc     a                       ; load a bit
        xch     a,t_out_nybble
        rrc     a
```

```
        djnz    t_out_cnt,al_next
        jb      tx9600,al_1
        mov     t_out_cnt,#3
        rr      a                                   ; right justify 3 bits
        swap    a
        anl     a,#0fh
        sjmp    al_3
al_1:
        mov     t_out_cnt,baud_size     ; #4
        swap    a
        anl     a,#0fh
%IF(%FALLBACK) THEN(
;---------------------------------------
        jnb     parse_4800,al_2
        rr      a
        rr      a
        anl     a,#03h
        orl     a,#00011000b                        ; flag 4-phase
        sjmp    al_3
al_2:
        jnb     parse_7200,al_3
        rr      a
        anl     a,#07h
        orl     a,#28h                              ; flag 7200

;---------------------------------------
)FI
al_3:
        mov     r0,t_store_ptr
        movx    @r0,a
        inc     t_store_ptr
        anl     t_store_ptr,#11110111b
        inc     t_nybble_cnt
al_next:
        xch     a,t_out_nybble
        setb    c                                   ; pad a stop bit
        djnz    r1,al_loop
        ret

al_marks:
        mov     r1,#8                               ; send marks
        jb      tx9600,$+5
        mov     r1,#3
        mov     a,#0ffh
        sjmp    al_loop
;***************************

des1:
; descramble 1 bit using 1 + X14 + X17
        mov     a,descram                           ; shift in the bit
        rlc     a
        mov     descram,a
```

```
        mov     a,descram+1
        rlc     a
        mov     descram+1,a
        mov     a,descram+2
        rlc     a
        mov     descram+2,a
        mov     c,acc.1                          ; X17

        mov     a,descram+1
        jnb     acc.6,$+4               ; X14
        cpl     c
        mov     a,descram
        jnb     acc.0,$+4               ; X0
        cpl     c
        ret

        mov     a,descram+1                      ;* a faster variant
        rl      a
        rl      a
        addc    a,descram
        rrc     a


diff_decode:
; differential and gray decode ( 4-phase only)
        anl     a,#03                            ; mask relevant bits
        rl      a                                ; generate an index
        rl      a                                ; into table
        xch     a,dstate
        rr      a
        rr      a
        anl     a,#03h                           ;
        orl     a,dstate                ;

        add     a,#dtable- ($+3)        ;
        movc    a,@a+pc                          ;
        ret

dtable:
        db      2                                ; 0000
        db      0                                ; 0001
        db      3                                ; 0010
        db      1                                ; 0011

        db      3                                ; 0100
        db      2                                ; 0101
        db      1                                ; 0110
        db      0                                ; 0111

        db      0                                ; 1000
        db      1                                ; 1001
        db      2                                ; 1010
```

```
        db      3                               ; 1011

        db      1                               ; 1100
        db      3                               ; 1101
        db      0                               ; 1110
        db      2                               ; 1111


vdes1:
; descramble 1 bit using  X0 + X18 + X23
        mov     a,descram               ; shift in the bit
        rlc     a
        mov     descram,a
        mov     a,descram+1
        rlc     a
        mov     descram+1,a
        mov     a,descram+2
        rlc     a
        mov     descram+2,a

        rlc     a                               ; cy = X23
        swap    a
        rl      a                               ; Acc.0 = X18
        addc    a,descram               ; descram.0 = X0
        rrc     a                               ; cy = X0 xor X18 xor X23
        ret


$EJECT
;*************************************************
;
;       I N I T I A L I Z E   E V E R Y T H I N G
;
;       F O R   H I G H   S P E E D   O P E R A T I O N
;
        using   0

init_hs1:
        call    determine_speed
        mov     last_nybble,#80h        ; signal a byte
;;      mov     baud_size,#04                   ; for 9600 operation
;       clr     parse_4800
;       clr     parse_7200
        mov     r0,#low baseptr
        movx    a,@r0
        inc     r0
        mov     inpl,a
        movx    a,@r0
        mov     inph,a

        mov     a,#35
        jnb     parse_7200,$+5
```

```
        mov     a,#26
        mov     txfreq,a

init_hs:
        clr     a
        mov     dstate,a                ; init diferential state
        mov     descram,a               ; init descrambler
        mov     descram+1,a
        mov     descram+2,a
        mov     rcountl,a
        mov     rcounth,a
        mov     cd_count,a
        cpl     a                                       ; 0ffh
        mov     r_crc_l,a               ; init recv crc poly
        mov     r_crc_h,a
        mov     t_crc_l,a               ; init xmit crc poly
        mov     t_crc_h,a
        setb    marking_state                           ; init state flags
        clr     fz_busy
        clr     fz_pending
        clr     brokenf
        clr     hlr
        clr     reverse_channel
        clr     retrain_signal

        clr     send_frame
        clr     send_data
        clr     send_crcl
        clr     send_crch
        setb    send_flag
        clr     send_close

        mov     r0,#low tnybble_buf
        mov     r1,#08
        mov     a,#10001111b
        movx    @r0,a
        inc     r0
        djnz    r1,$-2

        mov     t_load_ptr,#low tnybble_buf
        mov     t_store_ptr,#low (tnybble_buf+3)
        mov     t_get_ptr,#low theader_buf
        mov     _t_one_cnt,#5                           ; reset one counter
        mov     _t_out_cnt,baud_size    ; reset out counter
        mov     t_nybble_cnt,#01
        mov     sv_cmd,#10001111b       ; offset
        mov     _r_bit2_cnt,#8                          ;* experimental

;       mov     a,#low rx_bufstart      ; not needed?
;       mov     _tptr_l,a
;       mov     a,#high rx_bufstart
;       mov     _tptr_h,a
```

```
        mov     esc_timer,#24
        mov     timerfreq,#7
        mov     mon_count,#17
        clr     loss_of_carr
        clr     clocktick
        clr     r_parse
        clr     new_dataf
        clr     pure_mnp                        ; always use dpc
        mov     testp,#0
        mov     test_count,#1
        mov     dptr,#rmode
        clr     a
        movx    @dptr,a
        jmp     set_mercury


$EJECT
;*****************************************
;
; NAME                  FAST_TRAIN
; PURPOSE  fast connect train
;*****************************************

merc_ports:
;       mov     a,#00h
;       mov     portb,a
;       mov     dptr,#8000h
;       movx    @dptr,a
;       mov     a,#0d9h
;       mov     porta,a
;       mov     dptr,#0A000h
;       movx    @dptr,a
;       ret

        call    set_mercury
;;      call    arq_on
        call    alb_off
        call    set_originate
        call    dtmf_off
        ret

;--------------------------------------------
go_fast:
        setb    just_marks
        setb    recv_off
        clr     sync_async              ;**

        jb      orig,ini_recv
        mov     r1,#10
ini_xmit:
        mov     a,#1
        call    wait5
```

```
		jb	disco_pending,gf_abort
		jb	cd_false,ini_xmit1		;* experimental
		djnz	r1,ini_xmit
ini_xmit1:
		mov	rvalue,#0ffh
		clr	sv_flag
		call	reset_m			; drop courier mode
		call	merc_ports		; switch filters
		call	init_hs1		; shorten this delay
%IF(%U101) THEN(
		call	init_hs_int
		mov	a,#0ffh
		call	to_transmitter
		mov	a,#r_tone0
		call	to_transmitter
		mov	a,#0ffh
		call	to_transmitter
		mov	a,#r_setans
		call	to_transmitter
)FI
		%wait5(1)
		clr	cd_found
		ljmp	fast_xmit

ini_recv:
		clr	ok_2send
		call	reset_m			; drop courier mode
ini_recv1:
		jb	disco_pending,gf_abort
		jnb	cd_false,ini_recv1	;* experimental
		call	init_hs1
		call	merc_ports
%IF(%U101) THEN(
		call	init_hs_int
		mov	a,#r_tone0
		call	to_transmitter
		mov	a,#0ffh
		call	to_transmitter
		mov	a,#r_setorg
		call	to_transmitter
		%wait5(1)
;;;;;		mov	cd_count,#0		; skip 2.5 volt bias
)ELSE(
		%wait5(1)
)FI
		jmp	fast_recv

gf_abort:
		jmp	no_carrier


;-----------------------------------------------
```

```
fast_train:
        clr     sv_flag
        clr     ea
        mov     rvalue,#0ffh
        mov     sv_cmd,#0ffh
        mov     vectorl,#low trans_int
        mov     vectorh,#high trans_int
        setb    ea
        clr     a                               ; clr mnp vars
        mov     23h,a                           ; somewhat kludgy
        mov     24h,a
        mov     25h,a

        call    reset_m                         ; put into known state
        mov     r1,#20                          ; is this needed?
        djnz    r0,$
        djnz    r1,$-2
        call    init_mnp
        clr     sync_async          ;**

        mov     r0,#low baseptr
        mov     a,#low tx_bufstart
        movx    @r0,a
        inc     r0
        mov     a,#high tx_bufstart
        movx    @r0,a

        call    init_hs1
        call    init_serial
        clr     retrain_signal
        mov     dptr,#sreg+7                    ; init S7 timeout
        movx    a,@dptr
        mov     secs,a

        jb      orig,wait_for_2100
        call    set_answer

        call    set_courier
        call    dtmf_off            ;** experimental
        mov     a,#t_s_2100hz                   ; begin sending answer tone
        call    to_transmitter
        mov     a,#20                           ; send 2 sec
merc_wait:
        jb      ri,ft_no_carrier
        jb      disco_pending,ft_no_carrier
        push    acc
        %wait5(20)                  ; 100 ms
        pop     acc
        djnz    acc,merc_wait
        mov     a,#10h                          ; stop sending answer tone
        call    to_transmitter
        mov     a,#10h                          ; stop sending answer tone
```

```
            call        to_transmitter
            call        merc_ports
%IF(%U101) THEN(
            mov         a,#r_tone0
            call        to_transmitter
)FI         %wait5(2)
;--------------------------------------
            clr         cd_found
            clr         f0
            clr         retrain_signal
;--------------------------------------
            jmp         fast_xmit                  ; xmit 9600!



wait_for_2100:
            call        set_originate
            call        dtmf_on
            call        set_mercury
            call        set_originate
            call        getfreq                              ; delay 100 ms

wait_for_2100_loop:
            jb          ri,ft_no_carrier
            jb          disco_pending,ft_no_carrier
            call        getfreq
            jnb         f0,wait_for_2100_loop

;wait_for_2100_end:
;           jb          disco_pending,ft_no_carrier
;           call        getfreq
;           jb          f0,wait_for_2100_end
;w2100:
;           call        merc_ports
;;          call        dtmf_off
            ;wait5(60)                             ; 400 ms
;***********************************
            call        merc_ports
            call        init_hs_int
            mov         test_count,#3
            call        wait_20ms
            clr         loss_of_carr
w2100:
            jb          disco_pending,ft_no_carrier
            jnb         loss_of_carr,w2100
            clr         retrain_signal

;***********************************
%IF(%U101) THEN(
            mov         a,#r_tone0
            call        to_transmitter
```

```
)FI             jmp         fast_recv

ft_no_carrier:
                jmp         no_carrier


$EJECT
;*******************************************
;
;
; NAME                      FAST_XMIT
; PURPOSE  9600 bps train sequence
;*******************************************
;
;
fast_xmit:
                mov         rvalue,#10100000b                      ;* ZERO
                clr         f0                                                    ; backchannel
is off(?)
                call        init_hs_int
%IF(%U101) THEN(
                jb          retrain_signal,after_setans
                mov         a,#r_tone0
                call        to_transmitter
                mov         a,#0ffh
                call        to_transmitter
                mov         a,#r_setans
                call        to_transmitter
after_setans:
)ELSE(
                call        set_answer
)FI

;;              mov         secs,#0                                               ; disable timeout

                mov         cnt_lo,#181                            ; 75 ms
                setb        enable_cnt
                call        tx_wait

                mov         rvalue,#10111011b                      ;* AB
                jbc         retrain_signal,ft_0

                mov         dptr,#sreg+15
                movx        a,@dptr
                rrc         a
                mov         a,#r_set_boost
                jnc         $+4
                mov         a,#r_clr_boost
                call        to_transmitter
                mov         a,#0ffh
                call        to_transmitter

                mov         a,#r_back3
                call        to_transmitter
```

```
        mov     a,#t_xmit96
        call    to_transmitter
        clr     cd_found
        clr     f0
ft_0:
        clr     enable_cnt
        mov     cnt_lo,#72+1                    ;* must be odd
        setb    enable_cnt
        call    tx_wait

        mov     cnt_lo,#200
        mov     rvalue,#10010111b               ;* 4 - phase
        setb    enable_cnt                      ; no diff encoding
        call    tx_wait

        call    determine_speed
        mov     a,#10011111b                    ;* 4-phase data
        jb      parse_4800,not_7200
        mov     a,#10101111b                    ;* 7200 data
        jb      parse_7200,not_7200
        mov     a,#10001111b                    ;* v32
not_7200:
        mov     rvalue,a

        mov     r2,#200                         ; about 2 sec
ft_1:
        jb      disco_pending,ft_nc
        mov     cnt_lo,#low (24)                ; check this delay
        setb    enable_cnt
        call    tx_wait
        jb      f0,test_xmit                    ; was back ch receiver started?
        djnz    r2,ft_1
        mov     dptr,#sreg+10
        movx    a,@dptr
        inc     a
        jz      ft_1
ft_nc:  jmp     no_carrier

test_xmit:
        mov     secs,#0                         ; disable timeout
%IF(%ASYNC) THEN(
        mov     dptr,#amp_xm
        movx    a,@dptr
        jnz     $+4
        setb    sync_async
)FI
%IF(%FAX) THEN(
        extrn   code(init_sync_xmit)
        jz      not_sync_xmit
        jb      acc.2,not_sync_xmit
        setb    tx9600
        setb    sync_async
```

```
        call    assert_connect
        clr     loss_of_carr
        clr     retrain_signal
        jmp     init_sync_xmit
not_sync_xmit:
)FI
        jnb     sync_async,$+6
        lcall   wait_20ms
        call    assert_connect
        call    init_hs
        setb    tx9600
        clr     ea
        mov     vectorl,#low hst_int
        mov     vectorh,#high hst_int

        clr     ie0
        clr     ie1
        mov     ip,#0                                   ; x 04h
        setb    ea
        setb    ex1
        setb    send_flag
        call    rst_reverse_timer
        setb    es

        clr     retrain_signal
        clr     loss_of_carr
        clr     reverse_channel
        setb    r_parse                                 ;* must wait 100 ms after start

;-----------------------------------------------
        mov     a,#8
        call    wait5
;-----------------------------------------------
        clr     brokenf                                 ;** experimental
        call    mr_on
tx_loop:
        jb      disco_pending,no_carrier_jmp
        jbc     loss_of_carr,tx_s10
        jb      retrain_signal,tx_retrain
        call    update_timers
        call    scan_rts
        call    test_pattern
%IF(%ASYNC) THEN(
        jb      sync_async,tx_loop
)FI
        call    ack_scan
        jbc     reverse_channel,tx_switch
        call    tx_frame
        call    data_scan
        jnb     brokenf,tx_loop
        clr     brokenf
        mov     r0,#low reverse_timer
```

```
            movx    a,@r0
            jnz     tx_loop
            setb    xmit_la
            sjmp    tx_loop

;---------------------------------------------
tx_retrain:
            mov     dptr,#sreg+14
            movx    a,@dptr
            jnb     acc.7,x96_retrain
            clr     retrain_signal
            jmp     tx_loop
x96_retrain:
            clr     r_parse
            call    mr_off
            mov     dptr,#ld_retrains
            call    inc_ld_string
            jmp     fast_xmit


;---------------------------------------------
tx_switch:
            jb      disco_pending,no_carrier_jmp
            jb      send_frame,$-3
            mov     r1,#20                          ;** fix this
            djnz    r0,$                            ; flush lna
            djnz    r1,$-2


            mov     rvalue,#0ffh        ;* experimental
            call    init_hs_int
            call    reset_m
%IF(%U101) THEN(
            mov     a,#r_tone0
            call    to_transmitter
            mov     a,#r_setorg
            call    to_transmitter
)ELSE(      call    set_originate
)FI
            call    wait_5ms
            call    wait_5ms
            mov     dptr,#ld_reversals
            call    inc_ld_string
            mov     secs,#5                         ; arbitrary
            clr     retrain_signal
            jmp     fast_recv


;---------------------------------------------
no_carrier_jmp:
            jmp     no_carrier
```

```
;-----------------------------------------------

tx_s10:
            call        init_hs_int
            clr         r_parse                          ; stop parsing data
            mov         r2,#3
            mov         dptr,#sreg+10
            movx        a,@dptr
            jz          there_is_no_carrier
            cjne        a,#255,$+5
            sjmp        tx_s10_loop-2
            clr         c
            rrc         a
            addc        a,#0
            mov         b,a
tx_s10_loop:
            push        b
            call        getfreq
            pop         b
            jb          disco_pending,no_carrier_jmp
            cjne        a,#44h,$+3
            jc          tx_s10_next
            cjne        a,#49h+1,$+3
            jnc         tx_s10_next
            djnz        r2,tx_s10_no_rst
            jmp         test_xmit

tx_s10_next:
            mov         r2,#3
tx_s10_no_rst:
            mov         a,b
            inc         a
            jz          tx_s10_loop
            djnz        b,tx_s10_loop

there_is_no_carrier:
            mov         dptr,#sreg+20
            mov         a,#3                             ; no carrier
            movx        @dptr,a
            jmp         no_carrier

tx_s10_cd:
            jmp         fast_xmit


;-----------------------------------------------
signal_recv:
            setb        tr.6
            setb        f0                               ; flag start
tx_wait:
            jbc         cd_found,signal_recv
            jb          enable_cnt,tx_wait
```

```
            ret

rept_train:
            jmp         no_carrier

baud_wait:
            cpl         watchdg_pin                     ; reset watchdg
            mov         dptr,#8000h
            mov         a,portb
            movx        @dptr,a
            jb          enable_cnt,baud_wait
            ret

$EJECT
;*****************************************
;
;
; NAME              FAST_RECV
; PURPOSE  9600 recv train sequence
;*****************************************
;
restart_recv:
            mov         a,#r_reset
            call        to_transmitter
%IF(%U101) THEN(
            mov         a,#r_tone0
            call        to_transmitter
            mov         a,#r_setorg
            call        to_transmitter
)FI
            sjmp        fr_continue

fr_exit_jmp:
            jmp         no_carrier

fast_recv:
            call        init_hs_int
%IF(%U101) THEN(
            jb          retrain_signal,fr_continue
            mov         a,#r_tone0
            call        to_transmitter
            mov         a,#r_setorg
            call        to_transmitter
)ELSE(      call        set_originate
            jb          retrain_signal,fr_continue
)FI
            mov         r7,#0ffh
            call        wait_20ms                       ;* delay for filters
```

```
        mov     dptr,#sreg+15
        movx    a,@dptr
        rrc     a
        mov     a,#r_set_boost
        jnc     $+4
        mov     a,#r_clr_boost
        call    to_transmitter
        mov     a,#0ffh
        call    to_transmitter


fr_continue:
        clr     cd_found                    ; also timeout
fr_Wait:
        jb      disco_pending,fr_exit_jmp   ;** kludgey jump target
        jnb     cd_found,fr_wait

; start receive  9600

        jb      retrain_signal,fr_after
        call    determine_speed
        jnb     parse_7200,fr_after

        mov     a,#t_int_3200
        jb      parse_7200,$+5
        mov     a,#t_int_4800                       ; switch to 4800 hz
        call    to_transmitter
fr_after:
        mov     a,#r_recv48
        jb      parse_4800,fr_send
        mov     a,#r_recv72
        jb      parse_7200,fr_send
        mov     a,#r_recv96                 ; start recv sequence

fr_send:
        call    to_transmitter

        clr     clocktick
        clr     loss_of_carr
        mov     r0,#4                               ; check for false starts
fr_loop:
        jb      loss_of_carr,restart_recv
        jnb     clocktick,fr_loop
        clr     clocktick
        djnz    r0,fr_loop
        jb      retrain_signal,test_recv

; start backchannel transmitter
        mov     a,#29h                      ; start tx back channel
        call    to_transmitter
        mov     a,#2eh                      ; start new back channel
        call    to_transmitter              ; 2d for alt
```

```
        mov     a,#35
        jnb     parse_7200,$+5
        mov     a,#26
        mov     txfreq,a

        mov     a,#0ffh                         ; flush last command
        call    to_transmitter
        mov     r2,#8
tr_tra:
        call    wait_20ms
        djnz    r2,tr_tra

test_recv:
        mov     dptr,#rmode
        movx    a,@dptr
        jnz     test_recv
        mov     secs,#0
%IF(%ASYNC) THEN(
        mov     dptr,#amp_xm
        movx    a,@dptr
        jnz     $+4
        setb    sync_async
)FI

%IF(%FAX) THEN(
        extrn   code(init_sync_recv)
        jz      not_sync_recv
        jb      acc.2,not_sync_recv
        setb    sync_async
        call    assert_connect
        clr     loss_of_carr
        jmp     init_sync_recv
not_sync_recv:
)FI
        call    init_hs                                 ;** EXPERIMENTAL
        CLR     SEND_FLAG
        mov     t_load_ptr,t_store_ptr
        clr     tx9600
        call    rst_reverse_timer               ;**

        clr     ea
        mov     vectorl,#low r48_int
        mov     vectorh,#high r48_int
        mov     sv_cmd,#9fh
        mov     baud_size,#02
        jb      parse_4800,p4p_1

        mov     vectorl,#low r72_int
        mov     vectorh,#high r72_int
        mov     sv_cmd,#0Afh
        mov     baud_size,#03
        jb      parse_7200,p4p_1
```

```
          mov       vectorl,#low hsr_int
          mov       vectorh,#high hsr_int
          mov       sv_cmd,#8fh
          mov       baud_size,#04

p4p_1:
          mov       ip,#0                               ; x 04h
          mov       ie,#14h
          clr       ie0
          clr       ie1
          setb      send_flag

          clr       retrain_signal

          clr       loss_of_carr
          call      rst_reverse_timer
          setb      ea
          call      assert_connect
;;;       setb      ea
          setb      es

          setb      r_parse
          mov       a,#12
          call      wait5
          clr       ln_busy                             ;** experimental
          clr       brokenf
          call      mr_on
tr_loop:
          jb        disco_pending,tr_no_carrier
          jbc       loss_of_carr,tr_s10_jmp
          jb        retrain_signal,tr_retrain
          call      update_timers
          call      scan_rts
          call      test_pattern
%IF(%ASYNC) THEN(
          jb        sync_async,tr_loop
)FI
          call      ack_scan
          jbc       reverse_channel,tr_switch
          call      tx_frame
          call      data_scan
          jnb       brokenf,tr_loop
          clr       brokenf
          mov       r0,#low reverse_timer
          movx      a,@r0
          jnz       tr_loop
          setb      xmit_la
          sjmp      tr_loop

;-----------------------------------------------
tr_no_carrier:
          jmp       no_carrier
```

```
tr_s10_jmp:
            jmp         tr_s10


;-----------------------------------------------
tr_switch:
            mov         secs,#3                                 ;** experimental
trs_wait:
            jb          disco_pending,tr_no_carrier
            jnb         loss_of_carr,trs_wait
            call        init_hs_int
            call        reset_m
%IF(%U101) THEN(
            mov         a,#r_tone0
            call        to_transmitter
            mov         a,#r_setans
            call        to_transmitter
)ELSE(      call        set_answer
)FI
            call        wait_20ms
            mov         dptr,#ld_reversals
            call        inc_ld_string
            clr         retrain_signal
            jmp         fast_xmit


;-----------------------------------------------
tr_retrain:
            mov         dptr,#sreg+14
            movx        a,@dptr
            jnb         acc.7,r96_retrain

            mov         dptr,#9000h
            movx        a,@dptr
            jb          acc.5,r96_retrain

            clr         retrain_signal
            jmp         tr_loop
r96_retrain:
            call        mr_off
            mov         rvalue,#0ffh
            clr         r_parse                                 ; stop parseing data

;** switch to hs_int
            call        init_hs_int
            mov         ticks,#200                    ; check this?
            mov         r3,#11
            mov         secs,#10                      ;** experimental
trr_loop:
            dec         r3
            mov         r7,#20                                  ; 20 * 5ms
            mov         a,#r_reset                    ; halt receiver
```

```
        call    to_transmitter
%IF(%U101) THEN(
        mov     a,#0ffh
        call    to_transmitter
        mov     a,#r_tone0
        call    to_transmitter
        mov     a,#0ffh
        call    to_transmitter
        mov     a,#r_setorg
        call    to_transmitter
)FI
        mov     a,#t_retrain                    ; send 400hz
        call    to_transmitter
        mov     dptr,#ld_retrains
        call    inc_ld_string
        mov     dptr,#rmode                              ;**
        mov     a,#1                                     ;**
        movx    @dptr,a                                  ;**
        call    wait_20ms
        clr     loss_of_carr
trr_wait:
        mov     a,r3
        cjne    a,secs,trr_loop                          ; retry 1/sec
        jz      tr_no_retrain
        jb      disco_pending,trr_no_carrier
        mov     a,testp
        add     a,#-21                                   ; a random number
        jnc     trr_wait
;;      cjne    a,#24,trr_wait                           ;** experimental
;;      jnb     loss_of_carr,trr_wait           ; wait for tx9600 to stop

        clr     loss_of_carr
        jmp     fast_recv
tr_no_retrain:
        mov     a,#8
        jmp     no_carrier_a
trr_no_carrier:
        jmp     no_carrier
;-----------------------------------------------
tr_s10:
        clr     r_parse                                  ; stop parsing data
        mov     a,#r_stop_tap                            ; stop tap updates
        call    to_recv
        clr     cd_found
        mov     dptr,#sreg+10
        movx    a,@dptr
        jz      tinc_jmp
        mov     b,a
        clr     f0
        clr     cd_found
s10x:
;-----------------------------------------------
```

```
        push    b
        call    getfreq
        pop     b
        jb      disco_pending,no_carrier
        cjne    a,#144,$+3
        jc      trc_not_found
        cjne    a,#223,$+3
        jc      s10_restore

trc_not_found:
;---------------------------------------------
        mov     a,b
        inc     a                               ; go forever if S10 = 255
        jz      s10x

        djnz    b,s10x
;;      jb      cd_found,s10_restore

%IF(%ASYNC) THEN(
        jb      sync_async,tinc_jmp
)FI
        jb      send_frame,tinc_jmp
        jnb     ln_busy,tinc_jmp
        mov     r0,#low send_ln
        movx    a,@r0
        cjne    a,#4,tinc_jmp
;---------------------------------------------
        call    can_ln_timer                    ; experimental recovery code
        mov     r0,#low ln_send_seq
        movx    a,@r0
        inc     a
        movx    @r0,a
        mov     r0,#low send_ln                 ; did we request line reversal
        mov     a,#95
        movx    @r0,a
;---------------------------------------------
        jmp     tr_switch               ;* experimental

tinc_jmp:
        jmp     there_is_no_carrier

s10_restore:
        mov     a,#r_do_tap                     ; resume tap updates
        call    to_recv
        clr     loss_of_carr
        setb    r_parse                         ; start parsing data
        clr     brokenf
        jmp     tr_loop


;---------------------------------------------
no_carrier_a:
```

```
            mov         dptr,#sreg+20
            movx        @dptr,a
no_carrier:
            clr         ea                                      ;**
            mov         rvalue,#0ffh                            ;** experimental
            clr         sv_flag                                 ;**
            call        reset_m
            clr         a                                       ; clear flag bits
            mov         23h,a
            mov         24h,a
            mov         25h,a
            jmp         break_nocarr

;---------------------------------------------
assert_connect:
            jb          cdet_pin,$+4                            ; ignore if line reversal
            ret
            call        get_x_spkr
;           mov         a,x_spkr               ; turn off speaker unless M2
            anl         a,#0fh
            xrl         a,#02
            jz          $+5
            lcall       speaker_off
            clr         es
            setb        ti
%IF(%ASYNC) THEN(
            mov         a,#13                                   ; "CONNECT 9600"
            jb          sync_async,$+5
)FI
            mov         a,#17                                   ; "CONNECT 9600/ARQ"
            mov         b,a
            call        respond
            call        cdet_true              ; raise CD pin
            call        dsr_on                                  ; raise DSR
            jb          clock_mode,ac_next
            mov         dptr,#seconds                           ; clear online timer
            clr         a
            movx        @dptr,a
            inc         dptr
            movx        @dptr,a
            inc         dptr
            movx        @dptr,a
            setb        clock_on               ; start timer
ac_next:
            mov         dptr,#amp_xb                            ; change baud rates?
            movx        a,@dptr
            jnz         $+5
            mov         th1,#-6                                 ; drop to 9600
            jb          send_full_dup,$+6      ; turn off echo?
            ljmp        echo_on
            ljmp        echo_off
```

```
to_recv:
        setb    ea                      ; xmit acc to receiver
        mov     r0,#10                  ; when recv9600
        djnz    r0,$
        clr     ea
        mov     r0,sv_cmd
        cjne    r0,#0ffh,to_recv
        mov     sv_cmd,a
        setb    ea
        ret


txd_hang:
        clr     ea
        sjmp    $

;----------------------------------------------
wait_for_cdet:
        mov     r0,#70
        mov     r1,#2                   ; was 2
wfd:    ;jbc    ri,break
        nop
        nop
        jb      cdet,wait_for_cdet      ; wait for cdet
        djnz    r0,wfd
        djnz    r1,wfd
        ret

wait_for_no_cdet:
        mov     r0,#70
        mov     r1,#2
wfnd:   ;jbc    ri,break
        nop
        nop
        jnb     cdet,wait_for_no_cdet   ; wait for cdet
        djnz    r0,wfnd
        djnz    r1,wfnd
        ret


;----------------------------------------------

reset_m:
        call    reset_micros
        clr     a
        nop
        nop
        djnz    acc,$-2
        ret


wait_20ms:
```

```
        clr     enable_cnt
        mov     cnt_lo,#1+48
        setb    enable_cnt
        jmp     baud_Wait

wait_5ms:
        clr     enable_cnt
        mov     cnt_lo,#1+12                    ;* delay for filters
        setb    enable_cnt
        jmp     baud_wait


        END
```

```
$TITLE( Low Speed Data Pump )
%SET(RACK,0)
%SET(U101,0)
;*****************************************************
;
;
;           Name        LS:         LOW_SPEED_DATA_PUMP
;
;           Purpose     1200/2400 baud data pump
;
;*****************************************************

;**** Transmitter Commands
originate      equu        00100000b
answer                    equ         00100001b
go_300                    equ         00100010b
go_1200                   equ         00100011b
go_2400                   equ         00100100b
set_scramble              equ         00100101b
clr_scramble              equ         00100110b
start                     equ         00100111b
stop                      equ         00101000b
send_marks equ            00101001b
t_s_2225hz  equ           00101010b
t_s_2100hz  equ           00101011b
t_s_2250hz  equ           00010111b
go_back_channel           equ         00101100b
go_bc_2                   equ         00101101b
go_bc_3                   equ         00101110b
send_400hz equ            00011100b
stop_400hz  equ           00011101b
start_nofilter equ        00101111b

;**** Receiver commands
rcv_orig3      equ        01100001b
rcv_orig12     equ        01100010b
rcv_orig24     equ        01100011b
rcv_ans3       equ        01100100b
rcv_ans12      equ        01100101b
rcv_ans24      equ        01100110b
rcv_orig_1100             equ         01100111b
rcv_ans_1100              equ         01101000b
rcv_back_chan             equ         01101001b
rcv_stop       equ        01101010b
rcv_restart    equ        01101011b
rcv_go24       equ        01101100b
agc_narrow equ            01101101b
agc_wide       equ        01101110b
rcv_bc2                   equ         01101111b
rcv_bc3                   equ         01110000b
tone0                     equ         01001000b
tone1                     equ         01001001b
```

```
tr                      equ         p1
dibit_detect  equu      01
poor_quality            equ         02
freq_pin      bit       p3.4
energy_det    bit       p3.5

test_buf      equ       400h

STX                     equ         02
ETX                     equ         03
DLE                     equ         10h
SYN                     equ         16h
SYNC                    equ         7eh
TX_BUFSTART             equ         800h
TX_BUFEND               equ         1000h
RX_BUFSTART             equ         1000h
RX_BUFEND               equ         2000h

;**** 1200/2400 VARIABLES
              using     2
recv_cmd      set       ar0                     ; commands to supervisor
recv_data     set       ar1                     ; receiver data
int_cnt                 set         ar2                 ; interrupt counter
tx_data                 set         ar3                 ; transmit data
tx_cmd                  set         ar4                 ; tx & rx commands
parse_data    set       ar5
parse_cnt     set       ar6
bit_cnt                 set         ar7

              using     3
byte_cnt      set       ar0                     ; used to count skip stop bits
out_cnt                 set         ar1                 ; 12/24 interrupt counter
tempdata      set       ar4                     ; holds first dibit from recv
cptr                    set         ar5                 ; header pointer
bits                    set         ar6                 ; recv bits left in nybble
bpars                   set         ar7                 ; # of bits left in recv byte

;d16                    set         ar2                 ; descrambler bits 9 - 16
;d8                     set         ar3                 ; descrambler bits 1 - 8
;prev_q1q0    set       ar5                     ; used for differential decode

ls_data       segment   data
rseg          ls_data
;plus_char:   ds        1                       ; set to whatever S2 is
;plus_time:   ds        1                       ; set to S12 in 20ms increments
;plus_cnt:    ds        1                       ; count number of esc chars
;cd_count:    ds        1                       ; counts 64 consecutive 1's
                                                    ; on the CD line

bframe:                 ds          1                   ; MNP RX state counter
cframe:                 ds          1                   ; MNP TX state counter
```

```
recv_parse: ds      1                       ; recv data byte
test_data:  ds      1                       ; descambled data for marks tst

;**** break variables
mark5:
break_cnt:  ds      1                       ; counts bits during breaks
mark_cnt:
zero_cnt:   ds      1                       ; counts incoming zeros for
                                                    ; breaks. If = 19 then break
nul_cnt:    ds      1                       ; count nuls to be sent out
out_0:              ds      1                       ; # of bits/4 of break to be
                                                    ; sent
cd_duty:    ds      1                       ; duty cycle of cd pin
dibit_cnt:  ds      1                       ; RDL 1010 counter

            extrn   code(wait5,update_timers,test_mnp)
            extrn   code(get_tx_char,getat,init_serial,respond)
            extrn   code(trans_int,clock,get_s,putc_int,update_ports)
            extrn   code(callprog,init_mnp,setup_plus,dsr_on)
            extrn   code(fast_train,set_courier,dtmf_on,dtmf_off)
            extrn   code(porta_out,portb_out,on_hook,dsr_off)
            extrn   code(cdet_true,inc_ld_string,arq_off)
            extrn   code(speaker_on,check_for_9600)
            extrn   code(test_pattern)
            extrn   code(getfreq,clear_ld_strings)
            extrn   code(set_mercury,set_originate)
            extrn   code(get_x_spkr)

            extrn   data(vectorl, vectorh,portb,timer50,secs)
            extrn   data(ticks,time50)
            extrn   data(timer5,timer_tics,porta,rvalue)
            extrn   data(rxptr,r_crc_l,r_crc_h,t_crc_l,t_crc_h)
            extrn   data(inpl,inph,rcountl,rcounth)
            extrn   data(plus_cnt,cd_count)
            extrn   data(prev_q1q0,d8,d16)
            extrn   data(t_hbyte_cnt,t_xbyte_cnt)
            extrn   data(_tptr_l,_tptr_h,icountl,icounth)
            extrn   data(rack,rack_z1)

            extrn   bit(disco_pending,fsk,cts_pin)
            extrn   bit(flag5,ls_pin,at_dumb,at_dtr,cmd_echo)
            extrn   bit(alb_pin,flag50,clock_mode,echo_pin)

            extrn   bit(orig,keypress,oa_pin,send_full_dup,spkr_pin)
            extrn   bit(dsr_pin,cdet_pin,trans_on,repeat,break_det)
            extrn   bit(brokenf,sync_async,mnp_mode,send_frame,send_data)
            extrn   bit(first_int,t_timing,tx_flow,timer_on)

            extrn   xdata(amp_xm,amp_xn,baseptr,sreg,amp_xb,ld_retrains)
            extrn   xdata(seconds,bell_ans,amp_xh,x_spkr)

            extrn   number(stack_start)
```

```
                public      send_1224_data,return_online
                public      chk_timeout,cd_false,baud_24
                public      clock_on,ring1,call_over
                public      normal,print_it,assert_cd,transfg
                public      break_nocarr,recv_off,just_marks,ok_2send
                public      sync_init

;*** 1200/2400 flags
ls_flag         segment     bit
rseg            ls_flag
in_cmd:                     dbit        1
in_data:        dbit        1
out_cmd:        dbit        1
oddbaud:        dbit        1                   ; for 1200 baud demod
d17_bit:        dbit        1                   ; descambler bit 17
transfg:        dbit        1                   ; used during frequency calcs
just_marks:     dbit        1                   ; 1 = send only marks

recv_off:       dbit        1                   ; 1= dont process recv data
mark_test:      dbit        1                   ; mark test in progress
data_ready:     dbit        1                   ; mark test data ready
cd_false:       dbit        1                   ; 1 = carrier dropped
in_block:
break_done:                 dbit        1                   ; bit to send during a break
stuff_it:
in_break:       dbit        1                   ; got a recv data break
ring1:
stuff_zero:
dle2:                       dbit        1                   ; got a DLE in send packet

ls_bits                     segment data        bitaddressable
                            rseg        ls_bits

low_flags:      ds          1

baud_24                     bit         low_flags.0  ; 1 = 2400 baud
skip_stop       bit         low_flags.1
out_data        bit         low_flags.2
ok_2send        bit         low_flags.3  ; only send data when = 1
first_data      bit         low_flags.4  ; tells when first data sent
retraining      bit         low_flags.5  ; 1 = retrain in progress
send_1100       bit         low_flags.6  ; 1 = send 1100 to tx
clock_on        bit         low_flags.7  ; 1 = timer is on

timera                      set         r2
startb_l        set         r3
startb_h        set         r4
cd_timer        set         r5
timerc                      set         r6
timerb                      set         r7

%*DEFINE(wait5(count))(
```

```
            mov         a,#%count
            call        wait5
            )

%*DEFINE(wait50(count2))(
            clr         ea
            mov         timer_tics,#12
            mov         timer5,#10
            mov         timer50,#%count2
            clr         flag50
            setb        timer_on
            setb        ea
            jnb         flag50,$
            clr         timer_on
            )

%*DEFINE(send_tx(cmd))(
            mov         a,#%cmd
            call        send_2tx
            )

%*DEFINE( get_extrn(extrn_val) ) (
            mov         dptr,#%extrn_val
            movx        a,@dptr
            )

%*DEFINE( set_extrn(extrn_val) ) (
            mov         dptr,#%extrn_val
            movx        @dptr,a
            )
$EJECT
ls_code     segment     code
rseg        ls_code
;****************************************
;
; NAME                  LOW_SPEED_INT
; PURPOSE  1200/2400 interrupt routine
; FREQUENCY             9600
; SOURCE   EXT1
;****************************************
ls_int:
            push        acc
            push        psw

            mov         tr,#0ffh                ; read in the data
            mov         recv_data,tr

            jnb         ok_2send,chk_data       ; don't send anything to the TX
            djnz        int_cnt,chk_data
            mov         int_cnt,out_cnt
            setb        first_data              ; flags that data has been sent
```

```
        jbc     out_data,send_tx_data
        jb      send_1100,send_dibit
        mov     tr,#10001111b                 ; send marks to TX
        mov     byte_cnt,#08                  ; reset the skip stop bit variables
        clr     skip_stop
        sjmp    chk_data

send_dibit:
        mov     tr,#10001100b
        sjmp    chk_data

send_tx_data:
        mov     tr,tx_data

;------- Check for a incoming data byte or a status word.
chk_data:
        mov     a,recv_data
        jb      acc.6,chk_data_ready    ; null from recvr
        jb      acc.7,sav_data                ; check for recvr data
        mov     recv_cmd,a
        setb    in_cmd
        jmp     chk_data_ready
sav_data:
        anl     a,#0ch
        push    acc
        clr     c
        subb    a,prev_q1q0
        pop     prev_q1q0
        jb      acc.3,no_grey
        cpl     acc.2
no_grey:
        anl     recv_data,#03
        anl     a,#0ch
        orl     a,recv_data
        jb      baud_24,descram
        jbc     oddbaud,setup_nybble
        setb    oddbaud
        mov     tempdata,a
        jmp     chk_out_cmd
setup_nybble:
        rr      a
        rr      a
        anl     a,#03
        anl     tempdata,#0ch
        orl     a,tempdata
descram:

        %IF (%RACK) THEN (             ; RDL pattern detect vars
        mov     recv_data,a
        jnb     acc.0,chk_pattern
        rl      a
chk_pattern:
```

```
        inc     dibit_cnt
        anl     a,#0fh
        cjne    a,#00001010b,not_pat    ; upper nybble nul lower 1010
        sjmp    dscram                  ; already inc-d
not_pat:
        djnz    dibit_cnt,decit
        sjmp    dscram
decit:
        dec     dibit_cnt
dscram:
        mov     a,recv_data
        ) FI

        call    descr                   ; even if recv is off fill descrambler
        jnb     mark_test,demod_data
        mov     test_data,a
        setb    data_ready
        jmp     chk_out_cmd
demod_data:
        jb      recv_off,no_char

        jb      sync_async,get_async    ; check level 3 mnp
        jb      retraining,get_async
        call    sync_rxchar
        jmp     chk_cmd

get_async:
        call    get_recv        ; parse the incoming data
no_char:
        jmp     chk_out_cmd

get_bit_cnt:
        mov     bit_cnt,#04
        mov     tx_data,#0
        sjmp    parse_it
chk_data_ready:
        jb      just_marks,chk_out_cmd ; MNP level three check
        jnb     mnp_mode,no_sync
        jb      sync_async,no_sync
        jb      retraining,no_sync
        call    sync_txchar
        jmp     chk_cmd
no_sync:
        jb      out_data,chk_out_cmd    ; if data already there then don't

        clr     a
        cjne    a,parse_cnt,get_bit_cnt ; if in middle of word then finish

        jb      break_det,break         ; send a break

        cjne    a,bit_cnt,chk_new_char  ; don't stuff marks until need to
```

```
        call    mnpget                  ; check for char in buffer
        jc      chk_out_cmd

        djnz    byte_cnt,no_skip        ; eight consecutive bytes?
        mov     byte_cnt,#8
        setb    skip_stop
no_skip:

        mov     bit_cnt,#04
        mov     tx_data,#00
got_char:
        mov     parse_data,a
setup_parse:
        mov     parse_cnt,#10
parse_it:
        djnz    parse_cnt,check_start
        sjmp    insert_stop
check_start:
        mov     a,#09
        cjne    a,parse_cnt,not_start
        clr     c
        sjmp    insert_bit
not_start:
        mov     a,parse_data
        rrc     a
        mov     parse_data,a
insert_bit:
        mov     a,tx_data
        rrc     a
        mov     tx_data,a
        djnz    bit_cnt,parse_it        ; not done with baud time
got_it:
        swap    a
        setb    acc.7                   ; flag as data
        mov     tx_data,a
        setb    out_data
        sjmp    chk_cmd
insert_stop:
        jbc     skip_stop,no_stop_bit
send_stop_bit:
        setb    c
        mov     a,tx_data
        rrc     a
        mov     tx_data,a
check_new_char:
        djnz    bit_cnt,chk_new_char
        sjmp    got_it
chk_new_char:
        call    mnpget
        jc      chk_int_cnt
        djnz    byte_cnt,got_char       ; 8 consecutive bytes?
        mov     byte_cnt,#8
```

```
        setb    skip_stop
        sjmp    got_char

chk_out_cmd:
        jb      retraining,do_normal
        jnb     sync_async,chk_cmd
do_normal:
        clr     a
        cjne    a,bit_cnt,chk_new_char  ; don't stuff marks until need to
chk_cmd:
        jnb     ok_2send,cmds_ok        ; if not sending data then ok to send
                                        ; commands
        mov     a,int_cnt               ; can only send commands
        cjne    a,#2,done               ; once a baud time
cmds_ok:
        jbc     out_cmd,send_cmd
        sjmp    done
send_cmd:
        mov     tr,tx_cmd
        sjmp    done

break:                                  ; transmit a break. Send at least
                                        ; 23 spaces followed by 20 marks.
        inc     bit_cnt
        djnz    bit_cnt,break_loop      ; check if bit_cnt<>0
        mov     tx_data,#0
        mov     bit_cnt,#4
break_loop:
        mov     c,break_done            ; break done = bit to send
        mov     a,tx_data
        rrc     a
        mov     tx_data,a
        djnz    break_cnt,chk_bit       ; 23 for spaces, 20 for marks
        jbc     break_done,end_break
        jb      rxd,one20               ; incoming break is over send 20 marks
        inc     break_cnt               ; still send zeros
        sjmp    chk_bit
one20:
        setb    break_done
        mov     break_cnt,#20
chk_bit:
        djnz    bit_cnt,break_loop
        swap    a
        setb    acc.7
        mov     tx_data,a
        setb    out_data
        sjmp    chk_out_cmd
end_break:
        clr     break_det
        mov     break_cnt,#23
        jmp     chk_int_cnt
```

```
chk_int_cnt:                                ; don't stuff marks into tx_data
                                                          ; until int_cnt=1
            mov       a,#1
            cjne      a,int_cnt,chk_cmd
            mov       byte_cnt,#8           ; if stuffing marks then no skip stop
            clr       skip_stop
            sjmp      send_stop_bit

no_stop_bit:
            jb        mnp_mode,send_stop_bit
            jb        tx_flow,send_stop_bit
            mov       byte_cnt,#08
            mov       a,icounth             ; check if we are a char behind
            jnz       del_it                              ; in the receive buffer
            mov       a,icountl
            cjne      a,#2,$+3
            jnc       del_it
            jmp       send_stop_bit
del_it:
            call      mnpget
            jc        chk_int_cnt

            dec       byte_cnt              ; count it
            jmp       got_char

done:
            jnb       energy_det,no_count
            inc       cd_duty
no_count:
            pop       psw
            pop       acc
            call      clock
            reti


$EJECT
;**************************************************
;
;
; NAME                SEND_1224_DATA
; PURPOSE  Encode Serial Input Data
; SOURCE   D or A Command to Supervisor
;
;**************************************************

send_1224_data:
            call      get_x_spkr
;           mov       a,x_spkr
            jnb       acc.1,$+6
            lcall     speaker_on

            %get_extrn(amp_xm)
            jnz       not_direct
```

```
        %get_extrn(amp_xn)
        cjne    a,#4,$+3
        jc      $+5
        ljmp    fast_train
not_direct:

;***    setup break variables
        clr     a
        mov     out_0,a
        mov     zero_cnt,a
        mov     nul_cnt,a
        mov     break_cnt,#23                   ; send 23 zeros
        clr     break_det
        clr     break_done
        clr     in_break
        clr     keypress
        clr     disco_pending

        setb    sync_async
        clr     mnp_mode
        clr     fsk
        call    init_mnp            ;**
        mov     dptr,#amp_xm
        movx    a,@dptr
        jz      no_mnp
;;      call    init_mnp
        setb    mnp_mode
        clr     brokenf
        clr     dle2
        clr     a
        mov     rxptr,a
        mov     r_crc_l,a
        mov     r_crc_h,a
        mov     t_crc_l,a
        mov     t_crc_h,a
        mov     rcountl,a
        mov     rcounth,a
        mov     bframe,a
        mov     cframe,a
        mov     inpl,a                          ; first receive byte goes into 800h
        mov     inph,#08h
        mov     dptr,#baseptr                   ; base of current recv block
        movx    @dptr,a
        inc     dptr
        mov     a,#08h
        movx    @dptr,a
        setb    sync_async
        mov     p2,#01                          ; mnp variable page

no_mnp:
        clr     tx_flow             ; check for TX flow control
        %get_extrn(amp_xh)          ; if there is then don't delete
```

```
        jz      noflow                          ; stop bits
        setb    tx_flow
noflow:

        mov     IP,#00000000b
        mov     tx_data,#10001111b      ; init to marks
        mov     tr,#0ffh
        mov     bpars,#00

        mov     int_cnt,#02             ; make sure sending data
        mov     out_cnt,#02             ; outcnt will be 4,8 or 32 but want to
                                                ; get ahead of the transmitter
        mov     byte_cnt,#08                    ; bytes before can skip stop

        call    init_serial

        mov     low_flags,#00                   ; reset flags
        mov     bit_cnt,#00

        setb    recv_off
        clr     retraining
        clr     mark_test
        setb    just_marks              ; during training only send marks
        mov     cd_count,#00
        clr     cd_false
        clr     in_cmd

; Went off hook, setup filters, and waited two seconds before
; entering this routine

        mov     a,#14                           ; check merc mode s14.1
        call    get_s
        jnb     acc.1,chk_alb

        call    set_mercury

        clr     ea
        mov     vectorl,#low ls_int
        mov     vectorh,#high ls_int
        mov     IE,#10000100b                   ; no serial ints. yet

        jnb     orig,start_back

        call    on_hook                         ; production test
        mov     out_cnt,#08

        %send_tx(go_bc_3)

        setb    ok_2send
        jnb     first_data,$
        mov     out_cnt,#48
```

```
        jnb     ri,$
        jmp     call_over

start_back:
        %wait5(4)                       ; wait 20 ms for the AGC

        %send_tx(rcv_bc3)

        jnb     ri,$
        jmp     call_over

chk_alb:
        mov     a,#16                           ; check analog loopback
        call    get_s
        jnb     acc.0,reset_alb
        setb    alb_pin
        sjmp    setup_portb
reset_alb:
        clr     alb_pin
setup_portb:
        call    portb_out

        mov     a,#7                            ; wait S7 seconds for carrier
        call    get_s
        clr     ea
        mov     ticks,#120              ; set secs to call timeout
        mov     time50,#20
        mov     secs,a
        setb    ea

        jb      alb_pin,wait_for_speed
        jnb     orig,wait_for_speed     ; don't do answer tone detect
        jnb     trans_on,wait_for_speed ; if C0 don't do answer tone detect

;***************************************************
;
;
;       Originate Mode Area
;       Wait for valid answer tone, doing call progress, depending on X reg.
;       setting. After getting answer tone, wait for S9 continuous ans tone
;       or S7 timeout.

try_ans:
        clr     b.0                             ;not doing '@' command
        call    callprog
        jnc     wait_s9                         ;jump if we got ans tone
        mov     b,a                             ;result code
        jmp     break2

wait_s9:
        call    set_courier             ; set filters to custom chip
        call    dtmf_off                ; to filter 1800 Hz
```

```
        clr     oa_pin
        call    portb_out

        mov     a,#9                          ;wait for S9 continuous ans tone
        call    get_s
        jz      got_anstone
        mov     timerc,acc          ;timerc will be count down timer
        sjmp    dec_timer
anstone_loop:
        call    getfreq
        jnc     reset_s9            ;jump if we start s9 period over again
        call    dsr_on
                                              ;Here we got ans tone.
dec_timer:
        djnz    timerc,tmo_chk
got_anstone:                                  ;here ans tone was valid
        sjmp    wait_for_speed
reset_s9:
        mov     a,#9                          ;reset ans tone timeout
        call    get_s
        mov     timerc,a
tmo_chk:
        call    chk_timeout
        jnc     anstone_loop
time_out:
        clr     a
        %set_extrn(sreg+20)
        jmp     break_nocarr

;*************************************************

wait_for_speed:

        mov     cd_count,#0                   ; reset after answer tone detect
        clr     cd_false

        call    set_courier
        call    dtmf_off

        mov     c,orig                        ;set filters
        cpl     c                             ;to approp. mode.
        mov     oa_pin,c
        call    portb_out

        %wait5(4)

        mov     a,th1
        cjne    a,#0C0h,$+3                   ; < 1200 baud?
        jnc     chk_12
        jnb     trans_on,goto_300
        jnb     alb_pin,chk_ans
goto_300:
```

```
            %get_extrn(amp_xn)
            jz          go3
            cjne        a,#1,chk_12
go3:
            jmp         baud_300
chk_ans:
            jb          orig,goto_300
            sjmp        send_speed
chk_12:
            cjne        a,#0E0h,$+3                     ; < 2400 baud ?
            jnc         set_24
            clr         baud_24
            sjmp        send_speed
set_24:
            setb        baud_24

;*********** check ampersand N-----n1=300,n2=1200,n3=2400
send_speed:
            jnb         orig,init_vars
            %get_extrn(amp_xn)
            jz          init_vars
            djnz        acc,chk_amp12
            jmp         baud_300
chk_amp12:
            djnz        acc,chk_amp24
            clr         baud_24
            sjmp        init_vars
chk_amp24:
            djnz        acc,init_vars
            setb        baud_24
init_vars:
            clr         ea
            clr         ok_2send
            setb        just_marks
            setb        recv_off
            mov         vectorl,#low ls_int
            mov         vectorh,#high ls_int
            mov         IE,#10000100b                   ; no serial ints. yet

            jb          orig,start_training

            %send_tx(answer)

            %send_tx(go_1200)               ; 1200 for both 12 and 2400 baud

            %send_tx(clr_scramble)

            jmp         answer_mode

;****************************************************
;
;
;           ORIGINATE MODE TRAINING SEQUENCE
```

```
;
;***********************************************
;
start_training:
;****** send 1200 baud for both 1200 and 2400 baud

        jb      trans_on,setup_tx       ; check C0

        jnb     alb_pin,e_a_t                   ; if analog loopback just wait till
wait_on_it:                             ; key hit or timeout
        call    chk_timeout
        jnc     wait_on_it
        jmp     call_over

e_a_t:
        call    chk_timeout
        jnc     freq2
        jmp     call_over
freq2:
        jb      energy_det,e_a_t        ; wait till energy detect pin goes low
        call    get_freq50              ; get the frequency divided by 50
        jc      e_a_t
        cjne    a,#50,$+3               ; freq between 2300 and 2500 hz
        jnc     e_a_t
        cjne    a,#46,$+3
        jc      e_a_t

        %wait5(3)                       ; let agc settle
        %send_tx(agc_narrow)
        jb      baud_24,start_24
        %send_tx(rcv_orig12)
        jmp     turn_on_data
start_24:
        %send_tx(rcv_orig24)
        jmp     turn_on_data

;---------- Start Standard Training Sequence
setup_tx:
        %send_tx(go_1200)

        jb      baud_24,dont_scram
        mov     tx_cmd,#set_scramble    ; send scramble command
        sjmp    send_scram
dont_scram:
        mov     tx_cmd,#clr_scramble
send_scram:
        setb    out_cmd
        jb      out_cmd,$               ; wait for scramble to be sent

        jnb     retraining,send_mode
        mov     out_cnt,#08
        setb    send_1100
        sjmp    for_100ms
```

```
send_mode:
        %send_tx(originate)

        jnb     baud_24,no_dibit
        setb    send_1100
no_dibit:
        %send_tx(start_nofilter)   ; send start command

        setb    ok_2send

        jnb     baud_24,snd_marks       ; if 1200 send scrambled marks

for_100ms:
        clr     ea
        mov     timer_tics,#12
        mov     timer5,#20              ; send 1100 for 100ms
        clr     flag5
        setb    timer_on
        setb    ea

        jb      retraining,wait_it_out
        jnb     first_data,$            ; get ahead of the TX data
        mov     out_cnt,#08
wait_it_out:
        jnb     flag5,$
        clr     timer_on
        clr     send_1100               ; end 1100

        %send_tx(set_scramble)          ; send scrambled marks

        jnb     retraining,start_recv

        %send_tx(agc_wide)      ; send stop command
        %wait5(3)               ; let agc settle
        %send_tx(agc_narrow)

        jb      orig,send_1100orig

        %send_tx(rcv_ans_1100)
        sjmp    set_timeout
send_1100orig:
        %send_tx(rcv_orig_1100)
set_timeout:
        mov     a,#240                          ; 1.2 second wait for 1100 timeout
        sjmp    wait_for_dibit

snd_marks:
        jnb     first_data,$
        mov     out_cnt,#08             ; two baud times of data are sent

;******* Send receiver commands
start_recv:
```

```
        jnb     alb_pin,send_1100_orig  ; start recvr on answer tone
        %wait5(4)                       ; let AGC settle

        %send_tx(agc_narrow)

        %send_tx(rcv_ans12)

        %wait5(26)                      ; take up 150ms
        jmp     finish_it

send_1100_orig:
; begin 1100 check on the answer tone so we're sure not to miss the 1100
        %send_tx(rcv_orig_1100)

get_end_at:
        mov     a,secs
        add     a,#-6                   ; six seconds for answer tone to
        jnb     acc.7,no_flow           ; end if still there then 300 baud
        clr     a
no_flow:
        mov     r1,a                    ; r1 is the threshold
; wait for the end of the answer tone
end_at:
        call    chk_timeout
        jnc     chk_300_fallback
no_fallback:
        jmp     call_over
chk_300_fallback:
        mov     a,r1
        cjne    a,secs,freq
        %send_tx(stop)

        %send_tx(rcv_stop)

        %get_extrn(amp_xn)              ; not n1, if other than n0 hang up
        jnz     no_fallback

        jmp     baud_300
freq:
        jbc     in_cmd,setup_1100_timeout
        jb      energy_det,end_at
        call    get_freq50
        jc      end_at
        cjne    a,#46,$+3               ; frequency above 2300 hz
        jc      end_at
        cjne    a,#51,$+3
        jnc     end_at
        jnb     baud_24,start_recvr

        %send_tx(agc_narrow)

        mov     a,#25
```

```
wait_for_dibit:
        clr     ea
        mov     timer_tics,#12
        mov     timer5,a                ; wait 125 ms for 1100 detect
        clr     flag5
        setb    timer_on
        setb    ea

        jb      out_cmd,$

wait_1100:
        jbc     in_cmd,setup_1100_timeout
        call    chk_timeout
        jnc     chk_time
        jmp     call_over
chk_time:
        jnb     flag5,wait_1100
        jnb     retraining,end_at_1200
        jmp     start_training
;***** Didn't find 1100 redo retrain sequence
end_at_1200:
        %wait5(29)                      ; 270ms total timeout time
        clr     baud_24
        sjmp    start_recvr

setup_1100_timeout:
                                        ; wait for end of 1100
                                        ; wait for no 1100s for 20ms
        clr     ea
        mov     timer_tics,#12
        mov     timer5,#4
        clr     flag5
        setb    timer_on
        setb    ea

wait_1100_end:
        jnb     cd_false,timout_chk     ; see if carrier lost
        call    loss_of_carrier
        jnb     disco_pending,timout_chk
        jmp     update_timers
timout_chk:
        call    chk_timeout
        jnc     chk_in_1100
        clr     timer_on
        jmp     call_over
chk_in_1100:
        jbc     in_cmd,setup_1100_timeout; got a 1100 so reset timer
        jnb     flag5,wait_1100_end
        clr     timer_on

start_recvr:
        %send_tx(agc_narrow)
```

```
        jb          orig,send_orig          ; retrain test
        %send_tx(rcv_ans12)
        sjmp        finish_it
send_orig:
        %send_tx(rcv_orig12)

        jnb         baud_24,finish_12

finish_it:
        jnb         baud_24,finish_12
        %wait5(80)                          ; wait 450ms (400 now plus misc
                                                    ; 1100 time from before)

        %send_tx(rcv_go24)

        %wait5(30)                          ; wait 150ms

        %send_tx(go_2400)

wait_for_int_cnt:                           ; now at 2400 baud must send data
        mov         a,int_cnt               ; every 4 ints
        cjne        a,#8,wait_for_int_cnt   ; wait till data just sent out
        clr         ea
        mov         int_cnt,#4
        mov         out_cnt,#4
        setb        ea

        %wait5(40)                          ; wait 200ms

        sjmp        turn_on_data

finish_12:
        call        test_marks
        jnc         training_end
        sjmp        finish_12

training_end:
        %wait5(97)                          ; wait 750ms (take into account
                                                    ; the marks test)

;************* Check the speaker
turn_on_data:

        jnb         retraining,chk_spkr
        call        retrain_done
        clr         ea
        clr         retraining
        jb          sync_async,no_sync_init
        call        sync_init
no_sync_init:
        setb        ea
        jmp         wait_end
```

```
chk_spkr:
        call    setup_plus
        call    get_x_spkr
;       mov     a,x_spkr
        anl     a,#0fh
        cjne    a,#02,squelch
        sjmp    send_port
squelch:
        setb    spkr_pin
send_port:
        clr     ea
        call    porta_out
        mov     parse_cnt,#00
        setb    ea

        jb      clock_mode,connect_msg
        mov     dptr,#seconds
        clr     a
        clr     ea
        movx    @dptr,a                         ; seconds = 0
        inc     dptr
        movx    @dptr,a                         ; minutes = 0
        inc     dptr
        movx    @dptr,a                         ; hours = 0
        setb    clock_on
        setb    ea

connect_msg:
        call    clear_ld_strings
;-------------------------------------------
        mov     cd_count,#00
        clr     cd_false
;-------------------------------------------
        jnb     mnp_mode,print_it
        call    retrain_done
;       mov     secs,#00
        jmp     test_mnp
print_it:
        jnb     fsk,chk_con24
        mov     a,#1
        call    respond
        %get_extrn(amp_xb)
        jnz     setup_cd
        mov     th1,#-192
        sjmp    setup_cd
chk_con24:
        jb      baud_24,connect_24
        mov     a,#5
        call    respond
        %get_extrn(amp_xb)      ; fixed baud rate check
        jnz     setup_cd
        mov     th1,#-48        ; UART to 1200 baud
```

```
        clr     tx_flow                 ; same rate as link so can delete stop bits
        sjmp    setup_cd
connect_24:
        mov     a,#10
        call    respond
        %get_extrn(amp_xb)      ; fixed baud rate check
        jnz     setup_cd
        clr     tx_flow
        mov     th1,#-24        ; setup UART to 2400 baud

setup_cd:
        clr     mnp_mode
        call    assert_cd       ; assert CD and setup on line echo
        clr     keypress
        jnb     fsk,chk_marks
        call    enable_recv
        clr     just_marks
        mov     secs,#0
        sjmp    wait_end
chk_marks:
        call    retrain_done            ; turn on the data
        mov     secs,#00
        %get_extrn(sreg+16)
        jnb     acc.2,wait_end
        %wait5(80)              ; make sure other end done training
;---------------------------------------------------------------
; *** parse any input data and wait for +++ to end

wait_end:
        jnb     mnp_mode,chk_for_plus
        jmp     update_timers
chk_for_plus:
        clr     ea
        jnb     flag50,chk_dtr
        clr     a
        xch     a,plus_cnt
        cjne    a,#03,chk_dtr           ; got s12 timeout and 3 plusses
        setb    ea
        jmp     chk_cmd_mode            ; see if online command mode
chk_dtr:
        setb    ea
        lcall   test_pattern
        jnb     disco_pending,chk_dtr1
        clr     a
        jmp     call_over
chk_dtr1:
        jb      at_dtr,dtr_there
        mov     a,#1
        jmp     call_over
dtr_there:
        call    update_timers
        jnb     disco_pending,chk_for_retrain
```

```
        mov     a,#04                   ; inactivity timeout
        jmp     call_over
chk_for_retrain:
        jbc     in_cmd,retrain_in ; look for 0 to 1 trans on ALB switch

        %IF (%RACK) THEN (
        jnb     alb_pin,no_alb_switch
        mov     a,rack_z1
        jb      acc.2,no_alb_switch
        mov     a,rack
        jnb     acc.2,no_alb_switch
        %get_extrn(sreg+16)
        anl     a,#0feh                         ; clear ALB bit
        %set_extrn(sreg+16)
        clr     a
        jmp     call_over
no_alb_switch:
        jb      fsk,no_rdl
        jb      alb_pin,no_rdl
        mov     a,rack_z1
        xrl     a,rack
        jnb     acc.0,no_rdl            ; RDL switch changed
        jmp     rdl_code
no_rdl:
        ) FI

        jnb     cd_false,wait_end
        call    loss_of_carrier
        jmp     wait_end

;-----------------------------------------------------------------
;***************** must be a retrain command
retrain_in:
        jnb     ls_pin,wait_end
        jb      alb_pin,wait_end        ; no retrains in analog loopback
        jnb     trans_on,wait_end       ; if C0 no retrains
        jnb     baud_24,restart_recvr
        setb    recv_off                ; turn off all data
        setb    just_marks
        setb    retraining

        mov     dptr,#ld_retrains       ; count it
        call    inc_ld_string

        mov     a,recv_cmd

        cjne    a,#dibit_detect,chk_bad_qual
;**** remote end initiated the retrain so go through answer mode
;**** training sequence.
        jmp     got_1100

chk_bad_qual:
```

```
        cjne        a,#poor_quality,wait_end_jmp
        jmp         start_training

restart_recvr:                                  ; if 1200 baud then just restart
        jb          orig,restart_orig
        %send_tx(rcv_stop)      ; send stop command
        %wait5(3)               ; let agc settle
        %send_tx(agc_narrow)
        setb        timer_on    ; enable +++
        %send_tx(rcv_ans12)
wait_end_jmp:
        jmp         wait_end

restart_orig:
        %send_tx(rcv_stop)      ; send stop command
        %wait5(3)               ; let agc settle
        %send_tx(agc_narrow)
        setb        timer_on    ; enable +++
        %send_tx(rcv_orig12)
        jmp         wait_end

;---------------------------------------------------------------

normal:                                         ; called by MNP code for either mercury
                                                ; or courier mode. Checks for end of call.


        jb          ls_pin,$+6
        ljmp        update_timers

        %get_extrn(sreg+16)
        jnb         acc.2,normal_courier
        call        test_pattern

normal_courier:
        jbc         in_cmd,retrain_in
        jnb         cd_false,check_plus
        call        loss_of_carrier
check_plus:
        clr         ea
        jnb         flag50,chk_dtr2
        clr         a
        xch         a,plus_cnt
        cjne        a,#03,chk_dtr2          ; got s12 timeout and 3 plusses
        setb        ea
        mov         a,#2
        jmp         call_over
chk_dtr2:
        setb        ea
        jb          at_dtr,go_back
        mov         a,#1
```

```
         jmp       call_over
go_back:

         %IF (%RACK) THEN (    ; check rack switch for end of ALB
         jnb       alb_pin,alb_switch
         mov       a,rack_z1
         jb        acc.2,alb_switch
         mov       a,rack
         jnb       acc.2,alb_switch
         %get_extrn(sreg+16)
         anl       a,#0feh                        ; clear ALB bit
         %set_extrn(sreg+16)
         mov       a,#9
         jmp       call_over
alb_switch:
         ) FI

         jmp       update_timers

;----------------------------------------------------------------
chk_cmd_mode:                              ; got +++ see if online cmd mode

         setb      recv_off
         setb      just_marks
         mov       parse_cnt,#00           ; forget any chars being parsed

         mov       dptr,#sreg+14           ; chk S14 bit 0
         movx      a,@dptr
         jnb       acc.0,go_cmd_mode
         mov       a,#2
         sjmp      call_over
go_cmd_mode:
         jnb       fsk,wait_out
         clr       out_data
         mov       int_cnt,#1
         mov       bpars,#0
         sjmp      clr_ints

wait_out:
         mov       a,out_cnt
         cjne      a,int_cnt,wait_out; wait till data sent out

clr_ints:
         clr       ea
         clr       es                      ; make sure no serial ints happen
         setb      ti
         clr       ri
         mov       vectorl,#low trans_int
         mov       vectorh,#high trans_int
         mov       rvalue,#8fh  ; send marks every TX int
         setb      ea
```

```
        mov     c,cmd_echo          ; setup E0 or E1 for commands
        mov     echo_pin,c
        setb    TXD                 ; clear a break
        clr     a
        call    respond
        jmp     getat

;----------------------------------------------------------------

call_over:

        %set_extrn(sreg+20)     ; disconnect reason in the ACC

        %send_tx(stop)                  ; send stop command

        %send_tx(rcv_stop)      ; send stop command

        %IF(%U101) THEN (
        %send_tx(tone0)
        ) FI

        clr     ok_2send

break_nocarr:
        clr     ea
        mov     sp,#stack_start-1
        setb    ea
        mov     b,#3                        ;send NO CARRIER

break2:
        jb      clock_mode,no_stop
        clr     clock_on
no_stop:
        clr     ea
        mov     vectorl,#low trans_int
        mov     vectorh,#high trans_int
        clr     es
        setb    ea
        setb    ti

        call    on_hook
        call    arq_off

        mov     a,#30                       ; wait for the ring indicate
        call    wait5                       ; chip to settle out

        call    get_x_spkr
;       mov     a,x_spkr            ; turn off the speaker in case
        anl     a,#0fh                      ; the training sequence was aborted
        cjne    a,#2,shut_off
        sjmp    chk_merc_mode
shut_off:
```

```
        setb    spkr_pin
chk_merc_mode:
        setb    cdet_pin
        clr     cts_pin
;;      setb    ls_pin
;*********************
;       call    check_for_9600
;       cpl     c
;       mov     ls_pin,c
;*********************

        call    porta_out
        call    dsr_off

        %wait5(2)               ; wait 10ms so any characters
                                ; can finish being sent
;;      mov     t50reload,#10
        mov     p2,#00          ; setup for inputting ATs
        clr     mnp_mode
        setb    TXD             ; clear break

        %IF (%RACK) THEN (
        orl     rack_z1,#05     ; if alb switch still set then recycle
        ) FI

        jmp     update_ports

;------------------------------------------------------------
return_online:
        jnb     fsk,return_1224
        clr     ea
        mov     rvalue,#0ffh
        mov     vectorl,#low ls_300int
        mov     vectorh,#high ls_300int
        sjmp    common_ret

return_1224:
        mov     int_cnt,#2
        clr     ea
        mov     rvalue,#0ffh
        mov     vectorl,#low ls_int
        mov     vectorh,#high ls_int
common_ret:
        setb    ok_2send
        setb    sync_async
        setb    ea
        jmp     print_it

;------------------------------------------------------------
; RDL code for when the switch is moved
; Initiate RDL:
;       1. Send unscrambled marks
```

```
;            2. Wait for receipt of at least 231 ms of unscrambled 1010
;            3. Wait for same amount of no 1010
;            4. RDL is on
;
; End RDL:
;            1. Send 77ms of silence
;            2. Return ( then retrain )
;
%IF (%RACK) THEN (
rdl_code:
            mov         a,rack
            jnb         acc.0,init_rdl
            jmp         rdl_end
init_rdl:
            anl         rack_z1,#0feh                   ; go into RDL

            setb        recv_off
            setb        just_marks
            mov         dibit_cnt,#0
            %send_tx(clr_scramble)          ; send unscrambled marks until recv

response_wait:
            mov         a,rack
            jnb         acc.0,no_give_up
            %send_tx(set_scramble)
            clr         recv_off
            clr         just_marks
            orl         rack_z1,#01h
            jmp         wait_end
no_give_up:
            clr         ea
            jnb         flag50,chk_dibit
            clr         a
            xch         a,plus_cnt
            cjne        a,#03,chk_dibit          ; got s12 timeout and 3 plusses
            setb        ea
            %send_tx(set_scramble)
            orl         rack_z1,#01
            jmp         chk_cmd_mode             ; see if online command mode
chk_dibit:
            mov         a,dibit_cnt
            jb          baud_24,limit_24
            cjne        a,#68,$+3
            jnc         got_response
            sjmp        dtr
limit_24:
            cjne        a,#136,$+3
            jnc         got_response
dtr:
            jb          at_dtr,chk_car
            mov         a,#1
            jmp         call_over
```

```
chk_car:
            jnb         cd_false,response_wait
            call        loss_of_carrier
            jmp         response_wait

got_response:
            %send_tx(set_scramble)

; wait till dibit_cnt drops to 0 then we are in RDL
dtr_drop:
            jb          at_dtr,check_car
            mov         a,#1
            jmp         call_over
check_car:
            jnb         cd_false,chkplus
            call        loss_of_carrier
chkplus:
            clr         ea
            jnb         flag50,check_zero
            clr         a
            xch         a,plus_cnt
            cjne        a,#03,check_zero        ; got s12 timeout and 3 plusses
            setb        ea
            orl         rack_z1,#01
            jmp         chk_cmd_mode                    ; see if online command mode
check_zero:
            clr         a
            cjne        a,dibit_cnt,dtr_drop
            clr         just_marks
            clr         recv_off
            jmp         wait_end

rdl_end:
            %send_tx(stop)
            %wait5(16)                          ; wait 80ms
            jmp         wait_end
            ) FI

;*****************************************************
;
;
;           ANSWER MODE TRAINING SEQUENCE
;
;*****************************************************
answer_mode:
            %get_extrn(amp_xn)                          ; check &n1 analog loop
            djnz        acc,check_c0
            jnb         alb_pin,check_c0
            jmp         baud_300

check_c0:
            jb          trans_on,chk_dsr
```

```
        jnb       alb_pin,check_x_n          ; C0 answer mode code
        jmp       wait_on_it

;------------------------- C0 answer mode code
check_x_n:                                   ; check &n for what baud rate
        %get_extrn(amp_xn)                   ; to train up at
        jz        wait_till_energy
        djnz      acc,chk_2
        jmp       baud_300
chk_2:
        djnz      acc,chk_3
        clr       baud_24
        sjmp      wait_till_energy
chk_3:
        setb      baud_24

wait_till_energy:
        jb        energy_det,look_time
        call      get_freq50
        jc        look_time
        cjne      a,#28,$+3                  ; freq beteen 1100 and 1400 Hz
        jc        start_c0
look_time:
        call      chk_timeout
        jnc       wait_till_energy
        jmp       call_over
start_c0:
        cjne      a,#22,$+3
        jc        look_time

        %send_tx(agc_narrow)
        %wait5(3)
        jb        baud_24,start24
        %send_tx(rcv_ans12)
        jmp       turn_on_data
start24:
        %send_tx(rcv_ans24)
        jmp       turn_on_data

;-------------- Standard answer mode code
chk_dsr:
        %get_extrn(bell_ans)
        jb        acc.0,send_2225
        %send_tx(t_s_2100hz)
        clr       ea
        mov       timer_tics,#12
        mov       timer5,#10
        mov       timer50,#66                ; 3.3 seconds
        clr       flag50
        setb      timer_on
        setb      ea
```

```
chk_keyhit:
        call    chk_timeout
        jnc     check_timer
        jmp     call_over
check_timer:
        jnb     flag50,chk_keyhit
        clr     timer_on

        %send_tx(stop)

        %wait5(15)                      ; 75 ms delay

;       send_tx(go_1200)                ; no_scramble already sent

;       send_tx(clr_scramble)

;       send_tx(answer)

;       mov     int_cnt,#2
;       mov     out_cnt,#2
;       clr     send_1100
;       clr     first_data
;       setb    recv_off
;       setb    just_marks

;       send_tx(start)

;       setb    ok_2send

;       jnb     first_data,$
;       mov     out_cnt,#08

        %send_tx(t_s_2250hz)
        jmp     dsr

        %IF(%U101) THEN (
        %send_tx(tone1)
        ) FI

send_2225:
        %send_tx(t_s_2225hz)            ; begin sending answer tone

dsr:
        jnb     alb_pin,check_n1

        %wait5(120)                     ; in ALB send answer tone for 400ms

        jmp     end_tone

check_n1:
        call    dsr_on
        %get_extrn(amp_xn)
```

```
            cjne      a,#1,check_for_energy
            jmp       wait_for_1270
check_for_energy:                            ; wait for enegy detect or timeout
            jb        energy_det,look_at_time
            call      get_freq50
            jc        look_at_time
            cjne      a,#27,$+3              ; freq beteen 1100 and 1250 Hz
            jnc       look_at_time
            cjne      a,#18,$+3
            jnc       got_energy
look_at_time:
            call      chk_timeout
            jnc       check_for_energy
            jmp       call_over

got_energy:
            %send_tx(agc_narrow)
                                                       ; AGC settle during energy detect

            clr       cd_false               ; reset cd because just got energy
            mov       cd_count,#00

            %send_tx(rcv_ans_1100)           ; check for 1100 for 115ms

            clr       ea
            mov       timer_tics,#12
            mov       timer5,#19             ; 1100 timeout is 95ms
            clr       flag5
            setb      timer_on
            setb      ea

wait_for_1100:
            jbc       in_cmd,got_1100
            call      chk_timeout
            jnc       check_1100_timeout
            jmp       call_over
check_1100_timeout:
            jnb       flag5,wait_for_1100
            clr       baud_24                          ; didn't get 1100 so go with 1200
                                                       ; baud training sequence

;**** didn't get 1100 if amp_n3 then abort
            %get_extrn(amp_xn)
            cjne      a,#3,go1200
            clr       a
            jmp       call_over
go1200:
            jmp       answer_1200

got_1100:                                    ; wait for end of 1100
                                                       ; wait for no 1100s for 20ms
            setb      baud_24
```

```
            clr         ea
            mov         timer_tics,#12
            mov         timer5,#4
            clr         flag5
            setb        timer_on
            setb        ea

wait_for_1100_end:
            jnb         cd_false,check_time      ; check loss of carrier
            call        loss_of_carrier
            jnb         disco_pending,check_time
            jmp         update_timers
check_time:
            call        chk_timeout              ; if retraining just checks DTR
            jnc         see_1100
            clr         timer_on
            jmp         call_over
see_1100:
            jbc         in_cmd,got_1100                   ; got a 1100 so reset timer
            jnb         flag5,wait_for_1100_end
            clr         timer_on

            jb          retraining,answer_1200
            %get_extrn(amp_xn)                   ; got 1100 so check n0 or n3
            jz          answer_1200
;           cjne        a,#1,chk_n2
;           jmp         wait_for_1270
chk_n2:
            cjne        a,#2,answer_1200         ; got amp n3 so ok
            clr         baud_24

answer_1200:                                              ; common to 12 & 24
            jnb         retraining,chk_speed

;*********** if retraing then have to re-setup the tx
            %send_tx(agc_wide)      ; send stop command
            %wait5(3)               ; let agc settle
            %send_tx(agc_narrow)

            jb          orig,send_orig12

            %send_tx(rcv_ans12)
            sjmp        init_scramble

send_orig12:
            %send_tx(rcv_orig12)

init_scramble:
            %send_tx(clr_scramble)

            %send_tx(go_1200)
```

```
wait_data_sent:
        mov     a,int_cnt
        cjne    a,#04,wait_data_sent
        clr     ea
        mov     int_cnt,#08
        mov     out_cnt,#08
        setb    ea

        setb    send_1100
        sjmp    send_100ms

chk_speed:
        %send_tx(agc_narrow)

end_tone:
        jb      baud_24,end_ans_tone
        %get_extrn(amp_xn)
        cjne    a,#3,alb_1200
        setb    baud_24
        sjmp    end_ans_tone

alb_1200:
        clr     baud_24
        jmp     send_smarks             ; if 1200 baud send scrambled marks

end_ans_tone:
        %get_extrn(amp_xn)
        jz      alb_2400
        cjne    a,#3,alb_1200
alb_2400:
        %send_tx(rcv_ans12)
        %send_tx(stop)                          ; stop sending answer tone


                                                ; already sent answer,clr_scramble
                                                ; and 1200 baud to the tx
        setb    send_1100
        %send_tx(start_nofilter)

send_100ms:
        setb    ok_2send
        clr     ea
        mov     timer_tics,#12
        mov     timer5,#20              ; send 1100 for 100ms
        clr     flag5
        setb    timer_on
        setb    ea

        jb      retraining,end_1100
        jnb     first_data,$            ; wait to first data sent
        mov     out_cnt,#8
```

```
end_1100:
        jnb     flag5,$                 ; finish 1100 and send scrambled
        clr     timer_on                ; marks

        clr     send_1100
        %send_tx(set_scramble)

        setb    just_marks
        jnb     alb_pin,wait_350

        %wait5(4)                       ; wait 20ms for AGC

        %send_tx(agc_narrow)
        %send_tx(rcv_orig12)

wait_350:
        %wait5(70)                      ; wait 350ms

        %send_tx(rcv_go24)              ; tell rcvr to go to 16 pts

        %wait5(30)                      ; wait 150ms

        %send_tx(go_2400)               ; transmitter to 2400 baud

wait_int_cnt:
        mov     a,int_cnt               ; setup data for 2400 baud
        cjne    a,#8,wait_int_cnt
        clr     ea
        mov     int_cnt,#4
        mov     out_cnt,#4
        setb    ea

        %wait5(40)                      ; send 2400 marks for 200ms

        clr     in_cmd                  ; blow off any commands coming in
        jmp     turn_on_data

send_smarks:                            ; 1200 baud answer sequence

        jb      alb_pin,end_atone

        %send_tx(rcv_ans12)             ; let the recvr train for next 100ms

        call    getfreq
        cjne    a,#110,$+3
        jnc     check_marks
        cjne    a,#130,$+3
        jc      check_marks
        %send_tx(rcv_stop)
        jmp     check_for_energy

check_marks:
```

```
            call        test_marks
            jnc         end_atone
            %get_extrn(amp_xn)
            jz          go_to_300
            djnz        acc,cant_connect
go_to_300:
            jmp         baud_300
cant_connect:
            clr         a
            jmp         call_over

end_atone:
;           ;get_extrn(amp_xn)
;           cjne        a,#1,endtone
;           jmp         wait_for_1270
endtone:
            %send_tx(stop)                              ; stop sending answer tone
            clr         ok_2send
            clr         first_data
            mov         int_cnt,#2

            %send_tx(set_scramble)

            setb        just_marks
            %send_tx(start_nofilter)

            setb        ok_2send
            jnb         first_data,$
            mov         out_cnt,#08         ; data sent every other baud time

            jnb         alb_pin,see_if_marks

            %wait5(4)                       ; let the AGC settle
            %send_tx(agc_narrow)
            %send_tx(rcv_orig12)

            %wait5(4)                       ; let the recvr fireup

see_if_marks:
            call        test_marks
            jnc         end_training_seq
            sjmp        see_if_marks

end_training_seq:
            %wait5(57)                      ; wait 280 ms
            clr         in_cmd                          ; blow off any commands coming in
            jmp         turn_on_data

;*****************************************************************************
; End of the Training sequences--------various routines follow
;*****************************************************************************
wait_for_1270:
```

```
        mov     r1,#4                           ; must get 4 times in a row
time_chk:
        call    chk_timeout
        jnc     look_1270
        jmp     call_over
look_1270:
        call    getfreq
        cjne    a,#127,wait_for_1270
        djnz    r1,time_chk
        jmp     baud_300


; checks key hit, DTR drop, and S7 timeout
chk_timeout:
        jb      at_dtr,chk_retrain
        mov     a,#1
        sjmp    end_it
chk_retrain:
        jb      retraining,no_end
        mov     a,secs
        jz      end_it
        clr     a                               ; set for S20 disconnect reason
        jb      at_dumb,no_end
        jnb     trans_on,chk_key        ; if C0 then key ends analog loopback
        jb      alb_pin,no_end
chk_key:
        jbc     ri,end_it
no_end:
        clr     c
        ret
end_it:
        setb    c
        ret

;
; Parse the recv data into bytes and insert in TX buffer
;
count_0:
        djnz    out_0,in_parse
        setb    txd                             ; clr the break
get_recv:                               ; parse the input data
        inc     out_0                           ; check for break in progress
        djnz    out_0,count_0
in_parse:
        mov     bits,#04
        inc     bpars
        djnz    bpars,rest_byte                 ; middle of getting recv byte
        cjne    a,#0f0h,get_start       ; check for marks
        setb    c                               ; check break stuff
        call    chk_zero
        ret
get_start:
```

```
            rlc         a
            dec         bits
            call        chk_zero
            jc          get_start
            mov         bpars,#08           ; eight bits to be parsed
rest_byte:
            xch         a,bits
            jz          thats_it
            xch         a,bits
            rlc         a
            call        chk_zero
            xch         a,recv_parse
            rrc         a
            xch         a,recv_parse
            djnz        bpars,chk_end

            jnb         mnp_mode,see_if_nul

            call        putl2                         ; ACC is saved
            djnz        bits,get_new_start
            ret

see_if_nul:
            xch         a,recv_parse        ; send the char
            jnz         send_it
            inc         nul_cnt             ; if zero check for break
            sjmp        no_send
send_it:
            call        putc_int
no_send:
            xch         a,recv_parse
            djnz        bits,get_new_start
            ret
chk_end:
            djnz        bits,rest_byte
            ret
thats_it:
            xch         a,bits
            ret
get_new_start:
            rlc         a
            call        chk_zero
            jnc         got_start
            djnz        bits,get_new_start
            ret
got_start:
            mov         bpars,#08
            djnz        bits,rest_byte
            ret

;************************************************************
;           Check for incoming breaks. (what a mess!!!!)
```

```
;               If nineteen cosecutive zeros detected then
;               send a minimum of 20 bit times of zero to the
;               DTE. If more than 9 but less than 19 zeros then
;               stuff nulls into the out buffer.
;
;               Must save C flag and the ACC
;*******************************************************
chk_zero:
                jb          mnp_mode,no_breaks

                jnc         cnt_0
                inc         nul_cnt                 ; got a one, any nuls to be sent?
                djnz        nul_cnt,send_nuls
clr_cnt:
                mov         zero_cnt,#00
                clr         in_break
no_breaks:
                ret

send_nuls:
                push        acc
                push        psw
                clr         a
send_nul:
                call        putc_int
                djnz        nul_cnt,send_nul
                pop         psw
                pop         acc
                sjmp        clr_cnt

cnt_0:
                inc         zero_cnt
                xch         a,zero_cnt
                push        psw                             ; save carry
                cjne        a,#19,not_break
                pop         psw
                dec         a
                xch         a,zero_cnt              ; limit it to 19
                jb          in_break,chk_more       ; check if four more zeros in
; start the break
                mov         nul_cnt,#00
                mov         out_0,#5                ; send at least 20 zeros
                setb        in_break
                clr         txd                             ; start the break
                ret

chk_more:                                           ; see if bits=1 if so send four
                                                            ; more bits of break
                djnz        bits,no_more0                   ; bits > 1
                inc         out_0
no_more0:
                inc         bits
```

```
        mov     nul_cnt,#00
        ret

not_break:
        pop     psw
        xch     a,zero_cnt
        ret

descr:
        push    7
        push    1
        mov     r7,a
        rl      a
        rl      a
        xrl     a,d16
        mov     r1,a
        mov     a,d16
        mov     c,d17_bit
        rrc     a
        mov     c,acc.3
        mov     d17_bit,c
        xch     a,r1
        rl      a
        rl      a
        xrl     a,r1
        anl     a,#11110000b
        mov     r1,a
        mov     a,d16
        swap    a
        anl     a,#11110000b
        mov     d16,a
        mov     a,d8
        swap    a
        mov     d8,a
        anl     a,#00001111b
        orl     d16,a
        mov     a,d8
        anl     a,#11110000b
        orl     a,r7
        mov     d8,a
        mov     a,r1
        pop     1
        pop     7
        ret

;**************************************************
;               Get the frequency/50
;**************************************************
get_freq50:                             ; get the frequency of CD line
;       mov     p2,#3                   ; divided by 50. Lasts 20ms.
;       mov     r0,#0ffh
```

```
;time_it:
            clr         ea
            setb        freq_pin              ; t0 as input
            clr         et0                              ; disable timer0 overflow
            push        tmod
            mov         tmod,#00100101b                  ; timer0 is counter mode
            mov         th0,#0                           ; reset counter0
            mov         tl0,#0
            setb        tr0                              ; start count

            mov         cd_duty,#0            ; look for energy pin to be low 60
            mov         timer_tics,#12                   ; percent
            mov         timer5,#4
            clr         flag5
            setb        timer_on
            setb        ea

            jnb         flag5,$
            mov         a,cd_duty
            cjne        a,#20,$+3
            cpl         c                                ; c = 1 bad reading
            clr         timer_on

            mov         a,tl0                            ; acc = freq/10
            mov         th0,#0                           ; reset timer
            mov         tl0,#0
            pop         tmod

;           movx        @r0,a
;           djnz        r0,xoj
;           jmp         $
;xoj:
;           jmp         time_it

            ret

;*************************************************
;
;           MARKS TEST----test 80 nybbles for at least
;                       50 percent marks. If OK then C = 0
;                       on return. Test takes 266ms.
;
;*************************************************
test_marks:
            setb        mark_test
            mov         timera,#80   ; 80 nybbles
            mov         timerb,#00
look_timeout:
            call        chk_timeout
            jnc         wait_for_data
            jmp         call_over
wait_for_data:
```

```
        jnb     data_ready,look_timeout
        mov     a,test_data
        clr     data_ready
        cjne    a,#0f0h,not_marks
        inc     timerb
not_marks:
        djnz    timera,look_timeout
        mov     a,timerb
        cjne    a,#40,$+3
        clr     mark_test
        ret


;************************************************
;       Loss Of Carrier detection
;
;       This routine will call get freq S10 times
;       if the frequency is within the limits set
;       for either the low band or the high band
;       then we return and wait for another loss
;       to occur.  If the test fails S10 times
;       then we end the call.
;
;************************************************
Loss_of_carrier:
        jb      alb_pin,passed

        jnb     cdet_pin,get_s10        ; if not online then no loss
                                        ; of carrier
        mov     cd_count,#00
        clr     cd_false
        ret

get_s10:
;       mov     p2,#3
;       mov     r0,#0
        mov     a,#10
        call    get_s
        jnz     chk_no_hangup
        inc     a
chk_no_hangup:
        cjne    a,#0ffh,check_carr

passed:
        jnb     mnp_mode,reset_cd       ; flag for mnp carrier return
        clr     disco_pending
reset_cd:
        mov     cd_count,#00
        clr     cd_false
        jb      retraining,leave_off    ; if retraining don't turn on data
        clr     recv_off
        clr     just_marks
```

```
            setb        timer_on
leave_off:
            ret

check_carr:
            setb        recv_off      ; turn off receive data
            setb        just_marks
            mov         cd_timer,a
chk_freq:
            call        getfreq                    ; lasts 100ms
;           movx        @r0,a
;           inc         r0
            cjne        r4,#3,$+3   ; r4 is number of times energy detect was high
            jnc         failed                     ; sampled 10 times during getfreq
            jb          orig,orig_limits
            cjne        a,#100,$+3  ; recv low band limits
            jc          failed
            cjne        a,#140,$+3
            jnc         failed
            sjmp        passed
orig_limits:
            cjne        a,#230,$+3  ; recv high band limits
            jc          failed
            cjne        a,#245,$+3
            jnc         failed
            sjmp        passed
failed:
            djnz        cd_timer,chk_freq
            mov         a,#3
            jmp         call_over


throwjmp:
            jmp         throw

;
;********************************
;**         Level 2 Framing Code
;********************************
;
putl2:
            push        0
            push        1
            push        2
            push        acc
            push        b
            push        dpl
            push        dph
            mov         timera,recv_parse              ;byte to send
            mov         b,bframe                       ;byte within bframe
            inc         b
```

```
        djnz    b,nbframe0              ;SYN? (bframe 0)
        cjne    timera,#SYN,throwjmp
        inc     bframe
        jmp     mputret

nbframe0:
        djnz    b,nbframe1              ;DLE? (bframe 1)
        cjne    timera,#DLE,nodle1
        inc     bframe
        jmp     mputret

nodle1:
        cjne    timera,#SYN,throwjmp    ;case for SYN, SYN
        jmp     mputret

nbframe1:
        djnz    b,nbframe2              ;STX? (bframe 2)
        cjne    timera,#STX,throwjmp
        inc     bframe

        call    init_ptrs

        mov     r_crc_l,#0              ;reset CRC-16 value to 0
        mov     r_crc_h,#0

        jmp     mputret

nbframe2:
        djnz    b,nbframe3              ;1st DLE? (bframe 3)
        cjne    timera,#DLE,no1dle
        inc     bframe
        jmp     mputret

no1dle:                                         ;here if 1st char not DLE
                                                ;or if 2nd char is a DLE
        call    pcrc_calc
        jmp     mputret

nbframe3:
        djnz    b,nbframe4              ;2nd DLE? (bframe 4)
        cjne    timera,#DLE,no2dle
        dec     bframe
        sjmp    no1dle

no2dle:
        cjne    timera,#ETX,throw1
        inc     bframe
        call    crc_calc
        jmp     mputret

nbframe4:
        djnz    b,nbframe5              ;CRC1? (bframe 5)
```

```
        inc     bframe
        call    pcrc_calc
        jmp     mputret

nbframe5:
        djnz    b,throw                         ;CRC2? (bframe 6)
        call    pcrc_calc

        mov     a,r_crc_l
        jnz     throw1
        mov     a,r_crc_h
        jnz     throw1

;
; CRC is OK for the block, Add new block to the array
;

        call    save_block
        jmp     freset

throw1:
        setb    brokenf
throw:
;
; Repoint maybe data pointer to valid data pointer
; (done on receipt of a STX)

freset:
        mov     bframe,#0                 ;reset frame info

mputret:
        pop     dph
        pop     dpl
        pop     b
        pop     acc
        pop     2
        pop     1
        pop     0
        ret

;
;------------------------
;
init_ptrs:
        clr     ea                              ;MAYBE = serial output head
        mov     r1,#low baseptr
        call    loaddptr
        mov     inpl,dpl
        mov     inph,dph
        setb    ea

        mov     rcountl,#0                ;MAYBE COUNT = 0
```

```
        mov     rcounth,#0
        ret
;
;--------------------------
;
save_block:
        mov     r1,#low baseptr                         ;store pointer l/h
        call    loaddptr

        mov     a,rxptr
        anl     a,#1111b
        rl      a
        rl      a
        mov     r1,a

        mov     a,dpl                   ; store the base and then the count
        movx    @r1,a
        inc     r1
        mov     a,dph
        movx    @r1,a
        inc     r1

        mov     a,rcountl                       ;store count l/h
        movx    @r1,a
        inc     r1
        mov     a,rcounth
        movx    @r1,a

        inc     rxptr                                   ;increment pointer for next time


;
; CRC is OK for the block, move valid data pointer to maybe data pointer
;

save_inptr:
        mov     a,inpl
        mov     r1,#low     baseptr
        movx    @r1,a
        inc     r1
        mov     a,inph
        movx    @r1,a
        ret


;
;--------------------------
;
place:

        mov     dph,inph
        mov     dpl,inpl
```

```
        mov     a,recv_parse                          ;place char in buffer at MAYBE
        movx    @dptr,a
        inc     dptr

        mov     a,dph
        cjne    a,#HIGH TX_BUFEND,mnowrap
        mov     dph,#HIGH TX_BUFSTART
mnowrap:
        mov     inpl,dpl
        mov     inph,dph

        inc     rcountl                               ;increment maybe count
        inc     rcountl
        djnz    rcountl,mnowrap1
        inc     rcounth
mnowrap1:

        ret
;
;--------------------------
;
ctemp1  equ     r0

pcrc_calc:
        call    place
crc_calc:
        mov     a,recv_parse

        xrl     a,r_crc_l
        mov     ctemp1,a
        mov     c,p
        rrc     a
        mov     b,a
        clr     a
        rrc     a
        mov     c,b.7
        xch     a,b
        xrl     a,ctemp1
        rrc     a
        xch     a,b
        rrc     a
        mov     c,b.7
        addc    a,#0
        xrl     a,r_crc_h
        mov     r_crc_l,a
        mov     r_crc_h,b
        ret

loaddptr:
        movx    a,@r1
        mov     dpl,a
        inc     r1
```

```
        movx    a,@r1
        mov     dph,a
        ret

;
;--------------------------
;
mnpget:
        jb      mnp_mode,getmnp
        jmp     get_tx_char
getmnp:

        jb      send_frame,msend
;;      setb    no_data                 ;return with no data to send
        setb    c
        ret

dle2ret:
        mov     a,#dle
        sjmp    getret

cgetret:
        push    acc
        call    tcrc_calc
        pop     acc

getret:
;;      clr     no_data                 ;return with data in ACC and
        clr     c
        pop     b
        pop     dph
        pop     dpl
        pop     1
        pop     0
        ret

msend:
        push    0
        push    1
        push    dpl
        push    dph
        push    b

        jbc     dle2,dle2ret        ;if 2nd DLE

        mov     b,cframe
        inc     b

        djnz    b,ncf0                  ;send SYN
        inc     cframe
        mov     a,#SYN
        jmp     getret
```

```
ncf0:
        djnz    b,ncf1                          ;send DLE
        inc     cframe
        mov     a,#DLE
        jmp     getret

ncf1:
        djnz    b,ncf2                          ;send STX
        inc     cframe
        mov     a,#STX

        mov     t_crc_l,#0          ;clear crc values
        mov     t_crc_h,#0
        mov     cptr,#80h           ;init frame pointer

        jmp     getret

ncf2:
        djnz    b,ncf3                          ;send frame at 1:80h

        mov     b,r1
        mov     r1,cptr
        movx    a,@r1                           ;get the character
        mov     r1,b
        inc     cptr
        djnz    t_hbyte_cnt,nodone
        inc     cframe
nodone:
        cjne    a,#DLE,nodle2
        setb    dle2
nodle2:
        jmp     cgetret

ncf3:
        djnz    b,ncf4                          ;room for LT data send check

        jnb     send_data,nolt                  ;jump if no data to send

        mov     dpl,_tptr_l
        mov     dph,_tptr_h
        movx    a,@dptr
        inc     dptr
        mov     b,a                             ;save char in b

        mov     a,dph
        cjne    a,#high RX_BUFEND,noltwrap
        mov     dph,#high RX_BUFSTART
noltwrap:
        mov     _tptr_l,dpl
        mov     _tptr_h,dph
        mov     a,b                             ;restore char
```

```
        djnz    t_xbyte_cnt,nodone
        inc     cframe
        clr     send_data
        sjmp    nodone

nolt:
        inc     b
        inc     cframe

ncf4:

        djnz    b,ncf5                          ;stop frame DLE
        inc     cframe
        mov     a,#DLE
        jmp     getret

ncf5:
        djnz    b,ncf6                          ;ETX
        inc     cframe
        mov     a,#ETX
        jmp     cgetret

ncf6:
        djnz    b,ncf7                          ;crc1
        inc     cframe
        mov     a,t_crc_l
        jmp     getret

ncf7:
        djnz    b,ncf8                          ;crc2

        mov     cframe,#0
        mov     cptr,#80h
        clr     send_frame

        mov     a,t_crc_h
        jmp     getret

ncf8:

        jmp     $


;
;--------------------------
;
tcrc_calc:
        xrl     a,t_crc_l
        mov     ctemp1,a
        mov     c,p
        rrc     a
        mov     b,a
```

```
        clr     a
        rrc     a
        mov     c,b.7
        xch     a,b
        xrl     a,ctemp1
        rrc     a
        xch     a,b
        rrc     a
        mov     c,b.7
        addc    a,#0
        xrl     a,t_crc_h
        mov     t_crc_l,a
        mov     t_crc_h,b
        ret

;*************************************************************
;       Level 3 MNP receive data parser
;*************************************************************
sync_init:
        clr     ea

        clr     skip_stop
        clr     in_block
        mov     bpars,#0
        clr     sync_async

        mov     parse_cnt,#00
        mov     cframe,#00
        mov     mark5,#00
        clr     stuff_zero
        clr     stuff_it

        setb    ea
        ret

sync_rxchar:
        push    0
        push    1
        push    2
        push    acc
        push    b
        push    dpl
        push    dph

        mov     bits,#04                ; bits to parse
;       call    buf_it
        jnb     in_block,look_startfg
        inc     bpars
        djnz    bpars,parse_rest        ; parseing a char?
init_rchar:                             ; inside a block-- reset parse vars
        mov     recv_parse,#00
        mov     bpars,#08
```

```
        sjmp    parse_rest
look_startfg:
        cjne    a,#0f0h,get_the_0
        jmp     restore
get_the_0:
        rlc     a
        jnc     got_startfg
        djnz    bits,get_the_0
        sjmp    restore                         ; can get here only after
                                                ; getting stop flag of prev block
got_startfg:
        setb    in_block
        mov     mark_cnt,#06
        mov     bpars,#08
        mov     recv_parse,#00
        mov     b,a
        call    init_ptrs
        mov     a,b
        mov     r_crc_l,#0ffh
        mov     r_crc_h,#0ffh
        djnz    bits,parse_rest
        sjmp    restore
parse_rest:
        rlc     a
        jnc     not_stop
        djnz    mark_cnt,save_it        ; stop flag?

; got the stop flag now look to see if valid block

        mov     bpars,#00
        clr     skip_stop               ; forget inserted zero
        clr     in_block
        mov     b,a
        mov     a,rcountl
        orl     a,rcounth               ; zero length block?
        jz      no_save
        mov     a,r_crc_l
        cjne    a,#0f0h,throw_it_out
        mov     a,r_crc_h
        cjne    a,#0b8h,throw_it_out
        call    save_block              ; got a good block
no_save:
        mov     a,b
        djnz    bits,get_the_0                  ; look for new start flag
        sjmp    restore
throw_it_out:
;       call    save_inptr
;       setb    brokenf
        sjmp    no_save

not_stop:
        mov     mark_cnt,#6
```

```
        jbc     skip_stop,count_bits       ; inserted stop bit
save_it:
        djnz    mark_cnt,no_inserted_0     ; got 5 1's ?
        setb    skip_stop
no_inserted_0:
        inc     mark_cnt                   ; restore mark count
        xch     a,recv_parse
        rrc     a
        xch     a,recv_parse
        djnz    bpars,count_bits
        mov     b,a
;       mov     a,recv_parse
;       cjne    a,#78h,not_lock
;       nop
;not_lock:
        call    pcrc
        dec     bits
        mov     a,bits
        jz      restore
        mov     a,b
        jmp     init_rchar
count_bits:
        djnz    bits,parse_rest
restore:
        pop     dph
        pop     dpl
        pop     b
        pop     acc
        pop     2
        pop     1
        pop     0
        ret
;
;--------------------------
;
pcrc:
        push    acc

        mov     a,recv_parse

        xrl     a,r_crc_h
        xch     a,r_crc_l
        mov     r_crc_h,a
        mov     a,r_crc_l
        swap    a
        anl     a,#0f0h
        xrl     a,r_crc_l
        mov     r_crc_l,a
        swap    a
        anl     a,#0fh
        xrl     a,r_crc_h
        mov     r_crc_h,a
```

```
        mov     a,r_crc_l
        swap    a
        rr      a
        anl     a,#0f8h
        xrl     a,r_crc_h
        mov     r_crc_h,a
        mov     a,r_crc_l
        swap    a
        rr      a
        anl     a,#07h
        xrl     a,r_crc_l
        mov     r_crc_l,a

        pop     acc

        call    place

        ret

sync_txchar:
        jnb     out_data,get_achar
        ret
get_achar:
        push    0
        push    1
        push    dpl
        push    dph
        push    b
        mov     bit_cnt,#04
        mov     tx_data,#00
check_newchar:
        mov     a,parse_cnt
        jz      get_new_char
        jmp     finish_parse
get_new_char:
        clr     stuff_zero              ; no zero insertion unless CRC done
        jb      send_frame,check_state
        mov     a,#sync                         ; if not sending frame then send 7E's
        sjmp    parse_begin
check_state:
        mov     b,cframe
        inc     b
        djnz    b,send_ldp              ; if zero then send start flag

        mov     cptr,#80h               ; get LPD header at 1:80h
        mov     t_crc_h,#0ffh
        mov     t_crc_l,#0ffh                   ; init CRC
        inc     cframe
        mov     a,#sync                         ; start flag
        sjmp    parse_begin

send_ldp:
```

```
        djnz    b,send_lt
        mov     b,r1
        mov     r1,cptr
        movx    a,@r1
        inc     cptr
        mov     r1,b
        djnz    t_hbyte_cnt,more_header
        inc     cframe                          ; done with the header
more_header:
        call    crc_ccitt               ; compute the CRC
        sjmp    parse_begin

send_lt:
        djnz    b,send_crc1
        jnb     send_data,no_lt
        mov     dpl,_tptr_l
        mov     dph,_tptr_h
        movx    a,@dptr
        mov     b,a
        inc     dptr
        mov     a,dph
        cjne    a,#high RX_BUFEND,no_wrap
        mov     dph,#high RX_BUFSTART
no_wrap:
        mov     _tptr_l,dpl
        mov     _tptr_h,dph
        mov     a,b
        djnz    t_xbyte_cnt,more_lt
        inc     cframe
        clr     send_data
more_lt:
        call    crc_ccitt
        sjmp    parse_begin

no_lt:
        inc     b
        inc     cframe

send_crc1:
        djnz    b,send_crc2
        inc     cframe
        mov     a,t_crc_h
        cpl     a
        setb    stuff_zero
        sjmp    parse_begin

send_crc2:
        djnz    b,send_end_flag
        inc     cframe
        mov     a,t_crc_l
        cpl     a
```

```
            setb    stuff_zero
            sjmp    parse_begin

send_end_flag:
            mov     a,#sync
            mov     cframe,#0
            clr     send_frame

parse_begin:
            mov     parse_data,a
            mov     parse_cnt,#08
;           cjne    a,#7eh,buffer_it
;           sjmp    finish_parse
;buffer_it:
;           call    buf_it
finish_parse:                                       ; actually parse the nybble
            jnb     stuff_it,no_insert      ; check for zero insertion
            clr     stuff_it
            clr     c
            xch     a,tx_data
            rrc     a
            xch     a,tx_data
            djnz    bit_cnt,no_insert
            sjmp    nybble_done
no_insert:
            xch     a,parse_data
            rrc     a
            xch     a,parse_data
            jnb     stuff_zero,no_stuff
            jnc     no_stuff
            djnz    mark5,put_in_bit        ; check for five in a row
            setb    stuff_it                ; next bit stuff a zero
no_stuff:
            mov     mark5,#5
put_in_bit:
            xch     a,tx_data
            rrc     a
            xch     a,tx_data
            djnz    parse_cnt,count_the_bit
            dec     bit_cnt                         ; not enough to fill the nybble
            mov     a,bit_cnt
            jz      nybble_done
            jmp     check_newchar
nybble_done:
            mov     a,tx_data
            swap    a
            setb    acc.7
            mov     tx_data,a
            setb    out_data
            sjmp    alldone
count_the_bit:
            djnz    bit_cnt,finish_parse
```

```
        sjmp    nybble_done

alldone:
        pop     b
        pop     dph
        pop     dpl
        pop     1
        pop     0
        ret
;
;------------------------
;

crc_ccitt:
        setb    stuff_zero

        push    acc

        xrl     a,t_crc_h
        xch     a,t_crc_l
        mov     t_crc_h,a
        mov     a,t_crc_l
        swap    a
        anl     a,#0f0h
        xrl     a,t_crc_l
        mov     t_crc_l,a
        swap    a
        anl     a,#0fh
        xrl     a,t_crc_h
        mov     t_crc_h,a
        mov     a,t_crc_l
        swap    a
        rr      a
        anl     a,#0f8h
        xrl     a,t_crc_h
        mov     t_crc_h,a
        mov     a,t_crc_l
        swap    a
        rr      a
        anl     a,#07h
        xrl     a,t_crc_l
        mov     t_crc_l,a

        pop     acc
        ret

;
;-------------------------
;
assert_cd:
        clr     ea
        call    cdet_true
```

```
          setb      ea
          mov       cd_count,#00          ; reset carrier detect variables
          clr       cd_false
          jnb       send_full_dup,echo_on
          clr       echo_pin
          sjmp      $+4
echo_on:
          setb      echo_pin
          call      portb_out
          ret

retrain_done:
          clr       just_marks            ; okay to send data
          jnb       baud_24,enable_recv
          jnb       sync_async,enable_recv ; other end is sending syncs

          jb        retraining,get_32marks
          mov       dptr,#amp_xm                    ; if &M4 then tried MNP and
          movx      a,@dptr                         ; failed so no marks test
          jnz       enable_recv           ; ( too late )

;**********************************************
;         Wait for 32 consecutive marks
;**********************************************
get_32marks:
          setb      mark_test
          mov       timera,#00
          setb      timer_on              ; for +++ detect
look_for_end:
          jnb       cdet_pin,chk_plus
          clr       a                               ; setting for S20
          jb        keypress,end_the_call
          inc       a
          jnb       at_dtr,end_the_call
          mov       a,secs
          jnz       check_data
end_the_call:
          clr       mark_test
          clr       retraining
          jmp       call_over
chk_plus:
          clr       ea
          jnb       flag50,check_dtr      ; check for +++
          clr       a
          xch       a,plus_cnt
          cjne      a,#03,check_dtr
          setb      ea
          clr       mark_test
          pop       acc
          pop       acc
          jb        mnp_mode,end5
          jmp       chk_cmd_mode
```

```
end5:
        setb    disco_pending
        jmp     update_timers
check_dtr:
        setb    ea
        mov     a,#1
        jnb     at_dtr,end_the_call
        jnb     cd_false,check_data     ; see if carrier lost
        call    loss_of_carrier
        sjmp    reset_count
check_data:
        jbc     in_cmd,start_new
        jnb     data_ready,look_for_end
        clr     data_ready
        mov     a,test_data
        cjne    a,#0f0h,reset_count
        inc     timera
        cjne    timera,#8,look_for_end
        clr     mark_test
        sjmp    enable_recv
reset_count:
        mov     timera,#00
        sjmp    look_for_end
start_new:
;       mov     a,secs
;       jnz     chk_plus
        clr     mark_test
        pop     acc
        pop     acc
        jmp     retrain_in
                                        ; allowing receive data to pass

enable_recv:
        clr     recv_off
        jb      retraining,$+6
        mov     plus_cnt,#00
        setb    timer_on
        clr     repeat                  ; cancel repeat if connect
        setb    es                      ; start serial ints
        ret

send_2tx:
        mov     tx_cmd,a
        setb    out_cmd
        jb      out_cmd,$
        ret

;*************************************************************
;               300 BAUD TRAINING SEQUENCE
;*************************************************************
baud_300:
        clr     mnp_mode
```

```
            clr         ea
            mov         vectorl,#low ls_300int
            mov         vectorh,#high ls_300int
            mov         IE,#10000100b                      ; no serial ints. yet

            jnb         trans_on,recv_init
            %send_tx(stop)

            %wait5(2)

            jnb         orig,send_ans
            %send_tx(originate)
            sjmp        go300
send_ans:
            %send_tx(answer)
go300:
            %send_tx(go_300)

            clr         out_data
            mov         int_cnt,#1
            mov         out_cnt,#8
            setb        ok_2send
recv_init:
            mov         parse_cnt,#00
            mov         bpars,#0

;****************** 300 baud C0 code
            jb          trans_on,check_mode
            jnb         alb_pin,wait_carrier       ; if analog loopback just wait till
waste_it:                                          ; key hit or timeout
            call        chk_timeout
            jnc         waste_it
end_it_all:
            jmp         call_over

wait_carrier:
            call        chk_timeout
            jc          end_it_all
            call        getfreq
            jb          orig,chk_atone
            cjne        a,#127,wait_carrier
            sjmp        alb_orig
chk_atone:
            cjne        a,#222,$+3                 ; 2225 Hz detect
            jc          wait_carrier
            cjne        a,#224,$+3
            jnc         wait_carrier
            sjmp        reverse

check_mode:
            jnb         orig,snd_ans
            jb          alb_pin,alb_orig
```

```
reverse:
        %send_tx(rcv_orig3)
        sjmp    wait_connect
snd_ans:
        jb      alb_pin,reverse
alb_orig:
        %send_tx(rcv_ans3)

wait_connect:
        jnb     alb_pin,connect_wait
        cpl     orig                            ; if alb receiver is in opposite state
connect_wait:
        jb      orig,wait_250
        mov     a,#115
        sjmp    delay2
wait_250:
        mov     a,#100
delay2:
        call    wait5
        setb    fsk
        jmp     turn_on_data

ls_300int:
        push    acc
        push    psw

        mov     tr,#0ffh                ; read in the data
        mov     recv_data,tr

        jnb     ok_2send,send_amark     ; don't send anything to the TX
        jnb     out_data,send_amark
        djnz    int_cnt,check_indata
        mov     int_cnt,out_cnt
        jnb     in_break,chk_parsecnt
        djnz    out_0,send_zero
        clr     out_data
        sjmp    send_zero
chk_parsecnt:
        clr     a
        cjne    a,parse_cnt,chk_bitcnt
        clr     out_data
        mov     int_cnt,#1
        sjmp    send_amark
chk_bitcnt:
        djnz    parse_cnt,check_strt
        sjmp    send_stopb
check_strt:
        mov     a,#09
        cjne    a,parse_cnt,send_outdata
send_zero:
        mov     a,#10000000b                    ; send a zero
        sjmp    initbit
```

```
send_outdata:
        mov     a,tx_data
        rrc     a
        mov     tx_data,a
        mov     a,#01000000b
        rlc     a                               ; got 1000000x
        sjmp    initbit
send_stopb:
        mov     a,#10000001b                    ; send a one
initbit:
        mov     tr,a
        sjmp    check_indata
send_amark:
        jbc     out_cmd,send_tx_cmd
        jnb     ok_2send,check_indata
        mov     tr,#10000001b
        sjmp    check_indata
send_tx_cmd:
        mov     tr,tx_cmd
check_indata:
;------- Check for a incoming data byte or a status word.
        mov     a,recv_data

;------- note: bpars is the parse count, bits is the number of current
;        data bits to be parsed, and bit_cnt is the number of data bits
;        to skip till the next parse bit

        jb      acc.6,no_recvdata_jmp   ; null from recvr
        jb      recv_off,no_recvdata_jmp
        mov     bits,#4                         ; 4 data samples from the RX
        swap    a
        inc     bpars
        djnz    bpars,inbyte
look_startb:
        rlc     a
        jnc     startb300
        djnz    bits,look_startb
no_recvdata_jmp:
        jmp     no_recvdata

startb300:
        mov     bpars,#10
skip_last:
        jb      orig,set_skiphi
        mov     bit_cnt,#15             ; one less than 1/2 bit because of
        sjmp    cnt_that                ; above bit already counted
set_skiphi:
        mov     bit_cnt,#13
cnt_that:
        djnz    bits,inbyte             ; count that last bit
        sjmp    no_recvdata_jmp
inbyte:
```

```
        rlc     a
        djnz    bit_cnt,cnt_it

this_bit:
        mov     f0,c                            ; f0 = the data bit
        djnz    bpars,check_for_start
        inc     nul_cnt
        djnz    nul_cnt,check_stopb
no_nul:
        setb    TXD                             ; end any breaks
        sjmp    check_new
check_stopb:
        jb      f0,send_null            ; got nul with stop bit so send
        mov     bpars,#9                ; fake out the start bit
        mov     bit_cnt,#1
        clr     TXD
        sjmp    cnt_it                          ; here after last data bit
send_null:
        mov     nul_cnt,#0
        jnb     TXD,no_nul              ; if break on end it
        push    acc
        clr     a                               ; send the nul
        call    putc_int
        pop     acc
        sjmp    check_new

check_for_start:
        mov     bit_cnt,#28
        jb      orig,chk_bit_cnt
        mov     bit_cnt,#31
chk_bit_cnt:
        xch     a,bpars
        cjne    a,#9,not_startb
        xch     a,bpars
        jnb     f0,cnt_that
        mov     bpars,#0
check_new:
        djnz    bits,look_startb
        sjmp    no_recvdata                     ; false start bit

cnt_it:
        djnz    bits,inbyte
        sjmp    no_recvdata

not_startb:
        cjne    a,#1,readbit            ; skip the last part of data bit eight
        xch     a,bpars
        xch     a,recv_parse
        mov     c,f0
        rrc     a

; check to see if zero if so then don't send till we see
```

```
; what the stop bit is.

            jnz       send2
            mov       nul_cnt,#1
            sjmp      no_snd
send2:
            inc       nul_cnt                        ; if nul_cnt = 1 then sending break
            djnz      nul_cnt,end_of_break     ; what we have here is the end of
            setb      TXD
            call      putc_int                 ; the break
            sjmp      no_snd
end_of_break:
            mov       nul_cnt,#0
no_snd:
            xch       a,recv_parse
            mov       bit_cnt,#28              ; make sure we skip it
            jb        orig,cnt_it              ; counting on there always
            mov       bit_cnt,#31              ; being a stop bit after this skip
            sjmp      cnt_it
readbit:
            xch       a,bpars
            xch       a,recv_parse
            mov       c,f0
            rrc       a
            xch       a,recv_parse
            sjmp      cnt_it

no_recvdata:
            jb        just_marks,clock_it
            jb        out_data,clock_it
            jb        break_det,out_a_break
            call      mnpget
            jc        clock_it
            mov       tx_data,a
            mov       parse_cnt,#10
            setb      out_data
            sjmp      clock_it
;
;           TX break routine----- send ten bit times of zero then check
;                                 RX pin. If 0 then continue break
;                                 if 1 end it.
;
;
out_a_break:
            jb        in_break,chk_break_end
            setb      out_data
            setb      in_break
            mov       out_0,#10
            sjmp      clock_it
chk_break_end:
            jb        RXD,breakdone
            setb      out_data
            mov       out_0,#1   ; send one more zero
```

```
            sjmp        clock_it
breakdone:
            clr         in_break
            clr         break_det

clock_it:
            call        clock
            pop         psw
            pop         acc
            reti

;buf_it:
;           push        acc
;           mov         dptr,#test_buf
;           movx        a,@dptr             ; get buf low
;           mov         r0,a
;           inc         dptr
;           movx        a,@dptr             ; get buf hi
;           mov         dpl,r0
;           mov         dph,a
;           pop         acc
;           movx        @dptr,a
;           push        acc
;           inc         dptr
;           mov         a,dpl
;           mov         r0,dph
;           mov         dptr,#test_buf
;           movx        @dptr,a
;           inc         dptr
;           mov         a,r0
;           movx        @dptr,a
;           pop         acc
;           ret
 end
```

```
         UNL
*****************************************************
*        NAME:      New MOD96                                   *
*                                                               *
*        PURPOSE:   Modulate 9600 transmit signal               *
*                   Can handle variable Carrier Frequencies     *
*                                                               *
*****************************************************

         IDT        'TR9600'
         DEF        CLRMOD,MOD96,INCANG
         REF        DISBOX

*        O N  C H I P  R E G I S T E R S
TIM      EQU        2                       ; timer reg
PRD      EQU        3                       ; timer reload reg
IMR      EQU        4                       ; interrupt mask reg

*        I / O  P O R T S
* BIO = rd51
* XF = S/H
OUT51    EQU        5                       ;** out data port
IN51     EQU        4                       ;** input data port
ADC      EQU        6                       ;** A/D input port
LATCHP   EQU        7                       ;** latch port
* latch.0 = interrupt 8051
* latch.1 = wr51
* latch.2 = AGC0
* latch.3 = AGC1

*        P A G E  0  R E G I S T E R S

BOOST    EQU        >61                     ; Transmitter Boost
FCODE    EQU        >62                     ; holds sv command
RESULT   EQU        >63                     ; responce to sv
LATCH    EQU        >67                     ; output latch image

*        D E F I N I T I O N S
MPAGE    EQU        6                       ; this page
MBASE    EQU        >80*MPAGE               ; addr of this page
D0       EQU        >0F                     ; bits
D6       EQU        D0-6
D7       EQU        D0-7
D14      EQU        >1                      ; bit 14
D15      EQU        >0                      ; bit 15

*        M O D U L A T O R  V A R I A B L E S
TRBASE   EQU        0                       ; sb 300
AK       EQU        TRBASE+0
AK0      EQU        AK+0
AK1      EQU        AK+1
AK2      EQU        AK+2
```

```
AK3     EQU   AK+3
AK4     EQU   AK+4
AK5     EQU   AK+5
AK6     EQU   AK+6
AK7     EQU   AK+7
AK8     EQU   AK+8
AK9     EQU   AK+9
AK10    EQU   AK+10
AK11    EQU   AK+11

BK      EQU   TRBASE+>10
BK0     EQU   BK+0
BK1     EQU   BK+1
BK2     EQU   BK+2
BK3     EQU   BK+3
BK4     EQU   BK+4
BK5     EQU   BK+5
BK6     EQU   BK+6
BK7     EQU   BK+7
BK8     EQU   BK+8
BK9     EQU   BK+9
BK10    EQU   BK+10
BK11    EQU   BK+11

YM      EQU   TRBASE+>20
YM0     EQU   YM+0
YM1     EQU   YM+1
YM2     EQU   YM+2
YM3     EQU   YM+3
YM4     EQU   YM+4
YM5     EQU   YM+5
NCOUNT  EQU   YM+7
X0      EQU   YM+8
X1      EQU   YM+9
X2      EQU   YM+10
X3      EQU   YM+12
POINT   EQU   YM+11
FEE     EQU   YM+13
X4      EQU   YM+14
X5      EQU   YM+15

DAC     EQU   TRBASE+>30
DAC0    EQU   DAC+0
DAC1    EQU   DAC+1
DAC2    EQU   DAC+2
DAC3    EQU   DAC+3
DAC4    EQU   DAC+4
DAC5    EQU   DAC+5
BRTIME  EQU   DAC+6
X6      EQU   DAC+7

SAV     EQU   TRBASE+>38
```

```
PACH      EQU    SAV+0
PACL      EQU    SAV+1
TRL       EQU    SAV+2
OLDAR0    EQU    SAV+3

*         New Variables

ANGLE     EQU    FEE
COS       EQU    SAV+5
MSIN      EQU    SAV+6
INCANG    EQU    SAV+7

*         M O D U L A T O R   F I L T E R   C O N S T A N T S
KC0       EQU    24
KC1       EQU    -88
KC2       EQU    -126
KC3       EQU    -17
KC4       EQU    150
KC5       EQU    181
KC6       EQU    -5
KC7       EQU    -246
KC8       EQU    -255
KC9       EQU    56
KC10      EQU    410
KC11      EQU    372
KC12      EQU    -175
KC13      EQU    -765
KC14      EQU    -640
KC15      EQU    584
KC16      EQU    2436
KC17      EQU    3822

KT0       EQU    -1088                          ; for high frequency boost

*         I N T E R P O L A T E R   C O N S T A N T S
KD0       EQU    428
KD1       EQU    -811
KD2       EQU    2588
KD3       EQU    2588
KD4       EQU    -811
KD5       EQU    428

*         M O D   D A T A   V A L U E S
KP0       EQU    0                              ; check these numbers
KP1       EQU    >0001
KP2       EQU    >0002
KP3       EQU    >0003
KP4       EQU    >0004
KM1       EQU    ->0001
KM2       EQU.   ->0002
KM3       EQU    ->0003
KM4       EQU    ->0004
```

```
        PSEG
*       I N I T  M O D 9 6
CLRMOD
        LDPK    MPAGE
        MAR     *,0
        LRLK    AR0,MBASE+TRBASE
        ZAC
        RPTK    >3B
        SACL    *+
        RET


*************************************************
*                                               *
*       Modified Sin / Cos Generator            *
*       Pass the Angle in the Accumulator       *
*       Results are stored in Variables         *
*       MSIN & COS                              *
*                                               *
*************************************************

GENCOS
        LALK    >4000           ; Angle displacement for 1800 Hz.
        ADD     ANGLE           ; increment angle
GETCOS
        SACL    ANGLE           ; LDPK  >0 this routine uses X3,X4,X5, and X6
        ANDK    >3FFF           ; on page 0.  Also uses the TC bit.
        SACL    X3,1
        SQRA    X3
        PAC
        SACH    X4,1            ; X^2
        SQRA    X4
        PAC
        SACH    X5,1            ; X^4
        LALK    >4000,12  ; .5
        LT      X4
        MPYK    -2512
        LTA     X5              ; .5 + ALPHA*X^2
        MPYK    465
        APAC                    ; .5 + ALPHA*X^2 + BETA*X^4
        SACH    X6,4            ;**
        LALK    >7FFF           ; 1
        SUB     X3              ; 1 - X
        SACL    X3              ; used to find SIN(PHI)
        SQRA    X3
        PAC
        SACH    X4,1            ; X^2
        SQRA    X4
        PAC
        SACH    X5,1            ; X^4
        LALK    >4000,12  ; .5
```

```
        LT      X4
        MPYK    -2512
        LTA     X5              ; .5 + ALPHA*X^2
        MPYK    465
        APAC                    ; .5 + ALPHA*X^2 + BETA*X^4
        SACH    X5,4            ; SIN ---> X5
        BIT     ANGLE,D15       ; COS ---> X6
        BBNZ    QUAD1X
        BIT     ANGLE,D14
        BBNZ    QUAD01
SAVAL   LAC     X5              ; Save the Sin and Cos
        NEG
        SACL    MSIN
        LAC     X6
        SACL    COS
        RET

QUAD01
        LAC     X6              ; quadrant 01
        SACL    X4              ; COS = -SIN
        LAC     X5              ; SIN = COS
        NEG
        SACL    X6
        LAC     X4
        SACL    X5
        B       SAVAL

QUAD1X
        BIT     ANGLE,D14
        BBNZ    QUAD11
        LAC     X5              ; quadrant 10
        NEG                     ; cos = -cos
        SACL    X5
        LAC     X6              ; sin = -sin
        NEG
        SACL    X6
        B       SAVAL


QUAD11
        LAC     X5
        SACL    X4              ; quadrant 11
        LAC     X6              ; sin = -cos
        NEG
        SACL    X5
        LAC     X4              ; cos = sin
        SACL    X6
        B       SAVAL

*       S A V E   R E G I S T E R S
MOD96
```

```
        BIOZ    $+4                     ; check for spurious interrupts
        EINT
        RET
        DINT                            ; mod96 isr
        MAR     *,4                     ; sel AR4
        SST1    *-                      ; save ST1
        SST     *-                      ; save ST0
        SACH    *-
        SACL    *-
        POPD    *-                      ; save sp level
        POPD    *-                      ; save sp level
        EINT

        LDPK    MPAGE
        PAC                             ; save P reg
        SACH    PACH
        SACL    PACL
        SPM     0
        MPYK    1                       ; save T reg
        PAC
        SACL    TRL
        SAR     AR0,OLDAR0
        MAR     *,0

*       T A L K   T O   T R A N S M I T T E R
        IN      POINT,IN51              ; read command/pt
        BIT     POINT,D7        ; test for pt/command
        LDPK    0
        OUT     RESULT,OUT51            ; send backchannel result
        LACK    >FF                     ; reset it...
        SACL    RESULT
        LAC     LATCH
        LDPK    MPAGE
        BBNZ    W0

*       S T O P   T A L K
        LAC     POINT
        LDPK    0
        SACL    FCODE
        LDPK    MPAGE
        B       EXIT

*       M O R E   T A L K
W0      ANDK    >FD
        SACL    X0                      ; X0 = line low
        OUT     X0,LATCHP       ; signal result
        ORK     >02
        SACL    X1                      ; X1 = line high
        CALL    L2H                     ; wait...

        OUT     DAC0,OUT51
        OUT     X1,LATCHP
```

```
        CALL    H2L

        OUT     DAC1,OUT51
        OUT     X0,LATCHP
        CALL    L2H

        OUT     DAC2,OUT51
        OUT     X1,LATCHP
        CALL    H2L

        OUT     DAC3,OUT51
        OUT     X0,LATCHP
        CALL    L2H

        OUT     DAC4,OUT51
        OUT     X1,LATCHP
        CALL    H2L

        OUT     DAC5,OUT51
        OUT     X0,LATCHP
        CALL    L2H
        OUT     X1,LATCHP

        LACK    >1                              * debug
        ADD     BRTIME
        SACL    BRTIME

*       S H I F T   D E L A Y   L I N E
        DMOV    AK10
        DMOV    AK9
        DMOV    AK8
        DMOV    AK7
        DMOV    AK6
        DMOV    AK5
        DMOV    AK4
        DMOV    AK3
        DMOV    AK2
        DMOV    AK1
        DMOV    AK0

        DMOV    BK10
        DMOV    BK9
        DMOV    BK8
        DMOV    BK7
        DMOV    BK6
        DMOV    BK5
        DMOV    BK4
        DMOV    BK3
        DMOV    BK2
        DMOV    BK1
        DMOV    BK0
```

```
        SOVM                        ; not needed?
        LACK    >3F
        AND     POINT               ; convert point to re, im vector
        ADLK    AKTAB
        TBLR    AK0
        ADLK    BKTAB-AKTAB
        TBLR    BK0

************************************************
*                                              *
*       New Baseband Filter will allow         *
*       any Carrier frequency                  *
*                                              *
************************************************

        LDPK    MPAGE               ; Data Page
        CALL    GENCOS              ; Calculate Sin & Cos
FIRSAM  CALL    AP0                 ; Calculate A delay line
        SACL    X0                  ; Store result in temp

        CALL    BP0                 ; Calculate B delay line
        SACL    X1                  ; Store in temp
        LT      X1
        MPY     MSIN                ; Multiply by -Sin
        PAC
        LT      X0
        MPY     COS                 ; Multiply by Cos
        APAC
        SFL
        SACH    X0,1

        CALL    GENCOS              ; Calculate Sin & Cos
SECSAM  CALL    AP1                 ; Calculate A delay line
        SACL    X1                  ; Store result in temp

        CALL    BP1                 ; Calculate B delay line
        SACL    X2                  ; Store in temp
        LT      X2
        MPY     MSIN                ; Multiply by -Sin
        PAC
        LT      X1
        MPY     COS                 ; Multiply by Cos
        APAC
        SFL
        SACH    X1,1


        CALL    GENCOS              ; Calculate Sin & Cos
THRSAM  CALL    AP2                 ; Calculate A delay line
        SACL    X2                  ; Store result in temp
```

```
        CALL    BP2             ; Calculate B delay line
        SACL    X3              ; Store in temp
        LT      X3
        MPY     MSIN            ; Multiply by -Sin
        PAC
        LT      X2
        MPY     COS             ; Multiply by Cos
        APAC
        SFL
        SACH    X2,1

*       I N T E R P O L A T E
INTER
        LAC     X0
        CALL    INTERP
        SACH    DAC0,4
        LAC     DAC0,8
        SACH    DAC0
        LAC     YM3,8           ; check this
        SACH    DAC1

        LAC     X1
        CALL    INTERP
        SACH    DAC2,4
        LAC     DAC2,8
        SACH    DAC2
        LAC     YM3,8           ; check this
        SACH    DAC3

        LAC     X2
        CALL    INTERP
        SACH    DAC4,4
        LAC     DAC4,8
        SACH    DAC4
        LAC     YM3,8           ; check this
        SACH    DAC5            ; check scaling

*       R E S T O R E   R E G I S T E R S
EXIT
        LACK    >40             ; xfer sv toggle to
        AND     POINT           ; backchannel
        LDPK    7
        SACL    >56
*       CALL    DISBOX          ; done by back channel receiver
        LDPK    MPAGE
        LAR     AR0,OLDAR0
        MAR     *,4
        LT      PACL            ; regenerate P reg
        MPYK    1
        LPH     PACH
```

```
          LT       TRL                   ; reload T reg
          DINT
          MAR      *+
          PSHD     *+
          PSHD     *+
          ZALS     *+
          ADDH     *+
          LST      *+
          LST1     *
          EINT
          RET

*         S U B R O U T I N E S
INTERP
          SACL     YM0                   ; compute 1 interpolation pt
*******************************************
          LT       YM1                   * filter
          LDPK     0
          MPY      BOOST                 * code to boost high frequencys
          LDPK     MPAGE
          PAC                            * in event of rolloff
          ADD      YM0,15                *
          SACH     YM0,1                 *
*******************************************

          MPYK     0
          ZAC
          LT       YM5
          MPYK     KD5
          LTD      YM4
          MPYK     KD4
          LTD      YM3
          MPYK     KD3
          LTD      YM2
          MPYK     KD2
          LTD      YM1
          MPYK     KD1
          LTD      YM0
          MPYK     KD0
          APAC
          RET

AP0       LRLK     AR0,MBASE+AK
          B        XP0
BP0       LRLK     AR0,MBASE+BK
XP0       ZAC
          LT       *+
          MPYK     KC0
          LTA      *+
          MPYK     KC3
```

```
        LTA     *+
        MPYK    KC6
        LTA     *+
        MPYK    KC9
        LTA     *+
        MPYK    KC12
        LTA     *+
        MPYK    KC15
        LTA     *+
        MPYK    KC17
        LTA     *+
        MPYK    KC14
        LTA     *+
        MPYK    KC11
        LTA     *+
        MPYK    KC8
        LTA     *+
        MPYK    KC5
        LTA     *+
        MPYK    KC2
        APAC
        RET

AP1     LRLK    AR0,MBASE+AK
        B       XP1
BP1     LRLK    AR0,MBASE+BK
XP1     ZAC
        LT      *+
        MPYK    KC1
        LTA     *+
        MPYK    KC4
        LTA     *+
        MPYK    KC7
        LTA     *+
        MPYK    KC10
        LTA     *+
        MPYK    KC13
        LTA     *+
        MPYK    KC16
        LTA     *+
        MPYK    KC16
        LTA     *+
        MPYK    KC13
        LTA     *+
        MPYK    KC10
        LTA     *+
        MPYK    KC7
        LTA     *+
        MPYK    KC4
        LTA     *+
        MPYK    KC1
        APAC
```

```
        RET

AP2     LRLK    AR0,MBASE+AK
        B       XP2
BP2     LRLK    AR0,MBASE+BK
XP2     ZAC
        LT      *+
        MPYK    KC2
        LTA     *+
        MPYK    KC5
        LTA     *+
        MPYK    KC8
        LTA     *+
        MPYK    KC11
        LTA     *+
        MPYK    KC14
        LTA     *+
        MPYK    KC17
        LTA     *+
        MPYK    KC15
        LTA     *+
        MPYK    KC12
        LTA     *+
        MPYK    KC9
        LTA     *+
        MPYK    KC6
        LTA     *+
        MPYK    KC3
        LTA     *+
        MPYK    KC0
        APAC
        RET

*       P O I N T   T A B L E S
AKTAB
        DATA    KM4,KM3,KM2,KP1,KP4,KP3,KP2,KM1        * V32 PTS
        DATA    KP0,KM3,KP2,KP1,KP0,KP3,KM2,KM1
        DATA    KP0,KP1,KM2,KM3,KP0,KM1,KP2,KP3
        DATA    KP4,KP1,KP2,KP1,KM4,KM1,KM2,KM1

        DATA    KM3,KM1,KP1,KP3,KP0,KP0,KP0,KP0        * 4- PHASE
        DATA    KP0,KP0,KP0,KP0,KP0,KP0,KP0,KP0
AK72
        DATA    KP3,KM1,KP3,KM3                                 * 7200 PTS
        DATA    KM3,KP1,KM3,KP3
        DATA    KM1,KP3,KM1,KP1
        DATA    KP1,KM3,KP1,KM1


BKTAB
        DATA    KP1,KM2,KP3,KP4,KM1,KP2,KM3,KM4
```

```
        DATA    KP1,KP2,KP3,KP0,KM1,KM2,KM3,KP0
        DATA    KM3,KM2,KM1,KP0,KP3,KP2,KP1,KP0
        DATA    KP1,KP2,KM1,KM4,KM1,KM2,KP1,KP4

        DATA    KM1,KP3,KM3,KP1,KP0,KP0,KP0,KP0
        DATA    KP0,KP0,KP0,KP0,KP0,KP0,KP0,KP0
BK72
        DATA    KM3,KP3,KP1,KM3
        DATA    KP3,KM3,KM1,KP3
        DATA    KP1,KM1,KM3,KP1
        DATA    KM1,KP1,KP3,KM1


L2H     BIOZ    L2H
        RET

H2L     BIOZ    H2LRET
        B       H2L
H2LRET  RET


        END
```

```
$title (novram driver for mercury modem)
%SET(FAX,0)
%SET(FAllback,1)
;***********************************************
;
;
;           NAME:       NOVRAM
;
;
;           PURPOSE:    Contains entire novram interface
;
;
;***********************************************

;***** TX commands which affect the novram dip switch
raise_nram_pin          equ         14h
lower_nram_pin          equ         15h
read_nram_pin           equ         16h

            data_pin    bit         p3.4

            extrn       bit(cdet_pin)
            extrn       bit(dsr_pin)
            extrn       xdata(sreg,x_spkr)
            extrn       bit(parity_yes,even_odd_par)
            extrn       bit(pulse_dial,send_full_dup)
            extrn       bit(saving_fg)

            extrn       code(enable_novram,disable_novram)
            extrn       code(set_novram_clock,rst_novram_clock)
            extrn       code(putc,help_go,out_cr_lf)
            extrn       code(ring_on,ring_off)
            extrn       code(help_amp)
            extrn       code(get_in,char_error)             ;points to jmp to in parse loop
            extrn       code(parse_01,ascii_binary,putstring,get_s,setup_s) ;gen subs.
            extrn       code(abs_abort_error)
            extrn       code(get_x_spkr,save_x_spkr)

            public      ampersand,image_to_main,voice_cnt,tx_version
            public      get_digit,save_digit,print_phone_num,phone_num_begin
            public      main_to_image,amp_vars_start,inside_phone_pointer
            public      extra_amp_start,store_novram,novram_sregs
            public      nv_t,nv_b,nv_baud,nv_f,novram_phone_num,bell_ans
            public      raise_nram_pin,lower_nram_pin,read_nram_pin

            %*define ( get_extrn(extrn_val) ) (
            mov         dptr,#%extrn_val
            movx        a,@dptr
            )

            %*define ( set_extrn(extrn_val) ) (
            mov         dptr,#%extrn_val
            movx        @dptr,a
            )
```

```
        %*define ( get_nram(extrn_val) ) (
        mov         dptr,#novram+%extrn_val
        movx        a,@dptr
        )

        %*define ( set_nram(extrn_val) ) (
        mov         dptr,#novram+%extrn_val
        movx        @dptr,a
        )

        public      recall_novram
        public      save_novram,get_novram,set_ndefaults

        public      amp_xh,amp_xm,amp_xb,amp_xy,amp_xi,amp_xn
        public      amp_xr,amp_xa,amp_xs,amp_xg,amp_xp

        public      amp_xxh,amp_xxm,amp_xxb,amp_xxy,amp_xxi,amp_xxn
        public      amp_xxr,amp_xxa,amp_xxs,amp_xxg,amp_xxp
        public      nv_x_par_m

;*********************************************************
;
;       Ampersand work space. These variables are the
;       working ampersand variables. They are initialized
;       on pwer up to the NOVRAM variables or ROM variables.
;
;
;
        xseg        at 50h                          ; after the input buffer and sregs

extra_amp_start     equ     $                       ;start address of extra amp vars

amp_xa:             ds      1                       ;setting for 'AT&An'
amp_xb:             ds      1                       ;setting for 'AT&Bn'
amp_xg:             ds      1                       ;setting for 'AT&Gn'
amp_xh:             ds      1                       ;setting for 'AT&Hn'
amp_xi:             ds      1                       ;setting for 'AT&In'
amp_xm:             ds      1                       ;setting for 'AT&Mn'
amp_xn:             ds      1                       ;setting for 'AT&Nn'
amp_xp:             ds      1                       ;setting for 'AT&Pn'
amp_xr:             ds      1                       ;setting for 'AT&Rn'
amp_xs:             ds      1                       ;setting for 'AT&Sn'
amp_xy:             ds      1                       ;setting for 'AT&Yn'

extra_end   equ     $                   ;end address of extra amp vars

bell_ans:   ds      1                   ;B command

inside_phone_pointer:   ds      1       ;pointer when saving phone #
                                                    ;gives bit offset from start of phone#
                                                    ;5 bits = 1 digit

phone_num_begin:    ds      1           ; start of the current phone number
voice_cnt:          ds      1
```

```
tx_version:         ds        1         ; version of tx chip

;**************************************************************
;         NOVRAM IMAGE
;
;         The area from 80h to 100h contains the exact image
;         of the NOVRAM including the four phone numbers
;

          xseg      at        80h

novram              equ       $

amp_vars_start      equu      $                   ;start address of amp vars
                                                  ;AMPERSAND  VARS  USED  IN  MAIN
PROGRAM.
amp_xxa:  ds        1                   ; &a --- enable /ARQ responses
amp_xxb:  ds        1                   ; &b --- variable/fixed DCE
amp_xxg:  ds        1                   ; &g --- guard tone on/off
amp_xxh:  ds        1                   ; &h --- TX data flow control
amp_xxi:  ds        1                   ; &i --- RX data flow control
amp_xxm:  ds        1                   ; &m --- normal/ARQ mode
amp_xxn:  ds        1                   ; &n --- originate data rate
amp_xxp:  ds        1                   ; &p --- pulse dial make/break ratio
amp_xxr:  ds        1                   ; &r --- RTS flow control
amp_xxs:  ds        1                   ; &s --- DSr flow control
amp_xxy:  ds        1                   ; &y --- break handling

amp_end             equ       $                   ;end address of amp vars


NOVRAM_HAYES_cmds   equ       $

NV_x_par_m:         ds        1                   ; X/M --- call progrss, speaker mode,
                                                  ;       and power on parity
NV_f:               ds        1                   ; F --- online echo mode
NV_t:               ds        1                   ; T --- tone/pulse dial mode
NV_b:               ds        1                   ; B --- CCITT/US answer tone
NV_baud:  ds        1                   ; power on baud rate

NOVRAM_HAYES_end    equ       $

NOVRAM_sregs                  equ       $
NV_s2:              ds        1
NV_s3:              ds        1
NV_s4:              ds        1
NV_s5:              ds        1
NV_s6:              ds        1
NV_s7:              ds        1
NV_s8:              ds        1
NV_s9:              ds        1
NV_s10:             ds        1
```

```
NV_s11:          ds        1
NV_s12:          ds        1
NV_s13:          ds        1
NV_s19:          ds        1
NV_s21:          ds        1
NV_s22:          ds        1
NV_s23:          ds        1

NOVRAM_sreg_end            equ       $

NOVRAM_phone_num   equ     $
;***********************************************************
;
;          The stored phone numbers can be up to 37 characters.
;          plus a stop flag.  Each characters is 5 bits long
;          and there is a total of 4 numbers stored giving a
;          total of 95 bytes.
;
;
;
phone_nums:      ds        95

NOVRAM_phone_end equ       $

novram_extra:    ds        1                     ; unused NOVRAM byte

novram_end                 equ       $

$EJECT
novram_code      segment   code
                 rseg      novram_code
        using 0

$eject
;*****************************************************************
;
;SET_NDEFAULTS
;
;
;          Set variables that go into novram to the program defaults.
;          Do not change the novram image.
;          To do this, we use novram image as a scratch pad to setup main
;          vars; then when through read novram into novram image.
;
;
;*****************************************************************
set_ndefaults:
          mov      dptr,#novram_default      ;source pointer
          mov      r2,#amp_default_end - novram_default  ;count down counter
          mov      r1,#low extra_amp_start  ;dest pointer
          mov      p2,#high extra_amp_start
          call     load_defaults

          mov      r2,#sreg_default_end-amp_default_end
          mov      r1,#sreg+2
          call     load_defaults
          mov      a,#10
```

```
        mov     dptr,#sreg+21
        movx    @dptr,a
        inc     dptr
        mov     a,#11h
        call    save_x_spkr
;       mov     x_spkr,a
        movx    @dptr,a
        inc     dptr
        mov     a,#13h
        movx    @dptr,a
        mov     a,#1
        %set_extrn(bell_ans)
        setb    send_full_dup
        setb    pulse_dial
        setb    parity_yes
        setb    even_odd_par
        mov     th1,#-6

        ret

load_defaults:
        clr     a
        movc    a,@a+dptr
        movx    @r1,a
        inc     dptr
        inc     r1
        djnz    r2,load_defaults
        ret

novram_default:
;       ampersand defaults
        db      01                              ; &a
        db      00                              ; &b
        db      00                              ; &g
        db      00                              ; &h
        db      00                              ; &i
        db      04                              ; &m
        db      00                              ; &n
        db      00                              ; &p
        db      01                              ; &r
        db      00                              ; &s
        db      01                              ; &y

amp_default_end:

; S registers

        db      43                      ; S2  esc char
        db      13                      ; S3  cr char
        db      10                      ; S4  lf char
        db      8                       ; S5  bs char
        db      2                       ; S6  dial tone wait
```

```
        db      30                              ; S7  wait for carrier
        db      2                               ; S8  comma pause
        db      6                               ; S9  not supported
        db      7                               ; S10  loss of carrier
        db      70                              ; S11  touch tone duration
        db      50                              ; S12  esc guard time
        db      00                              ; S13  test modes

sreg_default_end:

$eject
;**************************************************************
; SAVE_DIGIT
;
;       Save digit in acc to novram, for 'AT&Znnnnn' cmd.
;       Novram area indexed by inside_phone_pointer.
;       Carry set if error.
;
;**************************************************************
save_digit:
        call    comp_digit                      ;compress digit to 5 bits
        jc      save_done                       ;carry set for ERROR return
        mov     r2,a                                    ;save input val
        mov     dptr,#inside_phone_pointer      ;get bit pointer
        movx    a,@dptr
        add     a,#5                                    ;auto incr pointer by 1 digit
        movx    @dptr,a
        add     a,#-5                                   ; back to original cal
        mov     b,#8                                    ;ptr/8 gives byte offset in acc
        div     ab                                      ;remain. in b = sub-bit offset
        xch     a,b                                     ;b= byte offset
        xch     a,r2                                    ;a= data, r2= bit offset
        mov     r3,#0                                   ;r3= data msb

        cjne    r2,#0,shloop                            ;if bit offset 0, no shifting
        sjmp    shift_done
shloop:                                                 ;shl r3,a left by 1 each pass
        clr     c
        rlc     a                                       ;lsb
        xch     a,r3
        rlc     a                                       ;msb
        xch     a,r3
        djnz    r2,shloop
shift_done:
        xch     a,b                                     ;a=byte offset, b= lsb data
        call    get_indexed_digit               ;set dptr= byte offset,a=@dptr
        orl     a,b                                     ;add lsb to previous digit
        movx    @dptr,a
        inc     dptr                                    ;add msb to array
        mov     a,r3
        movx    @dptr,a
        clr     c                                       ;success return
```

```
save_done:
        ret

;*****************************************************************
;
; GET_DIGIT
;
;       Get next digit from novram to acc for 'ATDS' cmd (dial string from
;       novram. Novram area indexed by inside_phone_pointer.
;       Array compressed to 5 bit format.
;
;*****************************************************************
get_digit:
        mov     dptr,#inside_phone_pointer          ;get array pointer
        movx    a,@dptr
;       push    acc
        add     a,#5                                ;auto-incr by 1 digit
        movx    @dptr,a
        add     a,#-5
;       pop     acc                                 ;get ptr val back
        mov     b,#8                                ;ptr/8 gives byte offset in acc
        div     ab                                  ;remainder in b = bit offset
        call    get_indexed_digit               ;get unshifted lsb
        mov     r3,a                                ;r3 = lsb
        inc     dptr
        movx    a,@dptr                             ;acc = msb
        mov     r2,b                                ;r2 = shift count
                                                    ;bit offset of 0 bit of digit
        cjne    r2,#0,shroop                        ;if =0, no shifting
        sjmp    shr_done
shroop:
        rrc     a                                   ;msb
        xch     a,r3
        rrc     a                                   ;lsb
        xch     a,r3
        djnz    r2,shroop
shr_done:                                       ;5 bit digit in r3
        mov     a,r3
        anl     a,#11111b
        call    decomp_digit
        ret

;*****************************************************************
;
; GET_INDEXED_DIGIT
;
;       Get byte in array with base address novram_phone_num
;       and indexed by acc.
;       Leave dptr = array address.
;
;*****************************************************************
get_indexed_digit:
        push    b
        mov     b,a
```

```
        mov     dptr,#phone_num_begin
        movx    a,@dptr
        add     a,b                                  ;add index to base address
        mov     dpl,a
        pop     b
        movx    a,@dptr
        ret

$eject
;****************************************************************
; COMP_DIGIT
;
;       Compress 8 bit digit in acc to 5 bit format.
;       Inputs are: 0-9,#,*,@,W,T,P,R,(comma),;,!,(,),-.
;       Zero is zero by default.
;       Return: acc = compressed #
;               carry set if error
;
;****************************************************************
comp_digit:
        mov     r1,a                    ;r1 target char to comp.
        mov     dptr,#atztable-1
        mov     r2,#-1
comp1:
        inc     r2
        inc     dptr
        clr     a
        movc    a,@a+dptr
        cjne    a,#0ffh,comp2
        setb    c                       ;error return
decomp_err:                             ;if invalid digit in stream
        clr     a                       ;return end of phone #
        ret                             ;got to end w/out finding
comp2:
        cjne    a,ar1,comp1
        mov     a,r2                    ;index in array.
;       clr     c                       ;success return
        ret

;****************************************************************
; DECOMP_DIGIT
;
;       Decompress 5 bit digit in acc to 8 bit format.
;       Outputs are: 0-9,#,*,@,W,T,P,R,(comma),;,!,(,),-., and 0.
;       Zero is zero by default.
;
;****************************************************************
decomp_digit:
        cjne    a,#atzend-atztable-1,$+3
        jnc     decomp_err
        mov     dptr,#atztable
```

```
        movc    a,@a+dptr
        ret

;-------------------------
atztable:
        db      0,'0123456789@,!#*>/PRTW()-',03bh,0ffh                    ;3b = semicolon
atzend:

;*************************************************************
; SAVE_START
;
;           Setup pointers to save or read phone # for 'AT&Znnnn' or
;           'ATDS' cmds, respectively.
;           Novram area indexed by inside_phone_pointer.
;
; SET_NRAM_PTR
;
;           Setup phone # pointer so we can use primitives get_digit,
;           save_digit.
;
;*************************************************************
save_start:
        call    ascii_binary
        jnc     chk_lim
bad_val:
        pop     acc
        pop     acc
        jmp     amp_error
chk_lim:
        cjne    a,#4,$+3
        jnc     bad_val
        mov     r1,a
        movx    a,@r0                           ; number to store into
        cjne    a,#'=',chk_question
        inc     r0
        sjmp    clear_num
chk_question:
        cjne    a,#'?',bad_val
        inc     r0                              ; here 'AT&Z?
        push    1
        call    out_cr_lf
        call    recall_novram
        jc      bad_val                         ; if no novram, print ERROR
        pop     acc                             ; get the number to print
        call    print_phone_num
        pop     acc                             ; don't return to amp_z routine
        pop     acc
        ret
clear_num:                              ; fill the number with zero
        mov     r3,#24                          ; length of the number
        mov     b,#24
```

```
            mov        a,r1
            mul        ab
            add        a,#low novram_phone_num
            %set_extrn(phone_num_begin)
            mov        r1,a
            clr        a
savelp:
            movx       @r1,a
            inc        r1
            djnz       r3,savelp

            %set_extrn(inside_phone_pointer)
            ret

$eject
;*****************************************************************
;image_to_main
;
;           Copy from novram image to main program
;
;
;*****************************************************************

copy_loop:
            movx       a,@dptr
            movx       @r1,a
            inc        r1
            inc        dptr
            djnz       r2,copy_loop
            ret


image_to_main:

;init misc variables

            %get_extrn(NV_x_par_m)                  ;X_spkr, and parity
            mov        c,acc.3
            mov        parity_yes,c
            mov        c,acc.2
            mov        even_odd_par,c
            anl        a,#01110011b
            call       save_x_spkr
;           mov        x_spkr,a

                                                                ;Now copy amp_ vars.
            mov        dptr,#amp_vars_start         ;source pointer
            mov        r1,#low extra_amp_start      ;dest. pointer lsb
            mov        p2,#high extra_amp_start     ;dest. pointer msb

copy_go:
            mov        r2,#amp_end - amp_vars_start ;counter
```

```
                call        copy_loop

                %get_extrn(nv_baud)
                clr         ea
                mov         th1,a
                setb        ea

                %get_extrn(nv_f)
                rrc         a
                mov         send_full_dup,c

                %get_extrn(nv_t)
                rrc         a
                mov         pulse_dial,c

                %get_extrn(nv_b)
                %set_extrn(bell_ans)
                                                                    ;Now copy novram sregs
                mov         dptr,#novram_sregs              ;source pointer
                mov         r1,#low (sreg+2)                        ;dest. pointer lsb
                mov         p2,#high sreg                           ;dest. pointer msb

                mov         r2,#(novram_sreg_end - novram_sregs-4) ;counter
                call        copy_loop
;copy_loop2:
;               movx        a,@dptr
;               movx        @r1,a
;               inc         r1
;               inc         dptr
;               djnz        r2,copy_loop2

                %get_extrn(nv_s19)                          ;S19 to start
                mov         dptr,#sreg+19
                movx        @dptr,a
;               mov         b,a
;               mov         a,#19
;               call        setup_s

                %get_extrn(nv_s21)                          ;S21 to start
                mov         dptr,#sreg+21
                movx        @dptr,a
;               mov         b,a
;               mov         a,#21
;               call        setup_s

                %get_extrn(nv_s22)                          ;S22 to start
                mov         dptr,#sreg+22
                movx        @dptr,a
;               mov         b,a
;               mov         a,#22
;               call        setup_s
```

```
        %get_extrn(nv_s23)                              ;S23 to start
        mov     dptr,#sreg+23
        movx    @dptr,a
;       mov     b,a
;       mov     a,#23
;       call    setup_s

        ret


$eject
;*****************************************************************
;main_to_image
;
;       Copy from main program vars to scratch pad set of variables.
;
;
;*****************************************************************
main_to_image:
        ; transfer all the ampersand commands

;       mov     dptr,#amp_vars_start                    ;dest pointer
;       mov     r1,#low extra_amp_start                 ;source pointer lsb
;       mov     p2,#high extra_amp_start                ;source pointer msb
        mov     dptr,#extra_amp_start
        mov     r1,#low amp_vars_start
        mov     p2,#high amp_vars_start

        mov     r2,#extra_end - extra_amp_start         ;counter
        call    copy_loop
;copy_loop3:
;       movx    a,@r1
;       movx    @dptr,a
;       inc     r1
;       inc     dptr
;       djnz    r2,copy_loop3

        call    get_x_spkr
;       mov     a,x_spkr                                ;X_spkr, and parity
        mov     c,parity_yes
        mov     acc.3,c
        mov     c,even_odd_par
        mov     acc.2,c
        %set_extrn(nv_x_par_m)

        clr     a                                       ; get hayes F cmd
        mov     c,send_full_dup
        rlc     a
        %set_extrn(NV_f)

        clr     a
        mov     c,pulse_dial
```

```
          rlc         a
          %set_extrn(nv_t)

          %get_extrn(bell_ans)
          %set_extrn(nv_b)

          mov         a,th1
          %set_extrn(NV_baud)

          mov         dptr,#(sreg+2)                    ;source pointer
          mov         r1,#low novram_sregs    ;dest. pointer lsb
          mov         p2,#high novram_sregs   ;dest. pointer msb

          mov         r2,#(novram_sreg_end - novram_sregs-4) ;counter
          call        copy_loop
;copy_loop4:
;         movx        a,@dptr
;         movx        @r1,a
;         inc         r1
;         inc         dptr
;         djnz        r2,copy_loop4

          mov         a,#19                                     ;Setup novram s19
          call        get_s
          %set_extrn(nv_s19)

          mov         a,#21                                     ;Setup novram s21
          call        get_s
          %set_extrn(nv_s21)

          mov         a,#22                                     ;Setup novram s22
          call        get_s
          %set_extrn(nv_s22)

          mov         a,#23                                     ;Setup novram s23
          call        get_s
          %set_extrn(nv_s23)

          ret
$eject
;*****************************************************************
; PRINT_PHONE_NUM
;
;         Print phone # stored in novram image.
;
;*****************************************************************
print_phone_num:
          mov         dptr,#phone_num_begin
          mov         b,#24
          mul         ab
          add         a,#low novram_phone_num
          movx        @dptr,a
```

```
        mov     dptr,#inside_phone_pointer                    ;init pointer
        clr     a
        movx    @dptr,a

print_loop:
        call    get_digit
        jz      print_done
        call    putc
        sjmp    print_loop

print_done:
        ret

$eject
;*****************************************************************
; save_novram
;
;       Copy main program variables to NOVRAM image and
;       store it in the NOVRAM
;
;*****************************************************************
save_novram:
        call    main_to_image
        call    store_novram
        ret


;*****************************************************************
; get_novram
;
;       Reverse of Save_novram
;       Set main program variables from values in novram,
;       using scrachpad area as a go-betweeen.
;
;*****************************************************************
get_novram:
        call    recall_novram           ;do block retrieve.
        jnc     setup_vars
        call    set_ndefaults
setup_vars:
        call    image_to_main           ;copy to main program vars.
        ret


$eject
;*****************************************************************
; Store_novram
;
;                       - Copy novram image into physical novram
;
;
```

```
;*****************************************************************
;
store_novram:
; writes contents of external novram image
; into novram, and stores it

        call    rst_novram_clock

        mov     a,#00110000b            ; enable write
        call    writebyte
        call    disable_novram

        mov     a,#00100000b            ; Erase all
        call    writebyte
        call    disable_novram
        call    check_status

        mov     r1,#low novram          ; ptr to write buffer
        mov     p2,#high novram
        mov     r3,#0                   ; novram pc
        mov     r2,#64                  ; #words
wn_loop:
        mov     a,r3
        inc     r3
        orl     a,#01000000b            ; 01aaaaaab
        call    writebyte               ; sel wr addr
        movx    a,@r1
        inc     r1
        call    writedata               ; write 1st byte
        movx    a,@r1
        inc     r1
        call    writedata               ; write 2nd byte
        call    disable_novram
        call    check_status

        djnz    r2,wn_loop              ; continue

        mov     a,#00000000b            ; write protect novram
        call    writebyte
        call    rst_novram_clock
        call    disable_novram

        ret

check_status:
        call    enable_novram
        jnb     data_pin,$

        call    set_novram_clock
        call    rst_novram_clock

        call    disable_novram
```

```
        call    set_novram_clock
        call    rst_novram_clock

        ret

writebyte:
        mov     r5,a
        call    enable_novram
        clr     data_pin                        ; always send 01 before
                                                        ; the instruction
        call    set_novram_clock
        call    rst_novram_clock

        setb    data_pin

        call    set_novram_clock
        call    rst_novram_clock

        mov     a,r5
writedata:
        mov     r4,#8
wb_loop:
        rlc     a
        mov     r5,a
        mov     data_pin,c              ;place data

        call    set_novram_clock
        call    rst_novram_clock

        mov     a,r5
        djnz    r4,wb_loop
        setb    data_pin
        mov     c,data_pin
        ret

$eject
;*************************************************************
; Recall_novram
;
;               Read physical novram into novram image.
;               Return Carry set if no novram present.
;
;*************************************************************

recall_novram:
        setb    f0                              ;used to see if Novram present.

        mov     r1,#low novram                          ; ptr to write buffer
        mov     p2,#high novram
        mov     r3,#0                                   ; novram pc
        mov     r2,#64                                  ; #words
```

```
rn_loop:
        call    enable_novram
        mov     a,r3
        inc     r3
        orl     a,#10000000b                    ; 10aaaaaab
        call    writebyte
        call    readbyte                ; read 1st byte
        movx    @r1,a
        inc     a                               ;see if data not #0ffh
        jz      $+4
        clr     f0                      ;NOVRAM is there!

        inc     r1

        call    readbyte                ; read 2nd byte
        movx    @r1,a

        inc     a                               ;see if data not #0ffh
        jz      $+4
        clr     f0                      ;NOVRAM is there!
        inc     r1

        call    disable_novram

        djnz    r2,rn_loop

        call    rst_novram_clock
        call    disable_novram
        mov     c,f0                    ;return val
        ret


readbyte:
        setb    data_pin            ; enable recv
        mov     r4,#8
rb_loop:
        call    set_novram_clock
        call    rst_novram_clock
        mov     c,data_pin          ; grab last bit
        mov     a,b
        rlc     a
        mov     b,a
        djnz    r4,rb_loop
        mov     c,data_pin          ; grab this bit
        mov     a,b
        ret


$eject
;*************************************************************
;
;               ampersand commands parsed here
;*************************************************************
;
```

```
ampersand:                                      ;Here for 'at&in' cmds.
        jnb     saving_fg,ampz_2
        call    store_novram                            ; here if 'AT&Znnnn&Z?'
        clr     saving_fg                       ; close the save
ampz_2:
        movx    a,@r0                                   ;get next instr
        cjne    a,#'$',$+6                      ;'&$' help screen
        ljmp    amp_help
        cjne    a,#'Z'+1,$+3                            ;'Z' highest amp cmd
        jnc     ampp_error
        subb    a,#'A'-1                        ;'A' lowest amp cmd (-1 for carry)
        jc      ampp_error
        mov     dptr,#amp_table
        movc    a,@a+dptr
        mov     dptr,#amp_start
        inc     r0                                      ;amp cmds have r0 set to num arg
        call    ampersand_jump
        jmp     get_in
ampersand_jump:
        jmp     @a+dptr

ampp_error:
        jmp     char_error

amp_table:
        db      amp_A - amp_start
        db      amp_B - amp_start
        db      amp_ok - amp_start              ; Hayes 2400 compatability
        db      amp_ok - amp_start
        db      amp_error - amp_start
        db      amp_F - amp_start
        db      amp_ok - amp_start
        db      amp_H - amp_start
        db      amp_I - amp_start
        db      amp_ok - amp_start
        db      amp_error - amp_start
        db      amp_ok - amp_start
        db      amp_M - amp_start
        db      amp_N - amp_start
        db      amp_error - amp_start
        db      amp_P - amp_start
        db      amp_error - amp_start
        db      amp_R - amp_start
        db      amp_S - amp_start
        db      amp_error - amp_start
        db      amp_error - amp_start
        db      amp_error - amp_start
        db      amp_W - amp_start
        db      amp_error - amp_start
        db      amp_Y - amp_start
        db      amp_Z - amp_start
```

```
amp_help:
        inc     r0
        mov     dptr,#help_amp
        call    help_go
        jmp     get_in

amp_start:                                  ;start of '&' subroutines

amp_ok:
        call    ascii_binary
        jmp     get_in

amp_A:
        call    parse_01
        clr     a
        rlc     a
        %set_extrn(amp_xa)
;       jmp     get_in
        ret
amp_B:                                      ;DTE baud rate
        call    ascii_binary
        jc      amp_error
        cjne    a,#8,$+3
        jnc     amp_error
        jz      $+4
        mov     a,#01
        %set_extrn(amp_xb)
        ret
amp_F:                                      ;load factory settings to RAM
        push    th1                         ; save parity and baud rate
        mov     c,parity_yes                ; for the result code
        mov     f0,c
        mov     c,even_odd_par
        push    psw
        call    set_ndefaults               ;set Ram vars to factory dflts.
        pop     psw
        mov     even_odd_par,c
        mov     c,f0
        mov     parity_yes,c
        pop     th1
        ret
amp_H:                                      ;transmitted data flow control
        call    ascii_binary
        jc      amp_error
        cjne    a,#4,$+3
        jnc     amp_error
        %set_extrn(amp_xh)
;       jmp     get_in
        ret

amp_I:                                      ;rx'ed data flow control
        call    ascii_binary
```

```
        jc          amp_error
        cjne        a,#5,$+3                    ;4 is max val
        jnc         amp_error
        %set_extrn(amp_xi)
;       jmp         get_in
        ret

amp_M:                                          ;NORMAL/ARQ mode
        call        ascii_binary
        jc          amp_error
        cjne        a,#6,$+3
        jnc         amp_error
%IF(%FAX) THEN (
)ELSE(  jb          acc.2,$+4                   ;if AT&M1 - 3, then AT&M0
        clr         a
)FI
        %set_extrn(amp_xm)
;       jmp         get_in
        ret

;----------------------------------------
amp_error:                                      ;here if arg was > 255
        pop         acc
        pop         acc
        jmp         char_error

;----------------------------------------
amp_N:                                          ;DATA SPEED (DCE -DCE spd)
        call        ascii_binary
        jc          amp_error
        cjne        a,#7,$+3
        jnc         amp_error
%IF(%FALLBACK) THEN (
)ELSE(
        jnb         acc.2,save_xn               ; values of 0-3 or 6
        mov         a,#6
)FI

save_xn:
        %set_extrn(amp_xn)
;       jmp         get_in
        ret

amp_P:
        call        parse_01
        clr         a
        rlc         a
        %set_extrn(amp_xp)
;       jmp         get_in
        ret
```

```
amp_R:                                          ;What to do with RTS
        call    ascii_binary
        jc      amp_error
        cjne    a,#3,$+3
        jnc     amp_error
        %set_extrn(amp_xr)
;       jmp     get_in
        ret

amp_S:                                          ;DSR override
        call    parse_01
        jnb     cdet_pin,$+5
        mov     dsr_pin,c
        clr     a
        rlc     a
        %set_extrn(amp_xs)
;       jmp     get_in
        ret

amp_W:                                          ;write curr settings to novram
        call    main_to_image
        call    store_novram
        call    recall_novram                   ; if novram there then ok
        jnc     good_write
        pop     acc                             ;clear stack (we're in a proc)
        pop     acc
        jmp     abs_abort_error                 ;print 'ERROR'
good_write:
        ret

amp_Y:                                          ;what to do with BREAK
        call    ascii_binary
        jc      amp_error
        cjne    a,#4,$+3
        jnc     amp_error
        %set_extrn(amp_xy)
;       jmp     get_in
        ret

amp_Z:                                          ;store phone number

ampz_norm:                                      ;setup save phone #
        call    save_start                      ;setup pointers
        setb    saving_fg
;       jmp     get_in
        ret

        end
```

```
$TITLE(Command line parse routine)
%SET(RACK,0)
;*********************************************************
;
;
;           NAME:       PARSE
;
;           PURPOSE:    Parse the input command line
;
;*********************************************************


startb_l    set     r3
startb_h    set     r4
tr                  equ     P1
crlf                equ     0edh

;porta:             ds      1                       ; output addr = A000h
;portb:             ds      1                       ; output addr = 8000h
;atswitch:  ds      1                   ; input addr = 9000h

;ttone_pin  bit     porta.0             ; 0 = sending touch tones
;dsr_pin    bit     porta.1             ; 0 = true
;cts_pin    bit     porta.2             ; 0 = true
;spkr_pin   bit     porta.3             ; 1 = off
;mercury_pin        bit     porta.4         ; 0 = mercury mode
;speed_pin  bit     porta.5             ; 0 = highest speed
;ring_pin   bit     porta.6             ; 0 = ring in progress
;cdet_pin   bit     porta.7             ; 0 = true


;oa_pin             bit     portb.0         ; 1 = ans mode
;alb_pin    bit     portb.1             ; 1 = AL on
;echo_pin   bit     portb.2             ; 1 = echo
;watchdg_pin        bit     portb.3         ; 1 = reset wd
;reset_pin  bit     portb.4             ; 1 = reset
;oh_pin             bit     portb.5         ; 1 = on hook
;nram_enb_pin       bit     portb.6         ; 1 = Chip Enable
;nram_clk_pin       bit     portb.7         ; 0 to 1 transition

;at_verbose bit     atswitch.0      ; 1 = verbose
;at_quiet   bit     atswitch.1      ; 1 = quiet
;at_echo    bit     atswitch.2      ; 1 = echo on
;at_auto_ans        bit     atswitch.3      ; 1 = auto ans
;at_dumb    bit     atswitch.4      ; 1 = dumb mode
;at_esc             bit     atswitch.5      ; 1 = +++ hang up
;at_dtr             bit     atswitch.6      ; 1 = DTR false
;at_rts             bit     atswitch.7      ; 1 = RTS false

            extrn   number(phone_num_begin,inside_phone_pointer,novram_phone_num)

            extrn   bit(at_verbose,at_quiet,at_echo,at_auto_ans)
            extrn   bit(at_dtr,at_rts)
```

```
extrn       bit(spkr_pin)
extrn       bit(ring_pin,cdet_pin)
extrn       bit(oa_pin,alb_pin,echo_pin,watchdg_pin)
extrn       bit(oh_pin)
extrn       bit(sv_flag,repeat)
extrn       bit(parity_yes,even_odd_par,t_timing,first_int)
extrn       bit(timer_on,clock_on)
extrn       bit(ring1,cd_false)

extrn       code(putc,putstring,out_a_string,help_go,out_cr_lf,send_result)
extrn       code(send_1224_data,getfreq,fast_train)
extrn       code(callprog1,chk_timeout,return_online)
extrn       code(save_novram,set_ndefaults,ampersand)
extrn       code(recall_novram,store_novram)
extrn       code(save_digit,get_digit,print_phone_num)
extrn       code(dtmf_on,dtmf_off,echo_on,echo_off)
extrn       code(set_answer,set_originate,on_hook,off_hook)
extrn       code(help_gen,help_dial,help_s)
extrn       code(puthexdigit,to_transmitter,from_transmitter)
extrn       code(datestr)
extrn       code(parse_01,ascii_binary,query_num)
extrn       code(out_3_digits,out_2_digits,out_1_digit)
extrn       code(xdelay_125ms,xdelay_5ms)
extrn       code(setup_s,get_s)
extrn       code(go_off_hook)
extrn       code(go_do_i4,go_do_i5,go_do_i6)
extrn       code(set_mercury,led_test)
extrn       code(respond)                       ;for debugging
extrn       code(get_repeat_cnt,get_x_spkr)
extrn       code(save_repeat_cnt,save_x_spkr)
extrn       data(secs,rack)
extrn       data(rom_version)
extrn       data(vectorl,vectorh,rvalue,sv_cmd,porta,portb,atswitch)
extrn       data(ticks,time50,timer_tics,rack_z1)

extrn       xdata(hours,minutes,seconds,bell_ans)
extrn       xdata(sreg)
extrn       xdata(amp_xn)
extrn       xdata(amp_xp)

public      get_in,char_error
public      parse_it,x_spkr,ctrl_c
public      got_reset,trans_on,send_full_dup
public      space_off,orig,chk_s0,update_ports
public  cmd_echo,pulse_dial,reverse_fg
public      repeat_cnt,tx_flow
public      tempbit1,tempbit2
public      abs_abort_error
public      saving_fg,clock_mode


parse_xdata segment     xdata
```

```
                rseg        parse_xdata
last_s:         ds          1
x_spkr:         ds          1                       ; upper nybble is x mode
                                                    ; lower is speaker mode
repeat_cnt: ds      1                   ; num times we can repeat 'D' cmd


parse_mode_bits         segment bit
                            rseg        parse_mode_bits

;THE FOLLOWING BITS CANNOT BE OVERLAYED WITH ONLINE CODE
send_full_dup:          dbit        1
trans_on:   dbit        1                   ; c0 command
clock_mode:             dbit        1                   ; clock mode
pulse_dial: dbit        1
orig:                   dbit        1                   ; 1 = originate mode
cmd_echo:   dbit        1                   ; command echo bit
got_reset:  dbit        1                   ; indicates got Z command

;THE FOLLOWING BITS CAN BE OVERLAYED WITH ONLINE CODE WITH CARE.
ctrl_c:                 dbit        1                   ; set for control c recognition
space_off:  dbit        1                   ; set when ctrl_c is encountered
tx_flow:                                    ; used in LS to signal TX flow control
tempbit1:   dbit        1
tempbit2:   dbit        1

parse_temp_bits                 segment     bit
                                rseg        parse_temp_bits
;THE FOLLOWING BITS CAN BE OVERLAYED WITH ONLINE CODE.
dialing_fg: dbit        1                   ; dialing in progress
adapt_fg:   dbit        1                   ; set if adapt dialing hasn't
                                                    ; determined tone or pulse yet
reverse_fg: dbit        1                   ; set if 'R' cmd was given.
quote_fg:   dbit        1                   ; set if in 'ATD"...' quote mode
saving_fg:  dbit        1                   ; set if saving phone # to novram -'&Z'
extern_fg:  dbit        1                   ; set if reading phone # from novram.
                                                                        ; only relevant
in dialing loop

$eject
;**************************************************

        %*define(get_extrn(address)) (
        mov         dptr,#%address
        movx        a,@dptr
        )

        %*define(set_extrn(address)) (
        mov         dptr,#%address
        movx        @dptr,a
        )
```

```
        %define(set_adapt) (                ; set adapt_fg to see if adapt dialing
        call        get_x_spkr
;       mov         a,x_spkr
        mov         c,acc.5
        orl         c,acc.6
        mov         adapt_fg,c
        )


        %define(wait_sec) (                                     ;del num secs in acc
        clr         ea
        mov         ticks,#120
        mov         time50,#20
        mov         secs,a
        setb        timer_on
        setb        ea
        mov         a,secs
        jnz         $-2
        clr         timer_on
        )
        parse       segment     code
        rseg        parse

parse_it:
        mov         r0,#00                          ;cmd buff pointer LSB
        call        echo_off

        clr         quote_fg                ;not in quote mode
        clr         saving_fg               ;not saving phone # to novram
        clr         dialing_fg              ;not dialing a phone #
        clr         extern_fg               ;not taking dial string from novram

;-----------------------------

        ; ****** M A I N   C M D   L O O P ******

get_in:
        clr         ctrl_c                          ;clr vars for out_a_char
        clr         space_off

        jnb         ri,$+6                          ;see if abort while dialing
        jb          dialing_fg,$+6
        ljmp        get_in2                         ;continue w/ no abort

;-----------------------------
abs_abort_ok:                                       ;END CMD EXEC w/ OK RESULT CODE
        mov         b,#00
        sjmp        dial_abort

;-----------------------------
abs_abort_error:                            ;END CMD EXEC w/ ERROR RESULT CODE
        mov         b,#04                           ;
```

```
;------------------------------
dial_abort:
        jnb     dialing_fg,cmd_done     ;ignore following if not in dial cmd
        jnb     saving_fg,$+6                   ;if 'ATD&Znnn', must finish the save.
        lcall   store_novram
        clr     ri
        clr     dialing_fg
;       clr     orig                            ;removed LMP 7/1/86
        call    get_x_spkr
;       mov     a,x_spkr                ;turn off speaker unless M2
        anl     a,#0f0h
        cjne    a,#20h,$+5
        sjmp    $+4                             ;here to keep speaker on
        setb    spkr_pin                ;turn speaker off

        %IF (%RACK) THEN (              ; check busy switch
        mov     a,rack
        jnb     acc.1,cmd_done
        ) FI

        setb    oh_pin
;       jmp     cmd_done

;------------------------------
cmd_done:                               ;abort command. Error.
update_ports:
        jnb     saving_fg,updp_2        ;if saving to nram, close the save
        call    store_novram                    ;actually save to novram
updp_2:
        jb      got_reset,chk_s0        ;in case 'ATDnnnnZ'
        jnb     cdet_pin,update                 ;ignore orig/ans mode if online.
        jnb     dialing_fg,chk_s0
        clr     dialing_fg
        jnb     reverse_fg,go_data      ;if reverse_fg,clr orig so we go to
        call    set_answer

        clr     orig                            ;ans mode
go_data:
        jmp     send_1224_data                  ;TRAINING SEQ. AREA

chk_s0:                                         ;cmd done, if not dialing
        jnb     cdet_pin,update                 ;ignore following if cmd mode online

        mov     dptr,#sreg+16                   ;set alb pin depending on S16.0
        movx    a,@dptr
        rrc     a
        mov     alb_pin,c

        mov     dptr,#sreg+0
        movx    a,@dptr
        clr     oa_pin                          ;AA LED on if S0 <> 0
        jz      update
```

```
                setb    oa_pin
update:
;               jb      alb_pin,update_echo
;               jb      cdet_pin,update_echo
;               call    online_check
update_echo:                                    ;here for 'ERROR' if cmd mode online
                jb      got_reset,update_noreset;no echo if 'ATZ'.
                mov     c,cmd_echo
                mov     echo_pin,c
update_noreset:
                mov     dptr,#08000h
                mov     a,portb
                movx    @dptr,a
                mov     dptr,#0A000h
                mov     a,porta
                movx    @dptr,a
                mov     a,b
                jmp     send_result

;-----------------------------
get_in2:                                ;GET CMD, CONT.
                jnb     extern_fg,get_in3       ;
                call    get_digit               ;get cmd from novram
                jz      extern_done
                mov     b,a
                jb      at_quiet,not_a_cr
                call    putc
                mov     a,b
                sjmp    not_a_cr                ;jump if not end of phone #.
extern_done:
                clr     extern_fg               ;no more phone # in novram.

get_in3:
                mov     P2,#00                          ;cmd buff pointer MSB
                movx    a,@r0                           ;grab cmd char
                inc     r0
                jnz     not_a_CR
                mov     b,#00
                jmp     cmd_done
not_a_CR:
                mov     c,dialing_fg            ;if dialing or saving to nram, chk
                orl     c,saving_fg             ;quote mode
                anl     c,quote_fg              ;are we in quote mode ?
                jnc     not_quote
                                                ;here in quote mode, and dialing
                cjne    a,#'A',$+3
                jc      not_quote
                cjne    a,#'Z'+1,$+3
                jnc     not_quote
                                                ;here we have quoted dial digit,
;------------------------------
dial_quotes:
```

```
            cjne    a,#'Z',quoted1                      ;Convert to corresp. number digit.
            jmp     quote_err               ;ERROR: no corresp. digit
quoted1:
            cjne    a,#'Q',quoted2
quote_err:
            jmp     abs_abort_error                     ;ERROR: no corresp. digit
quoted2:
            cpl     c                                   ;sub 1 extra if above 'Q'
            subb    a,#'A'
;           jb      acc.7,quote_err
            mov     b,#3
            div     ab
            add     a,#2+'0'                ;convert to ascii val of decimal equiv.

;-----------------------------
not_quote:
            jnb     saving_fg,not_saving
            push    acc                                 ;save cmd char
            call    save_digit              ;here if '&Z' save phone # mode.
            pop     acc
            jc      not_saving              ;jump if that digit wasn't savable.
                                                        ;ACT ON IT!
            cjne    a,#';',nquote2                      ;semi ends save. Else get next cmd.
            clr     saving_fg
            call    store_novram
nquote2:
            jmp     get_in

;-----------------------------
not_saving:
            mov     r1,a                                ;temp save in r1 for seperate cmds.

            cjne    a,#'Z'+1,$+3
            jnc     char_error
            add     a,#-'!'                 ; set up for table jump
            rl      a
            mov     r2,a
            add     a,#(jump_table-get_low_addr+1)
            movc    a,@a+PC
get_low_addr:
            push    acc
            mov     a,r2
            add     a,#(jump_table-get_high_addr)
            movc    a,@a+PC
get_high_addr:
            push    acc
            ret

;-----------------------------
char_error:                                 ; general cmd char error.
            jb      dialing_fg,charerr2     ; if dialing blow off error chars
            mov     b,#04
```

```
        jmp     cmd_done
charerr2:
        jmp     get_in


$EJECT
;-----------------------------
jump_table:
        dw      dial_exclam     ; !
        dw      dial_quote      ; "
        dw      dial_pound      ; #
        dw      help_scrn       ; $
        dw      char_error      ;
        dw      ampersand       ; &
        dw      char_error      ; '
        dw      dial_lparen     ; (
        dw      dial_rparen     ; )
        dw      dial_aster      ; *
        dw      char_error      ; +
        dw      dial_comma      ; ,
        dw      dial_dash       ; -
        dw      blow_off        ; .
        dw      wait125                 ; /
        dw      dial_num        ; 0
        dw      dial_num        ; 1
        dw      dial_num        ; 2
        dw      dial_num        ; 3
        dw      dial_num        ; 4
        dw      dial_num        ; 5
        dw      dial_num        ; 6
        dw      dial_num        ; 7
        dw      dial_num        ; 8
        dw      dial_num        ; 9
        dw      char_error      ; :
        dw      dial_semi       ; ;
        dw      char_error      ; <
        dw      equal                   ; =
        dw      repeat_cmd      ; >
        dw      question        ; ?
        dw      dial_atsign     ; @
        dw      go_ans                  ; A
        dw      ans_tone        ; B
        dw      C_cmd                   ; C
        dw      dial_do                 ; D
        dw      echo                    ; E
        dw      duplex                  ; F
        dw      go_cliff        ; G - DEBUG
        dw      on_off_hook             ; H
        dw      send_info       ; I
        dw      go_cliff2       ; J - DEBUG
        dw      clock                   ; K
```

```
        dw      l_command                       ; L - DEBUG
        dw      speaker                         ; M
        dw      char_error              ; N
        dw      online                          ; O
        dw      dial_p                          ; P
        dw      quiet                           ; Q
        dw      dial_r                          ; R
        dw      sreg_query              ; S
        dw      dial_t                          ; T
        dw      char_error              ; U
        dw      verbose                         ; V
        dw      dial_wait               ; W
        dw      xreg                            ; X
        dw      disp_freq               ; Y
        dw      rset                            ; Z

$eject
;**********************************************
;
;
;       INDIVIDUAL COMMAND ROUTINES
;
;
;**********************************************

;---------------------------
l_command:                                      ;DEBUG
        call    ascii_binary
;;;     call    respond
        jmp     get_in

;---------------------------
go_cliff:                               ;DEBUG
        jmp     get_in

;---------------------------
go_cliff2:                              ;DEBUG
        jmp     get_in

;---------------------------
help_scrn:
        mov     dptr,#help_gen
help_do:
        call    help_go
        jmp     get_in

;---------------------------

blow_off:                               ;general no-op
        jmp     get_in

;---------------------------
equal:                                          ;'ATSn=r' or 'AT=r' cmd
        call    ascii_binary
```

```
        jc      dont_do                 ; number > 255
        mov     b,a
;;      mov     a,last_s                ; got an = without an s
        mov     dptr,#last_s
        movx    a,@dptr
        cjne    a,#20,ok                ; S20 is read only
        jmp     get_in
ok:
        call    setup_s
        mov     dptr,#sreg+13           ; watchdog test?
        movx    a,@dptr
        jnb     acc.7,not_wtch
        clr     ea
        sjmp    $
not_wtch:
        jmp     blow_off

dont_do:
        jmp     char_error

;----------------------------
question:                               ;'ATSn?' or 'AT?' cmd
;;      mov     a,last_s
        mov     dptr,#last_s
        movx    a,@dptr
        call    get_s
        call    send_3
        jmp     get_in

;----------------------------
go_ans:                                 ;'ATA' cmd
        jb      cdet_pin,ans_ok
        mov     b,#4
        jmp     cmd_done
on_line_ok:
        jmp     return_online
ans_ok:
        clr     orig
        call    go_off_hook
        mov     dptr,#amp_xn
        movx    a,@dptr
        cjne    a,#6,$+6
        ljmp    fast_train
        jmp     send_1224_data

;----------------------------
online:                                 ;'ATO' cmd
        jnb     cdet_pin,on_line_ok     ; if online resume data mode
        call    go_off_hook
        jnc     online_go
;       mov     b,#6                    ;NO DIAL TONE
        jmp     cmd_done
```

```
online_go:
        jmp     send_1224_data

;-----------------------------
ans_tone:                               ;'ATBn' cmd
        call    parse_01
        clr     a
        rlc     a
        %set_extrn(bell_ans)
        jmp     get_in

;-----------------------------
c_cmd:                                  ;'ATCn' cmd
        call    parse_01
        mov     trans_on,c
        jmp     get_in

;-----------------------------
echo:                                   ;'ATEn' cmd
        call    parse_01
        mov     cmd_echo,c
        jmp     get_in

;-----------------------------
duplex:                                 ;'ATFn' cmd
        call    parse_01
        mov     send_full_dup,c
        jmp     get_in

;-----------------------------
on_off_hook:                            ;'ATHn' cmd
        call    parse_01
        jc      h1_off_hook
        setb    cd_false                ; set loss of carrier if

        %IF (%RACK) THEN (              ; make sure we read the ALB switch
        orl     rack_z1,#04             ; on return to command mode
        mov     a,rack
        jnb     acc.1,ath_ok            ; check busy switch
        ) FI

        setb    oh_pin                  ; online cmd mode
ath_ok:
        jmp     get_in
h1_off_hook:
        call    go_off_hook
        jnc     ath_ok                  ;jump if no error
;       mov     b,#6                    ;NO DIAL TONE result code
        jmp     cmd_done

;-----------------------------
clock:                                  ;'ATKn' cmd
```

```
        call    parse_01                        ; 1 = real time clock
        mov     clock_mode,c
        mov     clock_on,c
        jmp     get_in

;-----------------------------
speaker:                                        ;'ATMn' cmd
        call    ascii_binary
        jnc     chk_above_3
        jmp     char_error
;       mov     a,#3
chk_above_3:
        cjne    a,#4,$+3
        jc      value_ok
        jmp     char_error
;       mov     a,#3
value_ok:
        setb    spkr_pin                        ;turn speaker off
        cjne    a,#2,save_mode
        clr     spkr_pin                        ;turn speaker on
save_mode:
        mov     b,a
        call    get_x_spkr
        anl     a,#0f0h
        orl     a,b
        call    save_x_spkr
;       anl     x_spkr,#0f0h
;       orl     x_spkr,a

        jmp     get_in

;-----------------------------
quiet:
        call    parse_01
        mov     at_quiet,c
        jmp     get_in

;-----------------------------
sreg_query:                                     ;'ATSn' cmd for 'ATSn=r' or 'ATSn?'
        mov     P2,#00                          ;cmd buff pointer MSB
        movx    a,@r0
        cjne    a,#'$',not_dollar
        inc     r0                              ;'ATS$' help screen
        mov     dptr,#help_s
        jmp     help_do
not_dollar:

        call    ascii_binary
        jc      bad_reg
        cjne    a,#24,$+3
        jnc     chk_s99
;;      mov     last_s,a
```

```
        mov     dptr,#last_s
        movx    @dptr,a
        jmp     get_in
chk_s99:
        cjne    a,#99,bad_reg
;       jmp     s99_routine
        jmp     get_in
bad_reg:
        jmp     char_error

;-----------------------------
verbose:
        call    parse_01
        mov     at_verbose,c
        jmp     get_in

;-----------------------------
xreg:
        call    ascii_binary
        jc      bad_reg
        cjne    a,#8,$+3
        jnc     bad_reg
        swap    a
        mov     b,a
        call    get_x_spkr
        anl     a,#0fh
        orl     a,b
        call    save_x_spkr
;       anl     x_spkr,#0fh                     ;ms nybble only
;       orl     x_spkr,a

        %set_adapt
        jmp     get_in

;-----------------------------
rset:                                                   ; 'ATZ'
        jnb     saving_fg,rset2                         ; for 'AT&ZnnnZ
        call    store_novram
rset2:
        setb    got_reset
        mov     b,#0                                    ;ok response
        jmp     cmd_done

$eject
;*********************************************************
;
;       Information commands
;
;*********************************************************
send_info:
        call    ascii_binary
        jc      bad_reg
```

```
        cjne    a,#7,$+3                ;'ATI5'  max legit. I-cmd.
        jnc     bad_reg
        jnz     chk_i1
        call    putstring
        db      crlf,'96'
        db      rom_version + '0'
        db      0
        jmp     out_it
;-----------------------------
chk_i1:
        mov     r1,a
        djnz    r1,chk_i2
        call    out_cr_lf
        mov     dptr,#0
        mov     r1,#0
chksum:
        clr     a
        movc    a,@a+dptr
        add     a,r1
        mov     r1,a
        inc     dptr
        mov     a,dph
        cjne    a,#80h,chksum                           ; 32k eprom
        mov     a,r1
        call    out_3_digits

        call    putstring
        db      85h,0

; get transmitters check sum
        mov     a,#1eh
        call    to_transmitter
        call    from_transmitter
        push    acc
        call    from_transmitter
        call    puthexdigit
        pop     acc
        call    puthexdigit
        call    putstring
        db      86h,0

get_recv_checksum:
        mov     a,#59h                                  ; recv check cmd
        call    to_transmitter
grc_loop:
        call    from_transmitter
        push    acc
        call    from_transmitter
        push    acc
        call    from_transmitter
        push    acc
        call    from_transmitter
```

```
        push    acc

        mov     r1,#4
grc_pr_loop:
        pop     acc
        call    puthexdigit
        djnz    r1,grc_pr_loop

        call    out_cr_lf
        jmp     get_in

;----------------------------
chk_i2:
        djnz    r1,chk_i3
        mov     dptr,#00
get_ram:
        movx    a,@dptr
        mov     r1,a
        xrl     a,#0ffh                 ; invert it
        movx    @dptr,a
        movx    a,@dptr
        xrl     a,r1
        inc     a
        jnz     bad_ram
        mov     a,r1
        movx    @dptr,a                 ; restore it
        inc     dptr
        mov     a,dph
        cjne    a,#20h,get_ram
        call    xdelay_125ms
        call    out_cr_lf
        call    putstring
        db      'OK',0
        sjmp    out_it
bad_ram:
        call    xdelay_125ms
;       call    out_cr_lf
        call    putstring
        db      crlf,'ERROR',0
out_it:
        call    out_cr_lf
        call    xdelay_125ms
        jmp     get_in
;----------------------------
chk_i3:
        djnz    r1,do_i4
        mov     P2,#00                  ;cmd buff pointer MSB
        movx    a,@r0
        cjne    a,#'=',send_time
        inc     r0
        call    ascii_binary
        jnc     chk_hours
```

```
        jmp     char_error
chk_hours:
        cjne    a,#24,$+3           ; is hours>23
        jc      hours_ok
        jmp     char_error
hours_ok:
        mov     dptr,#hours
        movx    @dptr,a
        mov     P2,#00                        ;cmd buff pointer MSB
        movx    a,@r0
        cjne    a,#':',update_done
        inc     r0
        call    ascii_binary
        jnc     chk_mins
        clr     a
chk_mins:
        cjne    a,#60,$+3           ; if minutes > 59 then = 0
        jc      mins_ok
        clr     a
mins_ok:
        dec     dpl
        movx    @dptr,a                       ; minutes
;       mov     P2,#00                        ;cmd buff pointer MSB
        movx    a,@r0
        cjne    a,#':',update_done
        inc     r0
        call    ascii_binary
        jnc     chk_secs            ; if secs > 59 then = 0
        clr     a
chk_secs:
        cjne    a,#60,$+3
        jc      secs_ok
        clr     a
secs_ok:
        dec     dpl
        movx    @dptr,a                       ; seconds
update_done:
        jmp     get_in

send_time:                          ; i3 encountered
        call    xdelay_125ms
        call    out_cr_lf
        mov     dptr,#hours
        movx    a,@dptr
        call    out_2_digits
        mov     a,#':'
        call    putc
        mov     dptr,#minutes
        movx    a,@dptr
        call    out_2_digits
        mov     a,#':'
        call    putc
```

```
        mov     dptr,#seconds
        movx    a,@dptr
        call    out_2_digits
        sjmp    out_it
;-----------------------------
do_i4:
        djnz    r1,do_i5
        call    go_do_i4
doi4_2:
        jmp     get_in

;-----------------------------
do_i5:
        djnz    r1,do_i6
        jnb     saving_fg,doi5_2
        call    store_novram                    ;here if 'AT&Znnnnnni5'
        clr     saving_fg                       ;close the save-phone-num
doi5_2:
        call    go_do_i5
        sjmp    doi4_2

;-----------------------------
do_i6:
        jmp     go_do_i6

$eject
;*********************************************************
;       Dialing routines
;*********************************************************
dial_do:                                        ;'ATD' cmd
        mov     P2,#00                          ;cmd buff pointer MSB
        movx    a,@R0
        cjne    a,#'$',dial_nothelp
        inc     r0                              ; 'ATD$' cmd - dial help
        mov     dptr,#help_dial
        jmp     help_do

dial_nothelp:
        ;Here if we parsed a 'D' or 'DS' in dial string
        jnb     saving_fg,dial_chkds    ;'AT&ZnnD' or 'AT&ZnnDS' ends save.
        clr     saving_fg               ;Terminate '&Z' mode (dial string to
        call    store_novram                    ;novram) and enter actual dial mode.

dial_chkds:
        mov     P2,#00                          ;cmd buff pointer MSB
        movx    a,@R0
        cjne    a,#'S',dial_notds
        inc     r0                              ;'ATDS' cmd - dial from novram
        call    ascii_binary            ; which phone #?
        jc      dial_abort_error
        cjne    a,#4,$+3
        jnc     dial_abort_error
```

```
        mov     b,#24
        mul     ab
        add     a,#low novram_phone_num
        mov     dptr,#phone_num_begin
        movx    @dptr,a

        clr     a
        mov     dptr,#inside_phone_pointer
        movx    @dptr,a

        setb    extern_fg                   ;flag that we're reading from external
        jb      at_quiet,dial_notds
;       call    out_cr_lf
        call    putstring
        db      crlf,'Dialing...',0

dial_notds:

        ;       First thing is to go off hook, turn on speaker
        ;       and wait S6 seconds.

        jb      cdet_pin,ok_dial            ;error if 'ATD' online
        mov     b,#4
dial_error:
        jmp     cmd_done
;       jmp     update_echo
ok_dial:
        clr     quote_fg
        setb    orig
        setb    dialing_fg
        jnb     oh_pin,dial_ret                  ; if already off hook, then ignore following
        clr     ring1                            ; haven't got ring back for '@'
        clr     reverse_fg                  ; Reset 'R' cmd
        %set_adapt                          ; see if using adaptive dialing
        call    go_off_hook
        jnc     dial_ret
;       mov     b,#6                             ;NO DIAL TONE result code
        jmp     dial_abort

dial_ret:
        jmp     get_in


;----------------------- ----
dial_abort_ok:
        jmp     abs_abort_ok                     ;print 'OK'
dial_abort_error:
        jmp     abs_abort_error                  ;print 'ERROR'


;------------------------------
```

```
dial_num:                                       ;here to dial '0' - '9'
dial_pound:                                     ;'#'
dial_aster:                                     ;'*'
            jnb         dialing_fg,dial_abort_error
            mov         a,r1                            ;get cmd (digit) to be dialed
            call        t_tone                          ; dial the number
            jmp         get_in

;----------------------------
repeat_cmd:                                             ;'AT>' CMD     RCS 7/17/86
            call        get_repeat_cnt
;           mov         a,repeat_cnt                    ; repeat count should always be 10
            jz          clear_it                ; dial command is only  routine
            setb        repeat                          ; that decrements repeat_cnt
            jmp         get_in
clear_it:
            clr         repeat
            jmp         get_in

;----------------------------
wait125:                                        ;'AT/' cmd
            mov         a,#25                           ;del 125 msec
            call        xdelay_5ms
            jmp         get_in

;-----------------------------
dial_lparen:                                    ;only valid if dialing
dial_rparen:
            jnb         dialing_fg,abort_jmp

;-----------------------------
dial_dash:                                      ;save if dialing. else noop
            jmp         get_in
abort_jmp:
            jmp         dial_abort_error
;-----------------------------
dial_semi:                                      ; ';'
            jnb         dialing_fg,abort_jmp
            clr         dialing_fg              ;out of dialing mode
            jmp         get_in                          ;main cmd parsing loop

;-----------------------------
dial_t:
            clr         pulse_dial
            sjmp        dialp_2

;-----------------------------
dial_p:
            setb        pulse_dial
dialp_2:
            clr         adapt_fg                ;no more adaptive dialing
            jmp         get_in
```

```
;-----------------------------
dial_r:
        push    0
        movx    a,@r0
        cjne    a,#'S',not_s99
        inc     r0
        call    ascii_binary
        cjne    a,#99,not_s99
        movx    a,@r0
        cjne    a,#'?',not_s99
        inc     r0
        sjmp    print_names
not_s99:
        pop     0
        setb    reverse_fg
        jmp     get_in

print_names:
        pop     acc
        mov     dptr,#datestr
        call    out_a_string
        call    putstring
        db      crlf,'(c)1987 USRobotics',crlf
        db      'Software by Cliff Wallach, Robert C. Suffern',crlf
        db      'Hardware by Andy Norell, Andy M. Denenberg',crlf,0
        jmp     get_char_jmp

dial_jmp:
        jmp     dial_abort_error

;-----------------------------
dial_quote:                             ;'ATD"'
        jb      saving_fg,$+6                   ;ok only if saving_fg or dialing_fg
        jnb     dialing_fg,dial_jmp
        cpl     quote_fg
get_char_jmp_jmp:
        sjmp    get_char_jmp

;-----------------------------
dial_wait:
        jnb     dialing_fg,dial_jmp
        call    get_x_spkr
;       mov     a,x_spkr                ;wait for 2nd dial tone if X3 or above
        swap    a
        anl     a,#0fh
        add     a,#-3
        jb      acc.7,dial_comma        ;jump if X0-X2, just delay 2 seconds
        clr     b.0                             ;not doing '@' cmd
        call    callprog1
        jnc     get_char_jmp                    ;OK if we got answer tone
        jb      b.1,get_char_jmp        ;OK if we got answer tone
        mov     b,#3                            ;NO CARRIER result code
```

```
        jmp     dial_abort              ;err


;----------------------------
dial_comma:
;       mov     a,#08
;       call    get_s
        mov     dptr,#sreg+8
        movx    a,@dptr
        jz      nowait
        mov     r1,a                            ;r1 holds seconds count
comma_loop:
        mov     a,#200                          ;del 1 sec. each pass.
        call    xdelay_5ms
        djnz    r1,comma_loop
nowait:
get_char_jmp:
        jmp     get_in

;----------------------------
dial_atsign:
        jnb     dialing_fg,dial_abort_error_jmp
        call    get_x_spkr
;       mov     a,x_spkr                ;requires X3 or above
        swap    a
        anl     a,#0fh
        add     a,#-3
        jnb     acc.7,dialans_go        ;jump if OK
dial_abort_error_jmp:
        jmp     dial_abort_error        ;ELSE ERROR
dialans_go:                             ;DO '@' cmd here.

        setb    b.0                             ;wait for first ring and 5 sec silence
        call    callprog1
        jnc     get_char_jmp                    ;ok if we got ans tone
        jnb     b.0,get_char_jmp                ;ok if we got successful '@' silence.
        mov     b,#8                            ;NO ANSWER result code
        jmp     dial_abort

;----------------------------
dial_exclam:
        jnb     dialing_fg,dial_abort_error_jmp

        call    on_hook
        mov     a,#100                  ;500 ms
        call    xdelay_5ms

        call    off_hook
        mov     a,#100                  ;500 ms
        call    xdelay_5ms

        jmp     get_char_jmp
```

```
$eject
;*************************************************************
;
;           dial the phone with either touch tones or pulse
t_tone:
            push      acc                                   ;save digit from corruption
            mov       dptr,#sreg+16                          ; clear ALB
            movx      a,@dptr
            anl       a,#0feh
            movx      @dptr,a
            pop       acc

            mov       dptr,#8000h
            jnb       adapt_fg,noadapt
            clr       adapt_fg                    ;Use 1st digit for test

            push      acc                                   ;save digit from corruption
            call      send_tones                  ;send touch tone

            call      set_mercury                            ; set wide band
            call      set_originate
            call      dtmf_on

            mov       a,#14                                  ;del 70 msec
            call      xdelay_5ms
            mov       r1,#20                                 ; wait 2 sec. for dial tone
                                                             ; to end
dial_chk:
            call      getfreq
            cjne      r4,#3,$+3
            jnc       adapt_succ
            cjne      a,#30,$+3
            jc        adapt_succ
            cjne      a,#70,$+3
            jc        adapt_fail

adapt_succ:                                       ;here we got no dial tone.
            clr       pulse_dial                  ;Tone dialing from now on.
            sjmp      adapt_cont
adapt_fail:                                       ;here we have dial tone
            djnz      r1,dial_chk
            setb      pulse_dial                  ;Thus Pulse Dial only.
adapt_cont:
            call      set_courier
            call      dtmf_off
            call      set_originate

            pop       acc                                    ;clr stack & restore arg
            jb        pulse_dial,noadapt          ;dial in pulse if we need to
            ret

noadapt:
            jnb       pulse_dial,send_tones
```

```
        cjne    a,#'#',$+5
        sjmp    blow_pulse              ;ignore digit since pulsing
        cjne    a,#'*',$+5
        sjmp    blow_pulse              ;ignore digit since pulsing

        ;here to pulse dial digit in acc
        ;================================

        clr     c
        subb    a,#'0'
        jnz     not_zero
        mov     a,#10
not_zero:
        setb    timer_on
        mov     r1,a

pulse_it:
        call    on_hook

        %get_extrn(amp_xp)
        mov     c,acc.0
        mov     a,#12                   ; on hook 61ms
        jnc     delay1
        inc     acc                     ; on hook 66ms
delay1:
        call    xdelay_5ms

        call    off_hook

        %get_extrn(amp_xp)
        mov     c,acc.0
        mov     a,#8                    ; off hook 39ms
        jnc     delay2
        dec     acc                     ; off hook 34ms
delay2:
        call    xdelay_5ms

        djnz    r1,pulse_it

        mov     a,#140                  ; 700ms inter char delay
        call    xdelay_5ms

blow_pulse:
        ret

send_tones:                     ;DIAL TOUCH TONE. DIGIT IN ACC
        ;================================
        push    acc
        call    dtmf_on
        call    set_originate
        pop     acc
```

```
        cjne    a,#'#',not_lb
        mov     a,#0ah
        sjmp    send_to_tx
not_lb:
        cjne    a,#'*',get_num
        mov     a,#0bh
        sjmp    send_to_tx
get_num:
        subb    a,#'0'
send_to_tx:
        mov     sv_cmd,a
        setb    sv_flag
        jb      sv_flag,$
;***** make sure the command got sent then erased
wait_cmd:
        mov     a,tr
        cjne    a,#0ffh,wait_cmd

;**************************************************
;               because the transmitter uses both timers
;               to generate the tones the sup. must generate
;               its own 2400 baud clock during touch tones
;**************************************************

        mov     startb_l,#7ah           ; count for 1/2400 sec.
        mov     startb_h,#0feh
        setb    first_int
        setb    t_timing
        mov     th0,#0feh
        mov     tl0,#7ah
        mov     TMOD,#00100001b
        setb    tr0
        mov     ie,#10000010b           ; turn on timer 0 ints

        mov     a,#16
        call    get_s
        jnb     acc.1,chk_s11
        jnb     ri,$
        clr     a
        sjmp    no_wait
chk_s11:
        mov     a,#11                   ; get S11 for time on and off
        call    get_s
        mov     b,#05
        div     ab
        jz      no_wait

        push    acc
        call    xdelay_5ms
        pop     acc

no_wait:
```

```
        mov     ie,#10000100b
        clr     tr0
        clr     t_timing
        mov     sv_cmd,#00
        setb    sv_flag
        jb      sv_flag,$
        jz      no_wait2

        call    xdelay_5ms

no_wait2:
        clr     timer_on
        push    acc
        call    dtmf_off
        pop     acc
        ret

$eject
;***********************************************************
;               misc. character routines
;***********************************************************

send_3:
        call    xdelay_125ms
        mov     b,a
        call    out_cr_lf
        mov     a,b
        call    out_3_digits
        call    out_cr_lf
        call    xdelay_125ms
        ret


;*****************************************************
;               Display frequencies
;*****************************************************

        extrn   code(set_courier)
disp_freq:
        call    ascii_binary
        cjne    a,#4,check_leds
        call    set_mercury
        call    set_originate
        call    dtmf_on
        mov     a,#3
        call    xdelay_5ms
get_the_freq:
        call    out_cr_lf
        call    getfreq
        call    send_3
        jnb     ri,get_the_freq
        call    set_courier
```

```
        call    dtmf_off
df_jmp:
        jmp     get_in

check_leds:
        cjne    a,#5,df_jmp
; turn on leds
        call    led_test
        jmp     get_in

        END
```

```
            UNL
****************************************
*           RECV
*
*           Main TMS 30320 root module
*
****************************************
            IDT         'RECV'
            TITL        'Receive Main module'
            DEF         RETURN,TSIDLE,WAIT,DISBOX,EXEC,GETCOS
            DEF         INIT,COUNT
            REF         CLRMOD,MOD96,CLRTAP,INCANG
            REF         RECV48,RECV72,RECV96
            REF         ORG3,ORG12,ORG24,ANS3,ANS12,ANS24
            REF         DIBITO,DIBITA,BCRCV3,STOP,START,AGCHI,AGCLOW
            REF         UPTAP,NOTAP,DO4PH,DOV32,NOBAUD,DOBAUD
            REF         BCRCV,BCRCV2

*           I/O PORTS
* BIO = rd51
* XF = S/H
INX         EQU         0                               ;** display X input
INY         EQU         1                               ;** display Y input
OUTX        EQU         2                               ;** display X output
OUTY        EQU         3                               ;** display Y output

OUT51       EQU         5                               ;** out data port
IN51        EQU         4                               ;** input data port
ADC         EQU         6                               ;** A/D input port
LATCHP      EQU         7                               ;** latch port
* latch.0 = interrupt 8051
* latch.1 = wr51
* latch.2 = AGC0
* latch.3 = tone enable                 ; 2400 =1,  9600 =0
* latch.4 = originate / answer          ; always 0, except 1 when tx9600

*           ON CHIP REGISTERS
TIM         EQU         2                               ; timer reg
PRD         EQU         3                               ; timer reload reg
IMR         EQU         4                               ; interrupt mask reg
GREG        EQU         5

*           PAGE 0 REGISTERS
VECTOR      EQU         >60                             ; timer isr jump
BOOST       EQU         >61                             ; emphasis
FCODE       EQU         >62                             ; holds sv command
RESULT      EQU         >63                             ; holds data for sv
SAMPL0      EQU         >64                             ; A/D sample 0
SAMPL1      EQU         >65                             ; A/D sample 1
SAMPL2      EQU         >66                             ; A/D sample 2
LATCH       EQU         >67                             ; output latch image
TIMER       EQU         >68                             ; not used?
```

```
SYSFLG   EQU     >69                         ; bit flags
T0       EQU     >6A                         ; timer temp
T1       EQU     >6B                         ; timer temp
X0       EQU     >6C                         ; main temp
X1       EQU     >6D                         ; main temp
X2       EQU     >6E                         ; main temp
X3       EQU     >6F                         ; main temp
ONE      EQU     >70                         ; not used?
FEE      EQU     >71                         ; getcos temp
COUNT    EQU     >72                         ;** DEBUG

*        M O D E  B I T S
FTRA     EQU     >F                          ; 1 = train mode
FRETRA   EQU     >E                          ; 1 = preserve taps
FTAP     EQU     >D                          ; 1 = update taps
FV32     EQU     >C                          ; 0 = 4 phase, 1 = v32
FTHREE   EQU     >B                          ; 1 = we have 3 samples
FBAUD    EQU     >A                          ; 1 = do baud loop correction
FDATA4   EQU     >9                          ; 1 = 4-phase data
FDATA7   EQU     >7                          ; 1 = 7200 data

OTRA     EQU     >0001                       ; set train mode
ORETRA   EQU     >0002                       ; set preserve taps
OTAP     EQU     >0004                       ; set update taps
OV32     EQU     >0008                       ; set v32 decisions
OTHREE   EQU     >0010                       ; set we have 3 samples
OBAUD    EQU     >0020                       ; set baud correction
ODATA4   EQU     >0040                       ; set 4-phase data
O1920    EQU     >0080                       ; set 1920 carrier
ODATA7   EQU     >0100                       ; set 7200 data

ATRA     EQU     >FFFE                       ; clr train mode
ARETRA   EQU     >FFFD                       ; clr preserve taps
ATAP     EQU     >FFFB                       ; clr update taps
AV32     EQU     >FFF7                       ; clr v32 decisions
ATHREE   EQU     >FFEF                       ; clr we have 3 samples
ABAUD    EQU     >FFDF                       ; clr baud correction
ADATA4   EQU     >FFBF                       ; clr 4-phase data
A1800    EQU     >FF7F                       ; set 1800 carrier
ADATA7   EQU     >FEFF                       ; clr 7200 data

D0       EQU     >F                          ; bit 0
D1       EQU     >E                          ; bit 1
D7       EQU     >8                          ; bit 7
D14      EQU     >1                          ; bit 14
D15      EQU     >0                          ; bit 15


         PSEG

*        V E C T O R S
```

```
*           AORG    0
            B       RESET                       ; power on reset
            B       INT0                        ; spare external interrupt
            B       MOD96                       ; comm w transmitter
            B       INT2                        ; spare external interrupt

            DATA    0,0,0,0
            DATA    0,0,0,0
            DATA    0,0,0,0
            DATA    0,0,0,0

*           AORG    24
            B       TINT                        ; timer interrupt
            B       RINT                        ; not used
            B       XINT                        ; not used
            DINT                                ; trap handler
            IDLE                                ;** DEBUG
            B       $-1

ERROR
            DINT                                ;** debug
            IDLE                                ; halt if an error
            B       $-1


INT0        TRAP                                ; trap spurious interrupts
INT2        TRAP
RINT        TRAP
XINT        TRAP

TINT        DINT
            MAR     *,4                         ; sel AR4
            SST1    *-                          ; save ST1
            SST     *-                          ; save ST0
            SACH    *-
            SACL    *-
            SSXM
            LDPK    0                           ; sel data page 0
            LAC     VECTOR                      ; load subr addr
            BACC                                ; go!


TSIDLE
* communicate with transmitter
            NOP
            NOP
            NOP
            IN      FCODE,IN51                  ; get sv command
            OUT     RESULT,OUT51                ; put result
            LALK    >FFFF                       ;   reset next result
            SACL    RESULT
            LAC     LATCH
```

```
         ANDK    >00FE                       ;** check bit
         SACL    LATCH
         OUT     LATCH,LATCHP                ; interrupt transmitter
         LAC     LATCH
         ORK     >01
         SACL    LATCH
         NOP
         NOP
         NOP
         NOP
         NOP
         OUT     LATCH,LATCHP
BREAK    LAC     COUNT
         ADLK    1
         SACL    COUNT
RETURN   MAR     *+
         ZALS    *+
         ADDH    *+
         LST     *+                          ; restore ST0
         LST1    *                           ; restore ST1
         EINT                                ; is this needed?
         RET


         DATA    'CC','oo','pp','yy','rr','ii','gg','hh','tt'
         DATA    '  ','11','99','88','66','    ','((','CC','))'
         DATA    '  ','bb','yy','    ','UU','SS','RR'
         DATA    'oo','bb','oo','tt','ii','cc','ss'
         DATA    0


RESET    DINT
         LDPK    0                           ; sel data page 0
         CNFD                                ; configure block as data mem
         SXF                                 ; raise external pin
         MAR     *,4                         ; sel AR4
         ZAC                                 ; clear ram
         LRLK    AR4,>0200              ; addr of block B1
         LALK    >5555                       ;** debug
         RPTK    255
         SACL    *+                          ; clear mem pages 4, 5
         RPTK    255
         SACL    *+                          ; clear mem pages 6, 7
         LARK    AR4,>0060
         RPTK    30
         SACL    *+                          ; clear mem page 0
         LACK    >E3
         SACL    LATCH
         OUT     LATCH,LATCHP
         LALK    ERROR                       ; store address of error
         PUSH                                ; handler on stack
```

```
        PUSH
        PUSH
        PUSH

INIT    DINT
        CNFD                    ; configure block as data mem
        SXF                     ; raise external pin
        SOVM                    ; enable overflow mode
        SSXM                    ; set sign extension mode
        SPM     0               ; no shift on P output
        LDPK    0               ; mem page 0
        LALK    258             ;** baud time... (4800 hz)
        SACL    PRD             ; init timer reload
        SACL    TIM,4           ; load timer
        LACK    08
        SACL    IMR             ; unmask timer
        ZAC
        SACL    GREG
        SACL    SYSFLG

        LALK    TSIDLE          ; init timer vector
        SACL    VECTOR
*       LACK    >01             ; send ready code
*       SACL    RESULT
        LACK    >FF             ; nil command
        SACL    FCODE
        MAR     *,4             ; sel AR4
        LRLK    AR4,>7F         ; init SP
        LACK    1
        SACL    ONE
        CALL    SETBST          ; Default to emphasis


WAIT    LDPK    0               ; sel data page 0
        RXF             ; Needed to cool down TLO84 amd 1/16/87
        EINT
        CALL    EXEC
        B       WAIT

EXEC    LAC     FCODE           ; wait for a command
        ANDK    >00FF           ; strip upper bits
        SACL    X0              ; save it
        BIT     X0,D7           ; test for a command
        BBNZ    EXEC
        LACK    >FF             ; dont exec fcode twice
        SACL    FCODE
        LAC     X0              ; reload the command
        ANDK    >003F           ; strip flag bits
        ADLK    TABLE           ; prepare for indirect jump
        TBLR    X1              ; read address
        LAC     X1              ; load and
        SXF             ; Needed to cool down TLO84 amd 1/16/87
```

```
        BACC                              ; GO!

TABLE
        DATA    RESET                     ; 40
        DATA    TR9600                    ; 41
        DATA    RECV96                    ; 42
        DATA    TR9602                    ; 43
        DATA    TR9603                    ; 44
        DATA    S1920                     ; 45
        DATA    S1800                     ; 46
        DATA    VERS                      ; 47
        DATA    TONE0                     ; 48
        DATA    TONE1                     ; 49
        DATA    SETORG                    ; 4A
        DATA    SETANS                    ; 4B
        DATA    RECV48                    ; 4C
        DATA    RECV72                    ; 4D
        DATA    WAIT                      ; 4E
        DATA    CLRTAP                    ; 4F
        DATA    NOTAP                     ; 50
        DATA    UPTAP                     ; 51
        DATA    DO4PH                     ; 52
        DATA    DOV32                     ; 53
        DATA    NOBAUD                    ; 54
        DATA    DOBAUD                    ; 55
        DATA    DO1800                    ; 56
        DATA    DO1807                    ; 57
        DATA    DO1920                    ; 58
        DATA    CHKSUM                    ; 59
        DATA    SETBST                    ; 5A
        DATA    CLRBST                    ; 5B
        DATA    WAIT                      ; 5C
        DATA    WAIT                      ; 5D
        DATA    WAIT                      ; 5E
        DATA    WAIT                      ; 5F

        DATA    WAIT                      ; 60
        DATA    ORG3                      ; 61
        DATA    ORG12                     ; 62
        DATA    ORG24                     ; 63
        DATA    ANS3                      ; 64
        DATA    ANS12                     ; 65
        DATA    ANS24                     ; 66
        DATA    DIBITO                    ; 67
        DATA    DIBITA                    ; 68
        DATA    BCRCV                     ; 69
        DATA    STOP                      ; 6A
        DATA    START                     ; 6B
        DATA    WAIT                      ; 6C
        DATA    AGCHI                     ; 6D
        DATA    AGCLOW                    ; 6E
        DATA    BCRCV2                    ; 6F
```

```
        DATA    BCRCV3                          ; 70
        DATA    WAIT                            ; 71
        DATA    WAIT                            ; 72
        DATA    WAIT                            ; 73
        DATA    WAIT                            ; 74
        DATA    WAIT                            ; 75
        DATA    WAIT                            ; 76
        DATA    WAIT                            ; 77
        DATA    WAIT                            ; 78
        DATA    WAIT                            ; 79
        DATA    WAIT                            ; 7A
        DATA    WAIT                            ; 7B
        DATA    WAIT                            ; 7C
        DATA    WAIT                            ; 7D
        DATA    WAIT                            ; 7E
        DATA    WAIT                            ; 7F

*       M O D E   F U N C T I O N S

S1800   LDPK    0
        LAC     SYSFLG
        ANDK    A1800
        SACL    SYSFLG
        RET

S1920   LDPK    0
        LAC     SYSFLG
        ORK     O1920
        SACL    SYSFLG
        RET

DO1800  LDPK    6
        LALK    >4000
        SACL    INCANG
        RET

DO1807  LDPK    6
        LALK    >4040
        SACL    INCANG
        RET

DO1920  LDPK    6
        LALK    >4444
        SACL    INCANG
        RET


TONE0   LDPK    0
        DINT
        LACK    >F7
        AND     LATCH
```

```
        SACL    LATCH
        EINT
        RET


TONE1   LDPK    0
        DINT
        LACK    >08
        OR      LATCH
        SACL    LATCH
        EINT
        RET


SETORG  LDPK    0
        DINT
        LACK    >EF
        AND     LATCH
        SACL    LATCH
        EINT
        RET

SETANS  LDPK    0
        DINT
        LACK    >10
        OR      LATCH
        SACL    LATCH
        EINT
        RET

SETBST  LDPK    0
        LALK    -8704               ; -4352
        SACL    BOOST
        RET

CLRBST  LDPK    0
        ZAC
        SACL    BOOST
        RET

VERS    LDPK    0
        LALK    >FFA1               ; return version number
        SACL    RESULT
        RET


TR9600  CALL    CLRMOD
        LDPK    0
*       LACK    >02                 ; unmask transmitter int
*       SACL    IMR
        LALK    RETURN              ; change vector to nothing
        SACL    VECTOR
```

```
         ZAC
         SACL    >72                    ;** debug
         B       BCRCV                  ;** debug

TR9602   CALL    CLRMOD
         LDPK    0
*        LACK    >02                    ; unmask transmitter int
*        SACL    IMR
         LALK    RETURN                 ; change vector to nothing
         SACL    VECTOR

         ZAC
         SACL    >72                    ;** debug
         B       BCRCV2                 ;** debug

TR9603   CALL    CLRMOD
         LDPK    0
*        LACK    >02                    ; unmask transmitter int
*        SACL    IMR
         LALK    RETURN                 ; change vector to nothing
         SACL    VECTOR

         ZAC
         SACL    >72                    ;** debug
         B       BCRCV3                 ;** debug

TAPNUM   EQU     >23
TAPONT EQU       >24

DISBOX   LDPK    0                      ; sel data page 0
         MAR     *,0                    ; sel ar0
         LACK    1                      ; inc counter
         ADD     COUNT
         SACL    COUNT
         IN      X0,INX                 ; read page, x-coordinate
         LAC     X0
         SFR                            ;
         ANDK    >0780                  ; mask not page bits
         SACL    X1                     ; save page offset

         SBLK    >0700                  ; same as above, but faster
         BZ      PLT240
         SBLK    >0080
         BZ      PLTEQU


         LAC     X0
         LACK    >7F                    ; get addr in page
         AND     X0
         ADD     X1                     ; add page address
         SACL    X0                     ; xfer to index
         LAR     AR0,X0
```

```
        OUT     *,OUTX              ; send value to display box
        IN      X0,INY              ; read Y request
        LACK    >7F                 ; mask it
        AND     X0
        ADD     X1
        SACL    X0
        LAR     AR0,X0
        OUT     *,OUTY
        RET

PLTEQU  LDPK    5
        LACK    >6C                 ; check for last tap
        SUB     TAPONT
        BZ      NEWTP               ; Reinitialize
        LAC     TAPONT
        LDPK    0
        BIT     COUNT,D0
        BBNZ    ODDE
        ADLK    >200

        B       EVENE
ODDE    ADLK    >280
EVENE

        SOVM

        SACL    X1
        LAR     AR1,X1
        MAR     *,1
        SQRA    *

        ZAC
        LARK    AR0,>14
        MAR     *0+
        SQRA    *
        APAC

        SFL
        SACH    X1,1                ; Was shift of 1
        LALK    ->7FFF
        ADD     X1
        SACL    X1
        OUT     X1,OUTY             ; Output the Tap weight to Y dimension
        LDPK    5
        OUT     TAPNUM,OUTX         ; Output the Tap # to X dimension
        LAC     TAPNUM
        ADLK    >666                ; Increment to next x
        SACL    TAPNUM

        BBZ     DONE
        LACK    1                   ; inc to next tap
```

```
        ADD     TAPONT
        SACL    TAPONT
        RET

NEWTP   LACK    >58             ; re-init to 1st tsp
        SACL    TAPONT
        LALK    ->7FFF          ; Initialize to leftmost
        SACL    TAPNUM
DONE    RET


PLT240  LDPK    5               ; 2400 output routine
        LAC     TAPONT          ; Check for last tap
        SBLK    >23             ; 2400 Imaginary start
        BGEZ    NEW24           ; Reinitialize

        LDPK    0
        BIT     COUNT,D0
        BBNZ    ODD24

        LALK    >38A
        LDPK    5
        ADD     TAPONT
        LDPK    0
        SACL    X1
        LAR     AR0,X1
        LAC     *,1
        ABS
        SACL    X1
        B       EVN24

ODD24   LALK    >380
        LDPK    5
        ADD     TAPONT
        LDPK    0
        SACL    X1
        LAR     AR0,X1
        LAC     *,1
        ABS
        SACL    X1
        LALK    ->7F00
        ADD     X1
        SACL    X1

EVN24   OUT     X1,OUTY         ; Output the Tap weight to Y dimension
        LDPK    5
        OUT     TAPNUM,OUTX     ; Output the Tap # to X dimension

        LDPK    0
        BIT     COUNT,D0
        BBZ     DON24
```

```
          LDPK    5
          LAC     TAPONT
          ADLK    1                    ; Increment to next tap
          SACL    TAPONT
          LAC     TAPNUM
          ADLK    >1998                ; Increment to next x
          SACL    TAPNUM
          B       DON24

NEW24     LALK    >19                  ; Initialize to 1st Tap
          SACL    TAPONT
          LALK    ->7FFF               ; Initialize to leftmost
          SACL    TAPNUM
DON24     RET


GETCOS
          SPM     0
          LDPK    >0                   ; this routine uses X0,X1,X2, and X3
          SACL    FEE                  ; on page 0.  Also uses the TC bit.
          ANDK    >3FFF
          SACL    X0,1
          SQRA    X0
          PAC
          SACH    X1,1                 ; X^2
          SQRA    X1
          PAC
          SACH    X2,1                 ; X^4
          LALK    >4000,12    ; .5
          LT      X1
          MPYK    -2512
          LTA     X2                   ; .5 + ALPHA*X^2
          MPYK    465
          APAC                         ; .5 + ALPHA*X^2 + BETA*X^4
          SACH    X3,4                 ;**
          LALK    >7FFF                ; 1
          SUB     X0                   ; 1 - X
          SACL    X0                   ; used to find SIN(PHI)
          SQRA    X0
          PAC
          SACH    X1,1                 ; X^2
          SQRA    X1
          PAC
          SACH    X2,1                 ; X^4
          LALK    >4000,12    ; .5
          LT      X1
          MPYK    -2512
          LTA     X2                   ; .5 + ALPHA*X^2
          MPYK    465
          APAC                         ; .5 + ALPHA*X^2 + BETA*X^4
          SACH    X2,4                 ; SIN ---> X2
          BIT     FEE,D15              ; COS ---> X3
```

```
        BBNZ    QUAD1X
        BIT     FEE,D14
        BBNZ    QUAD01
        RET

QUAD01
        LAC     X3              ; quadrant 01
        SACL    X1              ; COS = -SIN
        LAC     X2              ; SIN = COS
        NEG
        SACL    X3
        LAC     X1
        SACL    X2
        RET

QUAD1X
        BIT     FEE,D14
        BBNZ    QUAD11
        LAC     X2              ; quadrant 10
        NEG                     ; cos = -cos
        SACL    X2
        LAC     X3              ; sin = -sin
        NEG
        SACL    X3
        RET


QUAD11
        LAC     X2
        SACL    X1              ; quadrant 11
        LAC     X3              ; sin = -cos
        NEG
        SACL    X2
        LAC     X1              ; cos = sin
        SACL    X3
        RET

CHKSUM  MAR     *,0
        LRLK    AR0,>1FFF
        ZAC
        LDPK    0
        SACL    X2
        SACL    X1
AGAIN   TBLR    X0
        LAC     X0
        ADD     X2
        SACL    X2
        LACK    >1
        ADD     X1
        SACL    X1
        BANZ    AGAIN,*-
        LAC     X2
```

```
SENDW   LDPK    0
        SACL    X1
        LAC     X1
        CALL    SENDN           ; Send the nibble in X1
        LAC     X1
        SFR
        SFR
        SFR
        SFR
        SACL    X1
        CALL    SENDN
        LAC     X1
        SFR
        SFR
        SFR
        SFR
        SACL    X1
        CALL    SENDN
        LAC     X1
        SFR
        SFR
        SFR
        SFR
        SACL    X1
        CALL    SENDN
        RET

SENDN   LDPK    0
        SACL    X0              ; Use as temp for out instruction
SENDN1
        LACK    1               ; Wait for result to be >FF
        ADD     RESULT
        BNZ     SENDN1
        LACK    >FE
        SACL    RESULT

SENDN2
        LACK    1               ; Wait for result to be >FF
        ADD     RESULT
        BNZ     SENDN2

        LACK    >0F             ; Send 4 low bits
        AND     X0
        ORK     >80             ; Tell super that its data
        SACL    RESULT
SENDN3
        LACK    1
        ADD     RESULT
        BNZ     SENDN3
        LACK    >FE

        SACL    RESULT
        RET

        END
```

```
$TITLE(System initialization routine)
%SET(U101,0)
%SET(RACK,0)
%SET(FAX,0)
;***********************************************************************
;
;
        NAME        START
;
;       Purpose     Reset system variables on power up
;                   and after an ATZ
;
;***********************************************************************
tr                  equ     P1
PCON                equ     87h

; TX commands

send_version        equ     1bh
read_ring_pin       equ     1fh

merccd_pin  bit     p3.5
rom_version         equ     2
                    public  rom_version


global_data segment data
                    rseg            global_data
vectorl:    ds      1                       ; ptr to xmit intr subr
vectorh:    ds      1
tr_data:    ds      1                       ; data from transmiter
sv_cmd:             ds      1               ; command for transmitter
rvalue:             ds      1               ; data for transmitter
dtr_count:  ds      1                       ; dtr
cd_count:   ds      1                       ; cd
baud_size:  ds      1                       ; # bits/baud time

                    public  sv_cmd,sv_flag,tr_flag,tr_data
                    public  vectorl,vectorh,rvalue
                    public  dtr_count,cd_count,baud_size
                    public  trans_int
;
timer_data  segment data
                    rseg    timer_data
esc_timer:  ds      1                       ; 1/2400 --> 20ms for + + +
time50:             ds      1               ; 50 ms counter for the clock
ticks:              ds      1               ; 1/4800 second clock counter
timer_tics: ds      1                       ; 1/4800 sec timer counter
timer5:             ds      1               ; 5 ms timer
timer50:    ds      1                       ; 50 ms timer
secs:               ds      1               ; 30 sec. call timeout

                    public  ticks,timer_tics,secs
```

```
        public          timer5,timer50,time50,esc_timer

timer_flags  segment   bit
                       rseg                timer_flags
flag5:                 dbit      1                          ; 5 ms timer done
flag50:                dbit      1                          ; 50 ms timer done
timer_on:    dbit      1                                    ; enable timers
                       public    flag5,flag50,timer_on

global_flags segment   bit
rseg                   global_flags
tr_flag:     dbit      1                                    ; flag new data
sv_flag:     dbit      1                                    ; flag new command
fsk:                   dbit      1                          ; 1 = 300 baud
mnp_mode:    dbit      1                                    ; 1 = mnp mode
                       public    fsk,mnp_mode

decode_data            segment   data                       ;** used by ls and hs
                       rseg      decode_data

dstate:
prev_q1q0:   ds        1                                    ; used for differential decode
descram:     ds        3
d16                    equ       descram+1                  ; descrambler bits 9 - 16
d8                     equ       descram                    ; descrambler bits 1 - 8
t_hbyte_cnt:           ds        1                          ; mnp header count
t_xbyte_cnt: ds        1                                    ; mnp data count
                       public    dstate,prev_q1q0,descram,d16,d8
                       public    t_hbyte_cnt,t_xbyte_cnt


stack                  segment   idata
rseg                   stack
stack_start:
                       ds        14h

                       xseg      at        0
inbuf:                 ds        41                         ; forty commands plus end
flag
sreg:                  ds        24                         ; std s registers
seconds:     ds        1                                    ; clock seconds
minutes:     ds        1                                    ; clock minutes
hours:                 ds        1                          ; clock hours
                       public    hours,minutes,seconds


;porta:                ds        1                          ; output addr = A000h
;portb:                ds        1                          ; output addr = 8000h
;atswitch:   ds        1                                    ; input addr = 9000h

;ttone_pin   bit       porta.0                              ; 0 = sending touch tones
;dsr_pin     bit       porta.1                              ; 0 = true
```

```
;cts_pin        bit         porta.2                    ; 0 = true
;spkr_pin       bit         porta.3                    ; 1 = off
;arq_pin        bit         porta.4                    ; 1 = arq led on
;ls_pin                     bit         porta.5                  ; 1 = courier
;ring_pin       bit         porta.6                    ; 0 = ring in progress
;cdet_pin       bit         porta.7                    ; 0 = true

;oa_pin                     bit         portb.0                  ; 1 = ans mode
;alb_pin        bit         portb.1                    ; 1 = AL on
;echo_pin       bit         portb.2                    ; 1 = echo
;watchdg_pin                bit         portb.3                  ; 1 = reset wd
;reset_pin      bit         portb.4                    ; 1 = reset
;oh_pin                     bit         portb.5                  ; 1 = on hook
;nram_enb_pin               bit         portb.6                  ; 1 = Chip Enable
;nram_clk_pin               bit         portb.7                  ; 0 to 1 transition

;at_verbose     bit         atswitch.0          ; 1 = verbose
;at_quiet       bit         atswitch.1          ; 1 = quiet
;at_echo        bit         atswitch.2          ; 1 = echo on
;at_auto_ans                bit         atswitch.3          ; 1 = auto ans
;at_dumb        bit         atswitch.4          ; 1 = dumb mode
;at_esc                     bit         atswitch.5          ; 1 = +++ hang up
;at_dtr                     bit         atswitch.6          ; 1 = DTR false
;at_rts                     bit         atswitch.7          ; 1 = RTS false

%*define(stx(loc,val))(
            mov         dptr,#%loc
            mov         a,%val
            movx        @dptr,a)

            extrn       bit(at_verbose,at_quiet,at_echo,at_auto_ans)
            extrn       bit(at_dumb,at_esc,at_dtr,at_rts,clocktick)

            extrn       bit(echo_pin,oa_pin,cdet_pin,watchdg_pin)
            extrn       bit(ls_pin)
            extrn       bit(parity_yes,even_odd_par,tx_busy)

            extrn       bit(disco_pending)
            extrn       bit(clock_on,clock_mode,cd_false)
            extrn       bit(trans_on,send_full_dup,cmd_echo)

            extrn       data(porta,portb,atswitch,rack,rack_z1)

            extrn       code(putstring,init_serial,setup_s)
            extrn       code(set_ndefaults,image_to_main,recall_novram)
            extrn       code(porta_out,dsr_off,reset_micros)
            extrn       code(mr_on,mr_off)
            extrn       code(alb_on,alb_off)
            extrn       code(hold_sync)
            extrn       code(getat,check_for_9600)
```

```
        extrn        number(read_nram_pin,tx_version)

        public       stack_start,sreg,inbuf,read_ring_pin
        public       rsetsys,clock,wait5,wait50,wait_sec
        public       xdelay_5ms,xdelay_125ms,delay_125ms


$EJECT
;
;       ABSOLUTE CODE SEGMENT

cseg
        org          RESET                                 ; 00h
        jmp          start_system                          ; power up reset

        org          EXTI0                                 ; 03H
        reti                                               ;

;       org          TIMER0                                ; 0BH
;       reti

        org          EXTI1                                 ; 13h
        push         vectorl                               ; set up ind call
        push         vectorh                               ; intr from transmitter
        mov          tr,#0ffh
        ret

;       org          TIMER1                                ; 1BH
;       reti                                               ;

        cseg         at           SINT+3
credit_notice:
        db           'Copyright (c) 1986, 87 by USRobotics'
        db           0dh,0ah
        db           'Written by Cliff Wallach and Robert C. Suffern'
        db           0dh,0ah
        db           0
        public       credit_notice


reset_code  segment      code
rseg        reset_code

$EJECT
;*******************************************
;
; NAME                   TRANS_INT
; PURPOSE  transfer data with transmitter
; FREQUENCY              on tx int    ( 2400 hz)
; SOURCE   EXT0
;*******************************************
;
```

```
trans_int:
;       mov     tr,#0ffh                ; read port
;       nop                             ; cmos delay
        jb      tr.6,$+8                ; skip non-data bytes
        mov     tr_data,tr              ; save recv data
        setb    tr_flag                 ; flag new data
        jbc     sv_flag,ti_1
        mov     tr,rvalue
        call    clock
        reti

ti_1:   mov     tr,sv_cmd
        mov     sv_cmd,#0ffh
        call    clock
        reti


$EJECT
;*******************************************
;
;
; NAME              START_SYSTEM
; PURPOSE  initializes the system on power up
; FREQUENCY         only on reset
; SOURCE   RST line
;*******************************************
;
;
        using   0

start_system:
        clr     EA                      ; disable all interrupts

        mov     P1,#0ffh                ; reset ports
        mov     P2,#000h                ; addr external page 0
        mov     P3,#0ffh                ;

        mov     PSW,#(0 shl 3)          ; select rb0
        mov     SP,#stack_start-1       ; reset stack ptr
        clr     a                       ; clear internal data memory
        mov     r0,#7fh                 ; clock_on gets cleared on power-up
        mov     @r0,a                   ;
        djnz    r0,$-1                  ;

begin:
        call    reset_micros            ; debug
        call    rsetsys

%IF(%RACK) THEN (
        mov     rack_z1,#07h            ; no switches activated
        ) FI

        jmp     getat
```

```
;-----------------------------------------------------------------
; Here for ATZ
;-----------------------------------------------------------------

rsetsys:
        jnb     clock_mode,clear_all    ; save the clock
        mov     dptr,#seconds
        mov     r1,#3
save_time:
        movx    a,@dptr
        push    acc
        inc     dptr
        djnz    r1,save_time
clear_all:
        call    mr_off

%IF(%U101) THEN(
        mov     p2,#80h                         ; addr of watch rst
        mov     b,#00100000b                    ; set NOVRAM off,on hook,
        mov     dptr,#00
        clr     a
 clr_xram:
        movx    @dptr,a
        djnz    dpl,clr_xram
        inc     dph
        cpl     b.3                             ; alt watch rst
        mov     a,b
        movx    @r0,a
        clr     a
        mov     r0,dph
        cjne    r0,#20h,clr_xram
        mov     p2,#0

 )ELSE(
        mov     dptr,#00                ; external ram start
 clr_xram:
        clr     a                               ; zero
        movx    @dptr,a                         ; clear external ram
        inc     dptr
        mov     a,dph
        cjne    a,#20h,clr_xram                 ; high 8k
 )FI

        jnb     clock_mode,no_restore   ; restore the clock
        mov     p2,#0
        mov     r1,#seconds+2
        pop     acc
        movx    @r1,a
        dec     r1
        pop     acc
        movx    @r1,a
        dec     r1
```

```
        pop     acc
        movx    @r1,a

no_restore:
        mov     TMOD,#00100010B                 ; auto-reload timers
        mov     TCON,#01000101B                 ; timer1 on,  ext ints are edge
        mov     TH1,#-06            ; 9600 baud
        mov     SCON,#01110010B                 ; uart mode 1
        mov     a,SBUF                          ; remove junk from uart
        mov     PCON,#10000000B                 ; double baud rate
        mov     IP,#00000100B                   ; system timer high priority
        mov     IE,#00000100B                   ; unmask interrupts

;;      mov     t50reload,#10                   ; setup timer50 for 50ms
        mov     vectorl,#low trans_int  ; set up xmit vector
        mov     vectorh,#high trans_int ;
        mov     rvalue,#0ffh
        call    init_serial

        clr     mnp_mode
        mov     dptr,#9000h                     ; read the hayes switches
        movx    a,@dptr
        mov     atswitch,a
        mov     portb,#00100000b        ; set NOVRAM off,on hook,
                                                ; no reset or watchdog,no AL

        mov     c,at_echo
        mov     echo_pin,c
        mov     cmd_echo,c
        mov     c,at_auto_ans
        mov     oa_pin,c
        mov     a,portb
        mov     dptr,#08000h
        movx    @dptr,a

        clr     a
        mov     c,at_auto_ans
        rlc     a
        mov     dptr,#sreg+0
        movx    @dptr,a
chk_esc:
        clr     a
        mov     c,at_esc
        rlc     a
        mov     dptr,#sreg+14
        movx    @dptr,a
        setb    EA                              ; enable interrupts

        jb      clock_mode,keep_time
        clr     a
        mov     dptr,#seconds
        movx    @dptr,a                         ; seconds = 0
        inc     dptr
```

```
        movx    @dptr,a                         ; minutes = 0
        inc     dptr
        movx    @dptr,a                         ; hours = 0
keep_time:
        setb    trans_on
        call    read_nram_switch
        jnc     set_defaults
        call    recall_novram
        jnc     init_from_nov
set_defaults:
        call    set_ndefaults                   ; NOVRAM routine
        call    recall_novram                   ; read in phone nums
        sjmp    no_image

init_from_nov:
        call    image_to_main
no_image:
;*******************************************
;       call    check_for_9600
;       cpl     c
;       mov     ls_pin,c
;       call    porta_out
;*******************************************
        mov     a,#11111001b                    ; CD off,RI off,HS off,Arq off
                                                ; speaker off,CTS true, DSR true
                                                ; touch tones off

        mov     porta,a                         ; check &s
        call    dsr_off
        call    porta_out

        call    mr_on
        call    reset_micros
%IF(%FAX) THEN(
        call    hold_sync
)FI

; read transmitter version number

        mov     a,#1
        call    wait5

        clr     ea
        clr     tr_flag
        mov     tr_data,#0ffh
        mov     sv_cmd,#send_version
        setb    sv_flag
        setb    ea

        jb      sv_flag,$               ; wait for command to be set

        mov     a,#1
        call    wait5                           ; if version 0 then no reponse
```

```
        jnb     tr_flag,ver0

        mov     a,tr_data
        anl     a,#0fh
        sjmp    save_version

ver0:
        clr     a
save_version:
        mov     dptr,#tx_version
        movx    @dptr,a

        clr     ea
        clr     tr_flag
        mov     tr_data,#0ffh
        setb    ea
        ret

read_nram_switch:
;       clr     tr_flag
;       mov     r1,#20
;       djnz    r0,$
;       djnz    r1,$-2
;       jnb     tr_flag,transmitter_dead

        mov     a,#120
        mov     ticks,a
        mov     r1,#20
rns_test:
        djnz    r0,$
        cjne    a,ticks,rns_next
        djnz    r1,rns_test
        jmp     transmitter_dead
rns_next:

        mov     a,#2                            ; wait till version code from
        call    wait5                           ; recvr is sent
        clr     tr_flag
        mov     tr_data,#0ffh
        clr     ea
        mov     sv_cmd,#read_nram_pin
        setb    sv_flag
        setb    ea

        jb      sv_flag,$               ; wait for command to be set

        jnb     tr_flag,$               ; wait for the reply

        clr     ea
        clr     tr_flag
        mov     a,tr_data
        setb    ea
```

```
        mov     tr_data,#0ffh
        rrc     a
        ret

transmitter_dead:
;       clr     ea
        call    mr_off
        call    alb_on                          ;** test
        call    wait_500
        call    mr_on
        call    alb_off                         ;** test
        call    wait_500
        jmp     transmitter_dead

wait_500:
        mov     r0,#10
        call    wait_20ms
        djnz    r0,wait_500+2
        ret

wait_20ms:
        clr     tr0                     ; stop timer0
        clr     et0                     ; disable timer0 int
        clr     tf0                     ; clear timer0 overflow
        push    tmod                    ; save old setup for Bob
        mov     tmod,#00100001b         ; timer0 16 bit, timer1 for uart
        mov     tl0,#low (-18720)
        mov     th0,#high (-18720)
        setb    tr0
        jnb     tf0,$
        pop     tmod
        ret

;*******************************************
;
;       CLOCK
;
;
;       Update the real time clock and the 10 and 50
;       ms timers.
;
;
;*******************************************
clock:
        push    psw                     ; should this be done elsewhere?
        push    acc
        push    dpl
        push    dph

        djnz    ticks,chk_esctimer
        mov     ticks,#120              ; 50 ms of ticks @ 4800 cycles

%IF(%U101) THEN ( )
        ELSE (
        cpl     watchdg_pin             ; test watchdg
```

```
         mov     dptr,#8000h
         mov     a,portb
         movx    @dptr,a
         ) FI

         jnb     es,$+5                      ;mnp_mode,$+5
         setb    clocktick
         djnz    time50,chk_esctimer
         mov     time50,#20
         mov     a,secs
         jz      no_dec
         djnz    secs,no_dec
         jb      ls_pin,no_dec
         setb    disco_pending
         mov     dptr,#sreg+20               ; set disco reason
         mov     a,#3                        ; no carrier
         movx    @dptr,a
no_dec:
         jnb     clock_on,chk_esctimer
         mov     dptr,#seconds               ; update real time clock
         movx    a,@dptr                     ; seconds
         inc     a
         cjne    a,#60,clock_done
         clr     a
         movx    @dptr,a
         inc     dptr
         movx    a,@dptr                     ; minutes
         inc     a
         cjne    a,#60,clock_done
         clr     a
         movx    @dptr,a
         inc     dptr
         movx    a,@dptr                     ; hours
         inc     a
         cjne    a,#24,clock_done
         clr     a
clock_done:
         movx    @dptr,a                     ; store updated value
chk_esctimer:
         jnb     es,chk_timers               ; only if online data mode
         djnz    esc_timer,chk_timers
         mov     esc_timer,#48               ; 20 ms
         djnz    timer50,chk_timers
         setb    flag50
chk_timers:
         jnb     timer_on,chk_latch
         djnz    timer_tics,chk_latch   ; update timers
         mov     timer_tics,#12              ; 5 ms count
         djnz    timer5,chk_latch
         mov     timer5,#10             ; reload for t50 either 10 (50ms) or
                                             ; 4 (20ms) for +++ timeout

         setb    flag5
```

```
        djnz    timer50,chk_latch
        setb    flag50
chk_latch:
        mov     dptr,#9000h                     ; read latch
        movx    a,@dptr

        jnb     acc.6,dtr_ok
        djnz    dtr_count,chk_dumb
        inc     dtr_count               ; = 1
        clr     at_dtr
        sjmp    chk_dumb
dtr_ok:
        mov     dtr_count,#120
        setb    at_dtr
chk_dumb:
        mov     c,acc.4
        mov     at_dumb,c

chk_cd:
;;;;    jb      cdet_pin,no_loss ; if offline then don't do carrier check
        jnb     at_rts,chk_mrc                  ; if 1-0 rts transition
        jb      acc.7,chk_mrc                   ; 0 = rts true
        clr     at_rts

        clr     ea
        jb      tx_busy,$+5
        setb    ti                              ; restart serial int
        setb    ea

chk_mrc:
        jnb     merccd_pin,rset_count
        inc     cd_count
        mov     a,cd_count
        cjne    a,#64,no_loss
        mov     cd_count,#63            ; limit cd_count to 64
        setb    cd_false
        sjmp    no_loss
rset_count:
        mov     cd_count,#00

no_loss:
%IF(%U101) THEN (
        cpl     watchdg_pin                     ; test watchdg
        mov     dptr,#8000h
        mov     a,portb
        movx    @dptr,a
        ) FI

%IF(%RACK) THEN (                       ; read rack switches
        mov     dptr,#0C000h
        movx    a,@dptr
        mov     rack,a
```

```
        ) FI

        pop     dph
        pop     dpl
        pop     acc
        pop     psw
        ret


xdelay_5ms:
wait5:
        clr     ea                              ; wait acc * 5ms
        mov     timer_tics,#12
        mov     timer5,a
        clr     flag5
        setb    timer_on
        setb    ea
        jnb     flag5,$
        clr     timer_on
        ret

wait50:
        clr     ea                              ; wait acc * 50ms
        mov     timer_tics,#12
        mov     timer5,#10
        mov     timer50,a
        clr     flag50
        setb    timer_on
        setb    ea
        jnb     flag50,$
        clr     timer_on
        ret

wait_sec:
        clr     ea                              ;del num secs in acc
        mov     ticks,#120
        mov     time50,#20
        mov     secs,a
        setb    timer_on
        setb    ea
        mov     a,secs
        jnz     $-2
        clr     timer_on
        ret

xdelay_125ms:
        push    acc
        mov     dptr,#sreg+13                   ; if s13=2 then no delay
        movx    a,@dptr
        jb      acc.2,skip_delay
        mov     a,#25
        call    xdelay_5ms
```

```
skip_delay:
        pop     acc
        ret

delay_125ms:
        push    acc
        mov     a,#25
        call    xdelay_5ms
        pop     acc
        ret


test_address_lines:
        mov     dptr,#0
        mov     r1,#0
        mov     r2,#13
        setb    c
tal_fill:
        mov     a,r1
        inc     r1
        call    load_tp
        movx    @dptr,a
        mov     a,dpl
        rlc     a
        mov     dpl,a
        mov     a,dph
        rlc     a
        mov     dph,a
        djnz    r2,tal_fill

        mov     dptr,#0
        mov     r1,#0
        mov     r2,#13
        setb    c
tal_scan:
        mov     a,r1
        inc     r1
        call    load_tp
        mov     b,a
        movx    a,@dptr
        cjne    a,b,tal_failed
        mov     a,dpl
        rlc     a
        mov     dpl,a
        mov     a,dph
        rlc     a
        mov     dph,a
        djnz    r2,tal_scan
        clr     c
        ret
```

```
tal_failed:
        setb    c
        ret

load_tp:
        inc     a
        movc    a,@a+pc
        ret
        db      00h,01h,02h,04h
        db      08h,10h,20h,40h
        db      80h,50h,0a1h,12h
        db      94h


        END
```

```
$TITLE(Serial Interrupt Handler)
%SET(diag,1)
;*************************************************************************
;
;           Name                    SERIAL
;
;           Purpose                 Contains Serial interrupt buffer code
;
;*************************************************************************
;
            using       0

cntr_c      equ         03h
cntr_k      equ         0bh
cntr_s      equ         13h
enq         equ         05h
ack         equ         06h


%IF(%DIAG) THEN(
            extrn       code(inc_ld_string)
            extrn       code(add_ld_string)

            extrn       xdata(ld_chars_lost)
            extrn       xdata(ld_chars_recv)
            extrn       xdata(ld_chars_sent)
)FI

            extrn       code(compute_parity,putstring)
            extrn       code(cts_on,cts_off,get_rts)
            extrn       code(rst_inack_timer)

            extrn       bit(ctrl_c,space_off,flag50)
            extrn       bit(at_rts)
            extrn       bit(disco_pending)

            extrn       data(timer_tics,timer5,timer50)
            extrn       data(atswitch,esc_timer)

            extrn       xdata(sreg,amp_xh,amp_xi,amp_xr)


            public      putc,getc,init_serial,putblock
            public      puthexdigit
            public      putc_int,get_tx_char
            public      break_det,rx_90,keypress
            public      tx_busy,ignore_rts,got_xoff
            public      plus_char,plus_time,plus_cnt
            public      setup_plus,flow_on
            public      test_pattern,save_block
```

```
rx_bufstart   equ       1000h
rx_bufend     equ       2000h                              ; end loc + 1
tx_bufstart   equ       0800h
tx_bufend     equ       1000h                              ; end loc + 1

rx_buflen     equ       rx_bufend-rx_bufstart      ; length of rx buffer
rx_90                   equu      (9*rx_buflen)/10         ; cts off threshold
rx_50                   equ       rx_buflen/2              ; cts on threshold

serial_data   segment   data
rseg                    serial_data
sih_lp:                 ds        1                              ; rx data store ptr
sih_hp:                 ds        1
sit_lp:                 ds        1                              ; rx data remove ptr
sit_hp:                 ds        1
soh_lp:                 ds        1                              ;- tx data store ptr
soh_hp:                 ds        1                              ;- not needed?
sot_lp:                 ds        1                              ; tx data remove ptr
sot_hp:                 ds        1
icountl:      ds        1                                  ; low byte of recv count
icounth:      ds        1                                  ; high byte of recv count
so_cnt:                 ds        1                              ; cnt chars to tx
plus_char:    ds        1                                  ; S2
plus_cnt:     ds        1                                  ; # of plus's
plus_time:    ds        1                                  ; S12
xon:                    ds        1
xoff:                   ds        1
              public    sih_lp,sih_hp,soh_lp,soh_hp
              public    icountl,icounth

serial_flags  segment   bit
rseg                    serial_flags
keypress:     dbit      1                                  ; set when char received
tx_busy:      dbit      1                                  ; 1 = char is clocking out
break_det:    dbit      1                                  ; 1 = break found
xmit_xon:     dbit      1                                  ; 1 = send XON
xmit_xoff:    dbit      1                                  ; 1 = send XOFF
sent_xoff:    dbit      1                                  ; sent an xoff
got_xoff:     dbit      1                                  ; got xoff from DTE
ignore_rts:   dbit      1                                  ; 0 = &r2, 1 = &r0,&r1
xmit_ack:     dbit      1                                  ; 1 = send ack
                        extrn bit(print_busy)

serial_xdata  segment   xdata
                        rseg      serial_xdata
enq_count:    ds        1
tp1:                    ds        1
tp2:                    ds        1


              xseg      at        300h
save_buffer:  ds        100h
```

```
save_page   equ         save_buffer
mnp_page    equ         0100h


$eject
;*****************************************************************
;
;
;  SERIAL INTERRUPT
;
;*****************************************************************

            cseg        at          SINT
            jmp         si_start                        ;* save the jump?

serial_code segment     code
rseg                    serial_code

si_start:                                                       ; save registers
            push        psw
            push        acc
            push        dpl
            push        dph
            jbc         ri,si_ri                        ; check for recv chars first
            jbc         ti,si_ti
            jmp         si_exit


;---- Transmit Int Handler ----
si_ti:
            clr         tx_busy                                 ; done with last char
            jbc         xmit_xoff,si_ti_xoff            ; send XOFF instead of data
si_ti0:
            jbc         xmit_xon,si_ti_xon              ; "  XON    "    "
            jbc         xmit_ack,si_ti_ack              ; "  ACK    "    "
si_ti1:
            mov         a,so_cnt                        ; so_cnt is # of bytes
            jz          si_xjmp                                 ; to send out
            jb          got_xoff,si_xjmp                ; If got XOFF, don't send.
            jb          ignore_rts,si_ti2
                                                                ; note-- set ti when RTS raised
            mov         dptr,#9000h                             ; see if DTE lowered RTS.
            movx        a,@dptr                                 ; read current rts
            jnb         acc.7,si_ti2                    ; 0 = rts true
            setb        at_rts
            sjmp        si_ti3                                  ; skip when rts false

 si_ti2:
            djnz        so_cnt,$+5                      ; send out normal data.
            clr         print_busy
            mov         dpl,sot_lp                      ; load tx output ptr
            mov         dph,sot_hp
            movx        a,@dptr                                 ; get the char
```

```
;-----------------------------------------------
;           jnz         not_nul
;           clr         ea
;           sjmp        $
;not_nul:
;-----------------------------------------------

            mov         sbuf,a                          ; and transmit it
            setb        tx_busy                         ;  its busy
            anl         a,#7fh                          ; strip parity of sent char
            cjne        a,#enq,si_ti3a                  ; is it an enq?
            mov         dptr,#amp_xi                    ; when &l3-4
            movx        a,@dptr
            cjne        a,#4,si_ti3a                    ; could be 3
            setb        got_xoff                        ; start enq/ack timer?
si_ti3a:
            inc         sot_lp
            mov         a,sot_lp
            jnz         si_ti3
            inc         sot_hp
            mov         a,sot_hp
            cjne        a,#high tx_bufend,si_ti3
            mov         sot_hp,#high tx_bufstart
si_ti3:
            jbc         ri,si_ri                        ; was a char received?
si_xjmp:
            jmp         si_exit

si_ti_ack:
            mov         dptr,#enq_count
            movx        a,@dptr
            jz          si_ti1
            dec         a
            movx        @dptr,a
            mov         a,#ack
            sjmp        si_tix
si_ti_xoff:                                             ;send XOFF
            jb          sent_xoff,si_ti0                ; only once
            setb        sent_xoff
            mov         a,xoff
            sjmp        si_tix
si_ti_xon:                                              ; send XON
            jbc         sent_xoff,$+5                   ; only if previous XOFF
            sjmp        si_ti1
            mov         a,xon
si_tix:     call        compute_parity                  ; note-- rts could be low
            mov         sbuf,a
            setb        tx_busy
            sjmp        si_ti3

;---- Receive Int Handler ----
si_ri:
```

```
        setb    keypress
        inc     icountl                         ; inc low count
        mov     a,icountl
        jnz     no_cts                          ; cy to high count?
        inc     icounth                         ; yes...
        mov     a,icounth
        cjne    a,#high rx_buflen,chk_90        ; buffer full?
        dec     icountl                         ; dont save char
        dec     icounth

%IF(%DIAG) THEN(
        mov     dptr,#ld_chars_lost
        call    inc_ld_string
)FI

        mov     a,sbuf                          ; clear it
        jnz     si_ri1                          ; check for a break
        jb      rb8,si_ri1
        setb    break_det                       ; check &Yn?

si_ri1:
        jbc     ti,si_ti_jmp
        jmp     si_exit

chk_90:
        cjne    a,#high rx_90,no_cts            ; check for 90 percent full
        mov     dptr,#amp_xh                    ; see if using flow ctrl
        movx    a,@dptr
        jnb     acc.1,lower_cts
        setb    xmit_xoff                       ; xon/xoff on &h2, &h3
        jb      tx_busy,$+5                     ; cause ti if not running
        setb    ti
lower_cts:
        jnb     acc.0,$+6                       ; rts/cts on &h1,&h3
        lcall   cts_off                         ; here using cts

no_cts:
        mov     a,sbuf                          ; read the char
        jnz     si_char                         ; test for a break
        jb      rb8,si_char
        setb    break_det                       ; <<BREAK>>
        mov     a,icountl
        jnz     $+4
        dec     icounth
        dec     icountl
        mov     plus_cnt,#00                    ; not a plus
        jbc     ti,si_ti_jmp
        jmp     si_exit
si_ti_jmp:
        jmp     si_ti

si_char:
```

```
        mov     dpl,sih_lp                  ; load store ptr
        mov     dph,sih_hp
        movx    @dptr,a                     ; store char

;       inc     sih_lp                      ; inc store ptr
;       inc     dptr
;       xch     a,dph                       ; temp save char
;       cjne    a,#high rx_bufend,$+5
;       mov     a,#high rx_bufstart
;       mov     sih_hp,a
;       mov     a,dph                       ; temp recall char
;       anl     a,#7fh                      ; strip parity

        xch     a,sih_lp
        inc     a
        jnz     plus_check
        xch     a,sih_hp
        inc     a
        cjne    a,#high rx_bufend,$+5
        mov     a,#high rx_bufstart
        xch     a,sih_hp

plus_check:
        xch     a,sih_lp
        anl     a,#7fh                      ; strip parity
        cjne    a,plus_char,reset_cnt       ; check +++ character
        inc     plus_cnt                    ; plus_cnt = 0?
        djnz    plus_cnt,not_first
        jnb     flag50,reset_timer
not_first:
        inc     plus_cnt
        sjmp    reset_timer
reset_cnt:
        mov     plus_cnt,#00
reset_timer:
        mov     esc_timer,#48               ; 20ms @2400hz
        mov     timer50,plus_time
        clr     flag50

si_ack:
        cjne    a,#ack,si_enq
        mov     dptr,#amp_xi                ; see if using Enq/Ack
        movx    a,@dptr
        cjne    a,#4,si_done
        clr     got_xoff
        jb      tx_busy,$+5
        setb    ti
        sjmp    si_erase                    ; 10 sec timer not implemented

si_enq:
        cjne    a,#enq,si_xon
        mov     dptr,#amp_xi                ; see if using XON/XOFF
```

```
        movx    a,@dptr
        cjne    a,#3,si_done
        mov     dptr,#enq_count
        movx    a,@dptr
        inc     a
        movx    @dptr,a
        mov     a,icounth
        add     a,#-high rx_90
        jc      si_done
        setb    xmit_ack                ;** add buffer check
        jb      tx_busy,$+5
        setb    ti
        sjmp    si_done

si_xon:
        cjne    a,XON,si_xoff
        clr     got_xoff
;       jnb     print_busy,si_done      ; ignore if not printing
        jb      tx_busy,$+5                     ; if not printing, ignore
        setb    ti                              ; Invoke TX interrupt.
        mov     dptr,#amp_xi                    ; see if using XON/XOFF
        movx    a,@dptr
        cjne    a,#02,si_done
        sjmp    si_erase

si_xoff:
        cjne    a,XOFF,si_done
        mov     dptr,#amp_xi                    ; see if using XON/XOFF
        movx    a,@dptr
        jz      si_done
        setb    got_xoff
        cjne    a,#02,si_done
si_erase:
        inc     icountl                         ; dec count
        djnz    icountl,$+5
        dec     icounth
        dec     icountl

        inc     sih_lp                          ; backup ptr
        djnz    sih_lp,si_erase1
        mov     a,sih_hp
        cjne    a,#high rx_bufstart,$+5
        mov     a,#high rx_bufend
        dec     a
        mov     sih_hp,a
si_erase1:
        dec     sih_lp

si_done:
        jnb     ti,si_exit
        clr     ti
        jmp     si_ti
```

```
si_exit:
        pop     dph                             ; restore registers
        pop     dpl
        pop     acc
        pop     psw
        reti

$eject
;*****************************************************************
;
; GETC  - Wait for char from serial port. Polled.
; PUTC     - Send a character to serial port. Polled.
;
;*****************************************************************
getc:
        jnb     ri,$
        clr     ri
        mov     a,sbuf
        anl     a,#7fh
        ret

;-------------------------------------

puthexdigit:
        anl     a,#0fh                          ; obscure code fragment
        add     a,#90h
        da      a
        addc    a,#40h
        da      a

putc:
        orl     scon,#11001000b                 ; switch to 11 bits
        jnb     ctrl_c,get_par
        jnb     ri,get_par
        clr     ri
        push    acc
        mov     a,sbuf
        anl     a,#7fh
        cjne    a,#cntr_c,chk_ctrls
got_ctrlc:
        mov     a,#'^'
        call    print_do
        mov     a,#'C'
        call    print_do
        setb    space_off
        pop     acc
        ret
chk_ctrls:
        anl     a,#07fh                         ;strip parity bit
        cjne    a,#cntr_s,chk_ctrlk
        jnb     ri,$                            ;* check for loc?
        clr     ri
```

```
            mov         a,sbuf
            sjmp        restore_char
chk_ctrlk:
            cjne        a,#cntr_k,restore_char
            sjmp        got_ctrlc
restore_char:
            pop         acc
get_par:
            jb          space_off,dont_print
print_do:
            push        acc                                    ;save while checking RTS
            push        dpl
            push        dph
            mov         dptr,#amp_xr
            movx        a,@dptr
            cjne    a,#2,print_rts_ok
wait_for_rts:
            mov         dptr,#9000h                            ; see if DTE lowered RTS.
            movx        a,@dptr                                ; read current rts
            jb          acc.6,print_rts_ok          ; continue when dtr low
            jb          acc.7,wait_for_rts          ; 1 = rts false
            clr         at_rts

print_rts_ok:
            pop         dph
            pop         dpl
            pop         acc
            call        compute_parity
            jnb         ti,$
            clr         ti
            mov         sbuf,a
dont_print:
;;;;;       anl         scon,#01111111b                         ; switch to 10 bits
            ret

$eject
;****************************************************************
;
;
;  Put char in tx buffer, to be sent to serial port.
;
;****************************************************************
putc_int:
; a = char
            push        dpl
            push        dph
            mov         dph,soh_hp
            mov         dpl,soh_lp
            movx        @dptr,a
            clr         EA                                      ; disable serial int
            inc         so_cnt
            mov         a,so_cnt
            jnz         no_overflow
```

```
            dec         so_cnt
            setb        EA
            sjmp        putc_ret
no_overflow:
            jb          tx_busy,$+5                  ; if tx int not acive
            setb        ti                           ; then cause tx int
            setb        EA                           ; reenable serial int
            mov         a,#01                        ; inc head ptr
            add         a,dpl
            mov         soh_lp,a
            clr         a
            addc        a,dph
            cjne        a,#high tx_bufend,$+5
            mov         a,#high tx_bufstart
            mov         soh_hp,a
%IF(%DIAG) THEN(
            call        rst_inack_timer
            mov         dptr,#ld_chars_recv
            call        inc_ld_string
)FI
putc_ret:
            pop         dph
            pop         dpl
            ret


$eject
;****************************************************************
;
; Add block of data to serial tx buffer.
;   dptr is ptr to block
;   r2 is length
;
;****************************************************************
putblock:
            mov         a,so_cnt                ; wait til done with current
            jnz         putblock
            mov         a,r2
            jz          pb_ret
            clr         ea
            mov         sot_lp,dpl
            mov         sot_hp,dph
            mov         so_cnt,a
            jb          tx_busy,$+5
            setb        ti
            setb        print_busy
            setb        ea
%IF(%DIAG) THEN(
            mov         dptr,#ld_chars_recv
            jmp         add_ld_string
)FI
pb_ret:     ret
```

```
$eject
;*************************************************************
;
;
;  Save a partially xmited block on page 3
;  in the event of an Xoff for a long time  ( > 5 min)
;  Durring MNP mode
;
;*************************************************************
save_block:
        mov     a,sot_hp                        ; skip if already saved
        cjne    a,#high save_page,$+4
        ret
        clr     a                               ; halt xmit, and get count
        xch     a,so_cnt
        jz      sb_return                       ; done if no pending data


        mov     r1,a                            ; loop counter
        mov     r2,a                            ; save count
        mov     dpl,sot_lp
        mov     dph,sot_hp
        mov     r0,#low save_page
sb_loop:
        movx    a,@dptr
        clr     ea
        mov     p2,#high save_page
        movx    @r0,a
        mov     p2,#high mnp_page
        setb    ea
        inc     r0
        inc     dptr
        mov     a,dph
        cjne    a,#high tx_bufend,$+6
        mov     dph,#high tx_bufstart
        djnz    r1,sb_loop

        mov     sot_lp,#low save_page
        mov     sot_hp,#high save_page
        mov     so_cnt,r2

sb_return:
        ret



$eject
```

```
;*************************************************************
;
;  Init serial buffers for interrupt driven buffered i/o.
;
;*************************************************************
init_serial:
            mov     a,sbuf
            clr     a
            anl     scon,#01111111b                         ; to 10 bits
            mov     sih_lp,a
            mov     sih_hp,#high rx_bufstart
            mov     sit_lp,a
            mov     sit_hp,#high rx_bufstart
            mov     soh_lp,a
            mov     soh_hp,#high tx_bufstart
            mov     sot_lp,a
            mov     sot_hp,#high tx_bufstart

            mov     icountl,a
            mov     icounth,a
            mov     so_cnt,a

            clr     tx_busy
            clr     print_busy
            clr     break_det
            clr     xmit_xon
            clr     xmit_xoff
            clr     sent_xoff
            clr     got_xoff
            clr     xmit_ack

;;          sjmp    sp_next
setup_plus:
;;          mov     t50reload,#4        ; make timer 50 a 20ms timer for +++
            mov     esc_timer,#48
sp_next:
            mov     dptr,#sreg+22        ; setup xon, xoff chars
            movx    a,@dptr
            mov     xon,a
            inc     dptr
            movx    a,@dptr
            mov     xoff,a

            mov     dptr,#sreg+2         ; setup +++ character
            movx    a,@dptr
            mov     plus_char,a
            mov     dptr,#sreg+12        ; get plus timeout
            movx    a,@dptr
            mov     plus_time,a     ; a is in 20ms increments
            mov     plus_cnt,#0
```

```
        mov     dptr,#enq_count
        clr     a
        movx    @dptr,a
        mov     dptr,#tp1               ., ; init test pattern generator
        dec     a                               ; 0ffh
        movx    @dptr,a
        inc     dptr                            ; tp2
        movx    @dptr,a

        clr     keypress
        mov     dptr,#amp_xr                    ; see if RTS flow ctl
        movx    a,@dptr                         ; should be a flag
        setb    ignore_rts
        cjne    a,#2,$+5                ; ignore if &R1 or &R0
        clr     ignore_rts
        ret


$eject
;*************************************************************
;
;
;  Get next char from serial input buffer, to be modulated.
;
;
;*************************************************************
get_tx_char:
        clr     EA                              ; disable serial ints
        mov     a,icountl
        orl     a,icounth               ; check for chars in buffer
        jnz     get_it
        setb    EA
        setb    c                               ; flag buffer empty
        ret

get_it:
        push    dpl                             ; save dptr
        push    dph
        mov     a,icountl               ; check for XX00
        dec     icountl
        jnz     no_rollover             ; check for underflow

        dec     icounth
        mov     a,icounth               ; check for below 50 percent of buffer
        cjne    a,#high rx_50,no_rollover
        call    flow_on
no_rollover:
        setb    EA

%IF(%DIAG) THEN(
        call    rst_inack_timer
        mov     dptr,#ld_chars_sent
        call    inc_ld_string
)FI
```

```
          mov     dpl,sit_lp
          mov     dph,sit_hp
          movx    a,@dptr                         ; get the char

          inc     sit_lp
          inc     sit_lp
          djnz    sit_lp,nr_1
          xch     a,sit_hp
          inc     a
          cjne    a,#high rx_bufend,$+5
          mov     a,#high rx_bufstart
          xch     a,sit_hp

nr_1:
          clr     c
          pop     dph
          pop     dpl
          ret


;
;--------------------------------------------------------------
;         If input buffer count < 1k then
;                 If test pattern mode then
;                         place a test pattern char in the buffer
;                         and in buffer pointer/count
;--------------------------------------------------------------
;
test_pattern:
          mov     dptr,#sreg+16
          movx    a,@dptr
          jnb     acc.2,tp_ret

          jnb     keypress,tp_chk_len
          setb    disco_pending
          mov     dptr,#sreg+20
          mov     a,#9
          movx    @dptr,a
          ret

tp_chk_len:
          mov     a,icounth
          cjne    a,#HIGH ((RX_BUFEND-RX_BUFSTART)/4),$+3
          jnc     tp_ret

get_test_char:
          mov     dptr,#tp1
          movx    a,@dptr
          inc     a
          movx    @dptr,a
          cjne    a,#79,tp_not_cr
          mov     dptr,#sreg+3                            ; cr char
```

```
        movx    a,@dptr
        sjmp    tp_continue
tp_not_cr:
        cjne    a,#80,tp_not_lf
        mov     dptr,#sreg+4                    ; lf char
        movx    a,@dptr
        sjmp    tp_continue
tp_not_lf:
        cjne    a,#81,tp_not_reset
        mov     a,#0
        movx    @dptr,a
tp_not_reset:
        mov     dptr,#tp2
        movx    a,@dptr
        inc     a
        movx    @dptr,a
        cjne    a,#78,tp_no_char_reset
        clr     a
        movx    @dptr,a
tp_no_char_reset:
        add     a,#'0'
tp_continue:
        clr     ea
        mov     dpl,sih_lp
        mov     dph,sih_hp
        movx    @dptr,a                         ;and place it in buffer

        inc     sih_lp
        inc     dptr
        mov     a,dph
        cjne    a,#HIGH RX_BUFEND,$+5
        mov     a,#HIGH RX_BUFSTART
        mov     sih_hp,a

        inc     icountl
        inc     icountl
        djnz    icountl,inowrap1
        inc     icounth
inowrap1:
        setb    ea
tp_ret:
        ret
;
;-------------------------------
;
$eject
;***************************************************************
;
;  Flow_on
;
;  reenable dataflow from terminal
;  call from xmnp code
```

```
;
;*****************************************************************
;
flow_on:
        mov     dptr,#amp_xi                    ; Enq/Ack
        movx    a,@dptr
        cjne    a,#3,flow_on1
        mov     dptr,#Enq_count
        clr     ea
        movx    a,@dptr
        jz      fo_next
        setb    xmit_ack
        jb      tx_busy,$+5
        setb    ti
fo_next:
        setb    ea
flow_on1:
        mov     dptr,#amp_xh                    ;see if using flow control
        movx    a,@dptr
        jnb     acc.1,fo_cts            ;** check for multiple xons
        clr     ea
        setb    xmit_xon                ; here using xon/xoff
        jb      tx_busy,$+5
        setb    ti
        setb    ea
fo_cts:
        jb      acc.0,$+4
        ret
        jmp     cts_on                          ;here using hardware flow ctrl

        END
```

```
$TITLE(General subroutines for user interface)
;*********************************************************
;
;
;           NAME:       SUBS
;
;           PURPOSE:    Subroutines mostly used in user interface.
;
;*********************************************************

crlf                    equu        0edh
usrobotics  equ         0f1h

startb_l    set         r3
startb_h    set         r4
tr                      equ         P1

;porta:                 ds          1                       ; output addr = A000h
;portb:                 ds          1                       ; output addr = 8000h
;atswitch:  ds          1                   ; input addr = 9000h

;ttone_pin  bit         porta.0             ; 0 = sending touch tones
;dsr_pin    bit         porta.1             ; 0 = true
;cts_pin    bit         porta.2             ; 0 = true
;spkr_pin   bit         porta.3             ; 1 = off
;mercury_pin            bit         porta.4             ; 0 = mercury mode
;speed_pin  bit         porta.5             ; 0 = highest speed
;ring_pin   bit         porta.6             ; 0 = ring in progress
;cdet_pin   bit         porta.7             ; 0 = true


;oa_pin                 bit         portb.0             ; 1 = ans mode
;alb_pin    bit         portb.1             ; 1 = AL on
;echo_pin   bit         portb.2             ; 1 = echo
;watchdg_pin            bit         portb.3             ; 1 = reset wd
;reset_pin  bit         portb.4             ; 1 = reset
;oh_pin                 bit         portb.5             ; 1 = on hook
;nram_enb_pin           bit         portb.6             ; 1 = Chip Enable
;nram_clk_pin           bit         portb.7             ; 0 to 1 transition

;at_verbose bit         atswitch.0          ; 1 = verbose
;at_quiet   bit         atswitch.1          ; 1 = quiet
;at_echo    bit         atswitch.2          ; 1 = echo on
;at_auto_ans            bit         atswitch.3          ; 1 = auto ans
;at_dumb    bit         atswitch.4          ; 1 = dumb mode
;at_esc                 bit         atswitch.5          ; 1 = +++ hang up
;at_dtr                 bit         atswitch.6          ; 1 = DTR false
;at_rts                 bit         atswitch.7          ; 1 = RTS false

            extrn       bit(at_verbose,at_quiet,at_echo,at_auto_ans)
            extrn       bit(at_dtr,at_rts)

            extrn       bit(spkr_pin)
```

```
        extrn   bit(cdet_pin)

        extrn   bit(oa_pin,alb_pin,echo_pin,watchdg_pin)
        extrn   bit(oh_pin)
        extrn   bit(repeat)
        extrn   bit(parity_yes,even_odd_par,t_timing,first_int)
        extrn   bit(flag5,flag50,timer_on)
        extrn   bit(pulse_dial,reverse_fg)
        extrn   bit(tempbit1,tempbit2)

        extrn   code(wait_sec,portb_out)
        extrn   code(putc,putstring,out_cr_lf,send_result)
        extrn   code(send_1224_data,getfreq)
        extrn   code(chk_timeout,return_online)
        extrn   code(save_novram,set_ndefaults,ampersand)
        extrn   code(save_digit,print_phone_num)
        extrn   code(recall_novram,main_to_image)
        extrn   code(abs_abort_error)
        extrn   code(on_hook,off_hook,set_answer)
        extrn   code(speaker_on,speaker_off)
        extrn   code(xdelay_5ms,xdelay_125ms)
        extrn   code(set_mercury,dtmf_on,dtmf_off,set_courier)
        extrn   code(wait5,set_originate)
        extrn   code(get_x_spkr,save_repeat_cnt,get_repeat_cnt)

        extrn   data(secs)
        extrn   data(ticks,time50)
        extrn   bit(cmd_echo,orig,trans_on,send_full_dup,clock_mode,ctrl_c,space_off)

        extrn   number(amp_vars_start,extra_amp_start,novram_sregs)

        public  go_do_i4,go_do_i5
        public  go_off_hook
        public  parse_01,ascii_binary,query_num
        public  out_1_digit,out_2_digits,out_3_digits
        public  setup_s,get_s

        extrn   xdata(repeat_cnt)
        extrn   xdata(x_spkr)
        extrn   xdata(amp_xxh,amp_xxm,amp_xxb,amp_xxy,amp_xxi,amp_xxn)
        extrn   xdata(amp_xxa,amp_xxs,amp_xxg,amp_xxp,amp_xxr)
        extrn   xdata(nv_x_par_m,sreg,bell_ans)
        extrn   xdata(nv_t,nv_f,nv_b,nv_baud)

$eject
;*************************************************

        %*define(get_extrn(address)) (
        mov     dptr,#%address
        movx    a,@dptr
        )
```

```
        %*define(set_extrn(address)) (
        mov       dptr,#%address
        movx      @dptr,a
        )


        %define(wait_sec) (
        clr       ea                                  ;del num secs in acc
        mov       ticks,#120
        mov       time50,#20
        mov       secs,a
        setb      timer_on
        setb      ea
        mov       a,secs
        jnz       $-2
        clr       timer_on
        )


subs    segment   code
rseg    subs

$eject
;***********************************************************************
;
;         ATI4 command status display:
;
;***********************************************************************
go_do_i4:
        setb      ctrl_c
        clr       space_off
        call      xdelay_125ms
;       call      out_cr_lf
        call      putstring
        db        crlf
        db        usrobotics,'Settings....'
        db        crlf
        db        crlf

;       call      out_cr_lf
;       call      out_cr_lf
;       call      putstring
        db        83h,'C='
        db        0

        mov       c,trans_on
        clr       a
        rlc       a
        call      out_1_digit

        mov       a,#'E'
        call      space_2
```

```
        mov     c,cmd_echo
        rlc     a
        call    out_1_digit

        mov     a,#'F'
        call    space_2
        mov     c,send_full_dup
        rlc     a
        call    out_1_digit

        mov     a,#'M'
        call    space_2
        call    get_x_spkr
;       mov     a,x_spkr
        anl     a,#0fh
        call    out_1_digit

        mov     a,#'Q'
        call    space_2
        mov     c,at_quiet
        rlc     a
        call    out_1_digit

        mov     a,#'V'
        call    space_2
        mov     c,at_verbose
        rlc     a
        call    out_1_digit

        mov     a,#'X'
        call    space_2
        call    get_x_spkr
;       mov     a,x_spkr
        swap    a
        anl     a,#0fh
        call    out_1_digit

        mov     a,#'B'
        call    space_2
        %get_extrn(bell_ans)
        call    out_1_digit

;       call    out_cr_lf
        call    putstring
        db      crlf,83h,'BAUD=',0


        mov     a,th1
        call    send_baud_rate

        mov     c,parity_yes                    ;setup temp bit args
        mov     tempbit1,c
```

```
            mov     c,even_odd_par
            mov     tempbit2,c

            call    print_par_wordlen

            mov     c,pulse_dial
            call    print_dial_mode

chk_hook:
            jb      oh_pin,send_on
            call    putstring
            db      'OFF HOOK',83h,0
            sjmp    chk_clock
send_on:
            call    putstring
            db      'ON HOOK',84h,0
chk_clock:
            jb      clock_mode,send_clock
send_timer:
            call    putstring
            db      'TIMER',0
            sjmp    sendclk_done
send_clock:
            call    putstring
            db      'CLOCK',0
sendclk_done:
            call    out_cr_lf
            mov     r1,#low extra_amp_start
            call    print_amps                      ;'&Xn' cmds.

$eject
;*************************************

send_sregs:
            mov     r1,#00
s_loop:
            mov     a,r1
            anl     a,#03h                          ; look at new line
            jnz     send_s
            call    out_cr_lf
            mov     a,#' '
            call    putc
send_s:
            call    putstring
            db      '  S',0
            mov     a,r1
            call    out_2_digits
            mov     a,#'='
            call    putc
            mov     a,r1
            call    get_s
            call    out_3_digits
```

```
        inc     r1
        cjne    r1,#24,s_loop
        clr     ctrl_c
        clr     space_off
        call    out_cr_lf
        call    xdelay_125ms
        ret

$eject
;*****************************************************************
space_2:
        mov     b,a
        call    putstring
        db      82h,0
        mov     a,b
        call    putc
        mov     a,#'='
        call    putc
        clr     a
        ret

amp_val:                        ;for '&Xn=' in ati4 command
        mov     b,a
        call    putstring
        db      '  &',0
        mov     a,b
        call    putc
        movx    a,@r1                   ;** CW
        inc     r1
        call    out_1_digit
        ret

$eject
;*********************************************************
;
;       Display novram settings.
;       - For ATI4 and ATI5
;
;*********************************************************
go_do_i5:
        setb    ctrl_c
        clr     space_off
        call    xdelay_125ms

        call    recall_novram           ;setup scrachpad set of vals
        jnc     godoi5_ok               ;jump if novram enabled
        pop     acc                     ;clear stack (we're in a proc)
        pop     acc
        jmp     abs_abort_error         ;print 'ERROR'

godoi5_ok:
        call    putstring
```

```
db          crlf
db          usrobotics,'NRAM Settings....'
db          crlf
db          crlf
db          0

%get_extrn(nv_t)
mov         c,acc.0
call        print_dial_mode

call        putstring
db          'M=',0

%get_extrn(nv_x_par_m)              ; X (3) | par (2) | X (2)
push        acc

;   mov     a,x_spkr
anl         a,#011b
call        out_1_digit

mov         a,#'X'
call        space_2
pop         acc                                         ;get novram set off stack
push        acc
;   mov     a,x_spkr
swap        a
anl         a,#0111b
call        out_1_digit

mov         a,#'F'
call        space_2
%get_extrn(nv_f)
call        out_1_digit

mov         a,#'B'
call        space_2
%get_extrn(nv_b)
call        out_1_digit

call        out_cr_lf

call        putstring
db          83h,'BAUD=',0
%get_extrn(nv_baud)
call        send_baud_rate

pop         acc                                         ;get novram set off stack
mov         c,acc.3                                     ;setup temp bit args
mov         tempbit1,c                      ;parity_yes
mov         c,acc.2
mov         tempbit2,c                      ;even_odd_par
call        print_par_wordlen               ;MUST PRINT FROM NOVRAM
```

```
        mov     r1,#low amp_vars_start
        call    print_amps

        mov     r5,#0
        mov     r2,#2
nv_sreg_print:
        mov     a,r5
        anl     a,#03h                          ; look at new line
        jnz     send_nv_s
        call    out_cr_lf
        mov     a,#' '
        call    putc
send_nv_s:
        call    putstring
        db      82h,'S',0
        mov     a,r2
        call    out_2_digits
        mov     a,#'='
        call    putc
        mov     dptr,#novram_sregs      ; putstring destroys DPTR
        mov     a,r5
        add     a,dpl
        mov     dpl,a
        movx    a,@dptr
        call    out_3_digits
        inc     r2
        inc     r5
        cjne    r2,#14,check_19
        mov     r2,#19
check_19:
        cjne    r2,#20,check_end
        mov     r2,#21
check_end:
        cjne    r2,#24,nv_sreg_print

        call    out_cr_lf
        call    out_cr_lf

        call    putstring
        db      83h,'STORED PHONE #0: ',0
        clr     a
        call    print_phone_num

        call    out_cr_lf
        call    putstring
        db      90h,'#1: ',0
        mov     a,#01
        call    print_phone_num

        call    out_cr_lf
        call    putstring
        db      90h,'#2: ',0
```

```
        mov     a,#02
        call    print_phone_num

        call    out_cr_lf
        call    putstring
        db      90h,'#3: ',0
        mov     a,#03
        call    print_phone_num

        call    out_cr_lf
        call    xdelay_125ms
        ret

$eject
;*************************************************************
;
;       Print_par_wordlen
;
;        - Substitute  parity_yes= tempbit1, even_odd_par= tempbit2
;        - Determine parity from parity_yes and even_odd_par
;        - Print 'PARITY=X'
;        - Return wordlen (7 or 8) in b.
;        - For ATI4 and ATI5
;
;*************************************************************
print_par_wordlen:
        call    putstring
        db      82h,'PARITY=',0
        mov     b,#'7'                  ; default to seven bits
        mov     a,#'E'
        jb      tempbit1,send_e_o
        mov     a,#'M'
        jb      tempbit2,send_par
        mov     a,#'N'
        mov     b,#'8'                  ; change to 8 bits
        sjmp    send_par
send_e_o:
        jb      tempbit2,send_par
        mov     a,#'O'
send_par:
        call    putc
                                                ;now B has wordlen
        call    putstring
        db      82h,'WORDLEN=',0
        mov     a,b
        call    putc

        call    out_cr_lf

        ret

$eject
```

```
;*********************************************************
;
;
;           Print Amps.
;            - Print ampersand vals from amp_xx set of novram vars.
;            - For ATI4 and ATI5
;
;
;*********************************************************
print_amps:

            call        out_cr_lf

            call        putstring
            db          '   &A',0
            movx        a,@r1
            inc         r1
            mov         c,acc.0
            clr         a
            rlc         a
            call        out_1_digit

            mov         a,#'B'
            call        amp_val

            mov         a,#'G'
            call        amp_val

            mov         a,#'H'
            call        amp_val

            mov         a,#'I'
            call        amp_val

            mov         a,#'M'
            call        amp_val

            call        out_cr_lf

            call        putstring
            db          '   &N',0
            movx        a,@r1
            inc         r1
            call        out_1_digit

            mov         a,#'P'
            call        amp_val

            mov         a,#'R'
            call        amp_val

            mov         a,#'S'
            call        amp_val
```

```
        mov     a,#'Y'
        call    amp_val

        call    out_cr_lf

        ret

$eject
;*********************************************************
;       Dialing routines
;*********************************************************

go_off_hook:

;       turn on speaker, go off hook, wait S6
        jb      oh_pin,$+6              ;(there must be tighter way)
        ljmp    done_ok                         ;jump if already off hook
        call    get_x_spkr
;       mov     a,x_spkr
        anl     a,#0fh
        jz      no_spkr
        xrl     a,#03h
        jz      no_spkr
        call    speaker_on

no_spkr:
;       djnz    repeat_cnt,no_rep
        call    get_repeat_cnt
        dec     acc
        jnz     no_rep
        clr     repeat
no_rep:
        call    save_repeat_cnt
        call    off_hook

        jnb     orig,no_tonechk                 ;ans mode -- no dial tone chk
        movx    a,@r0                           ; look at next char in input
        jnz     clr_alb                         ; buffer if D<CR> then don't
        mov     dptr,#sreg+16
        movx    a,@dptr
        jb      acc.0,no_tonechk        ; if ALB then just do wait
clr_alb:
        mov     dptr,#sreg+16
        movx    a,@dptr
        anl     a,#0feh
        movx    @dptr,a

        call    get_x_spkr
;       mov     a,x_spkr                ;If X2,X4,X6, do dial tone chk
        anl     a,#0f0h
        cjne    a,#60h,$+3              ;X6,X7 both tone check
        jnc     do_tonechk
```

```
        jz      no_tonechk
        jb      acc.4,no_tonechk        ;no tone check if odd

do_tonechk:
                                        ;HERE DO DIAL TONE CHECK
        clr     reverse_fg              ;don't know why, but C24 has it
                                        ;here also.
        clr     ea                      ;set 5 sec timeout
        mov     secs,#5
        mov     ticks,#120
        mov     time50,#20
        setb    ea

        call    set_mercury
        call    dtmf_on
        call    set_originate
        mov     a,#4
        call    wait5

dtone_loop:                             ;loop until we get dial tone
        call    getfreq
        cjne    r4,#3,$+3               ; energy must be there
        jnc     dtone_nyet
        cjne    a,#30,$+3
        jc      dtone_nyet
        cjne    a,#70,$+3
        jc      done                    ;jump if successful

dtone_nyet:                             ;see if timeout or abort
        call    chk_timeout
        jnc     dtone_loop

        call    on_hook
        call    set_courier
        call    dtmf_off
        mov     c,orig                  ;set filters appropriately
        cpl     c
        mov     oa_pin,c
        call    portb_out

        call    get_x_spkr
;       mov     a,x_spkr                ;turn off speaker unless M2
        anl     a,#0fh
        cjne    a,#2,$+5
        sjmp    nodtone_ret
        call    speaker_off

nodtone_ret:
        setb    c                       ;ERROR RETURN
        mov     a,secs
        jnz     key_abort
        mov     b,#6                    ; NO DIAL TONE
```

```
        ret

key_abort:
        mov     b,#3                            ; NO CARRIER
        ret

no_tonechk:
        mov     dptr,#sreg+6                    ; wait S6
        movx    a,@dptr
        jz      done
        call    wait_sec

done:
        call    set_courier
        call    dtmf_off
        mov     c,orig                          ;set filters appropriately
        cpl     c
        mov     oa_pin,c
        call    portb_out

        clr     ri                              ; character must be hit after
                                                ; the wait time
done_ok:
        clr     c                               ;SUCCESS RETURN
        ret


$eject
;***********************************************************
;               misc. character routines
;***********************************************************
ascii_binary:                           ;starting form curr pos in r0,
                                        ;read num in and return in acc
                                        ;Set carry if error - # too big
        push    1                       ; save r1
        clr     a
        mov     r1,a
chk_char:
        movx    a,@r0
        call    query_num
        jc      convert
err:
        mov     a,r1
        clr     c
        pop     1
        ret
convert:
        inc     r0
        add     a,#-'0'                         ; convert ascii digit to binary
        xch     a,r1
        push    b                               ; save b
        mov     b,#10                           ; shift 1 decimal digit
```

```
        mul     ab
        pop     b                                   ; restore b
        jb      ov,bad_ret              ; >255?

        add     a,r1
        mov     r1,a
        jnc     chk_char
bad_ret:
        call    eat_nums   ;clr extra digits (EG, ATDX9999T11) needs this.
        setb    c                       ;ERROR return
        pop     1
        ret

;---------------------------------
out_3_digits:
        mov     b,#100
        div     ab
        call    out_1_digit
        xch     a,b
out_2_digits:
        mov     b,#10
        div     ab
        call    out_1_digit
        xch     a,b
out_1_digit:
        add     a,#'0'
        jmp     putc

;---------------------------------
parse_01:                               ;return in carry if got 0 or 1
        movx    a,@r0
        call    query_num               ; if not a number assume 0
        jc      $+3                                 ; jump if got a number
        ret                                         ; Return 0
        cjne    a,#'0',parse_1                      ; jump if we got pos. num ( 1 ret )
        inc     r0
        sjmp    parse_01
parse_1:                                ;here eat up extra nums and ret 1

;---------------------------------
eat_nums:                               ;burn up extra digits
        movx    a,@r0
        call    query_num
        jnc     eat_done
        inc     r0
        sjmp    eat_nums
eat_done:
        setb    c                                   ;for when called from parse_01
        ret

;---------------------------------
query_num:
```

```
        cjne    a,#'0',$+3
        jnc     chk_hi
        clr     c
        ret
chk_hi:
        cjne    a,#'9'+1,$+3
        ret

;***********************************************************
;
;
;       SETUP_S:
;               ACC = S REGISTER
;               B   = VALUE
;
;***********************************************************
setup_s:
        mov     dph,#high sreg
        add     a,#low sreg
        mov     dpl,a
        mov     a,b
        movx    @dptr,a
        ret

;***********************************************************
;
;
;       GET_S:
;               ACC = S REGISTER
;               ACC = S VALUE UPON RETURN
;
;***********************************************************
get_s:
        mov     dph,#high sreg
        add     a,#low sreg
        mov     dpl,a
        movx    a,@dptr
        ret

;***********************************************************
send_baud_rate:
        ;compute baud rate mathematically:
        ;note: 576/(-th1) = baud rate * 100

        cpl     a
        inc     a
        mov     r2,a                            ; r2 = baud rate

        clr     a
        mov     r3,a                            ; clear result
        mov     r4,a                            ; zero

        mov     r1,#high 576
        mov     a,#low 576
```

```
sbr_loop:
        inc     r3                              ; repeated subtraction
        clr     c
        subb    a,r2
        xch     a,r1
        subb    a,r4
        xch     a,r1
        jnc     sbr_loop
        dec     r3


        add     a,r2                            ; round off adjustment
        clr     c
        rlc     a
        clr     c
        subb    a,r2
        jc      $+3
        inc     r3

got_baud:                               ;here got baud, and in r3
        mov     a,r3
        cjne    a,#100,$+3              ;see how big display will be
        jnc     baud_tri                ;jump if 3 digits
        cjne    a,#10,$+3               ;see if 1 or 2 digits
        jnc     baud_bi
        call    out_1_digit
        sjmp    baud_done
baud_bi:
        call    out_2_digits
        sjmp    baud_done
baud_tri:
        call    out_3_digits
baud_done:

extra_zero:
        call    putstring
        db      '00',0
        ret

;************************************************************
print_dial_mode:
        push    psw
        call    putstring
        db      83h,'DIAL=',0
        pop     psw
        jc      send_pulse
        call    putstring
        db      'TONE',83h,0
        ret
send_pulse:
        call    putstring
        db      'PULSE',82h,0

        ret

        END
```

```
$TITLE(Synchronous)
;***********************************************************************
;
;          Name                     SYNC
;
;          Purpose    Assumes       P2 has been set to the sync latch location
;                     B is used for flags
;***********************************************************************
;
tr                    equ           P1
cdet                  bit           p3.5                         ; carrier detect

sync_addr  equu       0D000h                     ;** arbitrary
KFREQ                 equ           -48                    ; 19200 timer reload val
                                                           ; when XTAL = 11.0592 Mhz


           using      2
so_buf                equ           ar0                    ; telephone --> serial out
;si_buf:   ds         8                          ; serial in --> telephone

;sync_data segment    data
;                     rseg          sync_data

           using      3
rnybble_cnt equ       ar0
so_put_ptr equ        ar1
so_cnt                equ           ar2
r_new_data equ        ar3
r_temp                equ           ar4
r_extra               equ           ar5


                      using         0
oparse                equ           r7
iparse                equ           r6
ocount                equ           r5
icount                equ           r4
so_get_ptr equ        r1

syncm                 equ           b
rc                    bit           syncm.0
tc                    bit           syncm.1
ALT_BIT               BIT           SYNCM.7

                      extrn         code(monitor_disco)
                      extrn         code(no_carrier)
                      extrn         code(r96_retrain,x96_retrain)
                      extrn         code(tr_s10,tx_s10)
                      extrn         code(hold_sync)
                      extrn         code(des1)
                      extrn         code(init_hs_int)
```

```
                extrn     bit(ls_pin,tx9600)
                extrn     bit(disco_pending)
                extrn     bit(retrain_signal)
                extrn     bit(loss_of_carr,cd_found)
                extrn     bit(hlr,new_dataf)
                extrn     bit(flag5)

                extrn     data(vectorl,vectorh)
                extrn     data(dstate,descram)
                extrn     data(txfreq,last_nybble)
                extrn     data(sv_cmd,mon_count,cd_count,test_count)

                public    init_sync_recv,init_sync_xmit
;---------------------------------------------
                cseg      at        timer1
        jmp     sync_bit


$EJECT
;---------------------------------------------
sync_code segment code
                rseg      sync_code

sync_bit:
        jnb     ls_pin,sync_hs                        ; allow for ls sync mode
        jmp     sync_ls                               ; do ls sync stuff

sync_hs:
        xch     a,syncm
        movx    @R1,a                                 ; write to sync latch
        xch     a,syncm

        jb      tx9600,tx96


;--- Receive 9600 / Transmit 300
        jbc     rc,send_bit
        setb    rc
        mov     th1,#KFREQ
        djnz    txfreq,iret                    ; time for back channel?
        push    psw
        sjmp    tx300

send_bit:
        push    psw
        xch     a,oparse
        rrc     a
        mov     txd,c                                 ; send bits to DTE at 9600
        djnz    ocount,sb_done
        mov     ocount,#8

;--- do baud correction
```

```
         mov     a,so_cnt                ; should tx int do this?
         add     a,#adj_tab -($+3)
         movc    a,@a+pc
         mov     th1,a                            ;** experimental
sb_load:
         dec     so_cnt                          ; mov       r1,so_get_ptr
         mov     a,@r1
         inc     r1                              ; inc so_get_ptr
         anl     ar1,#11110111b                  ; so_get_ptr,#11110111b
sb_done:
         xch     a,oparse
         djnz    txfreq,popreti                   ; time for back channel?
tx300:
         mov     txfreq,#32              ; check this val
         jbc     tc,rd_backch
         setb    tc
popreti:
         pop     psw
         reti

adj_tab:
         db      KFREQ -3                ; for direct loading into th1
         db      KFREQ -2
         db      KFREQ -1
         db      KFREQ +1
         db      KFREQ +1
         db      KFREQ +1
         db      KFREQ +2
         db      KFREQ +2
         db      KFREQ +2


rd_backch:
;--- Read back channnel tx bit here
;--------------------------------------------
         call    iret
         mov     c,rxd
;;       mov     c,alt_bit               ;** Debug
;;       cpl     alt_bit

         push    acc
         mov     a,iparse
         rrc     a
;--------------------------------------------
         djnz    icount;rb_done
         mov     icount,#3
         swap    a
         rr      a
         anl     a,#07h
         orl     a,#80h
         mov     sv_cmd,a
```

```
            clr         a
rb_done:
            mov         iparse,a
            pop         acc
            pop         psw
iret:       reti


$EJECT
;-----------------------------------------------------------
; tx9600 section
; XTC is read directly by the transmit processor.
; needed is a direct coupling if timer1 int with external int
tx96:
            jbc         tc,get_bit
            setb        tc
            mov         th1,#KFREQ                  ; reset reload val
            djnz        txfreq,iret
            push        psw
            sjmp        rx300

get_bit:
            push        psw
            mov         c,rxd                       ; recv bits from DTE at 9600
            xch         a,iparse
            rrc         a
;;          pop         psw
            djnz        icount,gb_done
            mov         icount,#04
            swap        a
            anl         a,#0fh
            orl         a,#80h
            mov         r3,a                        ; check this
;-----------------------------------------------
            mov         a,#KFREQ+1
            jb          ie1,$+5
            mov         a,#KFREQ-1
            mov         th1,a

            jnb         ie1,$                       ; sync with transmitter
            mov         tr,#0ffh
            setb        flag5                       ; misc flag bit
            clr         ie1

;-          mov         a,tr
;-          mov         tr,r3
            mov         a,r3
            xch         a,tr

            jb          acc.6,gb_done
            mov         r_new_data,a
            setb        new_dataf
```

```
        jnb     acc.4,gb_done
        setb    retrain_signal
;-------------------------------------------
gb_done:
        xch     a,iparse
        djnz    txfreq,rpop
rx300:
        mov     txfreq,#32              ; check this val
        jbc     rc,wr_backch
        setb    rc
rpop:   pop     psw
        reti


wr_backch:
;--- Write back channnel tx bit here
        call    iret                            ;** experimental
;;;     push    psw
        push    acc
        mov     a,oparse
        rrc     a
        mov     txd,c
        djnz    ocount,wr_done
        mov     ocount,#3

;--- check timing sync here

        mov     a,so_cnt
        add     a,#-3
        jc      wr_continue
        inc     txfreq
        sjmp    $+4
wr_continue:
        dec     txfreq
        mov     a,@r1                           ; R1 = so_get_ptr
        inc     r1
        anl     ar1,#11110111b
        dec     so_cnt
wr_done:
        mov     oparse,a
        pop     acc
        pop     psw
        reti


$EJECT
;-------------------------------------------------------
; HS Recv int

tr_scan:
        jnb     cdet,$+5
```

```
        inc     cd_count                        ; # of false counts

        djnz    mon_count,hsr_return
        mov     mon_count,#24                            ; 5 ms
        call    monitor_disco

        djnz    test_count,hsr_return
        mov     test_count,#05                           ; 25 ms tick

        mov     a,cd_count
        add     a,#-(24)                        ; if cd > 80 percent true
        jc      $+6
        setb    cd_found
        sjmp    hsr_reset

        mov     a,#-118
        add     a,cd_count

        jnc     $+4
        setb    loss_of_carr

hsr_reset:
        mov     cd_count,#0
hsr_return:
        ret

;----------------------------------------------------------
; HS TX int


tx_scan:
        djnz    mon_count,hst_nomon
        mov     mon_count,#12                            ; 5 ms
        call    monitor_disco

hst_nomon:
        jnb     cdet,$+5
        inc     cd_count                        ; # of cd false counts
        djnz    test_count,tx_return
        mov     test_count,#60                           ; 25 ms tick
        mov     a,cd_count                      ; look for loss of carr
        add     a,#-(48)                        ; if cd is >80 percent false
        jnc     $+4                                      ;    then loss of energy
        setb    loss_of_carr

        mov     a,cd_count                      ; look for return of carr
        add     a,#-(12)                        ; if cd is >80 percent true
        jc      $+4                                      ;    then return of energy
        setb    cd_found
        mov     cd_count,#0                              ; reset counter
tx_return:
```

```
        ret

tx_back:
        xch     a,dstate                        ; differential decode
        cpl     a
        inc     a
        add     a,dstate
        anl     a,#07h
        add     a,#gray_tab -($+3)
        movc    a,@a+pc
        swap    a
        mov     r0,a
        mov     c,acc.6
        call    des1
        mov     a,r0
        mov     acc.0,c
        mov     c,acc.5
        mov     r0,a
        call    des1
        mov     a,r0
        mov     acc.1,c
        mov     c,acc.4
        mov     r0,a
        call    des1
        mov     a,r0
        mov     acc.2,c
        anl     a,#07h                                  ; needed?
        mov     r0,so_put_ptr
        mov     @r0,a
        inc     so_put_ptr
        anl     so_put_ptr,#11110111b
        inc     so_cnt                                  ; check offset loc
        ret

gray_tab:
        db      1
        db      0
        db      2
        db      3
        db      7
        db      6
        db      4
        db      5

;-----------------------------------------------

init_sync_xmit:
        mov     ie,#00000000b                   ; disable all ints
        mov     P2,#high sync_addr      ; ptr to sync latch
        mov     th1,#KFREQ                      ;** int at 19.2k rate
```

```
                                        ; clock rate of 11.059 MHZ
        clr     tr1
        clr     tf1
        mov     tl1,th1                 ;** check values
        clr     ie1
        jnb     ie1,$                   ; wait for external sync
        setb    tr1

        mov     so_put_ptr,#so_buf+2
        mov     so_get_ptr,#so_buf
        mov     so_cnt,#02
        mov     syncm,#0ffh             ;

        mov     icount,#1
        mov     ocount,#2
        mov     ie,#10001000b           ; only enable timer1 int

tx_loop:
        jb      disco_pending,no_car
        jbc     loss_of_carr,x_no_car
        jb      retrain_signal,x_retrain
        jnb     flag5,txl_1
        clr     flag5
        call    tx_scan
txl_1:
        jnb     new_dataf,tx_loop
        clr     new_dataf
        mov     a,r_new_data
        call    tx_back
        sjmp    tx_loop


x_no_car:
        mov     ie,#10000100b
        call    hold_sync
        mov     P2,#01
        jmp     tx_s10

x_retrain:
        mov     ie,#10000100b
        call    hold_sync
        mov     P2,#01
        jmp     x96_retrain


no_car: call    hold_sync
        jmp     no_carrier          ;** do this better


;-----------------------------------------------
; receive 9600 mode
```

```
; rb0 used exclusively
; P2 = addr( Sync Latch)
; Dptr : Used by Ext1 int
; B : Used for flags
; R0 : Used by Ext1 int
; R1 : Used by Timer1 int
;

init_sync_recv:
        mov     ie,#00000000b                           ; disable all ints
        mov     P2,#high sync_addr      ; ptr to sync latch
        mov     vectorl,#low hsr_int    ; init ext1 vector
        mov     vectorh,#high hsr_int
        mov     th1,#KFREQ                              ;** int at 19.2k rate
                                                        ; clock rate of 11.059 MHZ
        mov     tl1,th1                                 ;** check values
        clr     tr1
        clr     ie1

        jnb     ie1,$                                   ; wait for external sync
        setb    tr1
        mov     icount,#1
        mov     ocount,#8
        mov     so_put_ptr,#so_buf+3
        mov     so_get_ptr,#so_buf
        mov     so_cnt,#03
        mov     syncm,#0ffh                             ;
;---------------------------------------
        jbc     retrain_signal,isr_1
        mov     a,txfreq                ; generate offset
        anl     a,#07h
        inc     txfreq
isr_1:
;---------------------------------------
        mov     ip,#00001000b                           ; timer1 high priority
        mov     ie,#10001100b                           ; enable timer1, ext1 ints
;;      ret                                             ;-- to be completed

tr_loop:
        jb      disco_pending,no_car
        jbc     loss_of_carr,r_no_car
        jb      retrain_signal,r_retrain
        mov     a,r1
        jb      acc.7,t_hang
        jnb     acc.4,t_hang
        cjne    a,#19h,$+3
        jnc     t_hang

        jnb     flag5,tr_loop
        clr     flag5
        call    tr_scan
        sjmp    tr_loop
```

```
t_hang:
        nop
        clr     ea
        sjmp    $

r_no_car:
        mov     ie,#10000100b
        call    hold_sync
        mov     P2,#01
        call    init_hs_int
        jmp     tr_s10

r_retrain:
        mov     ie,#10000100b
        call    hold_sync
        mov     P2,#01
        jmp     r96_retrain


;-----------------------------------------------
; receive 9600 mode
; xfer data with transmitter   freq = 4800hz
; uses R0

hsr_int:
        push    psw                                     ; allow cmos delay
        push    acc                                     ; while saving regs.

        jb      tr.6,hsr_continue               ; data?
;       mov     a,tr                                    ; yes... read it
;       jnb     tr.4,hsr_proc                           ; retrain?
;       setb    retrain_signal
;hsr_proc:
;       mov     tr,sv_cmd                       ; send any new data
;       mov     sv_cmd,#0ffh

        mov     a,#0ffh
        xch     a,sv_cmd
        xch     a,tr                                    ;*** check this
        jnb     acc.4,$+5                       ; retrain?
        setb    retrain_signal

        xch     a,dstate                        ; diff decode nybble
        cpl     a                                       ; 4's complement
        inc     a
        add     a,dstate                        ; (new - last) mod 4
        anl     a,#03h                                  ; only 2 lsbs decoded

        mov     R_temp,a
        mov     a,dstate
        anl     a,#0ch
```

```
        orl     a,R_temp                 ; regenerate nybble

        jbc     hlr,hsr_descram          ; convert nybbles
        mov     last_nybble,a            ; to bytes
        setb    hlr                      ; (for efficiency)
        sjmp    hsr_mon

hsr_descram:
        swap    a
        orl     a,last_nybble
        xch     a,descram
        xch     a,descram+1
        mov     c,acc.0
        xch     a,descram+2
        mov     r_extra,a                ; temp1
        rrc     a
        xrl     a,descram
        mov     R0,a                     ; temp2
        mov     a,r_extra
        rlc     a
        mov     a,descram+2
        rlc     a
        xch     a,r_extra
        mov     c,acc.6
        xch     a,r_extra
        rlc     a
        xrl     a,R0
        mov     R0,so_put_ptr
        mov     @R0,a
        inc     so_put_ptr
        anl     so_put_ptr,#11110111b
        inc     so_cnt
        sjmp    hsr_mon

hsr_continue:
        mov     a,#0ffh                  ; save 1 cycle
        xch     a,sv_cmd
        mov     tr,a
hsr_mon:
        setb    flag5

        pop     acc
        pop     psw
        reti

;----------------------------------------------
sync_ls:
        reti


        End
```

```
$TITLE(Main Transmitter Module)
%SET(FAX,0)
%SET(FREQ_3200,1)
;*********************************************************************
;
;
;           Name                    TR:         XMIT
;
;           Purpose                 Transmit module
;
;*********************************************************************
;
;
                        using       0
;           I/O PORTS
sv                      equu        P0                          ; supervisor data
recv                    equ         P1                          ; receiver data
dac                     equ         P2                          ; digital/analog conv

;           I/O PINS
wr_enable   bit         p3.0                        ; enable writing to recv
int_recv    bit         p3.1                        ; interrupt recv
novram_pin  bit         p3.3
xtc                     bit         p3.3                        ;FAX external transmitter clock
ring                    bit         p3.4                        ; ring detect
int_sv                  bit         p3.5                        ; interrupt sv


PCON                    equ         87h
data_buffer equ         40h
one_count   equ         r5
;temp                   equ         r6          ; temporarily holds recvr to sup commnad
ring_h_to_l equ         03          ; ring commands to sup
ring_l_to_h equ         04
novram_pin_hi           equ         05
novram_pin_low          equ         06

flags                   segment     bit
                        rseg        flags
at9600:                 dbit        1
rx9600:                 dbit        1
tx9600:                 dbit        1
r2s_flag:   dbit        1
s2r_flag:   dbit        1
t2s_flag:   dbit        1
s2t_flag:   dbit        1
s2t_cflag:  dbit        1                           ; s2t command flag
scr_17:                 dbit        1
odd_baud:   dbit        1
send_2400:  dbit        1
orig:                   dbit        1
xmit_marks: dbit        1
scramble:   dbit        1
```

```
hi_low_buf:  dbit        1
alt_bit:     dbit        1
got_data:    dbit        1
data_1200:   dbit        1                          ; 1200 data already processed
ring_stat:   dbit        1                          ; current value of ring pin
inv:                     dbit        1                          ; back chan 2 invert result
b_c_2:                   dbit        1                          ; 1 = back channel two
b_c_3:                   dbit        1                          ; 1 = back channel three
baud300:     dbit        1
no_filter:   dbit        1                          ; no digital filter in TX
sync:                    dbit        1                          ;fax 1 = do sync stuff
int3200:     dbit        1                          ; 1 = int at 3200 hz


;********* Back channel TX bits
send_400hz:              dbit        1
back_chan:   dbit        1
bcflag:                  dbit        1

bitmapped    segment     data bitaddressable
                         rseg        bitmapped
trellis:     ds          1
scrambler:   ds          3
scr_9_16:    ds          1
sign_reg:    ds          1
scr_data:    ds          1
sav_data:    ds          1                          ; 1200 data for next baud time

a_n:                     ds          1                          ; back channel two delay line
b_n:                     ds          1

sign_byte:   ds          1                          ; back channel previous signs

an                       bit         sign_byte.7    ; an
an1                      bit         sign_byte.6    ; an-1
an2                      bit         sign_byte.5    ; an-2
bn                       bit         sign_byte.3    ; bn
bn1                      bit         sign_byte.2    ; bn-1
bn2                      bit         sign_byte.1    ; bn-2

stack                    segment     idata
                         rseg        stack
                         ds          18                         ; 8 level stack

dseg                     at          40h
dac_buf:     ds          20h                        ; D/A buffer


global_data  segment     data
                         rseg        global_data
vector:                  ds          1                          ; holds offset to timer0 isr
dac_addptr:  ds          1                          ; store ptr into dac_buf
```

```
dac_subptr: ds        1                           ; store ptr into dac_buf
r2s_data:   ds        1                           ; holds data from recv to sv
s2r_data:   ds        1                           ; holds cmd from sv to recv
t2s_data:   ds        1                           ; holds data from tr to sv
s2t_data:   ds        1                           ; holds data from sv to tr
s2t_cmd:    ds        1                           ; holds cmd from sv to tr
sv_cmd:               ds        1                           ; supervisor command
sv_data:    ds        1                           ; supervisor data
dac_value:  ds        1                           ;** DEBUG
int_cnt:    ds        1                           ; count ints in low speed
table_cnt:  ds        1                           ; back channel table pointer
back_int_cnt:         ds        1                           ; back channel int count

hs_data               segment   data
                      rseg      hs_data
dstate:               ds        1                           ; differential encode state
hs_count:   ds        1                           ;** DEBUG

lows_data   segment   data
                      rseg      lows_data
jump_offset: ds       1
scr_1_8:    ds        1
prev_q1q0:  ds        1
mark_cnt:   ds        1
space_cnt:  ds        1

%*define(xrl_c(bit))(jnb  %bit,$+4
            cpl       c)


$EJECT
;
;           A B S O L U T E   C O D E   S E G M E N T

cseg
            org       RESET                                 ; 00h
            jmp       start_system                          ; power up reset

            org       EXTI0                                 ; 03H
            jmp       recvint                               ; exchange system data

            org       TIMER0                                ; 0BH
            xch       a,vector                    ; save acc & get offset to isr
            jmp       @a+dptr                               ; note-- dptr is dedicated

            org       EXTI1                                 ; 13h
            reti                                            ; XTC

            org       TIMER1                                ; 1BH
            mov       dac,@r1                               ; write to D/A converter
            inc       r1                                    ; every 70 us when xmit 9600
            anl       ar1,#11101111b                        ; r1 is a dedicated ptr
```

```
        dec     r2                              ; for sync with main
        reti

        org     SINT                            ; 23H
        reti                                    ; not used

        db      'Copyright (c) 1986, 87 by USRobotics '
        db      'Written by Cliff Wallach and Bob Suffern'
        db      0


$EJECT
;*****************************************
;
; NAME            RECVINT
; PURPOSE  transfer data with receiver
; FREQUENCY       on rx int    ( 2400 hz)
; SOURCE   EXT0
;*****************************************
;
recvint:
        mov     recv,#0ffh              ; read port
        clr     wr_enable               ; enable read
        jb      recv.6,send_2recvr
        mov     r2s_data,recv
        setb    r2s_flag                ; flag new data
send_2recvr:
        setb    wr_enable
        jbc     s2r_flag,$+4                    ; cmd for recv?
        reti                                    ; no...return
        mov     recv,s2r_data                   ; yes... send it
        reti


$EJECT
;*****************************************
;
; NAME            SVINT
; PURPOSE  gets command from sv
; FREQUENCY       random
; SOURCE   EXT1
; Notes           This may never be enabled
;*****************************************
;
svint:
        mov     sv,#0ffh                ; read port
        jb      sv.6,sv_other                   ; whose cmd?
        mov     s2t_data,sv
        setb    s2t_flag
        reti
sv_other:
```

```
        mov     s2r_data,sv
        setb    s2r_flag
        reti


$EJECT
INT_BASE:
;****************************************
;
;
; NAME            TONES
; PURPOSE  Generates DTMF Tones
; FREQUENCY       variable
; SOURCE   Timer0
;****************************************
;
;
tones:
        push    psw
        push    acc
        inc     r1
        anl     ar1,#11110111b
        mov     a,@r1
        add     a,@r0
        xrl     a,#80h
        mov     dac,a
        pop     acc
        pop     psw
; continue with sysint

;****************************************
;
;
; NAME            SYSINT
; PURPOSE  Transfers data durring idle modes
; FREQUENCY       4800 hz
; SOURCE   Timer0
;****************************************
;
;

sysint:
        jbc     odd_baud,no_int
        setb    odd_baud
si_recv:
        mov     sv,#0ffh                ; configure port for input
        nop
        jb      sv.6,si_other                   ; who is it for?...
        mov     s2t_data,sv             ; transmitter
        setb    s2t_flag                ;
        sjmp    si_send
si_other:
        jb      sv.7,si_send            ; only commands goto recv
        mov     s2r_data,sv             ; relay it
        setb    s2r_flag                ; signal other int
```

```
si_send:
        jbc     r2s_flag,si_r
si_t:
        mov     sv,t2s_data
        mov     t2s_data,#0ffh
        sjmp    si_intr
si_r:
        mov     sv,r2s_data
si_intr:
        clr     int_sv                          ; interrupt supervisor
        nop
        setb    int_sv
no_int:
        xch     a,vector                ; restore acc
        reti



$EJECT
;*****************************************
;
;
; NAME          TX_LOW_SPEED
; PURPOSE  transmit 12/2400 data and supervisor comm
; FREQUENCY     9600 per second
; SOURCE   start command from supervisor
;*****************************************

tx_low_speed:
        jnb     got_data,read_sup
        mov     dac,@r1                         ; send D/A data
        inc     r1
        dec     r2
read_sup:
        djnz    int_cnt,no_comm
        mov     int_cnt,#4

commi:
        mov     sv,#0ffh                ; read sup to trans
        nop
        jb      sv.7,get_tx_data
        jb      sv.6,rcv_cmnd
        mov     s2t_cmd,sv              ; get sup to tx command
        setb    s2t_cflag
        jmp     send2sup
get_tx_data:
        jb      sv.6,send2sup                   ; invalid nothing coming
        mov     s2t_data,sv
        setb    s2t_flag
        jmp     send2sup
rcv_cmnd:
        mov     s2r_data,sv             ; read sup to rcvr command
        setb    s2r_flag
```

```
send2sup:
        jbc     r2s_flag,send_rcv2sup
        mov     sv,t2s_data
        mov     t2s_data,#0ffh
        jmp     intsup
send_rcv2sup:
        mov     sv,r2s_data
intsup:
        clr     int_sv
        nop
        setb    int_sv
no_comm:
        xch     a,vector
        reti

back_ch23_int:
        jnb     got_data,commi
        djnz    back_int_cnt,commi

        mov     back_int_cnt,#02        ;** experimental, was 3
        jb      int3200,$+6
        mov     back_int_cnt,#03
        mov     dac,@r1

        inc     r1
        dec     r2
        sjmp    commi

back_ch_int:                                    ; back channel ints at 4800/s
        jbc     odd_baud,commi                  ; skip every other int
        setb    odd_baud
        jnb     got_data,commi
        mov     dac,@r1
        inc     r1
        dec     r2
        sjmp    commi

$EJECT
;******************************************
;
; NAME                  START_SYSTEM
; PURPOSE  initializes the system on power up
; FREQUENCY             only on reset
; SOURCE   RST line
;******************************************
;

start_system:
        clr     EA                              ; disable all interrupts

        mov     P2,#080h                ; dac = 0 value
        mov     P0,#0ffh                ; reset ports
```

```
        mov     P1,#0ffh                ;
        mov     P3,#0ffh                ;

        mov     PSW,#(0 shl 3)                  ; select rb0
        mov     SP,#stack-1                     ; reset stack ptr
        clr     a                               ; clear internal data memory
        mov     r0,#7fh                         ;
        mov     @r0,a                           ;
        djnz    r0,$-1                          ;

        mov     TMOD,#00100010B                 ; auto-reload timers
        mov     TCON,#00010101B                 ; timer0 on,  ext ints are edge
        mov     TH0,#-156               ; 4800 Hz
        mov     TH1,#-52                ; 14400 Hz!
        mov     SCON,#00000000B                 ; uart disabled
        mov     a,SBUF                          ; remove junk from uart
        mov     PCON,#00000000B                 ; baud rate gen not used
        mov     IP,#00000010B                   ; system timer high priority
        mov     IE,#00000011B                   ; unmask interrupts

        mov     dptr,#int_base
        mov     vector,#sysint - int_base

        mov     dac_subptr,#dac_buf     ; init variables
        mov     dac_addptr,#dac_buf     ;
        clr     tx9600                          ;
        clr     rx9600                          ;
        mov     sv_cmd,#00100000b       ; ?
        mov     sv_data,#00101111b      ;
        mov     a,#0ffh                         ; a useful constant
        mov     r2s_data,a
        mov     s2r_data,a
        mov     t2s_data,a
        mov     s2t_data,a
        mov     s2t_cmd,a
        call    clr_dac

        setb    EA                              ; enable interrupts
        jmp     top


respond:
; sends acc to sv
        mov     r0,t2s_data
        cjne    r0,#0ffh,respond
        mov     t2s_data,a
        ret

get_cmd:
; gets data byte from sv and check for incoming rings
        jb      s2t_flag,got_cmd
        jb      ring,chk_stat_hi        ; check for transition on ring line
```

```
            jnb      ring_stat,get_cmd
            clr      ring_stat
            mov      a,#ring_h_to_l
            call     respond
            sjmp     get_cmd
chk_stat_hi:
            jb       ring_stat,get_cmd
            setb     ring_stat
            mov      a,#ring_l_to_h
            call     respond
            sjmp     get_cmd
got_cmd:
            clr      ea
            mov      a,s2t_data
            clr      s2t_flag
            setb     ea
            mov      c,acc.7
            ret

top:
; upper level cmd loop
; wait for data and interpret it
            mov      c,ring                       ; init ring status
            mov      ring_stat,c
            call     get_cmd
            call     exec                         ; exec it
            jmp      top

exec:
            jnb      acc.7,xc_cmd                 ; if not command
            mov      sv_data,a               ;   save data
            mov      a,sv_cmd                ;   do last command
xc_cmd:
            mov      sv_cmd,a                ; save current command
            anl      a,#3fh                       ; remove extraneous bits
            add      a,#-10h                      ; check for dial
            jc       xc_not_dial             ; commands 0..f are dial
            jz       xc_not_dial
            add      a,#10h
            jmp      dial_cmd
xc_not_dial:
            rl       a
            mov      r0,a
            add      a,#command_table -($+3) +1
            movc     a,@a+pc
            push     acc
            mov      a,r0
            add      a,#command_table -($+3)
            movc     a,@a+pc
            push     acc
            ret
```

```
command_table:
        dw      reset                           ; 010000
        dw      tr9600_cmd          ; 010001
        dw      int_24                          ; 010010
        dw      int_48                          ; 010011
        dw      raise_novram                    ; 010100
        dw      lower_novram                    ; 010101
        dw      read_novram                     ; 010110
        dw      t_s_2250hz          ; 010111
        dw      int_32                          ; 011000
        dw      null_cmd            ; 011001
        dw      null_cmd            ; 011010
        dw      version                         ; 011011
        dw      snd_400hz           ; 011100
        dw      stop_400hz          ; 011101
        dw      checksum            ; 011110
        dw      read_ring           ; 011111

        dw      originate           ; 100000
        dw      answer              ; 100001
        dw      go_300                          ; 100010
        dw      go_1200                         ; 100011
        dw      go_2400                         ; 100100
        dw      set_scramble                    ; 100101
        dw      clr_scramble                    ; 100110
        dw      start                           ; 100111
        dw      stop                            ; 101000
        dw      send_marks          ; 101001
        dw      t_s_2225hz          ; 101010
        dw      t_s_2100hz          ; 101011
        dw      go_back_channel                 ; 101100
        dw      go_back_chan2                   ; 101101
        dw      go_b_c_3            ; 101110
        dw      start_nofilter      ; 101111


        dw      clr_sync            ; 110000
        dw      set_sync            ; 110001
        dw      null_cmd            ; 110010
        dw      null_cmd            ; 110011
        dw      null_cmd            ; 110100
        dw      null_cmd            ; 110101
        dw      null_cmd            ; 110110
        dw      null_cmd            ; 110111
        dw      null_cmd            ; 111000
        dw      null_cmd            ; 111001
        dw      null_cmd            ; 111010
        dw      null_cmd            ; 111100
        dw      null_cmd            ; 111101
        dw      null_cmd            ; 111110
        dw      null_cmd            ; 111111
```

```
int_24:
        clr     int3200
        mov     vector,#sysint - int_base
        ret

int_48:
        clr     int3200
        mov     vector,#si_recv - int_base
        ret

int_32:
        setb    int3200
        mov     vector,#si_recv - int_base
        mov     th0,#-234                       ;* 3200/second
        ret

raise_novram:
        setb    novram_pin
        ret

lower_novram:
        clr     novram_pin
        ret

read_novram:
        jb      novram_pin,send_one
        mov     a,#novram_pin_low
        sjmp    send_novram
send_one:
        mov     a,#novram_pin_hi
send_novram:
        call    respond
        ret

clr_sync:
        clr     sync
        ret

set_sync:
        setb    sync
        ret

version:
        mov     a,#91h                          ; new function to return
        jmp     respond                         ; transmiter version #

checksum:
        clr     ea                              ; checksum the program rom
        push    dpl                             ; save dptr
        push    dph
        mov     dptr,#0                         ; start of rom
        mov     r0,#0                           ; init checksum
```

```
cs_loop:
        clr     a
        movc    a,@a+dptr           ; read byte
        inc     dptr                ; in ptr
        add     a,r0                ; add in byte
        mov     r0,a
        mov     a,dph
        cjne    a,#10h,cs_loop      ; done?
        pop     dph                 ; restore old dptr
        pop     dpl
        clr     tf0                 ; clear pending interrupts
        clr     ie0
        setb    ea                  ; reenable interrupts
        mov     a,r0
        push    acc
        anl     a,#0fh
        orl     a,#90h
        call    respond             ; send low result to sv
        pop     acc
        swap    a
        anl     a,#0fh
        orl     a,#90h
        call    respond             ; send high result to sv
        ret


$EJECT
;****************************************
;
; Name          DIAL_CMD
; Purpose       generates DTMF tones
; Entry         a = digit
; Notes         changes timer0 frequency
;               runs until another sv command
; Registers
;               R0 = high band ptr
;               R1 = low band ptr
;****************************************
;
dial_cmd:
        clr     ea
        clr     tr0                 ; stop timer0
        clr     tr1                 ; stop timer1
        clr     ex0
        anl     a,#0fh              ; isolate digit
        mov     r0,a                ; save it
        add     a,#(ltone_table -($+3))
        movc    a,@a+pc
        mov     th0,a
        mov     tl0,a
        mov     a,r0
```

```
        add     a,#(htone_table -($+3))
        movc    a,@a+pc
        mov     th1,a
        mov     tl1,a

        mov     a,r0
        call    dtmf_init

        mov     r1,#data_buffer
        mov     r0,#data_buffer+8
        clr     tf0
        clr     tf1
        mov     vector,#tones-int_base
        setb    ea
        setb    tr0
        setb    tr1
dial_loop:
        jbc     tf1,dial_phase
        jnb     s2t_flag,dial_loop
        clr     s2t_flag
        clr     ea
        clr     tr1                             ; stop sending tones
        mov     th0,#-156
        mov     th1,#-52
        mov     vector,#sysint - int_base
        mov     dac,#80h
        setb    ex0
        setb    ea
        ret

dial_phase:
        clr     ea
        inc     r0
        anl     ar0,#11111011b
        mov     a,@r0
        add     a,@r1
        xrl     a,#80h
        mov     dac,a
        setb    ea
        sjmp    dial_loop

ltone_table:
        db      -99                     ; 0, 941hz, /8
        db      -134                    ; 1, 697hz, /8
        db      -134                    ; 2, 697hz, /8
        db      -134                    ; 3, 697hz, /8
        db      -122                    ; 4, 770hz, /8
        db      -122                    ; 5, 770hz, /8
        db      -122                    ; 6, 770hz, /8
        db      -110                    ; 7, 852hz, /8
        db      -110                    ; 8, 852hz, /8
        db      -110                    ; 9, 852hz, /8
```

```
        db      -99                           ; #,  941hz,  /8
        db      -99                           ; *,  941hz,  /8
        db      -134                          ; A,  697hz,  /8
        db      -122                          ; B,  770hz,  /8
        db      -110                          ; C,  852hz,  /8
        db      -99                           ; D,  941hz,  /8

htone_table:
        db      -140                          ; 0,  1336hz,  /4
        db      -155                          ; 1,  1209hz,  /4
        db      -140                          ; 2,  1336hz,  /4
        db      -127                          ; 3,  1477hz,  /4
        db      -155                          ; 4,  1209hz,  /4
        db      -140                          ; 5,  1336hz,  /4
        db      -127                          ; 6,  1477hz,  /4
        db      -155                          ; 7,  1209hz,  /4
        db      -140                          ; 8,  1336hz,  /4
        db      -127                          ; 9,  1477hz,  /4
        db      -127                          ; #,  1477hz,  /4
        db      -155                          ; *,  1209hz,  /4
        db      -115                          ; A,  1633hz,  /4
        db      -115                          ; B,  1633hz,  /4
        db      -115                          ; C,  1633hz,  /4
        db      -115                          ; D,  1633hz,  /4

dtmf_init:
        mov     r3,a
        add     a,#lt_index-($+3)
        movc    a,@a+pc
        mov     r1,a

        mov     r0,#data_buffer
        mov     r2,#8
lt_loop:
        mov     a,r1
        movc    a,@a+pc
lt_lookup:
        mov     @r0,a
        inc     r0
        inc     r1
        djnz    r2,lt_loop

        mov     a,r3
        add     a,#ht_index-($+3)
        movc    a,@a+pc
        mov     r1,a
        mov     r2,#4
ht_loop:
        mov     a,r1
        movc    a,@a+pc
ht_lookup:
        mov     @r0,a
```

```
        inc     r0
        inc     r1
        djnz    r2,ht_loop
        ret

lt_index:
        db      ltone_941 - lt_lookup               ; 0
        db      ltone_697 - lt_lookup               ; 1
        db      ltone_697 - lt_lookup               ; 2
        db      ltone_697 - lt_lookup               ; 3
        db      ltone_770 - lt_lookup               ; 4
        db      ltone_770 - lt_lookup               ; 5
        db      ltone_770 - lt_lookup               ; 6
        db      ltone_852 - lt_lookup               ; 7
        db      ltone_852 - lt_lookup               ; 8
        db      ltone_852 - lt_lookup               ; 9
        db      ltone_941 - lt_lookup               ; #
        db      ltone_941 - lt_lookup               ; *
        db      ltone_941 - lt_lookup               ; a
        db      ltone_941 - lt_lookup               ; b
        db      ltone_941 - lt_lookup               ; c
        db      ltone_941 - lt_lookup               ; d

ltone_697:
        db      0,(84h/4),(84h/2),(84h/4),0,(-84h/4),(-84h/2),(-84h/4)

ltone_770:
        db      0,(6ch/4),(6ch/2),(6ch/4),0,(-6ch/4),(-6ch/2),(-6ch/4)

ltone_852:
ltone_941:
        db      0,(60h/4),(60h/2),(60h/4),0,(-60h/4),(-60h/2),(-60h/4)


ht_index:
        db      htone_1336 - ht_lookup              ; 0
        db      htone_1209 - ht_lookup              ; 1
        db      htone_1336 - ht_lookup              ; 2
        db      htone_1477 - ht_lookup              ; 3
        db      htone_1209 - ht_lookup              ; 4
        db      htone_1336 - ht_lookup              ; 5
        db      htone_1477 - ht_lookup              ; 6
        db      htone_1209 - ht_lookup              ; 7
        db      htone_1336 - ht_lookup              ; 8
        db      htone_1477 - ht_lookup              ; 9
        db      htone_1477 - ht_lookup              ; #
        db      htone_1209 - ht_lookup              ; *
        db      htone_1633 - ht_lookup              ; a
        db      htone_1633 - ht_lookup              ; b
        db      htone_1633 - ht_lookup              ; c
        db      htone_1633 - ht_lookup              ; d
```

```
htone_1209:
        db      36h,0,-36,0

htone_1336:
htone_1477:
htone_1633:
        db      30h,0,-30,0


$eject
null_cmd:
        ret

read_ring:
        mov     a,#11001111b
        mov     c,ring
        rlc     a
        call    respond
        ret

clr_dac:
        mov     a,#80h                          ; zero value
        mov     r0,#dac_buf                     ; reset dac buffer to 0
        mov     r1,#32                          ; size of buffer
cd_loop:
        mov     @r0,a
        inc     r0
        djnz    r1,cd_loop
        mov     dac,a
        ret


$EJECT
;*****************************************
;
; Name          TR9600_CMD
; Purpose   encodes data for 9600 transmit mode
; Frequency 2400 hz
; Notes         Time critical.  Only Timer1 is used for speed
;               Data is exchanged with the recv & sv.
;               Data byte detemines both data and xmit mode
; Registers
;               B  = data byte from supervisor
;               R0 = scratch reg
;               R1 = timer1 isr dacbuf sub ptr
;               R2 = interrupt counter for timing
;*****************************************
;

tr9600_cmd:
        call    clr_dac
        jb      s2r_flag,$                  ; wait for pending xfer
```

```
        call    init_v32_scram
        mov     TH1,#-52                ; 14400 Hz!
        clr     ring                            ;*** DEBUG
timeing_cmd:
        mov     b,#3fh                          ; start in timeing mode
        sjmp    mercury_mode

two_pt_cmd:
        mov     b,#2fh                          ;** DEBUG
        sjmp    mercury_mode

four_pt_cmd:
        mov     b,#1fh                          ;** DEBUG
        sjmp    mercury_mode

v32_cmd:
        mov     b,#0fh                          ;** DEBUG
        sjmp    mercury_mode


mercury_mode:
; r1 is dac ptr for int routine
; r2 is intr counter

        jb      tx9600,mercury_loop
        setb    tx9600                          ; switch modes here
        setb    rd                              ;* experimental
        mov     dac_addptr,#dac_buf     ;* experimental
        mov     r1,#dac_buf + 8                 ;* experimental
        mov     r2,#6                           ; 14400/2400 = 6
        clr     tr0                             ; stop timer0
        setb    tr1                             ; start timer1
        clr     tf1                             ; clear pending timer1 int
        mov     ie,#10001000b                   ; enable timer1
        mov     r2s_data,#0ffh
        mov     hs_count,#00                    ;** DEBUG
        clr     bcflag

mercury_loop:
        setb    wr                              ; from prev exchange
        jb      b.5,ml2
        jb      b.4,ml1
        call    v32
        sjmp    mcontinue
ml1:
        call    four_phase
        sjmp    mcontinue
ml2:
        jb      b.4,ml3
        call    two_phase
        sjmp    mcontinue
ml3:
```

```
        call    alt_phase
        sjmp    mcontinue

mcontinue:
        orl     a,#10000000b                    ; a  = scrambled byte
        mov     c,bcflag
        mov     acc.6,c
        jb      tx9600,mcr2

ml_exit:
; no longer in tx9600 mode,  so reset and return
        cjne    r2,#0,$                         ; sync with intr

;** CHECK THIS
        mov     recv,#01000000b                 ; stop receiver
        clr     int_recv                ; intr recv
        setb    int_recv                ; note-- check timing
        mov     sv,#0ffh                ; configure for input

        jb      rd,$                            ; wait for recv ack
        mov     r0,#20h
        djnz    r0,$                            ; delay a while

        mov     tl0,th0
        clr     tr1                             ; stop timer1
        clr     tf0                             ; clear pending timer0 int
        setb    tr0                             ; start timer0
        mov     ie,#10000011b                   ; enable timer0, recv int
        mov     dac_subptr,ar1
        setb    ring                            ;*** DEBUG

        mov     a,#0c0h                         ;? send ack to sv ?
        call    respond
        ret

mcr2:
        cjne    r2,#0,$                         ; sync with intr
        mov     r2,#6

        setb    wr_enable
        mov     recv,a                          ; send new pt
        clr     wr                              ; signal pt to recv
        clr     int_recv                ; intr recv
        setb    int_recv                ; note-- slow responce

        mov     sv,#0ffh                ; configure for input
        nop                                     ;** experimental
        mov     b,sv                            ; swap data
        mov     sv,r2s_data
        clr     int_sv                          ; intr supervisor
        mov     r0,dac_addptr                   ; a small delay
        setb    int_sv
```

```
        mov     c,b.6                       ; xfer this bit to receiver
        mov     bcflag,c            ; save it
        jb      b.7,mcomm           ; check for mode change
        clr     tx9600                      ; exit on next pass

mcomm:
; comm with receiver
        mov     a,#0ffh                     ; save a cycle after ack
        jb      rd,$                        ; wait for recv ack
        mov     recv,a                      ; switch to input mode
        clr     wr_enable           ; enable receive
        mov     a,recv
        setb    wr
        mov     r2s_data,a

        jnb     rd,$
        mov     a,recv                      ; read dac0
        clr     wr
        xrl     a,#80h
        mov     @r0,a
        inc     r0
        anl     ar0,#11101111b

        jb      rd,$
        mov     a,recv                      ; read dac1
        setb    wr
        xrl     a,#80h
        mov     @r0,a
        inc     r0
        anl     ar0,#11101111b

        jnb     rd,$
        mov     a,recv                      ; read dac2
        clr     wr
        xrl     a,#80h
        mov     @r0,a
        inc     r0
        anl     ar0,#11101111b

        jb      rd,$
        mov     a,recv                      ; read dac3
        setb    wr
        xrl     a,#80h
        mov     @r0,a
        inc     r0
        anl     ar0,#11101111b

        jnb     rd,$
        mov     a,recv                      ; read dac4
        clr     wr
        xrl     a,#80h
        mov     @r0,a
```

```
        inc     r0
        anl     ar0,#11101111b

        jb      rd,$
        mov     a,recv                          ; read dac5
        setb    wr
        setb    wr_enable
        xrl     a,#80h
        mov     @r0,a
        inc     r0
        mov     a,r0
        anl     a,#11101111b
        mov     dac_addptr,a

        inc     hs_count
        jmp     mercury_loop

alt_phase:
fast_train:
        setb    c
        jnb     b.3,ft_scram
        jb      b.2,ft_cd
ft_ab:
        clr     a
        addc    a,dstate
        anl     a,#03h
        mov     dstate,a
        rrc     a
        mov     a,#00100000b                    ; (-3,-1)
        jnc     $+4
        mov     a,#00100010b                    ; (+1,-3)
        ret
ft_cd:
        clr     a
        addc    a,dstate
        anl     a,#03h
        mov     dstate,a
        rrc     a
        mov     a,#00100010b                    ; (+3,+1)
        jnc     $+4
        mov     a,#00100011b                    ; (+3,+1)
        ret

ft_scram:
        mov     c,b.0                           ;
        call    v32_scram1              ;
        mov     b.0,c                           ;
        mov     c,b.1                           ;
        call    v32_scram1              ;
        mov     b.1,c                           ;
        mov     a,b                             ;
        anl     a,#03h                          ;
```

```
        orl     a,#00100000b                          ; flag => not v32
        mov     c,acc.1                               ; limit to ac pts
        mov     acc.0,c
        ret

four_phase:
        mov     c,b.0                                 ;
        call    v32_scram1                  ;
        mov     b.0,c                                 ;
        mov     c,b.1                                 ;
        call    v32_scram1                  ;
        mov     b.1,c                                 ;
        mov     a,b                                   ;
        jnb     acc.3,fp_skip                         ; skip diff encode
        call    diff_encode                 ; when training
;;;     sjmp    fp_continue                 ;** HUH????
fp_skip:
        nop
        nop
        mov     dstate,a
fp_continue:
        anl     a,#03h                                ;
        orl     a,#00100000b                          ; flag => not v32
        ret

two_phase:
        jb      b.3,f7200
        call    init_v32_scram                        ; random clears
        mov     dstate,#0
        mov     a,#10100100b                          ;* ZERO code
        ret

f7200:
; data in B.2, B.1, B.0
; scramble 3 bits
        mov     c,b.0                                 ; note-- there may no be
        call    v32_scram1                  ; sufficent time...
        mov     b.0,c                                 ;
        mov     c,b.1                                 ;
        call    v32_scram1                  ;
        mov     b.1,c                                 ;
        mov     c,b.2                                 ;
        call    v32_scram1                  ;
        mov     b.2,c                                 ;
        mov     a,b
        sjmp    vcon

v32:
; 9600 transmitter      v32  4 bit
```

```
; scramble 4 bits
            mov        a,b
            call       v32_scram4
vcon:
; differential encode
            xch        a,dstate
            add        a,dstate                    ; mod 4
            anl        a,#03h
            xch        a,dstate
            anl        a,#0ch                             ; rejoin nybble
            orl        a,dstate


;;VCON:
; trellis encode
            mov        c,trellis.0                 ;
            rlc        a                                  ; a = new code
; new t0 = (t0 and y1) xor (t1 xor y2)
            mov        c,trellis.0
            anl        c,acc.1
            %xrl_c(trellis.1)
            %xrl_c(acc.2)
            mov        trellis.7,c                 ; temp storage
; new t1 = (t0 and (y2 xor t1)) xor (t2 xor (y1 xor y2))
            mov        c,acc.2
            %xrl_c(trellis.1)
            anl        c,trellis.0
            %xrl_c(trellis.2)
            %xrl_c(acc.1)
            %xrl_c(acc.2)
            mov        trellis.1,c
            mov        c,trellis.0
            mov        trellis.2,c
            mov        c,trellis.7
            mov        trellis.0,c

; Note-- coordinate mapping was moved to recv
            anl        a,#1fh
            jb         b.5,$+4
            ret
            orl        a,#30h
            ret


;---------------------------------------------
trellis_encode:
            mov        c,trellis.0                 ; experimental version
            rlc        a
            mov        r0,a
            rl         a
            rl         a
            anl        a,#18h
```

```
        anl     trellis,#07h
        orl     a,trellis
        add     a,#ttab -($+3)
        movc    a,@a+pc
        mov     trellis,a
        mov     a,r0


; T R E L L I S   T A B L E
ttab:
        db      00h
        db      04h
        db      01h
        db      07h
        db      02h
        db      06h
        db      03h
        db      05h

        db      0ah
        db      0fh
        db      0bh
        db      0ch
        db      08h
        db      0dh
        db      09h
        db      0eh

        db      13h
        db      15h
        db      12h
        db      16h
        db      11h
        db      17h
        db      10h
        db      14h

        db      19h
        db      1eh
        db      18h
        db      1dh
        db      1bh
        db      1ch
        db      1ah
        db      1fh

;--------------------------------------------------

init_v32_scram:
        mov     scrambler+0,#01111100b
        mov     scrambler+1,#01100111b
        mov     scrambler+2,#00000100b
```

```
        mov     trellis,#00000000b
        ret

v32_scram1:
; cy = the bit
        mov     a,scrambler+2                   ;
        jnb     acc.1,$+4               ; x18
        cpl     c                               ;
        jnb     acc.6,$+4               ; x23
        cpl     c                               ;

        mov     a,scrambler             ; d0
        rlc     a                               ;
        mov     scrambler,a             ;
        mov     a,scrambler+1                   ; d8
        rlc     a                               ;
        mov     scrambler+1,a                   ;
        mov     a,scrambler+2                   ; d16
        rlc     a                               ;
        mov     scrambler+2,a                   ;

        mov     a,scrambler             ;
        rrc     a                               ;
        ret


v32_scram4:
; al.3 - al.0 = the nybble
; this is 2x faster.            note-- scrambler must be bitmapped
; reverse nybble
;       jb      scramble,$+4
;       ret

        anl     a,#0fh
        add     a,#reverse_table -($+3)
        movc    a,@a+pc

; scramble nybble in parallel
        mov     r0,a
        mov     a,scrambler+2
        swap    a
        rl      a
        xrl     a,r0                                    ; x23
        mov     r0,a

        mov     a,scrambler+2
        mov     c,scrambler+1.7
        rlc     a
        mov     c,scrambler+1.6
        rlc     a
        xrl     a,r0                                    ; x18
        anl     a,#00001111b
```

```
; now shift bits
        mov     r0,#scrambler
        xch     a,@r0
        swap    a
        xchd    a,@r0
        xch     a,@r0

        inc     r0
        xch     a,@r0
        swap    a
        xchd    a,@r0
        xch     a,@r0

        inc     r0
        xch     a,@r0
        swap    a
        xchd    a,@r0
        xch     a,@r0

        mov     a,scrambler                     ;
;-      anl     a,0fh                                   ;
;-      ret

reverse_nybble:
        anl     a,#0fh
        add     a,#reverse_table -($+3)
        movc    a,@a+pc
        ret

reverse_table:
; table of reversed nybbles
        db      0                                       ; 0000
        db      8                                       ; 0001
        db      4                                       ; 0010
        db      12                                      ; 0011
        db      2                                       ; 0100
        db      10                                      ; 0101
        db      6                                       ; 0110
        db      14                                      ; 0111
        db      1                                       ; 1000
        db      9                                       ; 1001
        db      5                                       ; 1010
        db      13                                      ; 1011
        db      3                                       ; 1100
        db      11                                      ; 1101
        db      7                                       ; 1110
        db      15                                      ; 1111


diff_encode:
; differential and gray encode ( 4-phase only)
        anl     a,#03                                   ; mask relevant bits
```

```
        rl      a                               ; generate an index
        rl      a                               ; into table
        anl     dstate,#03h             ;
        orl     a,dstate                ;
        add     a,#dtable- ($+3)        ;
        movc    a,@a+pc                         ;
        mov     dstate,a                ;
        ret

dtable:
        db      2                               ; 0000
        db      0                               ; 0001
        db      3                               ; 0010
        db      1                               ; 0011

        db      3                               ; 0100
        db      2                               ; 0101
        db      1                               ; 0110
        db      0                               ; 0111

        db      0                               ; 1000
        db      1                               ; 1001
        db      2                               ; 1010
        db      3                               ; 1011

        db      1                               ; 1100
        db      3                               ; 1101
        db      0                               ; 1110
        db      2                               ; 1111


$EJECT
;***********************************************
;
;
; NAME                  COURIER_TX
; PURPOSE  1200 and 2400 baud transmitter
; FREQUENCY             called to process commands and encode data
; SOURCE   supervisor commands
;***********************************************


; These routines process all transmitter commands concerning
; low speed operations

originate:
        setb    orig
        ret

answer:
        clr     orig
        ret
```

```
go_300:
          pop       acc
          pop       acc
          setb      baud300
          jmp       send_tone

go_1200:
          clr       send_2400
          ret

go_2400:
          setb      send_2400
          ret

set_scramble:
          setb      scramble
          ret

clr_scramble:
          clr       scramble
          ret

snd_400hz:
          setb      send_400hz
          ret

stop_400hz:
          clr       send_400hz
          ret

start_nofilter:
          setb      no_filter
          sjmp      go
start:
          clr       no_filter
go:
          pop       acc
          pop       acc
          mov       vector,#tx_low_speed-int_base
          mov       th0,#-78                          ; 9600/second
          clr       b_c_2
          clr       b_c_3
          clr       back_chan
          jmp       data_mode

stop:
          pop       acc
          pop       acc
          clr       EA
          clr       got_data
          mov       vector,#sysint-int_base
```

```
        mov     TMOD,#00100010B                    ; auto-reload timers
        mov     TCON,#00010101B                    ; timer0 on,  ext ints are edge
        mov     TH0,#-156              ; 4800 Hz
        mov     TH1,#-52               ; 14400 Hz!
        mov     SCON,#00000000B                    ; uart disabled
        mov     a,SBUF                             ; remove junk from uart
        mov     PCON,#00000000B                    ; baud rate gen not used
        mov     IP,#00000010B                      ; system timer high priority
        mov     IE,#00000011B                      ; unmask interrupts
        setb    EA
        clr     b_c_2
        clr     b_c_3
        clr     no_filter
        clr     back_chan
        clr     baud300
        call    clr_dac
        jmp     top

send_marks:
        setb    xmit_marks
        ret

t_s_2225hz:
        mov     a,#-84
        jmp     send_tone

t_s_2100hz:
        mov     a,#-89
        jmp     send_tone

t_s_2250hz:
        mov     a,#-83
        jmp     send_tone

go_b_c_3:
        setb    b_c_3
        sjmp    set_flags
go_back_chan2:
        clr     b_c_3
set_flags:
        setb    b_c_2
        clr     data_1200
        setb    send_2400
        mov     a_n,#00
        mov     b_n,#00
        clr     inv
go_back_channel:
        pop     acc
        pop     acc
        mov     vector,#back_ch_int-int_base
        setb    scramble
        setb    orig
```

```
        mov     sign_byte,#00

        jb      int3200,setup_3200
        mov     th0,#-156                       ; 4800/second
        jb      b_c_2,set_32
        jb      b_c_3,set_32
        clr     send_2400
        setb    back_chan
        sjmp    data_mode
set_32:
        mov     back_int_cnt,#03                ; send data every third
        mov     vector,#back_ch23_int-int_base  ; int and communicate
                                                ; every second int
        sjmp    data_mode

setup_3200:
        mov     th0,#-234                       ;* 3200/second
        mov     back_int_cnt,#02                ; send data every third
        mov     vector,#back_ch23_int-int_base  ; int and communicate


;**********************************************
;
; NAME          DATA_MODE
; PURPOSE 1200 and 2400 baud transmitter
; FREQUENCY     called by start command from supervisor
; SOURCE  supervisor commands
;**********************************************

data_mode:
        mov     t2s_data,#0ffh
        clr     got_data
        mov     r1,#40h                         ; TX buffer addr
        mov     prev_q1q0,#00
        mov     int_cnt,#4
        mov     scr_1_8,#7fh                    ; init scrambler
        mov     scr_9_16,#029h
        clr     scr_17
        clr     send_400hz
        clr     hi_low_buf                      ; tranmitting lower buf
        mov     r2,#16                          ; sample count
        clr     data_1200
wait_for_data:
        jb      s2t_cflag,proc_cmd
        jb      data_1200,scramble_data
        jb      xmit_marks,stuff_mark           ; check send marks mode
        jnb     s2t_flag,wait_for_data
        sjmp    scramble_data
proc_cmd:
        mov     a,s2t_cmd                       ; process TX cmnd
        clr     s2t_cflag
```

```
        call    xc_cmd
        jmp     wait_for_data
stuff_mark:
        jb      s2t_flag,no_more_mark          ; if data sent then clr
        mov     s2t_data,#0fh
        jmp     scramble_data
no_more_mark:
        clr     xmit_marks
scramble_data:
        setb    got_data
        jnb     scramble,setup_nybble
        call    data_scrambler
        jnb     b_c_2,grey_encode
        jmp     b_c_2_comp
setup_nybble:
        jbc     data_1200,get_hi_bits
        mov     a,s2t_data
        clr     s2t_flag
        call    reverse_nybble
        jb      send_2400,save_quad
        mov     sav_data,a
        setb    data_1200
        sjmp    stuff_it
get_hi_bits:
        mov     a,sav_data
        rl      a
        rl      a
stuff_it:
        anl     a,#0ch
        orl     a,#01h
save_quad:
        mov     scr_data,a
grey_encode:
        jb      scr_data.3,differential_encode
        cpl     scr_data.2
differential_encode:
        mov     a,scr_data
        rr      a
        rr      a
        anl     prev_q1q0,#03h
        add     a,prev_q1q0
        anl     a,#0c3h
        mov     prev_q1q0,a
        jnb     back_chan,setup_quad
        jmp     back_chan_comp
setup_quad:
        rl      a
        rl      a
        jnb     no_filter,get_signs
        jmp     no_filter_comp
get_signs:
        jnb     orig,get_hi_band_sign
```

```
        call    get_low_sign
        jmp     no_cpl
get_hi_band_sign:
        jb      acc.2,get_sign1
        mov     sign_reg,#01100110b
        sjmp    check_cpl
get_sign1:
        mov     sign_reg,#00110011b
check_cpl:
        jnb     acc.3,no_cpl
        xrl     sign_reg,#11111111b
no_cpl:
        mov     r0,#data_buffer
        jb      hi_low_buf,get_jump             ; set up buffer ptr
        mov     r0,#data_buffer+10h
get_jump:
        mov     r4,#10h                                   ; sample counter
        jb      orig,read_samples
        call    map_nybble
        add     a,#hi_band_table-get_sample-1
        mov     jump_offset,a
        sjmp    get_data
read_samples:
        anl     a,#07h
        swap    a
        add     a,#low_band_table-get_sample-1
        mov     jump_offset,a
get_data:
        call    get_sample
        xch     a,sign_reg
        jb      acc.0,set_c
        clr     c
        sjmp    rotate_sign
set_c:
        setb    c
rotate_sign:
        rr      a
        xch     a,sign_reg
        jnc     not_neg
        cpl     a
        inc     a
not_neg:
        cpl     acc.7                                     ; complement sign for d/a
        mov     @r0,a
        inc     r0
        inc     jump_offset
        mov     a,jump_offset
        djnz    r4,get_data
wait_baud_end:
        cjne    r2,#00,wait_baud_end
        jb      hi_low_buf,set_lower_buf
        mov     r1,#data_buffer+10h
```

```
            mov     r2,#10h
            setb    hi_low_buf
            jmp     wait_for_data
set_lower_buf:
            mov     r1,#data_buffer
            mov     r2,#10h
            clr     hi_low_buf
            jmp     wait_for_data

get_low_sign:
            mov     sign_reg,a
            anl     a,#07h
            add     a,#low_sign_table-($+3)
            movc    a,@a+pc
            jnb     sign_reg.3,dont_swap
            swap    a
dont_swap:
            xch     a,sign_reg
            ret

low_sign_table:                         ; table of sample sign for 0-7
            db      01ch                ; 8-fh just swap nybbles
            db      03ch
            db      01eh
            db      01ch
            db      007h
            db      00fh
            db      087h
            db      007h

;***************************************************
;
; SCRAMBLER         scramble input data from supervisor.
;                   scrambler 4 times for 2400 baud data and 2 times
;                   for 1200 baud.
;
;***************************************************

data_scrambler:
            jbc     data_1200,setup_1200_data
            mov     scr_data,s2t_data
            clr     s2t_flag
            anl     scr_data,#0fh
            mov     r3,#04h                         ; scramble quadbit
            jnb     b_c_2,begin
            dec     r3                              ; only scramble 3 bits
begin:
            cjne    one_count,#64,no_lockup         ; check scrambler lockup
            cpl     scr_data.0
            mov     one_count,#00h
no_lockup:
            jnb     scr_17,no_comp                  ; XOR scr.17
```

```
        cpl     scr_data.0
no_comp:
        jnb     scr_9_16.5,no_comp_d14              ; XOR scr.14
        cpl     scr_data.0
no_comp_d14:
        jb      scr_data.0,count_one
        mov     one_count,#00
        sjmp    save_in_scr
count_one:
        inc     one_count
save_in_scr:
        mov     c,scr_9_16.7
        mov     scr_17,c
        mov     a,scr_1_8
        rlc     a
        jb      scr_data.0,set_scr_0        ; mov scr_data.0 into acc.0
        clr     acc.0                                ; while saving c
        sjmp    rset_scr_1_8
set_scr_0:
        setb    acc.0
rset_scr_1_8:
        mov     scr_1_8,a
        mov     a,scr_9_16
        rlc     a
        mov     scr_9_16,a
        mov     a,scr_data
        rr      a
        mov     scr_data,a
        djnz    r3,begin
        mov     a,scr_1_8                   ; low nybble in scr_1_8
        anl     a,#0fh                               ; has correct scrambled data
        jb      send_2400,sav_quad
        setb    data_1200
        mov     sav_data,a
        anl     a,#0ch
        orl     a,#01h
        sjmp    sav_quad
setup_1200_data:
        mov     a,sav_data
        rl      a
        rl      a
        anl     a,#0ch
        orl     a,#01
sav_quad:
        mov     scr_data,a
        ret

;*****************************************************
; Original Courier TX ----- No digital filtering
;*****************************************************
no_filter_comp:
        mov     r0,#data_buffer
```

```
        jb      hi_low_buf,get_count       ; set up buffer ptr
        mov     r0,#data_buffer+10h
get_count:
        mov     r4,#08h                    ; sample counter
        mov     jump_offset,a
        call    get_am                     ; get the point
        mov     a_n,a
        call    get_bm
        mov     b_n,a
        mov     sign_reg,#01100110b
sample_loop:
        mov     a,a_n
        xch     a,sign_reg                 ; keep sign_reg intact
        mov     c,acc.7
        rlc     a
        xch     a,sign_reg
        jnc     save_it
        cpl     a
        inc     a
save_it:
        cpl     acc.7                      ; for d/a
        mov     @r0,a
        inc     r0
        jnb     orig,no_double             ; double samples for orig
        mov     @r0,a
        inc     r0
        dec     r4
no_double:
        mov     a,b_n
        xch     a,sign_reg
        mov     c,acc.7
        rlc     a
        xch     a,sign_reg
        jnc     no_compl
        cpl     a
        inc     a
no_compl:
        cpl     acc.7
        mov     @r0,a
        inc     r0
        jnb     orig,count_samp
        mov     @r0,a
        inc     r0
count_samp:
        djnz    r4,sample_loop
        jmp     wait_baud_end

get_am:
        mov     a,jump_offset
        add     a,#am_table - ($+3)
        movc    a,@a+pc
        ret
```

```
am_table:
        db      015h            ; +1
        db      040h            ; +3
        db      015h            ; +1
        db      040h            ; +3
        db      0ebh            ; -1
        db      0ebh            ; -1
        db      0bfh            ; -3
        db      0bfh            ; -3
        db      0ebh            ; -1
        db      0bfh            ; -3
        db      0ebh            ; -1
        db      0bfh            ; -3
        db      015h            ; +1
        db      015h            ; +1
        db      040h            ; +3
        db      040h            ; +3

get_bm:
        mov     a,jump_offset
        add     a,#bm_table - ($+3)
        movc    a,@a+pc
        ret

bm_table:
        db      015h            ; +1
        db      015h            ; +1
        db      040h            ; +3
        db      040h            ; +3
        db      015h            ; +1
        db      040h            ; +3
        db      015h            ; +1
        db      040h            ; +3
        db      0ebh            ; -1
        db      0ebh            ; -1
        db      0bfh            ; -3
        db      0bfh            ; -3
        db      0ebh            ; -1
        db      0bfh            ; -3
        db      0ebh            ; -1
        db      0bfh            ; -3

back_chan_comp:
        anl     a,#3                    ; just get q1q0
        call    map_sign                ; signs are in bit 7 and 3
        xch     a,sign_byte
        rr      a                       ; mov into an-1,bn-1
        anl     a,#66h                  ; get rid of old signs
        orl     a,sign_byte
        mov     sign_byte,a
        mov     r0,#data_buffer
        jb      hi_low_buf,get_cnt
```

```
        mov     r0,#data_buffer+10h
get_cnt:
        mov     r4,#16                          ; double the samples
        mov     table_cnt,#00
b_loop:
        mov     b,#00

        call    get_back_samp
        jnb     an,$+5
        cpl     a
        inc     a
        add     a,b
        mov     b,a

        call    get_back_samp
        jnb     an1,$+5
        cpl     a
        inc     a
        add     a,b
        mov     b,a

        call    get_back_samp
        jnb     an2,$+5
        cpl     a
        inc     a
        add     a,b
        mov     b,a

        call    get_back_samp
        jnb     bn,$+5
        cpl     a
        inc     a
        add     a,b
        mov     b,a

        call    get_back_samp
        jnb     bn1,$+5
        cpl     a
        inc     a
        add     a,b
        mov     b,a

        call    get_back_samp
        jnb     bn2,$+5
        cpl     a
        inc     a
        add     a,b
        cpl     acc.7           ; for d/a
        mov     @r0,a
        inc     r0

        djnz    r4,b_loop
```

```
        jmp     wait_baud_end

map_sign:
        add     a,#sign_table-($+3)
        movc    a,@a+pc
        ret

sign_table:
        db      00h
        db      80h
        db      88h
        db      08h

get_back_samp:
        mov     a,table_cnt
        add     a,#back_samps-($+3)
        movc    a,@a+pc
        inc     table_cnt
        ret

back_samps:
        db      -4
        db      47
        db      1
        db      0
        db      0
        db      0

        db      -3
        db      36
        db      -1
        db      3
        db      -36
        db      1

        db      0
        db      0
        db      0
        db      5
        db      -54
        db      4

        db      4
        db      -39
        db      3
        db      4
        db      -39
        db      3

        db      5
        db      -55
        db      5
```

```
db 0
db 0
db 0

db 3
db -38
db 3
db -3
db 38
db -3

db 0
db 0
db 0
db -2
db 51
db -4

db 1
db 33
db -3
db 1
db 33
db -3

db 4
db 42
db 0
db 0
db 0
db 0

db 6
db 26
db 0
db -6
db -26
db 0

db 0
db 0
db 0
db -13
db -31
db 0

db -13
db -18
db 0
db -13
db -18
db 0
```

```
        db      -25
        db      -19
        db      0
        db      0
        db      0
        db      0

        db      -22
        db      -9
        db      0
        db      22
        db      9
        db      0

        db      0
        db      0
        db      0
        db      37
        db      8
        db      0

        db      30
        db      3
        db      0
        db      30
        db      3
        db      0

b_c_2_comp:
        anl     scr_data,#07h           ; get just the tri_bit
        jnb     scr_data.2,no_comp2
        cpl     scr_data.1
no_comp2:
        jb      scr_data.1,no_comp3
        cpl     scr_data.0
no_comp3:
        mov     a,scr_data
        add     a,prev_q1q0
        anl     a,#07h
        mov     prev_q1q0,a

; sign byte format
;       sign_byte.7 = sign(an)
;                .6 = sign(an-1)
;                .5 = sign(an-2)
;                .2 = sign(bn)
;                .1 = sign(bn-1)
;                .0 = sign(bn-2)

        call    an_bn_map
        mov     sav_data,a
        anl     a,#88h                  ; get the signs and save
```

```
        xch     a,sign_byte
        rr      a
        anl     a,#66h                          ; get rid of old signs
        orl     a,sign_byte
        mov     sign_byte,a

        mov     a,sav_data              ; get an and save in the delay line

; a_n and b_n format:
;       a_n.5 - a_n.4 = an              ; 11 = 3, 01 = 1, 00 = 0
;       a_n.3 - a_n.2 = an-1
;       a_n.1 - a_n.0 = an-2

        anl     a,#30h
        xch     a,a_n
        rr      a
        rr      a
        anl     a,#0fh
        orl     a,a_n
        mov     a_n,a

        mov     a,sav_data              ; save bn
        swap    a
        anl     a,#30h
        xch     a,b_n
        rr      a
        rr      a
        anl     a,#0fh
        orl     a,b_n
        mov     b_n,a

        mov     r0,#data_buffer                 ; setup buffer pointers
        jb      hi_low_buf,get_samp_cnt
        mov     r0,#data_buffer+10h
get_samp_cnt:
        mov     r4,#10h
        mov     table_cnt,#00
        jnb     send_400hz,comp_loop
        mov     r4,#4
init_sine:
        mov     @r0,#80h                ; 0
        inc     r0
        mov     @r0,#0c3h               ; positive 111/128
        inc     r0
        mov     @r0,#80h                ; 0
        inc     r0
        mov     @r0,#03dh               ; negative 111/128
        inc     r0
        djnz    r4,init_sine
        jmp     wait_baud_end

comp_loop:
```

```
        mov     b,#00

        jnb     a_n.4,an_0          ; an is zero so skip
        jnb     a_n.5,an0_1         ; an=1 so get from 1 table
        call    get_ccos_3          ; get from 3 table
        sjmp    sav_0
an0_1:
        call    get_ccos_1
sav_0:
        jnb     an,an0_pos
        cpl     a
        inc     a
an0_pos:
        mov     b,a                           ; b is the sum
an_0:
        inc     table_cnt           ; always inc the table cnt

        jnb     a_n.2,an1_0         ; an is zero so skip
        jnb     a_n.3,an1_1         ; an=1 so get from 1 table
        call    get_ccos_3          ; get from 3 table
        sjmp    sav_1
an1_1:
        call    get_ccos_1
sav_1:
        jnb     an1,an1_pos
        cpl     a
        inc     a
an1_pos:
        add     a,b
        mov     b,a                           ; b is the sum
an1_0:
        inc     table_cnt           ; always inc the table cnt

        jnb     a_n.0,an2_0         ; an is zero so skip
        jnb     a_n.1,an2_1         ; an=1 so get from 1 table
        call    get_ccos_3          ; get from 3 table
        sjmp    sav_2
an2_1:
        call    get_ccos_1
sav_2:
        jnb     an2,an2_pos
        cpl     a
        inc     a
an2_pos:
        add     a,b
        mov     b,a                           ; b is the sum
an2_0:
        inc     table_cnt           ; always inc the table cnt

        jnb     b_n.4,bn_0          ; bn is zero so skip
        jnb     b_n.5,bn0_1         ; bn=1 so get from 1 table
        call    get_ccos_3          ; get from 3 table
```

```
        sjmp    sav_b0
bn0_1:
        call    get_ccos_1
sav_b0:
        jnb     bn,bn0_pos
        cpl     a
        inc     a
bn0_pos:
        add     a,b
        mov     b,a                              ; b is the sum
bn_0:
        inc     table_cnt            ; always inc the table cnt

        jnb     b_n.2,bn1_0          ; bn is zero so skip
        jnb     b_n.3,bn1_1          ; bn=1 so get from 1 table
        call    get_ccos_3           ; get from 3 table
        sjmp    sav_b1
bn1_1:
        call    get_ccos_1
sav_b1:
        jnb     bn1,bn1_pos
        cpl     a
        inc     a
bn1_pos:
        add     a,b
        mov     b,a                              ; b is the sum
bn1_0:
        inc     table_cnt            ; always inc the table cnt

        jnb     b_n.0,bn2_0          ; bn is zero so skip
        jnb     b_n.1,bn2_1          ; bn=1 so get from 1 table
        call    get_ccos_3           ; get from 3 table
        sjmp    sav_b2
bn2_1:
        call    get_ccos_1
sav_b2:
        jnb     bn2,bn2_pos
        cpl     a
        inc     a
bn2_pos:
        add     a,b
        mov     b,a
bn2_0:
        inc     table_cnt            ; always inc the table cnt
        mov     a,b
        jnb     inv,no_not
        cpl     a
        inc     a
no_not:
        cpl     acc.7                            ; setup for the DAC
        mov     @r0,a
        inc     r0
```

```
        dec     r4
        mov     a,r4
        jz      setup_inv
        jmp     comp_loop
setup_inv:
        cpl     inv                     ; next baud time invert the results
        jmp     wait_baud_end

send_tone:
        clr     ea
        clr     tr0
        clr     tr1
        mov     IP,#00001000b                   ; TH1 highest priority
        jnb     baud300,check_atone

        jb      orig,orig_counts
        mov     mark_cnt,#-84                   ; 1/(2225*4) counts
        mov     space_cnt,#-92                  ; 1/(2025*4) counts
        sjmp    init_buf
orig_counts:
        mov     mark_cnt,#-147                  ; 1/(1270*4) counts
        mov     space_cnt,#-175                 ; 1/(1070*4) counts
        sjmp    init_buf

check_atone:
        mov     TH1,a                           ; 748,800/(freq*4) counts
init_buf:
        mov     data_buffer+0,#80h
        mov     data_buffer+1,#(78h/2)
        mov     data_buffer+2,#80h
        mov     data_buffer+3,#(-78h/2)
        mov     data_buffer+4,#80h
        mov     data_buffer+5,#(78h/2)
        mov     data_buffer+6,#80h
        mov     data_buffer+7,#(-78h/2)
        mov     data_buffer+8,#80h
        mov     data_buffer+9,#(78h/2)
        mov     data_buffer+10,#80h
        mov     data_buffer+11,#(-78h/2)
        mov     data_buffer+12,#80h
        mov     data_buffer+13,#(78h/2)
        mov     data_buffer+14,#80h
        mov     data_buffer+15,#(-78h/2)
        mov     r1,#dàta_buffer
        jb      baud300,loop300
        mov     TCON,#01010101b                 ; turn on T0 and T1
        mov     IE,#10001011b                   ; T0,T1, and EXT0

wait_end:
        jnb     s2t_flag,wait_end       ; loop till command received
        clr     s2t_flag
```

```
        clr     EA
        clr     TR1
        mov     IP,#00000010b           ; T0 highest priority
        mov     IE,#10000011b           ; T0 and EXT0
        call    clr_dac
        ret

;*****************************************************
;
;       300 baud transmit loop wait for data to come in
;       then begin transmitting. switch the freq. on
;       data words. Execute any commands that come in.
;
;*****************************************************
loop300:
        mov     TCON,#00010101b         ; turn on T0
        mov     IE,#10000011b           ; T0 and EXT0, wait for data
        mov     tl1,#-20
wait_loop:
        jnb     s2t_flag,$
        clr     s2t_flag
        mov     a,s2t_data
        jb      acc.7,its_data
        call    xc_cmd
        sjmp    wait_loop
its_data:
        setb    tr1
        setb    et1
        jnb     acc.0,send_space
        mov     th1,mark_cnt
        sjmp    wait_loop
send_space:
        mov     th1,space_cnt
        sjmp    wait_loop

map_nybble:
        anl     a,#0fh
        add     a,#map_table -($+3)
        movc    a,@a+pc
        ret

map_table:
; map into data table
        db      0                       ; 0000
        db      16                      ; 0001
        db      32                      ; 0010
        db      48                      ; 0011
        db      0                       ; 0100
        db      32                      ; 0101
        db      16                      ; 0110
        db      48                      ; 0111
        db      0                       ; 1000
```

```
        db      16                      ; 1001
        db      32                      ; 1010
        db      48                      ; 1011
        db      0                       ; 1100
        db      32                      ; 1101
        db      16                      ; 1110
        db      48                      ; 1111

get_sample:
;?      add     a,#low_band_table -($+3)
        movc    a,@a+pc
        ret

low_band_table:
        db      5                       ; 0 samples
        db      0
        db      12
        db      22
        db      21
        db      0
        db      28
        db      42
        db      30
        db      0
        db      25
        db      30
        db      16
        db      0
        db      8
        db      8
        db      15                      ; 1 samples
        db      11
        db      12
        db      45
        db      63
        db      35
        db      28
        db      85
        db      90
        db      39
        db      25
        db      60
        db      48
        db      17
        db      8
        db      15
        db      5                       ; 2 samples
        db      11
        db      36
        db      45
        db      21
        db      35
```

```
db      84
db      85
db      30
db      39
db      75
db      60
db      16
db      17
db      24
db      15
db      15                          ; 3 samples
db      0
db      36
db      68
db      63
db      0
db      84
db      127
db      90
db      0
db      75
db      90
db      48
db      0
db      24
db      22
db      5                           ; 4 samples
db      12
db      12
db      0
db      21
db      36
db      28
db      0
db      30
db      40
db      25
db      0
db      16
db      16
db      8
db      0
db      5                           ; 5 samples
db      23
db      36
db      23
db      21
db      71
db      84
db      43
db      30
db      79
```

```
        db      75
        db      30
        db      16
        db      33
        db      24
        db      7
        db      15                      ; 6 samples
        db      23
        db      12
        db      23
        db      63
        db      71
        db      28
        db      43
        db      90
        db      79
        db      25
        db      30
        db      48
        db      33
        db      8
        db      7
        db      15                      ; 7 samples
        db      34
        db      36
        db      0
        db      63
        db      106
        db      84
        db      0
        db      90
        db      118
        db      75
        db      0
        db      48
        db      50
        db      24
        db      0

hi_band_table:
        db      5                       ; 0 samples
        db      8
        db      12
        db      16
        db      21
        db      25
        db      28
        db      30
        db      30
        db      28
        db      25
        db      21
```

```
db 16
db 12
db 8
db 5
db 15      ; 1 samples
db 8
db 36
db 16
db 63
db 25
db 84
db 30
db 90
db 28
db 75
db 21
db 48
db 12
db 24
db 5
db 5       ; 2 samples
db 24
db 12
db 48
db 21
db 75
db 28
db 90
db 30
db 84
db 25
db 63
db 16
db 36
db 8
db 15
db 15      ; 3 samples
db 24
db 36
db 48
db 63
db 75
db 84
db 90
db 90
db 84
db 75
db 63
db 48
db 36
db 24
db 15
```

```
;*******************
; back channel 2 samples
;*******************
an_bn_map:
        jb      b_c_3,map_b_c_3
        add     a,#an_bn_table-($+3)
        movc    a,@a+pc
        ret

an_bn_table:
        db      00110000b       ; +3,0
        db      00010001b       ; 1,1
        db      00000011b       ; 0.3
        db      10010001b       ; -1,1
        db      10110000b       ; -3,0
        db      10011001b       ; -1,-1
        db      00001011b       ; 0,-3
        db      00011001b       ; 1,-1

map_b_c_3:
        add     a,#b_c_3_table-($+3)
        movc    a,@a+pc
        ret

b_c_3_table:
        db      00110001b       ; +3,1
        db      00010011b       ; 1,3
        db      10010011b       ; -1,3
        db      10110001b       ; -3,1
        db      10111001b       ; -3,-1
        db      10011011b       ; -1,-3
        db      00011011b       ; 1,-3
        db      00111001b       ; 3,-1

get_ccos_1:
        jnb     b_c_3,get_samp1
        call    b_c_3_ones
        ret
get_samp1:
        mov     a,table_cnt
        add     a,#one_samps-($+3)
        movc    a,@a+pc
        ret

one_samps:
        db      -2
        db      20
        db      0
        db      1
        db      -16
        db      0
```

```
db 1
db -13
db 0
db 2
db -24
db 1
db 3
db -28
db 2
db -1
db 8
db -1
db 0
db 3
db 0
db -3
db 30
db -2
db -2
db 30
db -3
db 0
db 3
db 0
db -1
db 8
db -1
db 2
db -28
db 3
db 1
db -24
db 2
db 0
db -13
db 1
db 0
db -16
db 1
db 0
db 20
db -2
db 1
db 15
db 0
db 2
db 18
db 0
db 4
db 18
db 0
db -2
```

```
        db      -9
        db      0
        db      -2
        db      -5
        db      0
        db      -7
        db      -16
        db      0
        db      -10
        db      -13
        db      0
        db      1
        db      1
        db      0
        db      -1
        db      -1
        db      0
        db      13
        db      10
        db      0
        db      16
        db      7
        db      0
        db      5
        db      2
        db      0
        db      9
        db      2
        db      0
        db      -18
        db      -4
        db      0
        db      -18
        db      -2
        db      0
        db      -15
        db      -1
        db      0

b_c_3_ones:
        mov     a,table_cnt
        add     a,#bc3_ones-($+3)
        movc    a,@a+pc
        ret

bc3_ones:
        db      -1
        db      20
        db      0
        db      1
        db      -16
        db      0
```

```
db	1
db	-13
db	0
db	2
db	-24
db	1
db	3
db	-28
db	2
db	-1
db	8
db	-1
db	0
db	3
db	0
db	-3
db	30
db	-2
db	-2
db	30
db	-3
db	0
db	3
db	0
db	-1
db	8
db	-1
db	2
db	-28
db	3
db	-1
db	-24
db	2
db	0
db	-13
db	1
db	0
db	-16
db	1
db	0
db	20
db	-1
db	1
db	15
db	0
db	2
db	18
db	0
db	4
db	18
db	0
db	-2
```

```
        db      -9
        db      0
        db      -2
        db      -5
        db      0
        db      -7
        db      -16
        db      0
        db      -10
        db      -13
        db      0
        db      1
        db      1
        db      0
        db      -1
        db      -1
        db      0
        db      13
        db      10
        db      0
        db      16
        db      7
        db      0
        db      5
        db      2
        db      0
        db      9
        db      2
        db      0
        db      -18
        db      -4
        db      0
        db      -18
        db      -2
        db      0
        db      -15
        db      -1
        db      0

get_ccos_3:
        jnb     b_c_3,get_3samps
        call    bc3_3samps
        ret
get_3samps:
        mov     a,table_cnt
        add     a,#three_samps-($+3)
        movc    a,@a+pc
        ret

three_samps:
        db      -5
        db      59
```

```
db	1
db	4
db	-49
db	-1
db	3
db	-39
db	1
db	6
db	-73
db	3
db	8
db	-84
db	6
db	-2
db	25
db	-2
db	-1
db	9
db	-1
db	-8
db	90
db	-7
db	-7
db	90
db	-8
db	-1
db	9
db	-1
db	-2
db	25
db	-2
db	6
db	-84
db	8
db	3
db	-73
db	6
db	1
db	-39
db	3
db	-1
db	-49
db	4
db	1
db	59
db	-5
db	4
db	44
db	0
db	5
db	53
db	0
```

```
         db      12
         db      53
         db      0
         db      -6
         db      -28
         db      0
         db      -6
         db      -15
         db      0
         db      -21
         db      -48
         db      0
         db      -31
         db      -40
         db      0
         db      3
         db      4
         db      0
         db      -4
         db      -3
         db      0
         db      40
         db      31
         db      0
         db      48
         db      21
         db      0
         db      15
         db      6
         db      0
         db      28
         db      6
         db      0
         db      -53
         db      -12
         db      0
         db      -53
         db      -5
         db      0
         db      -44
         db      -4
         db      0

bc3_3samps:
         mov     a,table_cnt
         add     a,#bc3_three_samps-($+3)
         movc    a,@a+pc
         ret

bc3_three_samps:
         db      -4
         db      48
```

```
db	1
db	3
db	-39
db	-1
db	3
db	-31
db	1
db	5
db	-59
db	2
db	6
db	-67
db	4
db	-2
db	20
db	-1
db	-1
db	7
db	-1
db	-6
db	72
db	-6
db	-6
db	72
db	-6
db	-1
db	7
db	-1
db	-1
db	20
db	-2
db	4
db	-67
db	6
db	2
db	-59
db	5
db	1
db	-31
db	3
db	-1
db	-39
db	3
db	1
db	48
db	-4
db	3
db	35
db	0
db	4
db	43
db	0
```

```
        db      10
        db      42
        db      0
        db      -5
        db      -23
        db      0
        db      -5
        db      -12
        db      0
        db      -17
        db      -39
        db      0
        db      -25
        db      -32
        db      0
        db      2
        db      3
        db      0
        db      -3
        db      -2
        db      0
        db      32
        db      25
        db      0
        db      39
        db      17
        db      0
        db      12
        db      5
        db      0
        db      23
        db      5
        db      0
        db      -42
        db      -10
        db      0
        db      -43
        db      -4
        db      0
        db      -35
        db      -3
        db      0

;** debug
        mov     c,scr_data.0            ; X0
        mov     a,scrambler+1
        swap    a
        rr      a                               ; X14
        addc    a,scrambler+2                   ; X17
        rrc     a
        mov     f0,c
        mov     a,scrambler
```

```
        rrc     a
        mov     scrambler,a
        mov     a,scrambler+1
        rrc     a
        mov     scrambler+1,a
        mov     a,scrambler+2
        rrc     a
        mov     scrambler+2,a
        mov     c,f0
        ret

END
```

```
        UNL
****************************************
*       NAME:   VA
*
*       Viterbi decoder
*
*       Entry   AR(ARP) = (Zre, Zim)
*       Returns AR0         = (Ere, Eim)
*               ACC         = decoded nybble
****************************************
        IDT     'VITERBI'
        TITL    'Viterbi Decode'
        DEF     INITVA,VA
        DEF     IDEC72,IDEC96
        PSEG

XALPHA  EQU     >1800

DOUT    EQU     0               ;** out data port
DIN     EQU     1               ;** input data port
ADC     EQU     2               ;** A/D input port
TIM     EQU     2               ; timer reg
PRD     EQU     3               ; timer reload reg
IMR     EQU     4               ; interrupt mask reg
VECTOR  EQU     >60             ; timer isr jump
TDELTA  EQU     >61             ; timer adjustment value
FCODE   EQU     >62             ; holds sv command
RESULT  EQU     >63             ; holds data for sv
SAMPL0  EQU     >64             ; A/D sample 0
SAMPL1  EQU     >65             ; A/D sample 1
SAMPL2  EQU     >66             ; A/D sample 2
LATCH   EQU     >67             ; output latch image
TIMER   EQU     >68             ; baud timer
SYSFLG  EQU     >69             ; system flags
T0      EQU     >6A             ; timer temp
T1      EQU     >6B             ; timer temp

*       M O D E  B I T S
FTRA    EQU     >F              ; 1 = train mode
FRETRA  EQU     >E              ; 1 = preserve taps
FTAP    EQU     >D              ; 1 = update taps
FV32    EQU     >C              ; 0 = 4 phase, 1 = v32
FTHREE  EQU     >B              ; 1 = we have 3 samples
FDATA4  EQU     >9              ; 1 = 4-phase data
FDATA7  EQU     >7              ; 1 = 7200 data

OTRA    EQU     >0001           ; set train mode
ORETRA  EQU     >0002           ; set preserve taps
OTAP    EQU     >0004           ; set update taps
OV32    EQU     >0008           ; set v32 decisions
OTHREE  EQU     >0010           ; set we have 3 samples
ODATA7  EQU     >0100           ; set 7200 data
```

```
ATRA      EQU   >FFFE          ; clr train mode
ARETRA    EQU   >FFFD          ; clr preserve taps
ATAP      EQU   >FFFB          ; clr update taps
AV32      EQU   >FFF7          ; clr v32 decisions
ATHREE    EQU   >FFEF          ; clr we have 3 samples
ADATA7    EQU   >FEFF          ; clr 7200 data

D0        EQU   >F             ; bit 0
D1        EQU   >E
D2        EQU   >D
D6        EQU   >9
D7        EQU   >8
DF        EQU   >0             ; bit 15

* Viterbi history buffers
VBUF      EQU   >0380          ;** check this
VBUF0     EQU   VBUF           ; path history
VBUF1     EQU   VBUF+>10
VBUF2     EQU   VBUF+>20
VBUF3     EQU   VBUF+>30
VBUF4     EQU   VBUF+>40
VBUF5     EQU   VBUF+>50
VBUF6     EQU   VBUF+>60
VBUF7     EQU   VBUF+>70

FTPAGE    EQU   >6
TVAR      EQU   >0
COUNT     EQU   TVAR+0
TRELL     EQU   TVAR+1
SCRAML    EQU   TVAR+2
SCRAMH    EQU   TVAR+3
DSTATE    EQU   TVAR+4

VPAGE     EQU   6              ;** check this
VBASEP    EQU   >0300          ;** check this
VBASE     EQU   0
VAR       EQU   VBASE+>10      ; misc variables
ZRE       EQU   VAR            ; re input
ZIM       EQU   VAR+1          ; im input
XRE       EQU   VAR+2          ; temp re
XIM       EQU   VAR+3          ; temp im
DECIDE    EQU   VAR+4          ; holds table decision
INDEX     EQU   VAR+5          ; index into path histore buffer
INDEXP    EQU   VAR+6          ; index ptr
MIN       EQU   VAR+7          ; min path value
X0        EQU   VAR+8          ; temp
X1        EQU   VAR+9          ; temp
```

```
X2        EQU    VAR+10          ; temp
X3        EQU    VAR+11          ; temp
KBUF      EQU    VAR+12          ; holds constant for speed
K0070     EQU    VAR+13          ; holds constant for speed
K000C     EQU    VAR+14          ; holds constant for speed
K000F     EQU    VAR+15          ; holds constant for speed

SUM       EQU    VBASE+>20       ; start of current metric sums
SUM0      EQU    SUM
SUM1      EQU    SUM+1
SUM2      EQU    SUM+2
SUM3      EQU    SUM+3
SUM4      EQU    SUM+4
SUM5      EQU    SUM+5
SUM6      EQU    SUM+6
SUM7      EQU    SUM+7

DEC       EQU    VBASE+>28       ; start of current decisions
DEC0      EQU    DEC
DEC1      EQU    DEC+1
DEC2      EQU    DEC+2
DEC3      EQU    DEC+3
DEC4      EQU    DEC+4
DEC5      EQU    DEC+5
DEC6      EQU    DEC+6
DEC7      EQU    DEC+7

NEW       EQU    VBASE+>30       ; start of new metrics
NEW0      EQU    NEW
NEW1      EQU    NEW+1
NEW2      EQU    NEW+2
NEW3      EQU    NEW+3
NEW4      EQU    NEW+4
NEW5      EQU    NEW+5
NEW6      EQU    NEW+6
NEW7      EQU    NEW+7

DELTA     EQU    VBASE+>38       ; start of new tree branches
DELTA0    EQU    DELTA           ; may not be used
DELTA1    EQU    DELTA+1
DELTA2    EQU    DELTA+2
DELTA3    EQU    DELTA+3
DELTA4    EQU    DELTA+4
DELTA5    EQU    DELTA+5
DELTA6    EQU    DELTA+6
DELTA7    EQU    DELTA+7

PTS       EQU    VBASE+>40
ERE0      EQU    PTS
EIM0      EQU    PTS+1
ERE1      EQU    PTS+2
EIM1      EQU    PTS+3
```

```
ERE2    EQU   PTS+4
EIM2    EQU   PTS+5
ERE3    EQU   PTS+6
EIM3    EQU   PTS+7
ERE4    EQU   PTS+8
EIM4    EQU   PTS+9
ERE5    EQU   PTS+10
EIM5    EQU   PTS+11
ERE6    EQU   PTS+12
EIM6    EQU   PTS+13
ERE7    EQU   PTS+14
EIM7    EQU   PTS+15


DPTS    EQU   VBASE+>50
DRE0    EQU   DPTS
DIM0    EQU   DPTS+1
DRE1    EQU   DPTS+2
DIM1    EQU   DPTS+3
DRE2    EQU   DPTS+4
DIM2    EQU   DPTS+5
DRE3    EQU   DPTS+6
DIM3    EQU   DPTS+7
DRE4    EQU   DPTS+8
DIM4    EQU   DPTS+9
DRE5    EQU   DPTS+10
DIM5    EQU   DPTS+11
DRE6    EQU   DPTS+12
DIM6    EQU   DPTS+13
DRE7    EQU   DPTS+14
DIM7    EQU   DPTS+15

GR      EQU   VBASE+>68
GR0     EQU   GR+0
GR1     EQU   GR+1
GR2     EQU   GR+2
GR3     EQU   GR+3
GR4     EQU   GR+4
GR5     EQU   GR+5
GR6     EQU   GR+6
GR7     EQU   GR+7


XDRE    EQU   >70
XDIM    EQU   >71
XMAG    EQU   >72
XERE    EQU   >73
XEIM    EQU   >74
DECP    EQU   >75
RTRAIN  EQU   >76              ; Ored into result
RSUM    EQU   >77              ; trellis weight
RTOTAL  EQU   >78              ; last RSUM
```

```
RCOUNT   EQU    >79                          ; threshold counter
RLIM     EQU    >7A
RSCAT    EQU    >7B                          ; scatter flag bit

YRE      EQU    >60
YIM      EQU    >61

D72PTR   EQU    >62
DECPTR   EQU    >67


TEST     EQU    >63



INITVA   NOP                                 ; do any required initialization
         CNFD                                ; used as data memory
         LDPK   VPAGE                        ; sel va page
         ZAC                                 ; zero
         SACL   INDEX
         LACK   >0070                        ; init constants
         SACL   K0070
         LACK   >000C
         SACL   K000C
         LACK   >000F
         SACL   K000F
         LALK   VBUF
         SACL   KBUF
         MAR    *,2
         LRLK   AR2,>320          ; DEBUG
         ZAC
         RPTK   >0F
         SACL   *+
         LALK   >1111
         LRLK   AR2,VBUF
         RPTK   127
         SACL   *+

         LDPK   FTPAGE
         LACK   192                          ;** check this
         SACL   COUNT
         ZAC
         SACL   TRELL
         SACL   DSTATE
         LALK   ?1110111011101110
         SACL   SCRAML
         LACK   ?01111100
         SACL   SCRAMH

         ZAC
         SACL   RTRAIN
         SACL   RSUM
```

```
        LACK     9
        SACL     RCOUNT
        LALK     >4000
        SACL     RLIM
        LALK     ->4000
        SACL     XMAG
****************************************
        ZAC
        SACL     RSCAT
****************************************
        RET

IDEC72
        LDPK     VPAGE
        LALK     GR0T72
        SACL     GR0
        LALK     GR1T72
        SACL     GR1
        LALK     GR2T72
        SACL     GR2
        LALK     GR3T72
        SACL     GR3
        LALK     GR4T72
        SACL     GR4
        LALK     GR5T72
        SACL     GR5
        LALK     GR6T72
        SACL     GR6
        LALK     GR7T72
        SACL     GR7
        LALK     D72TAB
        SACL     DECPTR
        LACK     >0004
        SACL     K000C
        LALK     TR72
        SACL     D72PTR
        LALK     >0700                    ;** experimental
        SACL     RLIM
        LALK     ->1000
        SACL     XMAG
        RET

IDEC96
        LDPK     VPAGE
        LALK     GR0TAB
        SACL     GR0
        LALK     GR1TAB
        SACL     GR1
        LALK     GR2TAB
        SACL     GR2
        LALK     GR3TAB
        SACL     GR3
```

```
         LALK    GR4TAB
         SACL    GR4
         LALK    GR5TAB
         SACL    GR5
         LALK    GR6TAB
         SACL    GR6
         LALK    GR7TAB
         SACL    GR7
         LALK    DTABLE
         SACL    DECPTR
         LALK    >0380
         SACL    RLIM
         LALK    ->0C00
         SACL    XMAG
         RET

***      S T A R T   O F   D E C I S I O N S
VA
         SPM     0                        ;** debug
*        CNFD                             ; use as data mem
         LDPK    VPAGE
         LAC     *+                       ; get Zre
         SACL    ZRE
         LAC     *+                       ; get Zim
         SACL    ZIM

         LDPK    0
         BIT     SYSFLG,FTRA              ; check for training mode
         BBNZ    TGEN
         BIT     SYSFLG,FV32              ; check for V32/4-phase
         LDPK    VPAGE
         BBNZ    DOV32                    ;----
         B       DO4PH

*        G E N E R A T E   K N O W N   D E C I S I O N S
TGEN
         BIT     SYSFLG,FV32              ; gen v32 or 4 phase?
         BBNZ    GENV32

*        F O U R   P H A S E   G E N E R A T O R
* scramble 2 marks
         LDPK    VPAGE
         LACK    >03
         SACL    X1
         CALL    SCRAM1
         SACL    X0
         LAC     X1
         DMOV    X0
         SFR
         CALL    SCRAM1
         SFL
```

```
            OR          X1

* gen 4 pt coordinates
            ANDK        >0003
            SACL        DSTATE
            ADLK        RE4TAB
            TBLR        ZRE
            ADLK        IM4TAB-RE4TAB
            TBLR        ZIM

* how much longer?
            LAC         COUNT
            SBLK        >1
            SACL        COUNT
            BNZ         DO4PH

* switch to v32 decisons
            LACK        16
            SACL        COUNT
            LDPK        0
*******************************************
            BIT         SYSFLG,FDATA4
            BBZ         MORE96
            DINT
            LAC         SYSFLG
            ANDK        AV32
MORE72      ANDK        ATRA                        ; stop training
            SACL        SYSFLG
            EINT

*********************
            LDPK        4
            LALK        XALPHA                      ; Was 1800 5/2/87
            SACL        >2D                         ; EALPHA
            LALK        -324                        ; -324
            SACL        >1F                         ; ALPHA
            LDPK        VPAGE
            ZAC
            SACL        RSUM
            LACK        >9
            SACL        RCOUNT
*********************
            B           DO4PH


MORE96
*******************************************

            DINT
            LAC         SYSFLG
            ORK         OV32                        ;* debug
*           BIT         SYSFLG,FDATA7               ; should be deleted
```

```
*               BBNZ       MORE72                             ;
                SACL       SYSFLG
                EINT
                B          DO4PH


* a 1 bit v32 scrambler
SCRAM1
                BIT        SCRAMH,D1                          ; x18
                BBZ        SCR23
                CMPL
SCR23           BIT        SCRAMH,D6                          ; x23
                BBZ        SHIFT1
                CMPL
SHIFT1          ANDK       >0001
                SACL       X0
                ZALH       SCRAMH
                ADDS       SCRAML
                SFL
                OR         X0
                SACL       SCRAML
                SACH       SCRAMH
                ANDK       >0001
                RET


*               G E N E R A T E   4   P H A S E   D E C I S I O N S
* rotate pt so quadrants determine the decision
COSW            EQU        >728                               ; check this value
SINW            EQU        >394                               ; check this value

COS45           EQU        >650                               ; Cos(pi/4)
SIN45           EQU        >650                               ; Sin(pi/4)


DO4PH
* new Zre = Zre*cosw - Zim*sinw
                LDPK       VPAGE
                LT         ZRE
                MPYK       COSW
                PAC
                LT         ZIM
                MPYK       SINW
                SPAC
                SACH       XRE,4

* new Zim = Zre*sinw + Zim*cosw
                LT         ZRE
                MPYK       SINW
                PAC
                LT         ZIM
                MPYK       COSW
```

```
        APAC
        SACH    XIM,4

* the point is rotated so the quadrant indicates the decision
* this bit twiddles the sign bits into a small integer
        ZAC
        BIT     XRE,DF                  ; was XRE
        BBZ     $+3
        LACK    >01
        BIT     XIM,DF                  ; was XIM
        BBZ     $+4
        ORK     >02
        SACL    X1
        ADLK    DTAB4
        TBLR    X0                      ; get the decision
*       LAC     X0
*       LDPK    0
*       SACL    RESULT
*       LDPK    VPAGE
        LAC     X1,1
        ADLK    PTAB4                   ; get decision vector
        TBLR    XDRE
        ADLK    >01
        TBLR    XDIM
*       LALK    >287A                   ;  Square Root of A00 4,1
*       SACL    XMAG

* compute an error vector
        LRLK    AR0,VBASEP+XDRE
        MAR     *,0

        LACK    >80
        OR      X0                              ; return decoded bits
        OR      RTRAIN                          ;* also retrain signal
        LDPK    0
        SACL    RESULT

********************
*       L O S T  S Y N C  ?
        LDPK    4
        SQRA    >2B                     ; ERRR
        PAC
        SFR
        SFR
        SFR
        SFR
        SFR
        LDPK    VPAGE
        ADDH    RSUM
        SACH    RSUM
*******************
        RET
```

```
DTAB4
        DATA    >03                 ; C
        DATA    >01                 ; D
        DATA    >02                 ; B
        DATA    >00                 ; A
PTAB4
        DATA    >3000,>1000         ; check scaling
        DATA    ->1000,>3000        ; and order
        DATA    >1000,->3000        ;
        DATA    ->3000,->1000       ;

VEC     EQU     >23C6
        DATA    VEC,VEC
        DATA    -VEC,VEC
        DATA    VEC,-VEC
        DATA    -VEC,-VEC
        RET


****************************************
*       7200 ENCODE
* possible a table lookup approach would be better
GEN72
        LAC     D72PTR
        TBLR    ZRE
        ADLK    >1
        TBLR    ZIM
        ADLK    >1
        SACL    D72PTR

*       LACK    1
*       CALL    SCRAM1
*       SACL    X1
*       LACK    1
*       CALL    SCRAM1
*       SFL
*       OR      X1
*       SACL    X1
*       LACK    1
*       CALL    SCRAM1
*       SFL
*       SFL
*       OR      X1
*       SACL    X1

*       ADD     DSTATE
*       ANDK    >03
*       SACL    DSTATE
*       LACK    >04
```

```
*           AND     X1
*           OR      DSTATE

*           SACL    X1                  ; X1 = Y4 Y3 Y2 Y1
*           ANDK    >03
*           SFL
*           SFL
*           SFL
*           OR      TRELL               ; ACC = y2 y1 t2 t1 t0
*           ADLK    TTAB
*           TBLR    X0                  ; X0 = Y2 Y1 T2 T1 T0

*           LAC     X0                  ; get new trell state
*           ANDK    >07
*           SACL    TRELL

*           LACK    >08
*           AND     X1
*           SACL    X1,1                ; X1 = Y3 0 0 0

*           LAC     X0
*           SFR
*           SFR
*           ANDK    >07                 ; ACC = Y2 Y1 Y0
*           OR      X1                  ; ACC = Y3 Y2 Y1 Y0

*           ADLK    RE72
*           TBLR    ZRE                 ; ZRE = v32 coordinate mapping
*           ADLK    IM72-RE72
*           TBLR    ZIM                 ; ZIM = v32 coordinate mapping

* continue?
            LAC     COUNT
            SBLK    >1
            SACL    COUNT
            BNZ     DO7200
            LDPK    0
            DINT
            LAC     SYSFLG
            ANDK    ATRA                ; set normal mode
            SACL    SYSFLG
            EINT
********************
            LDPK    4
            LALK    XALPHA              ; Was 1800 5/2/87
            SACL    >2D                 ; EALPHA
            LALK    -324                ; -324
            SACL    >1F                 ; ALPHA
            LDPK    VPAGE
            ZAC
            SACL    RSUM
            LACK    >9
```

```
            SACL        RCOUNT
*********************



DO7200
            B           DOV32                        ;** DEBUG

* new Zre = Zre*cosw - Zim*sinw
            LDPK        VPAGE
            LT          ZRE
            MPYK        COS45
            PAC
            LT          ZIM
            MPYK        SIN45
            SPAC
*           SFL
            SACH        XRE,4

* new Zim = Zre*sinw + Zim*cosw
            LT          ZRE
            MPYK        SIN45
            PAC
            LT          ZIM
            MPYK        COS45
            APAC
*           SFL
            SACH        XIM,4
***
            LAC         ZRE,8                        ;** check scaling
            SACH        ZRE
            LAC         ZIM,8
            SACH        ZIM


            LAC         XRE,8
            SACH        XRE
            LAC         XRE
            ANDK        >00F0
            SACL        X0

            LAC         XIM,4
            SACH        X1
            LACK        >000F
            AND         X1

            OR          X0
            ADD         DECPTR
            B           LOOK


****************************************
```

```
*       V32 ENCODE
GENV32
        BIT     SYSFLG,FDATA7
        LDPK    VPAGE
        BBNZ    GEN72

        LACK    >0F

* scramble 4 marks
        ANDK    >000F                 ; isolate nybble
        ADLK    REVTAB                ; reverse bits
        TBLR    X0

        ZALS    SCRAML
        ADDH    SCRAMH
        SFL
        SFL
        SACH    X1
        LAC     X1
        XOR     X0                    ; X18
        SACL    X0

        LAC     SCRAMH
        SFR
        SFR
        SFR                           ; X23
        XOR     X0

        ANDK    >000F                 ; isolate scrambled bits
        SACL    X0

        ZALS    SCRAML                ; shift scrambler left 4x
        ADDH    SCRAMH
        SFL
        SFL
        SFL
        SFL
        SACH    SCRAMH
        OR      X0                    ; add in new bits
        SACL    SCRAML

        ANDK    >000F
        ADLK    REVTAB
        TBLR    X0                    ; reverse bits again
        LAC     X0

* differential encode
        SACL    X0                    ; X0 = Y4 Y3 y2 y1
        ADD     DSTATE
        ANDK    >0003                 ; ACC = Y2 y1
        SACL    DSTATE
        LACK    >0C
```

```
        AND     X0
        OR      DSTATE                  ; ACC = Y4 Y3 Y2 Y1

****************************************
*       DMOV    TEST+12
*       DMOV    TEST+11
*       DMOV    TEST+10
*       DMOV    TEST+9
*       DMOV    TEST+8
*       DMOV    TEST+7
*       DMOV    TEST+6
*       DMOV    TEST+5
*       DMOV    TEST+4
*       DMOV    TEST+3
*       DMOV    TEST+2
*       DMOV    TEST+1
*       DMOV    TEST+0
*       SACL    TEST
****************************************
* Trellis encode
DOTREL
        SACL    X1                      ; X1 = Y4 Y3 Y2 Y1
        ANDK    >03
        SFL
        SFL
        SFL
        OR      TRELL                   ; ACC = y2 y1 t2 t1 t0
        ADLK    TTAB
        TBLR    X0                      ; X0 = Y2 Y1 T2 T1 T0

        LAC     X0                      ; get new trell state
        ANDK    >07
        SACL    TRELL

        LACK    >0C
        AND     X1
        SACL    X1,1                    ; X1 = Y4 Y3 0 0 0

        LAC     X0
        SFR
        SFR
        ANDK    >07                     ; ACC = Y2 Y1 Y0
        OR      X1                      ; ACC = Y4 Y3 Y2 Y1 Y0
        ADLK    RETAB
        TBLR    ZRE                     ; ZRE = v32 coordinate mapping
        ADLK    IMTAB-RETAB
        TBLR    ZIM                     ; ZIM = v32 coordinate mapping

* continue?
        LAC     COUNT
        SBLK    >1
        SACL    COUNT
```

```
          BNZ       DOV32
          LDPK      0
          DINT
          LAC       SYSFLG
          ANDK      ATRA                 ; set normal mode
          SACL      SYSFLG
          EINT
********************
          LDPK      4
          LALK      XALPHA               ; Was 1800 5/2/87
          SACL      >2D                  ; EALPHA
          LALK      -324                 ; -324
          SACL      >1F                  ; ALPHA
          LDPK      VPAGE
          ZAC
          SACL      RSUM
          LACK      >9
          SACL      RCOUNT
********************


*         G E N E R A T E   V 3 2   D E C I S I O N S
DOV32
          LDPK      VPAGE
          LAC       ZRE,8                ;** check scaling
          SACH      ZRE
          LAC       ZRE
          ANDK      >00F0
          SACL      X0
          LAC       ZIM,8
          SACH      ZIM

          LAC       ZIM,12
          SACH      X1
          LACK      >000F
          AND       X1

          OR        X0
          ADD       DECPTR
LOOK      TBLR      DECIDE
          MAR       *,2                  ; sel AR2
          LRLK      AR2,VBASEP+DRE0

*         M E T R I C  0
          LAC       DECIDE,2
          AND       K000C
          SACL      DEC0                 ; save decision
          SFR                            ; table interleaving can save 1.6 us
          ADD       GR0
          RPTK      1
          TBLR      *+
```

```
        LAC     ZRE
        SUB     DRE0
        SACL    ERE0
        LAC     ZIM
        SUB     DIM0
        SACL    EIM0
        SQRA    ERE0
        ZAC                             ;** a convenient zero
*       SACL    RTRAIN                  ;** experimental
        SQRA    EIM0
        APAC
        SACL    DELTA0

*       M E T R I C  1
        LAC     DECIDE
        AND     K000C
        SACL    DEC1                    ; save decision
        SFR
        ADD     GR1
        RPTK    1
        TBLR    *+
        LAC     ZRE
        SUB     DRE1
        SACL    ERE1
        LAC     ZIM
        SUB     DIM1
        SACL    EIM1
        SQRA    ERE1
        ZAC
        SQRA    EIM1
        APAC
        SACL    DELTA1

*       M E T R I C  2
        LAC     DECIDE
        SFR
        SFR
        AND     K000C
        SACL    DEC2                    ; save decision
        SFR
        ADD     GR2
        RPTK    1
        TBLR    *+
        LAC     ZRE
        SUB     DRE2
        SACL    ERE2
        LAC     ZIM
        SUB     DIM2
        SACL    EIM2
        SQRA    ERE2
        ZAC
        SQRA    EIM2
```

```
        APAC
        SACL     DELTA2

*       METRIC 3
        LAC      DECIDE,12
        SACH     X0
        LAC      X0
        AND      K000C
        SACL     DEC3                ; save decision
        SFR
        ADD      GR3
        RPTK     1
        TBLR     *+
        LAC      ZRE
        SUB      DRE3
        SACL     ERE3
        LAC      ZIM
        SUB      DIM3
        SACL     EIM3
        SQRA     ERE3
        ZAC
        SQRA     EIM3
        APAC
        SACL     DELTA3

*       METRIC 4
        LAC      DECIDE,10
        SACH     X0
        LAC      X0
        AND      K000C
        SACL     DEC4                ; save decision
        SFR
        ADD      GR4
        RPTK     1
        TBLR     *+
        LAC      ZRE
        SUB      DRE4
        SACL     ERE4
        LAC      ZIM
        SUB      DIM4
        SACL     EIM4
        SQRA     ERE4
        ZAC
        SQRA     EIM4
        APAC
        SACL     DELTA4

*       METRIC 5
        LAC      DECIDE,8
        SACH     X0
        LAC      X0
        AND      K000C
```

```
         SACL    DEC5               ; save decision
         SFR
         ADD     GR5
         RPTK    1
         TBLR    *+
         LAC     ZRE
         SUB     DRE5
         SACL    ERE5
         LAC     ZIM
         SUB     DIM5
         SACL    EIM5
         SQRA    ERE5
         ZAC
         SQRA    EIM5
         APAC
         SACL    DELTA5

*        M E T R I C  6
         LAC     DECIDE,6
         SACH    X0
         LAC     X0
         AND     K000C
         SACL    DEC6               ; save decision
         SFR
         ADD     GR6
         RPTK    1
         TBLR    *+
         LAC     ZRE
         SUB     DRE6
         SACL    ERE6
         LAC     ZIM
         SUB     DIM6
         SACL    EIM6
         SQRA    ERE6
         ZAC
         SQRA    EIM6
         APAC
         SACL    DELTA6

*        M E T R I C  7
         LAC     DECIDE,4
         SACH    X0
         LAC     X0
         AND     K000C
         SACL    DEC7               ; save decision
         SFR
         ADD     GR7
         RPTK    1
         TBLR    *+
         LAC     ZRE
         SUB     DRE7
         SACL    ERE7
```

```
        LAC     ZIM
        SUB     DIM7
        SACL    EIM7
        SQRA    ERE7
        ZAC
        SQRA    EIM7
        APAC
        SACL    DELTA7

        MAR     *,1
        LALK    VBUF0
        ADD     INDEX
        SACL    X0
        LAR     AR1,X0                  ; init current ptr
        LARK    AR0,VBUF1-VBUF0
        SOVM                            ;**

*       T R E E  0  (0, (0,0), (2,6), (4,2), (6,4))
        LARK    AR2,(0*16)+(0/2)
        LAR     AR3,DEC0
        ZALH    SUM0
        ADDH    DELTA0
        SACH    NEW0
        ZALH    SUM2
        ADDH    DELTA6
        SUBH    NEW0
        BGEZ    $+6
        ADDH    NEW0
        SACH    NEW0
        LARK    AR2,(2*16)+(6/2)
        LAR     AR3,DEC6
        ZALH    SUM4
        ADDH    DELTA2
        SUBH    NEW0
        BGEZ    $+6
        ADDH    NEW0
        SACH    NEW0
        LARK    AR2,(4*16)+(2/2)
        LAR     AR3,DEC2
        ZALH    SUM6
        ADDH    DELTA4
        SUBH    NEW0
        BGEZ    $+6
        ADDH    NEW0
        SACH    NEW0
        LARK    AR2,(6*16)+(4/2)
        LAR     AR3,DEC4
        SAR     AR2,X0
        LAC     X0
        SAR     AR3,X0
        OR      X0                              ; generate record
        SACL    *0+                             ; store the record
```

```
*       TREE  1  (1, (0,6), (2,0), (4,4), (6,2))
        LARK     AR2,(0*16)+(6/2)
        LAR      AR3,DEC6
        ZALH     SUM0
        ADDH     DELTA6
        SACH     NEW1
        ZALH     SUM2
        ADDH     DELTA0
        SUBH     NEW1
        BGEZ     $+6
        ADDH     NEW1
        SACH     NEW1
        LARK     AR2,(2*16)+(0/2)
        LAR      AR3,DEC0
        ZALH     SUM4
        ADDH     DELTA4
        SUBH     NEW1
        BGEZ     $+6
        ADDH     NEW1
        SACH     NEW1
        LARK     AR2,(4*16)+(4/2)
        LAR      AR3,DEC4
        ZALH     SUM6
        ADDH     DELTA2
        SUBH     NEW1
        BGEZ     $+6
        ADDH     NEW1
        SACH     NEW1
        LARK     AR2,(6*16)+(2/2)
        LAR      AR3,DEC2
        SAR      AR2,X0
        LAC      X0
        SAR      AR3,X0
        OR       X0                             ; generate record
        SACL     *0+                            ; store the record

*       TREE  2  (2, (0,2), (2,4), (4,0), (6,6))
        LARK     AR2,(0*16)+(2/2)
        LAR      AR3,DEC2
        ZALH     SUM0
        ADDH     DELTA2
        SACH     NEW2
        ZALH     SUM2
        ADDH     DELTA4
        SUBH     NEW2
        BGEZ     $+6
        ADDH     NEW2
        SACH     NEW2
        LARK     AR2,(2*16)+(4/2)
        LAR      AR3,DEC4
        ZALH     SUM4
        ADDH     DELTA0
```

```
        SUBH    NEW2
        BGEZ    $+6
        ADDH    NEW2
        SACH    NEW2
        LARK    AR2,(4*16)+(0/2)
        LAR     AR3,DEC0
        ZALH    SUM6
        ADDH    DELTA6
        SUBH    NEW2
        BGEZ    $+6
        ADDH    NEW2
        SACH    NEW2
        LARK    AR2,(6*16)+(6/2)
        LAR     AR3,DEC6
        SAR     AR2,X0
        LAC     X0
        SAR     AR3,X0
        OR      X0                          ; generate record
        SACL    *0+                         ; store the record

*       T R E E  3  (3, (0,4), (2,2), (4,6), (6,0))
        LARK    AR2,(0*16)+(4/2)
        LAR     AR3,DEC4
        ZALH    SUM0
        ADDH    DELTA4
        SACH    NEW3
        ZALH    SUM2
        ADDH    DELTA2
        SUBH    NEW3
        BGEZ    $+6
        ADDH    NEW3
        SACH    NEW3
        LARK    AR2,(2*16)+(2/2)
        LAR     AR3,DEC2
        ZALH    SUM4
        ADDH    DELTA6
        SUBH    NEW3
        BGEZ    $+6
        ADDH    NEW3
        SACH    NEW3
        LARK    AR2,(4*16)+(6/2)
        LAR     AR3,DEC6
        ZALH    SUM6
        ADDH    DELTA0
        SUBH    NEW3
        BGEZ    $+6
        ADDH    NEW3
        SACH    NEW3
        LARK    AR2,(6*16)+(0/2)
        LAR     AR3,DEC0
        SAR     AR2,X0
        LAC     X0
```

```
         SAR      AR3,X0
         OR       X0                      ; generate record
         SACL     *0+                     ; store the record

*        TREE  4  (4, (1,1), (3,3), (5,7), (7,5))
         LARK     AR2,(1*16)+(1/2)
         LAR      AR3,DEC1
         ZALH     SUM1
         ADDH     DELTA1
         SACH     NEW4
         ZALH     SUM3
         ADDH     DELTA3
         SUBH     NEW4
         BGEZ     $+6
         ADDH     NEW4
         SACH     NEW4
         LARK     AR2,(3*16)+(3/2)
         LAR      AR3,DEC3
         ZALH     SUM5
         ADDH     DELTA7
         SUBH     NEW4
         BGEZ     $+6
         ADDH     NEW4
         SACH     NEW4
         LARK     AR2,(5*16)+(7/2)
         LAR      AR3,DEC7
         ZALH     SUM7
         ADDH     DELTA5
         SUBH     NEW4
         BGEZ     $+6
         ADDH     NEW4
         SACH     NEW4
         LARK     AR2,(7*16)+(5/2)
         LAR      AR3,DEC5
         SAR      AR2,X0
         LAC      X0
         SAR      AR3,X0
         OR       X0                      ; generate record
         SACL     *0+                     ; store the record

*        TREE  5  (5, (1,5), (3,7), (5,3), (7,1))
         LARK     AR2,(1*16)+(5/2)
         LAR      AR3,DEC5
         ZALH     SUM1
         ADDH     DELTA5
         SACH     NEW5
         ZALH     SUM3
         ADDH     DELTA7
         SUBH     NEW5
         BGEZ     $+6
         ADDH     NEW5
         SACH     NEW5
```

```
        LARK    AR2,(3*16)+(7/2)
        LAR     AR3,DEC7
        ZALH    SUM5
        ADDH    DELTA3
        SUBH    NEW5
        BGEZ    $+6
        ADDH    NEW5
        SACH    NEW5
        LARK    AR2,(5*16)+(3/2)
        LAR     AR3,DEC3
        ZALH    SUM7
        ADDH    DELTA1
        SUBH    NEW5
        BGEZ    $+6
        ADDH    NEW5
        SACH    NEW5
        LARK    AR2,(7*16)+(1/2)
        LAR     AR3,DEC1
        SAR     AR2,X0
        LAC     X0
        SAR     AR3,X0
        OR      X0                       ; generate record
        SACL    *0+                      ; store the record

*       T R E E 6  (6, (1,7), (3,5), (5,1), (7,3))
        LARK    AR2,(1*16)+(7/2)
        LAR     AR3,DEC7
        ZALH    SUM1
        ADDH    DELTA7
        SACH    NEW6
        ZALH    SUM3
        ADDH    DELTA5
        SUBH    NEW6
        BGEZ    $+6
        ADDH    NEW6
        SACH    NEW6
        LARK    AR2,(3*16)+(5/2)
        LAR     AR3,DEC5
        ZALH    SUM5
        ADDH    DELTA1
        SUBH    NEW6
        BGEZ    $+6
        ADDH    NEW6
        SACH    NEW6
        LARK    AR2,(5*16)+(1/2)
        LAR     AR3,DEC1
        ZALH    SUM7
        ADDH    DELTA3
        SUBH    NEW6
        BGEZ    $+6
        ADDH    NEW6
        SACH    NEW6
```

```
        LARK    AR2,(7*16)+(3/2)
        LAR     AR3,DEC3
        SAR     AR2,X0
        LAC     X0
        SAR     AR3,X0
        OR      X0                          ; generate record
        SACL    *0+                         ; store the record

*       T R E E  7  (7, (1,3), (3,1), (5,5), (7,7))
        LARK    AR2,(1*16)+(3/2)
        LAR     AR3,DEC3
        ZALH    SUM1
        ADDH    DELTA3
        SACH    NEW7
        ZALH    SUM3
        ADDH    DELTA1
        SUBH    NEW7
        BGEZ    $+6
        ADDH    NEW7
        SACH    NEW7
        LARK    AR2,(3*16)+(1/2)
        LAR     AR3,DEC1
        ZALH    SUM5
        ADDH    DELTA5
        SUBH    NEW7
        BGEZ    $+6
        ADDH    NEW7
        SACH    NEW7
        LARK    AR2,(5*16)+(5/2)
        LAR     AR3,DEC5
        ZALH    SUM7
        ADDH    DELTA7
        SUBH    NEW7
        BGEZ    $+6
        ADDH    NEW7
        SACH    NEW7
        LARK    AR2,(7*16)+(7/2)
        LAR     AR3,DEC7
        SAR     AR2,X0
        LAC     X0
        SAR     AR3,X0
        OR      X0                          ; generate record
        SACL    *0+                         ; store the record


*       F I N D  M I N I M U N  P A T H
        LARK    AR2,0               ; AR2 = min path #
        LAC     NEW0
        SACL    MIN

        ZALH    NEW1
```

```
        SUBH    MIN
        BGEZ    MIN2
        ADDH    MIN
        SACH    MIN
        LARK    AR2,1
MIN2    ZALH    NEW2
        SUBH    MIN
        BGEZ    MIN3
        ADDH    MIN
        SACH    MIN
        LARK    AR2,2
MIN3    ZALH    NEW3
        SUBH    MIN
        BGEZ    MIN4
        ADDH    MIN
        SACH    MIN
        LARK    AR2,3
MIN4    ZALH    NEW4
        SUBH    MIN
        BGEZ    MIN5
        ADDH    MIN
        SACH    MIN
        LARK    AR2,4
MIN5    ZALH    NEW5
        SUBH    MIN
        BGEZ    MIN6
        ADDH    MIN
        SACH    MIN
        LARK    AR2,5
MIN6    ZALH    NEW6
        SUBH    MIN
        BGEZ    MIN7
        ADDH    MIN
        SACH    MIN
        LARK    AR2,6
MIN7    ZALH    NEW7
        SUBH    MIN
        BGEZ    RENORM
        ADDH    MIN
        SACH    MIN
        LARK    AR2,7

*       N O R M A L I Z E   M E T R I C   S U M S
RENORM
        ZALH    NEW0
        SUBH    MIN
        SACH    SUM0
        ZALH    NEW1
        SUBH    MIN
        SACH    SUM1
        ZALH    NEW2
        SUBH    MIN
```

```
         SACH     SUM2
         ZALH     NEW3
         SUBH     MIN
         SACH     SUM3
         ZALH     NEW4
         SUBH     MIN
         SACH     SUM4
         ZALH     NEW5
         SUBH     MIN
         SACH     SUM5
         ZALH     NEW6
         SUBH     MIN
         SACH     SUM6
         ZALH     NEW7
         SUBH     MIN
         SACH     SUM7

********************
*        L O S T  S Y N C ?
         LAC      MIN,13
         ADDH     RSUM
         SACH     RSUM
*******************



*        B A C K T R A C K
* A DEBUG BACKTRACK
         LAC      INDEX
         SACL     X0
         SAR      AR2,X3          ; the decisiion
         ADD      X3,4            ; offset to dec group
         ADD      KBUF
         SACL     X2
         SACL     DECP            ;** experimental
         LAR      AR1,X2

         LARK     AR2,11          ; 11 +1 levels to backtrack
         MAR      *,1
BACKTR
         LACK     >FF             ; -1
         ADD      X0
         AND      K000F
         SACL     X0
         LACK     >70
         AND      *,2
         ADD      KBUF
         ADD      X0
         SACL     X2
         LAR      AR1,X2
         BANZ     BACKTR,*-,1
         LACK     >0F
```

```
            AND       *                         ; load final record

DONE        SACL      X1
            LACK      >01
            ADD       INDEX                     ; inc index
            AND       K000F                     ;   with wrap
            SACL      INDEX
            LAR       AR0,DECP
            MAR       *,0
            LACK      >03
            AND       *
            SFL
            BIT       X3,D2
            BBZ       DONE1
            ORK       >01
DONE1       SACL      X3

            LAC       X3,1                      ; get decision group
            ADLK      DRE0+>300                 ; with page offset
            SACL      X0
            LAR       AR0,X0                    ; return ptr to decision vector
            MAR       *,0
            LAC       *+,8
            SACL      XDRE
            LAC       *-,8
            SACL      XDIM

            LRLK      AR0,>300+XDRE             ; return decision in fixed loc
            MAR       *,0
            LACK      >80
            OR        X1                        ; return decoded bits
            OR        RTRAIN                    ;* also retrain signal
            OR        RSCAT                     ;*** Experimental
            LDPK      0
            SACL      RESULT
********************
*           BIT       SYSFLG,FTRA
*           BBNZ      ARET
*           LDPK      VPAGE
*           LAC       X1                        ; the point
*           SUB       TEST+5                    ; check this value
*           BNZ       DIFF
********************
ARET
            RET
DIFF
            TRAP


*******************************************
*           D A T A   T A B L E S
```

```
* TRELLIS TABLE
TTAB    DATA    >0
        DATA    >4
        DATA    >1
        DATA    >7
        DATA    >2
        DATA    >6
        DATA    >3
        DATA    >5
        DATA    >A
        DATA    >F
        DATA    >B
        DATA    >C
        DATA    >8
        DATA    >D
        DATA    >9
        DATA    >E
        DATA    >13
        DATA    >15
        DATA    >12
        DATA    >16
        DATA    >11
        DATA    >17
        DATA    >10
        DATA    >14
        DATA    >19
        DATA    >1E
        DATA    >18
        DATA    >1D
        DATA    >1B
        DATA    >1C
        DATA    >1A
        DATA    >1F

*       GEN DATA VALUES
CP0     EQU     0                       ; check these numbers
CP1     EQU     >1000
CP2     EQU     >2000
CP3     EQU     >3000
CP4     EQU     >4000
CM1     EQU     ->1000
CM2     EQU     ->2000
CM3     EQU     ->3000
CM4     EQU     ->4000

*       GEN POINT TABLES
RETAB
        DATA    CM4,CM3,CM2,CP1,CP4,CP3,CP2,CM1
        DATA    CP0,CM3,CP2,CP1,CP0,CP3,CM2,CM1
```

```
          DATA      CP0,CP1,CM2,CM3,CP0,CM1,CP2,CP3
          DATA      CP4,CP1,CP2,CP1,CM4,CM1,CM2,CM1

IMTAB
          DATA      CP1,CM2,CP3,CP4,CM1,CP2,CM3,CM4
          DATA      CP1,CP2,CP3,CP0,CM1,CM2,CM3,CP0
          DATA      CM3,CM2,CM1,CP0,CP3,CP2,CP1,CP0
          DATA      CP1,CP2,CM1,CM4,CM1,CM2,CP1,CP4


RE4TAB    DATA      CM3,CM1,CP1,CP3
IM4TAB    DATA      CM1,CP3,CM3,CP1


RE72      DATA      CP3,CM1,CP3,CM3
          DATA      CM3,CP1,CM3,CP3
          DATA      CM1,CP3,CM1,CP1
          DATA      CP1,CM3,CP1,CM1

IM72      DATA      CM3,CP3,CP1,CM3
          DATA      CP3,CM3,CM1,CP3
          DATA      CP1,CM1,CM3,CP1
          DATA      CM1,CP1,CP3,CM1


* reversed nybbles
REVTAB
          DATA      0,8,4,12
          DATA      2,10,6,14
          DATA      1,9,5,13
          DATA      3,11,7,15



KP0       EQU       0
KP1       EQU       >0010
KP2       EQU       >0020
KP3       EQU       >0030
KP4       EQU       >0040
KM1       EQU       -KP1
KM2       EQU       -KP2
KM3       EQU       -KP3
KM4       EQU       -KP4

GR0TAB
          DATA      KM4,KP1
          DATA      KP0,KP1
          DATA      KP0,KM3
          DATA      KP4,KP1

GR1TAB
          DATA      KM3,KM2
```

```
        DATA    KM3,KP2
        DATA    KP1,KM2
        DATA    KP1,KP2

GR2TAB
        DATA    KM2,KP3
        DATA    KP2,KP3
        DATA    KM2,KM1
        DATA    KP2,KM1

GR3TAB
        DATA    KP1,KP4
        DATA    KP1,KP0
        DATA    KM3,KP0
        DATA    KP1,KM4

GR4TAB
        DATA    KP4,KM1
        DATA    KP0,KM1
        DATA    KP0,KP3
        DATA    KM4,KM1

GR5TAB
        DATA    KP3,KP2
        DATA    KP3,KM2
        DATA    KM1,KP2
        DATA    KM1,KM2

GR6TAB
        DATA    KP2,KM3
        DATA    KM2,KM3
        DATA    KP2,KP1
        DATA    KM2,KP1

GR7TAB
        DATA    KM1,KM4
        DATA    KM1,KP0
        DATA    KP3,KP0
        DATA    KM1,KP4

*       D E C I S I O N   T A B L E
        UNL
DTABLE
        DATA    >697D,>6A5D,>EA1D,>EA1D,>EA1D,>EA1D,>EA1D,>EA1D
        DATA    >0DFA,>0DFA,>0DFA,>0DFA,>0DFA,>0DFA,>4D7A,>6D79
        DATA    >A17D,>A25D,>A21D,>E21D,>E21D,>E21D,>E21D,>E21D
        DATA    >05FA,>05FA,>05FA,>05FA,>05FA,>05FA,>857A,>A579
        DATA    >A07F,>A05F,>A21F,>A21F,>E21F,>E21F,>E21F,>E21F
        DATA    >04FA,>04FA,>04FA,>04FA,>04FA,>84FA,>847A,>A47B
        DATA    >A07F,>A05F,>A01F,>A21F,>A21F,>E21F,>E21F,>E21F
        DATA    >04FA,>04FA,>04FA,>04FA,>84FA,>84FA,>847B,>A47B
        DATA    >A07F,>A05F,>A01F,>A01F,>A21F,>A21F,>E21F,>E21F
```

```
         DATA    >04FA,>04FA,>04FA,>84FA,>84FA,>84FB,>847B,>A47B
         DATA    >A07F,>A05F,>A01F,>A01F,>A01F,>A21F,>A21F,>E21F
         DATA    >04FA,>04FA,>84FA,>84FA,>84FB,>84FB,>847B,>A47B
         DATA    >A07F,>A05F,>A01F,>A01F,>A01F,>A01F,>A21F,>A21F
         DATA    >04FA,>84FA,>84FA,>84FB,>84FB,>84FB,>847B,>A47B
         DATA    >A07F,>A05F,>A01F,>A01F,>A01F,>A01F,>A01F,>A21F
         DATA    >84FA,>84FA,>84FB,>84FB,>84FB,>84FB,>847B,>A47B
         DATA    >7BA4,>7B84,>FB84,>FB84,>FB84,>FB84,>FB84,>FA84
         DATA    >1FA2,>1FA0,>1FA0,>1FA0,>1FA0,>1FA0,>5FA0,>7FA0
         DATA    >7BA4,>7B84,>FB84,>FB84,>FB84,>FB84,>FA84,>FA84
         DATA    >1FA2,>1FA2,>1FA0,>1FA0,>1FA0,>1FA0,>5FA0,>7FA0
         DATA    >7BA4,>7B84,>FB84,>FB84,>FB84,>FA84,>FA84,>FA04
         DATA    >1FE2,>1FA2,>1FA2,>1FA0,>1FA0,>1FA0,>5FA0,>7FA0
         DATA    >7BA4,>7B84,>FB84,>FB84,>FA84,>FA84,>FA04,>FA04
         DATA    >1FE2,>1FE2,>1FA2,>1FA2,>1FA0,>1FA0,>5FA0,>7FA0
         DATA    >7BA4,>7B84,>FB84,>FA84,>FA84,>FA04,>FA04,>FA04
         DATA    >1FE2,>1FE2,>1FE2,>1FA2,>1FA2,>1FA0,>5FA0,>7FA0
         DATA    >7BA4,>7B84,>FA84,>FA84,>FA04,>FA04,>FA04,>FA04
         DATA    >1FE2,>1FE2,>1FE2,>1FE2,>1FA2,>1FA2,>5FA0,>7FA0
         DATA    >79A5,>7A85,>FA85,>FA05,>FA05,>FA05,>FA05,>FA05
         DATA    >1DE2,>1DE2,>1DE2,>1DE2,>1DE2,>1DA2,>5DA2,>7DA1
         DATA    >796D,>7A4D,>FA0D,>FA0D,>FA0D,>FA0D,>FA0D,>FA0D
         DATA    >1DEA,>1DEA,>1DEA,>1DEA,>1DEA,>1DEA,>5D6A,>7D69


GR0T72
         DATA    KP3,KM3
         DATA    KM1,KP1
GR1T72
         DATA    KM1,KP3
         DATA    KP3,KM1
GR2T72
         DATA    KP3,KP1
         DATA    KM1,KM3
GR3T72
         DATA    KM3,KM3
         DATA    KP1,KP1
GR4T72
         DATA    KM3,KP3
         DATA    KP1,KM1
GR5T72
         DATA    KP1,KM3
         DATA    KM3,KP1
GR6T72
         DATA    KM3,KM1
         DATA    KP1,KP3
GR7T72
         DATA    KP3,KP3
         DATA    KM1,KM1


D72TAB
```

```
* 7200 group decisions          --Normal--
            DATA        >5141,>5541,>1441,>1441,>1441,>1441,>1441,>1441
            DATA        >4114,>4114,>4114,>4114,>4114,>4114,>4154,>4155
            DATA        >5145,>1141,>1541,>1441,>1441,>1441,>1441,>1441
            DATA        >4114,>4114,>4114,>4114,>4114,>4154,>4154,>5144
            DATA        >1144,>1145,>1141,>1541,>1441,>1441,>1441,>1441
            DATA        >4114,>4114,>4114,>4114,>4154,>4154,>5144,>5144
            DATA        >1144,>1144,>1145,>1141,>1541,>1441,>1441,>1441
            DATA        >4114,>4114,>4114,>4154,>4154,>5144,>5144,>1144
            DATA        >1144,>1144,>1144,>1145,>1141,>1541,>1441,>1441
            DATA        >4114,>4114,>4154,>4154,>5144,>5144,>1144,>1144
            DATA        >1144,>1144,>1144,>1144,>1145,>1141,>1541,>1441
            DATA        >4114,>4154,>4154,>5144,>5144,>1144,>1144,>1144
            DATA        >1144,>1144,>1144,>1144,>1144,>1145,>1141,>1541
            DATA        >4154,>4154,>5144,>5144,>1144,>1144,>1144,>1144
            DATA        >1144,>1144,>1144,>1144,>1144,>1144,>1145,>1141
            DATA        >4154,>5144,>5144,>1144,>1144,>1144,>1144,>1144
            DATA        >4411,>4411,>4411,>4411,>4411,>4411,>4451,>4451
            DATA        >4111,>4511,>4411,>4411,>4411,>4411,>4411,>4411
            DATA        >4411,>4411,>4411,>4411,>4411,>4451,>4451,>5441
            DATA        >4115,>4111,>4511,>4411,>4411,>4411,>4411,>4411
            DATA        >4411,>4411,>4411,>4411,>4451,>4451,>5441,>5441
            DATA        >4114,>4115,>4111,>4511,>4411,>4411,>4411,>4411
            DATA        >4411,>4411,>4411,>4451,>4451,>5441,>5441,>1441
            DATA        >4114,>4114,>4115,>4111,>4511,>4411,>4411,>4411
            DATA        >4411,>4411,>4451,>4451,>5441,>5441,>1441,>1441
            DATA        >4114,>4114,>4114,>4115,>4111,>4511,>4411,>4411
            DATA        >4411,>4451,>4451,>5441,>5441,>1441,>1441,>1441
            DATA        >4114,>4114,>4114,>4114,>4115,>4111,>4511,>4411
            DATA        >4451,>4451,>5441,>5441,>1441,>1441,>1441,>1441
            DATA        >4114,>4114,>4114,>4114,>4114,>4115,>4111,>4511
            DATA        >4551,>5441,>5441,>1441,>1441,>1441,>1441,>1441
            DATA        >4114,>4114,>4114,>4114,>4114,>4114,>4115,>4151

* 7200 group decisions,         --ROTATED--
*           DATA        >5411,>1441,>1441,>1441,>1441,>1441,>1441,>1441
*           DATA        >4114,>4114,>4114,>4114,>4114,>4114,>4114,>4114
*           DATA        >4411,>5411,>1441,>1441,>1441,>1441,>1441,>1441
*           DATA        >4114,>4114,>4114,>4114,>4114,>4114,>4114,>4411
*           DATA        >4411,>4411,>5411,>1441,>1441,>1441,>1441,>1441
*           DATA        >4114,>4114,>4114,>4114,>4114,>4114,>4411,>4411
*           DATA        >4411,>4411,>4411,>5411,>1441,>1441,>1441,>1441
*           DATA        >4114,>4114,>4114,>4114,>4114,>4411,>4411,>4411
*           DATA        >4411,>4411,>4411,>4411,>5411,>1441,>1441,>1441
*           DATA        >4114,>4114,>4114,>4114,>4411,>4411,>4411,>4411
*           DATA        >4411,>4411,>4411,>4411,>4411,>5411,>1441,>1441
*           DATA        >4114,>4114,>4114,>4411,>4411,>4411,>4411,>4411
*           DATA        >4411,>4411,>4411,>4411,>4411,>4411,>5411,>1441
*           DATA        >4114,>4114,>4411,>4411,>4411,>4411,>4411,>4411
*           DATA        >4411,>4411,>4411,>4411,>4411,>4411,>4411,>5411
*           DATA        >4114,>4411,>4411,>4411,>4411,>4411,>4411,>4411
*           DATA        >1144,>1144,>1144,>1144,>1144,>1144,>1144,>1144
```

```
*               DATA      >1154,>1144,>1144,>1144,>1144,>1144,>1144,>1144
*               DATA      >1144,>1144,>1144,>1144,>1144,>1144,>1144,>1441
*               DATA      >4114,>1154,>1144,>1144,>1144,>1144,>1144,>1144
*               DATA      >1144,>1144,>1144,>1144,>1144,>1144,>1441,>1441
*               DATA      >4114,>4114,>1154,>1144,>1144,>1144,>1144,>1144
*               DATA      >1144,>1144,>1144,>1144,>1144,>1441,>1441,>1441
*               DATA      >4114,>4114,>4114,>1154,>1144,>1144,>1144,>1144
*               DATA      >1144,>1144,>1144,>1144,>1441,>1441,>1441,>1441
*               DATA      >4114,>4114,>4114,>4114,>1154,>1144,>1144,>1144
*               DATA      >1144,>1144,>1144,>1441,>1441,>1441,>1441,>1441
*               DATA      >4114,>4114,>4114,>4114,>4114,>1154,>1144,>1144
*               DATA      >1144,>1144,>1441,>1441,>1441,>1441,>1441,>1441
*               DATA      >4114,>4114,>4114,>4114,>4114,>4114,>1154,>1144
*               DATA      >1144,>1441,>1441,>1441,>1441,>1441,>1441,>1441
*               DATA      >4114,>4114,>4114,>4114,>4114,>4114,>4114,>1154

* the point lookup table for the 7200 training sequence
* this is much faster than computing it, if less flexible
TR72
                DATA      ->3000,>3000                        * 4
                DATA      ->1000,->1000                       * F
                DATA      ->3000,>1000                        * D
                DATA      ->1000,->1000                       * F
                DATA      ->3000,>1000                        * D
                DATA      ->1000,->3000                       * A
                DATA      >3000,->3000                        * 0
                DATA      >1000,>3000                         * E
                DATA      ->1000,->1000                       * F
                DATA      >1000,>3000                         * E
                DATA      >1000,->1000                        * C
                DATA      ->1000,>1000                        * 8
                DATA      >3000,>3000                         * 7
                DATA      >1000,->1000                        * C
                DATA      ->1000,>1000                        * 8
                DATA      >3000,->3000                        * 0

                DATA      ->3000,>3000                        * 4


MAGTAB          DATA      >0000              ; Not Valid
                DATA      >7FFF              ; 1
                DATA      >0000              ; Not Valid
                DATA      >0000              ; Not Valid
                DATA      >0000              ; Not Valid
                DATA      >49E7              ; 5
                DATA      >0000              ; Not Valid
                DATA      >0000              ; Not Valid
                DATA      >0000              ; Not Valid
                DATA      >2AAA              ; 9
                DATA      >287A              ; 10
```

```
DATA    >0000    ; Not Valid
DATA    >0000    ; Not Valid
DATA    >2380    ; 13
DATA    >0000    ; Not Valid
DATA    >0000    ; Not Valid
DATA    >0000    ; Not Valid
DATA    >1F06    ; 17

END
```

```
$TITLE(I/O)
%SET(RACK,0)
;*********************************************************************
;
            Name                    XIO
;
;*********************************************************************
;

portb_addr  equu        08000h                          ; output
at_addr                 equu        09000h                          ; input
porta_addr  equ         0A000h                          ; output
mr_addr                 equu        0B000h                          ; output
rack_addr   equ         0C000h                          ; input
sync_addr   equ         0D000h                          ; output

                        dseg        at          20h
; modem ready led =                                     ; output addr = B000h
porta:                  ds          1                               ; output addr = A000h
portb:                  ds          1                               ; output addr = 8000h
atswitch:   ds          1                               ; input addr = 9000h

ttone_pin   bit         porta.0                         ; 0 = send ttones
dsr_pin                 bit         porta.1                         ; 0 = DSR true
cts_pin                 bit         porta.2                         ; 0 = CTS true
spkr_pin    bit         porta.3                         ; 1 = off
arq_pin                 bit         porta.4                         ; 0 = mnp led on
ls_pin                  bit         porta.5                         ; 0 = highest speed, 1 = ls
ring_pin    bit         porta.6                         ; 0 = ring in progress
cdet_pin    bit         porta.7                         ; 0 = CD true

oa_pin                  bit         portb.0                         ; 1 = ans mode
alb_pin                 bit         portb.1                         ; 1 = AL on
echo_pin    bit         portb.2                         ; 1 = echo on
watchdg_pin             bit         portb.3                         ; 1 = reset wd
reset_pin   bit         portb.4                         ; 1 = reset micros
oh_pin                  bit         portb.5                         ; 1 = on hook
nram_enb_pin            bit         portb.6                         ; 1 = Chip Enable
nram_clk_pin            bit         portb.7                         ; 0 to 1 transition

at_verbose  bit         atswitch.0              ; 1 = verbose
at_quiet    bit         atswitch.1              ; 1 = quiet
at_echo                 bit         atswitch.2              ; 1 = echo on
at_auto_ans bit         atswitch.3              ; 1 = auto ans
at_dumb                 bit         atswitch.4              ; 1 = dumb mode
at_esc                  bit         atswitch.5              ; 1 = +++ hang up
at_dtr                  bit         atswitch.6              ; 1 = DTR false
at_rts                  bit         atswitch.7              ; 1 = RTS false


rack_vars   segment     data
            rseg        rack_vars
```

```
rack:       ds          1                   ; bit 0: 0 = Remote Digital loopback
                                            ;     1: 0 = busy
                                            ;     2: 0 = Analog Loopback
rack_z1:ds  1                   ; last state of the switches

xio_code    segment     code
                        rseg        xio_code

            public      porta,portb,atswitch
            public      at_verbose,at_quiet,at_echo,at_auto_ans
            public      at_dtr,at_rts,at_dumb,at_esc
            public      oa_pin,echo_pin,oh_pin,watchdg_pin
            public      cdet_pin,ring_pin,ls_pin,cts_pin
            public      alb_pin,dsr_pin,spkr_pin,rack,rack_z1

            public      dtmf_on,dtmf_off,dsr_on,dsr_off
            public      cts_on,cts_off,speaker_on,speaker_off
            public      set_mercury,set_courier,arq_on,arq_off
            public      ring_on,ring_off,cdet_true,cdet_false
            public      set_answer,set_originate,alb_on,alb_off
            public      echo_on,echo_off
            public      set_watchdog,rst_watchdog,cpl_watchdog
            public      on_hook,off_hook,enable_novram,disable_novram
            public      set_novram_clock,rst_novram_clock
            public      portb_out,porta_out
            public      reset_micros,led_test
            public      get_rts,get_dtr,get_esc,get_dumb
            public      upcase
            public      hold_sync
            public      mr_on,mr_off
            public      get_x_spkr,save_x_spkr
            public      get_repeat_cnt,save_repeat_cnt

            extrn       xdata(amp_xs,x_spkr,repeat_cnt)

$eject
;******************************************
;   INPUT ROUTINES
;******************************************


get_rts:
            mov         dptr,#at_addr
            movx        a,@dptr
            mov         c,acc.7
            ret

get_dtr:
            mov         dptr,#at_addr
            movx        a,@dptr
            mov         c,acc.6
            ret
```

```
get_esc:
;           mov         dptr,#at_addr
;           movx        a,@dptr
;           mov         c,acc.5
            ret

get_dumb:
;           mov         dptr,#at_addr
;           movx        a,@dptr
;           mov         c,acc.4
            ret


get_x_spkr:
            mov         dptr,#x_spkr
            movx        a,@dptr
            ret

get_repeat_cnt:
            mov         dptr,#repeat_cnt
            movx        a,@dptr
            ret

$eject
;*****************************************
;   OUTPUT ROUTINES
;*****************************************

set_answer:
            setb        oa_pin
            sjmp        portb_out
set_originate:
            clr         oa_pin
            sjmp        portb_out

alb_on:
            setb        alb_pin
            sjmp        portb_out
alb_off:
            clr         alb_pin
            sjmp        portb_out

echo_on:
            setb        echo_pin
            sjmp        portb_out
echo_off:
            clr         echo_pin
            sjmp        portb_out

set_watchdog:
            clr         watchdg_pin
            sjmp        portb_out
```

```
rst_watchdog:
            setb        watchdg_pin
            sjmp        portb_out

cpl_watchdog:
            cpl         watchdg_pin
            sjmp        portb_out

on_hook:
            %IF (%RACK) THEN (
            mov         a,rack
            jnb         acc.1,off_hook
            ) FI
            setb        oh_pin
            sjmp        portb_out
off_hook:
            clr         oh_pin
            sjmp        portb_out

enable_novram:
            setb        nram_enb_pin
            sjmp        portb_out
disable_novram:
            clr         nram_enb_pin
            sjmp        portb_out

set_novram_clock:
            setb        nram_clk_pin
%IF(%RACK) THEN(
            setb        watchdg_pin
)FI
            sjmp        portb_out

rst_novram_clock:
            clr         nram_clk_pin
%IF(%RACK) THEN(
            clr         watchdg_pin
)FI
            sjmp        portb_out

reset_micros:
            setb        reset_pin
            call        portb_out
;           clr         a
;           mov         a,#10
;           djnz        acc,$
            clr         reset_pin
            call        portb_out
            ret

portb_out:
            mov         dptr,#portb_addr
```

```
            jnb     ea,pb_dis
            clr     ea
            mov     a,portb
            movx    @dptr,a
            setb    ea
            ret
pb_dis:
            mov     a,portb
            movx    @dptr,a
            ret


dtmf_on:
            clr     ttone_pin
            sjmp    porta_out
dtmf_off:
            setb    ttone_pin
            sjmp    porta_out

dsr_on:
            clr     dsr_pin
            sjmp    porta_out
dsr_off:
            mov     dptr,#amp_xs
            movx    a,@dptr
            jnz     $+3
            ret
            setb    dsr_pin
            sjmp    porta_out

cts_on:
            clr     cts_pin
            sjmp    porta_out
cts_off:
            setb    cts_pin
            sjmp    porta_out

speaker_on:
            clr     spkr_pin
            sjmp    porta_out
speaker_off:
            setb    spkr_pin
            sjmp    porta_out

set_mercury:
            clr     ls_pin
            sjmp    porta_out
set_courier:
            setb    ls_pin
            sjmp    porta_out

arq_on:
```

```
        clr     arq_pin
        sjmp    porta_out
arq_off:
        setb    arq_pin
        sjmp    porta_out

ring_on:
        clr     ring_pin
        sjmp    porta_out
ring_off:
        setb    ring_pin
        sjmp    porta_out

cdet_true:
        clr     cdet_pin
        sjmp    porta_out
cdet_false:
        setb    cdet_pin
        sjmp    porta_out


porta_out:
        mov     dptr,#porta_addr
        jnb     ea,pa_dis
        clr     ea
        mov     a,porta
        movx    @dptr,a
        setb    ea
        ret
pa_dis:
        mov     a,porta
        movx    @dptr,a
        ret

mr_on:
        mov     dptr,#mr_addr
        clr     a
        movx    @dptr,a
        ret

mr_off:
        mov     dptr,#mr_addr
        mov     a,#01
        movx    @dptr,a
        ret


save_x_spkr:
        mov     dptr,#x_spkr
        movx    @dptr,a
        ret
```

```
save_repeat_cnt:
        mov     dptr,#repeat_cnt
        movx    @dptr,a
        ret

led_test:
        push    porta
        push    portb
        anl     porta,#01001011b
        anl     portb,#11011111b
        orl     portb,#00000111b
        call    porta_out
        call    portb_out
        call    mr_on
        jb      at_dtr,$
        pop     portb
        pop     porta
        call    porta_out
        call    portb_out
        ret


;-----------------------------------------------
hold_sync:
        clr     et1
        mov     a,#0ffh
        mov     dptr,#sync_addr
        movx    @dptr,a
        setb    txd
        ret

;-----------------------------------------------

upcase:
        cjne    a,#('a'),$
        jc      upcase_exit
        cjne    a,#('z'+1),$+3
        jnc     upcase_exit
        subb    a,#('a'-'A'-1)
upcase_exit:
        ret

        End
```

```
%set(krypton,0)
%set(mercury,1-%krypton)
%set(diag,%mercury)
$TITLE(MNP Control Module)
;*********************************************************************
;
;           Name                    XMNP
;
;           Purpose                 Contains MNP control processor
;                                   1200/2400 Courier mode
;                                   & 9600 Mercury mode
;
;           Conditionals            krypton = 1  for mnp courier
;                                   krypton = 0  for 9600 mercury
;
;                                   diag = 1 for link diagnostics
;                                   diag = 0 for no diagnostics
;
;                                   usr_product_code = 1  for krypton
;                                   usr_product_code = 3  for mercury
;                                   note-- msb of product code indicates o/a
;
;*********************************************************************
;
;           R A N D O M   C O N S T A N T S

;---- Magic Chars
Ack                     equu     06                             ; xmodem ack
Esc                     equ      27                             ; cursor escape

;---- Other Special Numbers
usr_serial_num          equ      17                             ; US Robotics ID
my_credit     equ       12                            ; 1..15
tx_bufend     equ       1000h                         ;** check this
tx_bufstart   equ       800h                          ;** check this
rx_bufend     equ       2000h                         ;** check this
rx_bufstart   equ       1000h                         ;** check this
txsize                  equ      tx_bufend - tx_bufstart
rxsize                  equ      rx_bufend - rx_bufstart

%IF(%krypton) THEN(
at_latch                equ      8000h                ; location of RTS input
rts_bit                          bit       acc.6                ; RTS bit pos
max_datasize                     equ       244
usr_product_code        equ      1                    ; must be odd
)ELSE(
at_latch                equ      9000h
rts_bit                          bit       acc.7
max_datasize                     equ       64                   ;** experimental
usr_product_code        equ      3
)FI
;           C O N T R O L   F L A G S
```

```
%IF(%krypton) THEN(
glob_f              data        29h
misc_f              data        2bh
xmit_f              data        2ch                              ; tx frame control)
ELSE(
glob_f              data        23h
misc_f              data        24h
xmit_f              data        25h                              ; tx frame control)
FI

brokenf             bit         glob_f.0          ; 1 = received invalid frame
sync_async  bit     glob_f.1              ; 0 = sync, 1 = async
print_busy  bit     glob_f.2              ; 0 = ready, 1 = serout busy
clocktick   bit     glob_f.3              ; 1 = 250 ms
disco_pending       bit         glob_f.4          ; 1 = stop link

send_frame  bit     glob_f.5              ; 1 = sending frame
send_data   bit     glob_f.6              ; 1 = send data byte
;break_det  bit     glob_f.7              ; 1 = break detected
xmit_ln             bit         glob_f.7          ; 1 = xmit link attention

%IF(%krypton) THEN(
            extrn   bit(o_a_fg)                   ; 0 = originate, 1 = answer mode
            extrn   bit(al_pin)                   ; 1 = analog loopback
            extrn   bit(ls_pin)                   ; 0 = 2400, 1 =1200
)ELSE(
            public  send_frame,send_data,disco_pending,sync_async
            public  can_ln_timer,scan_rts
            public  ln_send_seq
            public  brokenf,print_busy,clocktick
            public  ln_busy,send_ln,send_rpt
            extrn   bit(timer_on)
            extrn   bit(break_det)
            extrn   bit(orig)                     ; 1 = originate mode
            extrn   bit(baud_24)                              ; 1 = 2400
            extrn   bit(tx9600)                   ; 1 = tx 9600
            extrn   bit(ls_pin)                   ; 0 = 9600, 1 = 1200/2400
            extrn   bit(alb_pin)                  ; 1 = analog loopback
)FI


;           R E C E I V E   F L A G S

level3_pend bit     misc_f.0              ; 1 = switch to level 3
block_mode          bit         misc_f.1          ; 1 = block mode
;disco_remote       bit         misc_f.1          ; 1 = stop link
;pr_violation bit   misc_f.2              ; 1 = protocol problem
;dup_lt             bit         misc_f.3          ; 1 = duplicate lt received
send_rpt    bit     misc_f.3              ; 1 = format compressed frame
lr_received bit     misc_f.4              ; 1 = lr received
lr_timeout  bit     misc_f.5              ; 1 = (lr timer = 0)
lt_or_la_recv       bit         misc_f.6          ; 1 = lt or la recieved
```

```
breaking        bit         misc_f.7                ; 1 = busy breaking
recv_ov                     equ         f0          ; 1 = recv frame to short

; tx intr control

;               T R A N S M I T T E R   F L A G S

xmit_ld                     bit         xmit_f.0    ; 1 = xmit link disconnect
xmit_la                     bit         xmit_f.1    ; 1 = xmit ack
xmit_lna        bit         xmit_f.2
ln_busy                     bit         xmit_f.3    ; 1 = unacked ln
xmit_lr                     bit         xmit_f.4    ; 1 = xmit link request
xmit_nak        bit         xmit_f.5
large_blocks                bit         xmit_f.6    ; 1 = >64
pure_mnp        bit         xmit_f.7                ; 1 = mnp, 0 = streamlined


;               E X T E R N A L   D E C L A R A T I O N S
                extrn       xdata(sreg)                 ; addr of S-registers
                extrn       code(putblock)              ; send string to term
                extrn       code(normal)                ; handle retrain, loc, dtr
                extrn       code(sync_init)             ; init intr for level 3
                extrn       code(call_over)

                extrn       data(rom_version)           ; equate, ie 24X
;               extrn       bit(fsk)                    ; 1 = 300 bps

%IF(%krypton) THEN(
                extrn       bit(amp_r1)                 ; 1 = rts override
                extrn       code(mnp_on)                ; turn on mnp led
                extrn       code(mnp_off)               ; turn off mnp led
                extrn       code(delay)
                extrn       code(print_connect)         ; prints connect msg
)ELSE(
                extrn       bit(ignore_rts)             ; 1 = rts override
                extrn       bit(reverse_channel)        ; 1 = switch 9600/300
                extrn       bit(tempbit2)
                extrn       code(go_fast)               ; goto high speed
                extrn       code(arq_on)                ; turn on arq led
                extrn       code(arq_off)               ; turn off arq led
                extrn       code(wait5)
                extrn       code(print_it)              ; non-mnp mode
                extrn       code(assert_cd)
                extrn       code(respond)
                extrn       code(check_for_9600)
                extrn       code(gen_speed_vector)
                extrn       code(save_block)
                public      pure_mnp,lt_or_la_recv
)FI
                extrn       bit(got_xoff)               ; 1 = received xoff
```

```
;            RECEIVE VARIABLES

%IF(%krypton) THEN(
            extrn               xdata(received_lr_serial_number)
            extrn               data(delay_ct)
            extrn               data(r_no)              ; default result code
            extrn               code(non_mnp_mode)      ; jump here when done
            extrn               code(flow_enable)       ; raise cts/ send xon
            extrn               data(rxptr)             ; ptr to len xbuffer
            extrn               xdata(tltptr)
            extrn               xdata(soh)              ; serial output ptr
            extrn               xdata(sih)              ; serial input ptr)
ELSE(       extrn               data(soh_lp,soh_hp)
            extrn               data(sih_lp,sih_hp)
            extrn               data(_tptr_l,_tptr_h)

            extrn               code(flow_on)                   ; raise cts
            public              tx_frame,data_scan,ack_scan
            public              xmit_lr,xmit_la
)FI
            public              update_timers
            public              rst_inack_timer
;           extrn               data(secs_ct)                   ; 6.667 ms timer cnt

;            TRANSMITTER VARIABLES

            extrn               data(icountl)                   ; ser in low count
            extrn               data(icounth)                   ; ser in high count
            extrn               data(t_hbyte_cnt)       ; #bytes in header byte buffer
            extrn               data(t_xbyte_cnt)       ; #data bytes in tx buffer

%IF(%krypton) THEN(
            extrn               data(morestuf)                  ; &y flags)
ELSE(       extrn               xdata(amp_xy)
            extrn               xdata(amp_xb)                   ; baud rate fallback
            extrn               xdata(amp_xm)                   ; ARQ fallback?
)FI


;            EXTERNAL RECEIVE DATA VARS

%IF(%krypton) THEN(     xseg        at          400h)
ELSE(       xseg        at          100h)
FI
xmnp_data:

rxrec:                  ds          40h                         ; recv frame records
txrec:                  ds          40h                         ; xmit frame records
theader_buf:            ds          20h
tnybble_buf:            ds          8                           ; used by intr
```

```
rdata_ptr:      ds      2                       ; r data ptr
rdata_index:            ds      1               ; r data index
txbase_ptr:     ds      2
rack_ptr:       ds      2                       ; r ack ptr
rack_index:     ds      1                       ; r ack index
lt_send_seq:            ds      1               ; tx data seq
ln_send_seq:            ds      1               ; tx break seq
lt_recv_seq:    ds      1                       ; last lt seq received
ln_recv_seq:            ds      1               ; last ln seq received
r_credit:       ds      1                       ; remote credit
t_credit:       ds      1                       ; local credit
new_sseq:       ds      1
current_sseq:           ds      1
last_acked_seq:         ds      1
send_ln:        ds      1                       ; type of ln to send
r_windowsize:           ds      1               ; received windowsize

disco_us:       ds      1                       ; our reason to remote
pr_level:       ds      1                       ; mnp (1,2)
sv_level:       ds      1                       ; mnp (2,3)
t_last_ack:     ds      1


;               E X T E R N A L   T I M E R S
inackp_timer:           ds      1               ; inack timer
inackl_timer:           ds      1               ; inack timer
inackh_timer:           ds      1               ; inack timer

ln_timer:       ds      1                       ; lnr timer
lr_timer:       ds      1                       ; link req timer
lt_timer:       ds      1                       ; lt timer
window_timer:           ds      1               ; window timer
break_timer:            ds      1               ; times breaks to term
la_timer:       ds      1
ln_retry:       ds      1                       ; ln retry cnt
rts_timer:      ds      1                       ; time rts down threshold
rts_mode:       ds      1
r_brk_type:     ds      1
nak_timer:      ds      1                       ;** experimental
xmode:                  ds      2               ; 0 = normal mnp mode

%IF(%mercury) THEN(
reverse_timer:          ds      1               ; delay between reversals
baseptr:        ds      2                       ; used by hs
secd_timer:     ds      1                       ; clockticks --> sec
sec_timer:      ds      1                       ; counts seconds
debug_ptr:      ds      1
debug2_ptr:     ds      1
common_speeds:          ds      1
next_speed:     ds      1

                public          reverse_timer,common_speeds,next_speed
```

```
received_lr_serial_number:
                    ds          6
r_rept_length:      ds          1
r_rept_string:      ds          8                        ;** experimental
t_rept_length:      ds          1
t_rept_string:      ds          4                        ;** experimental


          public                rxrec,theader_buf,tnybble_buf,baseptr
)FI

;         T I M E R   C O N S T A N T S
max_tic             equ         150                      ; tic (  150 --> 0)
%IF(%krypton) THEN(
sec_                equ         4                        ; 250 ms/tick)
ELSE (sec_  equ     20                       ; 50 ms/tick)
FI
sec_1               equ         sec_ +1
sec_2               equ         2*sec_ +1
sec_3               equ         3*sec_ +1
sec_4               equ         4*sec_ +1
sec_5               equ         5*sec_ +1
sec_6               equ         6*sec_ +1
sec_7               equ         7*sec_ +1
sec_8               equ         8*sec_ +1
sec_9               equ         9*sec_ +1
sec_10              equ         10*sec_ +1
%IF(%krypton) THEN(
sec_21              equ         21*sec_ +1
sec_31              equ         31*sec_ +1)
ELSE (
sec_21              equ         255                      ;** check this
sec_31              equ         255
)FI


%IF(%MERCURY) THEN(
mnp_data  segment   data
                    rseg        mnp_data
rcountl:  ds        1
rcounth:  ds        1
inpl:               ds          1
inph:               ds          1
r_crc_l:  ds        1
r_crc_h:  ds        1
t_crc_l:  ds        1
t_crc_h:  ds        1
rxptr:              ds          1
                    public      rcountl,rcounth,inpl,inph,rxptr
                    public      r_crc_l,r_crc_h,t_crc_l,t_crc_h
)FI
```

```
%IF(%DIAG) THEN(
            extrn       code(clear_ld_strings)
            extrn       code(inc_ld_string)
            extrn       code(add_ld_string)

            extrn       xdata(ld_chars_sent)
            extrn       xdata(ld_chars_recv)
            extrn       xdata(ld_lts_sent)
            extrn       xdata(ld_lts_resent)
            extrn       xdata(ld_naks)
            extrn       xdata(ld_lt_timeouts)
)FI


;           C O N S T A N T   D E F I N I T I O N S
; frame formats
ff_lr                   equu    1           ; link request
ff_ld                   equ     2           ; link disconnect
ff_lt                   equ     4           ; link data
ff_la                   equ     5           ; link ack
ff_ln                   equ     6           ; link attn
ff_lna                  equ     7           ; link attn ack
ff_nak                  equ     3           ; link ack
ff_lta                  equ     8           ; link data w ack
ff_lt1                  equ     9           ; link char, compressed
ff_lt2                  equ     10          ; lt 2 chars, compressed
ff_lt3                  equ     11          ; lt 3 chars, compressed
ff_ltr                  equ     12          ; repeat last lt, compressed
ff_ltdr                 equ     13          ; 2*repeat last lt, compressed
ff_null                 equ     0ffh        ; not assigned


;           D I S C O N N E C T   R E A S O N S
dm_handshake            equ     1           ; received lpdu not lr
dm_protocol             equ     2           ; incompatible protocol level
dm_unknown              equ     3           ; unknown parms in lr
dm_retrans  equ         4           ; >12 retries
dm_inactive equ         5           ; inactivity timer expired
dm_dest                 equ     6           ; dest user not found
dm_online   equ         96          ; user +++
dm_peer                 equ     254         ; peer protocol error
dm_user                 equ     255         ; user-initiated

dc_dtr                  equ     1           ; dtr dropped
dc_plus                 equ     2           ; +++
dc_carrier  equ         3           ; loss of carrier
dc_inactive equ         4           ; inactivity timer expired
dc_incompatible         equ     5           ; mnp incompatible
dc_retrans  equ         6           ; >12 retries
dc_ld                   equ     7           ; received an ld
```

```
;           M A C R O S
%*DEFINE(LDA(loc))(
            mov         dptr,#%loc
            movx        a,@dptr
            )
%*DEFINE(STA(loc))(
            mov         r0,#low %loc
            movx        @r0,a
            )
%*DEFINE(DEC_DPTR)(
            inc         dpl
            djnz        dpl,$+5
            dec         dph
            dec         dpl
            )
%*DEFINE(STX(ADDR,VAL)) (
            mov         r0,#low %ADDR
            mov         a,%VAL
            movx        @r0,a
            )


xmnp1_code              segment     code
                        rseg        xmnp1_code
$EJECT
;*************************************************
;
;
;           U P D A T E   T I M E R S
;
;
; update_timers is periodically called
; if not clocktick then return
; for all timers do
;   if  timer <> 0,  timer = timer - 1
;           if timer = 0,   something is done
;
;
;
;T I M E R              B A U D  R A T E
;*************************************************
;                                   1           2           9
;                       3           2           4           6
;                       0           0           0           0
;                       0           0           0           0
;
;--------------------------------------------
; ack                   10          3           2           2
;
; lr                    9           9           9           9
;
; lt                    21          6           4           4
;
; ln                    21          6           4           4
```

```
;
; window     31        7         3         3
;
; inactivity   S register  19
;
;***********************************************

update_timers:
%IF(%mercury) THEN(
            jnb       break_det,ut_clocktick
            clr       break_det
            setb      xmit_ln
)FI

ut_clocktick:
            jbc       clocktick,$+4                          ; time to update?
            ret                                              ; no
%IF(%mercury) THEN(
            mov       r0,#low secd_timer
            movx      a,@r0
            dec       a
            jnz       ut_sec
            mov       a,#20
            movx      @r0,a
            inc       r0
            movx      a,@r0
            jz        ut_la
            dec       a
ut_sec:
            movx      @r0,a
)FI
ut_la:
; check ack timer
            mov       r0,#low la_timer               ; yes...
            movx      a,@r0
            jz        ut_inack
            dec       a
            movx      @r0,a
            jnz       ut_inack
            setb      xmit_la
            call      rst_la_timer

; check inactivity timer
ut_inack:
%IF(%MERCURY) THEN(
            mov       r0,#low inackp_timer
            movx      a,@r0
            dec       a
            movx      @r0
            jnz       ut_ln
            mov       a,#5
            movx      @r0,a
```

```
)FI
            mov     r0,#low inackl_timer        ; not fully implemented
            movx    a,@r0
            dec     a
            movx    @r0,a
            jnz     ut_ln
            mov     a,#240                      ;* check this value
            movx    @r0,a
            mov     r0,#low inackh_timer
            movx    a,@r0
            jz      ut_ln
            dec     a
            movx    @r0,a
            jnz     ut_ln
            mov     a,#dc_inactive              ; our inactivity code
            mov     dptr,#sreg+20
            movx    @dptr,a
            setb    disco_pending
            mov     a,#dm_inactive              ; disconnect if no activity
            call    init_disco

; check ln timer
ut_ln:
            mov     r0,#low ln_timer
            movx    a,@r0
            jz      ut_lr
            dec     a
            movx    @r0,a
            jnz     ut_lr
            clr     ln_busy
            setb    xmit_ln                     ; also inc ln retrans count

            ; check link request timer
ut_lr:
            mov     r0,#low lr_timer
            movx    a,@r0
            jz      ut_lt
            dec     a
            movx    @r0,a
            jnz     ut_lt
            setb    lr_timeout

; check lt retransmission timer
ut_lt:
            mov     r0,#low lt_timer
            movx    a,@r0
            jz      ut_window
            dec     a
            movx    @r0,a
            jnz     ut_window
            mov     r0,#low last_acked_seq
            movx    a,@r0
```

```
            inc         a
            mov         r0,#low current_sseq
            movx        @r0,a
%IF(%DIAG) THEN(
            mov         dptr,#ld_lt_timeouts
            call        inc_ld_string
)FI
; check window timer
ut_window:
            mov         r0,#low window_timer              ; not fully implemented
            movx        a,@r0
            jz          ut_nak
            dec         a
            movx        @r0,a
            jnz         ut_nak
            setb        xmit_la
ut_nak:
            mov         r0,#low nak_timer
            movx        a,@r0
            jz          ut_rts
            dec         a
            movx        @r0,a
ut_rts:
            mov         r0,#low rts_timer
            movx        a,@r0
            jz          ut_reverse
            dec         a
            movx        @r0,a
            jnz         ut_reverse
            mov         r0,#low t_credit                  ; reduce CA to 0
            clr         a
            movx        @r0,a
ut_reverse:
%IF(%MERCURY) THEN(
            mov         r0,#low reverse_[illegible]
            movx        a,@r0
            jz          ut_ret
            dec         a
            movx        @r0,a
)FI
ut_ret:
            ret

xmnp_code segment       code inblock
                        rseg        xmnp_code

$EJECT
;**************************************************
; if a timer = 0, then it is cancelled (inactive)
; a timer is reset by loading it with a non-zero val
; a timer is initiated by reseting it if inactive
;
```

```
can_lr_timer:
            clr         xmit_lr
            mov         r0,#low lr_timer
can_ret:
            clr         a
            movx        @r0,a
            ret

can_lt_timer:
            mov         r0,#low lt_timer
            sjmp        can_ret
;           clr         a
;           movx        @r0,a
;           ret

can_la_timer:
            mov         r0,#low la_timer
            sjmp        can_ret
;           clr         a
;           movx        @r0,a
;           ret

can_window_timer:
            mov         r0,#low window_timer
            sjmp        can_ret
;           clr         a
;           movx        @r0,a
;           ret


can_inack_timer:
            mov         r0,#low inackh_timer
            sjmp        can_ret
;           clr         a
;           movx        @r0,a
;           ret

can_rts_timer:
            mov         r0,#low rts_timer
            sjmp        can_ret
;           clr         a
;           movx        @r0,a
;           ret

can_ln_timer:
            mov         r0,#low ln_timer
            clr         a
            movx        @r0,a
            mov         r0,#low ln_retry
            movx        @r0,a
            clr         ln_busy
            clr         xmit_ln
```

```
                ret

rst_lr_timer:
                mov         r0,#low lr_timer
                mov         a,#sec_4
                movx        @r0,a
                clr         lr_timeout
                ret

ini_lt_timer:
                mov         r0,#low lt_timer
                movx        a,@r0
                jz          rst_lt_timer
                ret
rst_lt_timer:
                mov         r0,#low lt_timer
                mov         a,#sec_4                        ; at 2400
%IF(%KRYPTON) THEN(
                jnb         ls_pin,$+5
)ELSE(          jnb         ls_pin,$+8
                jb          baud_24,$+5
)FI
                mov         a,#sec_6                        ; at 1200
                movx        @r0,a
                ret

rst_ln_timer:
                mov         r0,#low ln_timer
                mov         a,#sec_4                        ; at 2400
%IF(%KRYPTON) THEN(
                jnb         ls_pin,$+5
)ELSE(          jnb         ls_pin,$+8
                jb          baud_24,$+5
)FI
                mov         a,#sec_6                        ; at 1200
                movx        @r0,a
                ret


ini_la_timer:
                mov         r0,#low la_timer
                movx        a,@r0
                jz          rst_la_timer
                ret
rst_la_timer:
                mov         r0,#low la_timer
                mov         a,#sec_2                        ; at 2400
%IF(%KRYPTON) THEN(
                jnb         ls_pin,$+5
)ELSE(          jnb         ls_pin,$+8
                jb          baud_24,$+5
)FI
```

```
            mov     a,#sec_3                    ; at 1200
            movx    @r0,a
            ret

rst_nak_timer:
            mov     r0,#low nak_timer
            mov     a,#sec_2                    ;** experimental value
            movx    @r0,a
            ret

rst_window_timer:
            mov     r0,#low window_timer
            mov     a,#sec_3                    ; at 2400
%IF(%KRYPTON) THEN(
            jnb     ls_pin,$+5
)ELSE(      jnb     ls_pin,$+8
            jb      baud_24,$+5
)FI
            mov     a,#sec_7                    ; at 1200
            movx    @r0,a
            ret

rst_inack_timer:
%IF(%KRYPTON) THEN(
            push    acc                                 ; save it for Donavon
            mov     dptr,#sreg+19
            movx    a,@dptr
            mov     dptr,#inackh_timer
            movx    @dptr,a
            dec     dpl
            mov     a,#240
            movx    @dptr,a
            pop     acc
            ret
)ELSE(
            mov     dptr,#inackp_timer
            mov     a,#5
            movx    @dptr,a
            mov     a,#240
            inc     dpl                         ; inackl
            movx    @dptr,a

            mov     dptr,#sreg+19
            movx    a,@dptr
            mov     dptr,#inackh_timer
            movx    @dptr,a
            ret
)FI

ini_rts_timer:
            mov     r0,#low rts_timer
            movx    a,@r0
```

```
            jz          rst_rts_timer
            ret
rst_rts_timer:
            mov         r0,#low rts_timer
            mov         a,#sec_2
            movx        @r0,a
            ret

%IF(%MERCURY) THEN(
rst_reverse_timer:
            public      rst_reverse_timer
            mov         r0,#low reverse_timer
            mov         a,#sec_2                        ;* experimental
            movx        @r0,a
            ret
)FI

init_lt:
;           mov         a,#0ffh                                   ;** experimental
;           mov         r0,#low last_acked_seq
;           movx        @r0,a

            clr         a
            mov         r0,#low last_acked_seq
            movx        @r0,a
            mov         r0,#low lt_recv_seq
            movx        @r0,a
            mov         r0,#low t_last_ack
            movx        @r0,a
            inc         a                                         ; 1
            mov         r0,#low current_sseq
            movx        @r0,a
            mov         r0,#low new_sseq
            movx        @r0,a
            mov         r0,#low lt_send_seq
            movx        @r0,a
            ret

init_ln:
            clr         a
            mov         r0,#low ln_recv_seq
            movx        @r0,a
            inc         a
            mov         r0,#low ln_send_seq
            movx        @r0,a
%IF(%mercury) THEN(
;           mov         a,#12
)FI
            mov         r0,#low r_windowsize
            movx        @r0,a
            mov         r0,#low r_credit
            movx        @r0,a
```

```
        ret


        rseg        xmnp1_code
$EJECT
;*************************************************
;
;       I N I T I A L I Z E   E V E R Y T H I N G
;
;       F O R   M N P   O P E R A T I O N
;
;*************************************************
init_mnp:
        public      init_mnp
        mov         p2,#high xmnp_data
        mov         r0,#0efh
        mov         a,#011h                                         ;* debug
        movx        @r0,a
        djnz        r0,$-1

%IF(%DIAG) THEN(
        clr         a
        mov         glob_f,a
        mov         misc_f,a
;       mov         xmit_f,a
        call        clear_ld_strings
)FI
        call        init_lt
        call        init_ln

        call        can_la_timer
        call        rst_inack_timer
        call        can_ln_timer
        call        can_lr_timer
        call        can_lt_timer
        call        can_window_timer
        call        can_rts_timer
        call        rst_nak_timer

        clr         a
        mov         rxptr,a
%IF(%MERCURY) THEN(
        %sta(r_rept_length)
        %sta(t_rept_length)
)FI
        %sta(rdata_index)
        %sta(rack_index)
        %sta(rts_mode)
        %sta(xmode)
        inc         r0
        movx        @r0,a
```

```
        %stx(t_credit,#my_credit)
        %stx(pr_level,2)
        %stx(sv_level,2)

        mov     a,#low tx_bufstart
        mov     r0,#low rdata_ptr
        movx    @r0,a
        inc     r0
        mov     r1,#low rack_ptr
        movx    @r1,a
        inc     r1


        mov     a,#high tx_bufstart
        movx    @r0,a
        movx    @r1,a
        clr     brokenf
        setb    sync_async
        clr     disco_pending
        clr     clocktick
;       clr     break_det
        clr     lr_received
        clr     lr_timeout
        clr     lt_or_la_recv
        clr     breaking
        mov     xmit_f,#80h
        clr     large_blocks
        setb    pure_mnp                        ; experimental
        clr     level3_pend
        clr     block_mode

        clr     send_frame
        clr     send_data

%IF(%krypton) THEN(
        mov     r0,#low txbase_ptr
        mov     r1,#low sih
        clr     ea
        movx    a,@r1
        inc     r1
        movx    @r0,a
        inc     r0
        movx    a,@r1
        movx    @r0,a
        setb    ea
)ELSE(
        call    rst_reverse_timer
        mov     a,#low rx_bufstart
        mov     r0,#low txbase_ptr
        movx    @r0,a
        inc     r0
        mov     r #high rx_bufstart
```

```
                movx    @r0,a
                mov     a,#20
                mov     r0,#low secd_timer
                movx    @r0,a
)FI
                clr     a
                mov     dptr,#sreg+17                       ; clear ld reason
                movx    @dptr,a
                mov     dptr,#sreg+20                       ; clear disco
reason
                movx    @dptr,a
%IF(%mercury) THEN(
                mov     dptr,#common_speeds
                mov     a,#00010011b
                movx    @dptr,a
                mov     dptr,#next_speed
                clr     a                                   ; undetermined speed
                movx    @dptr,a

                mov     r0,#low baseptr
                clr     a
                movx    @r0,a
                inc     r0
                mov     a,#high tx_bufstart
                movx    @r0,a
                inc     r0
                movx    @r0,a
)FI
;*********************
                mov     r0,#low txrec
                mov     a,#low (rx_bufend-1)
                movx    @r0,a
                inc     r0
                mov     a,#high (rx_bufend-1)
                movx    @r0,a
                inc     r0
                mov     a,#01
                movx    @r0,a
                inc     r0
                clr     a
                movx    @r0,a
;*********************
                ret


$EJECT
%IF(%MERCURY) THEN(
ds_save:
                mov     r0,#low r_rept_length
                movx    @r0,a
;               mov     a,r2
                mov     r1,a
```

```
        mov     r0,#low r_rept_string          ; copy the string
sr_double:
        mov     dpl,r6
        mov     dph,r7
save_rept:
        movx    a,@dptr
        movx    @r0,a
        inc     r0
        inc     dptr
        mov     a,dph
        cjne    a,#high tx_bufend,$+6
        mov     dph,#high tx_bufstart
sr_next:
        djnz    r1,save_rept
        clr     a
        xch     a,r2
        mov     r1,a
        jnz     sr_double
        ret


save_string:
;-- Save This Data Frame For Future Repeats
; copy string to repeat area
        mov     a,r2
        mov     r0,#low t_rept_length
        movx    @r0,a
        mov     r1,a
        mov     r0,#low t_rept_string
save_loop:
        movx    a,@dptr
        movx    @r0,a
        inc     r0
        inc     dptr
        mov     a,dph
        cjne    a,#high rx_bufend,$+6
        mov     dph,#high rx_bufstart
        djnz    r1,save_loop
        ret


compare_string:
        mov     r0,#low t_rept_string
compare_loop:
        movx    a,@r0
        inc     r0
        mov     b,a
        movx    a,@dptr
        cjne    a,b,mismatch
        inc     dptr
        mov     a,dph
        cjne    a,#high rx_bufend,$+6
```

```
            mov         dph,#high rx_bufstart
            djnz        r1,compare_loop
            setb        c
            ret
mismatch:
            clr         c
            ret

)FI


            rseg        xmnp_code

$EJECT
;************************************************
;
;           T R A N S M I T T E R
;
; upper level transmitter frame generator
; send_frame is a global flag
;   This sets send_frame = true when a frame
; is formatted and ready to be xmitted
;   The interrupt routine clears send_frame
; when it is done,  and ready for the next frame
;
; Frame header data is stored in a fixed buffer, theader_buf
; r1 is the store ptr
; t_hbyte_cnt is a counter
; send_frame is the synchronization flag
; send_data is set if an lt
;
; if send_frame == true
;           return
; if special frame type
;           send special frame
; if (current_sseq - last_acked_sseq) < credit amount
;           lt or lta is allowed
; this will setup and send either an
;           lta, lt, or la  frame,
; otherwise it will exit
;
;************************************************

%IF(%KRYPTON) THEN (
xm4_store:
            jb          pure_mnp,xd_store
            ret

xm_store_1a:
            acall       xm_store_1
xm_store_1:
```

```
                mov         a,#01
xm_store:
;;              jnb         pure_mnp,xd_ret                     ; store mnp filer bytes
;;              ret                                             ; only in mnp mode
xd_store:
                movx        @r1,a                               ; store essential bytes
                inc         r1                                  ; inc ptr
                inc         t_hbyte_cnt                 ; inc count
xd_ret:         ret
)ELSE(
xm_store_1a:
                acall       xm_store_1
xm_store_1:
                mov         a,#01
xm4_store:
xm_store:
                jnb         pure_mnp,xd_ret                     ; store mnp filler bytes
;;              ret                                             ; only in mnp mode
xd_store:
                movx        @r1,a                               ; store essential bytes
                inc         r1                                  ; inc ptr
                inc         t_hbyte_cnt                 ; inc count
xd_ret:         ret
)FI


;               F O R M A T   F R A M E   H E A D E R
tx_frame:
                jb          send_frame,xd_ret           ; wait for opening

%IF(%krypton) THEN(
                call        mnp_on                              ; turn on mnp led
)ELSE(          call        arq_on
)FI
                mov         r1,#low theader_buf
                mov         t_hbyte_cnt,#0                      ; init vars for new frame

;               F O R M A T   L I N K   D I S C O N N E C T
tx_ld:
                jnb         xmit_ld,tx_lr
                clr         xmit_ld

                mov         a,#04                               ; li
                call        xm_store
                mov         a,#ff_ld                    ; ld
                call        xd_store

                call        xm_store_1a                         ; par code, length

                mov         r0,#low disco_us            ; reason for disconnect
                movx        a,@r0
                call        xd_store
```

```
        setb    send_frame              ; GO!
ld_wait:
        call    normal                          ; send frame
        jb      send_frame,ld_wait      ; and exit
        mov     r1,#20                          ; flush frame
        djnz    r0,$
        djnz    r1,$-2
        setb    disco_pending
        ret

;       F O R M A T   L I N K   R E Q U E S T
tx_lr:
        jbc     xmit_lr,$+5             ; check for O/A
        ajmp    tx_lna

        call    rst_lr_timer
        mov     dptr,#sreg+13
        movx    a,@dptr
        mov     c,acc.5                         ; f0 = 1 --> mnp
        jc      tx_lr1                          ; minor bug fix
        clr     c

%IF(%KRYPTON) THEN(
        jnb     o_a_fg,tx_lr1                   ; send extra if orig...
)ELSE(  jb      orig,tx_lr1
)FI
        mov     r0,#low xmode                   ; we received dpc req?
        movx    a,@r0
        jnz     tx_lr1                          ; no
        setb    c                               ; yes...
tx_lr1:
        mov     f0,c                            ; save xmit extended flag
%IF(%KRYPTON) THEN(
        mov     a,#23                           ; li with extended par
)ELSE(  mov     a,#24                           ; li with extended par
)FI     jnc     $+4
        mov     a,#20                           ; li
        call    xd_store
        mov     a,#ff_lr                ; send ack id
        call    xd_store
        mov     a,#02                           ; protocol level
        call    xd_store

        mov     a,#01                           ; par code
        call    xd_store
        mov     a,#06                           ; par length
        call    xd_store
        mov     a,#usr_product_code     ; send product type
%IF(%KRYPTON) THEN(
        jb      al_pin,lr_upc                   ; analog loopback
        jb      o_a_fg,$+5
)ELSE(  jb      alb_pin,lr_upc
```

```
        jnb     orig,$+5
)FI
        orl     a,#80h                          ; indicate originate mode
lr_upc:
        mov     r7,a                            ; save it
        call    xd_store
        mov     a,#rom_version                  ; current rom version
        call    xd_store
        mov     a,#00                           ; not used
        call    xd_store
        mov     a,r7                            ; compute checksum
        add     a,#rom_version + usr_serial_num
        cpl     a
        inc     a
        call    xd_store
        mov     a,#00                           ; not used
        call    xd_store
        mov     a,#usr_serial_num       ; company id
        call    xd_store

        mov     a,#02                           ; par code
        call    xd_store
        mov     a,#01                           ; par length
        call    xd_store

;       mov     dptr,#sreg+13
        movx    a,@dptr
        mov     c,acc.6                         ; 0 = level 3, 1 = level 2
        mov     a,#2
        jc      $+4
        mov     a,#3
        call    xd_store                ; service class

        mov     a,#03                           ; par code
        call    xd_store
        mov     a,#01                           ; par length
        call    xd_store
        mov     r0,#low t_credit        ; send our credit
        movx    a,@r0
        call    xd_store

        mov     a,#04                           ; par code
        call    xd_store
        mov     a,#02                           ; par length
        call    xd_store
        mov     a,#64                           ; max_DataSize
        call    xd_store
        mov     a,#00                           ; max_DataSize
        call    xd_store
        jb      f0,tx_lr_ret

tx_usr:
```

```
%IF(%KRYPTON) THEN(
            mov         a,#08h                          ; data phase optimization
            call        xd_store
            mov         a,#01
            call        xd_store
            mov         a,#03                           ; stream mode max = 255, fixed lt/la
            call        xd_store
)ELSE(

; send USR mode
; Hopefully; parm 0C0h is unused by other modem makers
;   first par is USR protocol rev level,  initially 01.
;   second par is bit vector of speeds supported.
;
;--------------------------------------------------------------+
; 7          6          5          4          3          2          1          0          |
;                                                                                         |
; X          14.4k      12k        9600       7200       4800       2400       1200       |
;--------------------------------------------------------------+
;
            mov         a,#0c0h
            call        xd_store
            mov         a,#02
            call        xd_store
            mov         a,#1                                        ; protocol rev level
            call        xd_store

;           call        check_for_9600
;           mov         a,#00000011b                                ; 1200, 2400
;           jnc         $+4
;           mov         a,#00010011b                                ; 1200, 2400, 9600
            call        gen_speed_vector

            call        xd_store
)FI
tx_lr_ret:
            setb        send_frame                      ; GO!
            ret

;           F O R M A T   L I N K   A T T N   A C K
tx_lna:
            jnb         xmit_lna,tx_ln
            clr         xmit_lna
            mov         a,#04                                       ; li
            call        xm_store
            mov         a,#ff_lna                       ; lna
            call        xd_store

            call        xm_store_1a                                 ; par code, length

            mov         r0,#low ln_recv_seq             ; ack last attn seq
```

```
        movx    a,@r0
        call    xd_store
        setb    send_frame                  ; GO!
        ret


;       F O R M A T   L I N K   A T T E N T I O N
tx_ln:
        jnb     xmit_ln,tx_nak
        clr     xmit_ln
        jnb     ln_busy,$+4                          ; only one ln at a time
        ret
        jnb     block_mode,$+4
        ret
        mov     r0,#low ln_retry
        movx    a,@r0
        inc     a
        movx    @r0,a
        add     a,#-12                               ; ln retrans limit
        jnc     tx_ln_format
        jmp     retran_limit
tx_ln_format:
        call    rst_ln_timer
        mov     a,#07                                ; li
        call    xm_store
        mov     a,#ff_ln                    ; ln
        call    xd_store

        call    xm_store_1a                          ; par code, length

        mov     r0,#low ln_send_seq
        movx    a,@r0
        call    xd_store
        mov     a,#02                                ; par code
        call    xm_store
;       mov     a,#01                                ; par length
;       call    xm_store
        call    xm_store_1
%IF(%MERCURY) THEN(
        mov     r0,#low send_ln                      ; find what kind
        movx    a,@r0
        cjne    a,#4,tx_ln_break            ; line reverse?
        jb      ls_pin,m_hang
        jb      tx9600,m_hang
        call    xd_store
        setb    ln_busy                              ;**
        setb    send_frame
        ret
tx_ln_break:
        mov     dptr,#amp_xy
        movx    a,@dptr
        movx    @r0,a                                ;** new
```

```
) ELSE(
        mov     a,morestuf                  ; &Y-mode in d2d1
        rr      a
)FI
        anl     a,#03h
        jz      tx_ln_scratch
        setb    ln_busy
        call    xd_store
        setb    send_frame                  ; GO!
        cjne    a,#01,tx_lnret

tx_ln_scratch:
        call    scr_txbuf
m_hang:
tx_lnret:
        ret

;       F O R M A T   L I N K   N A K
tx_nak:
%IF(%MERCURY) THEN(
        jb      pure_mnp,tx_la                      ;** debug, shoul be
tx_continue
        jnb     xmit_nak,tx_continue
        clr     xmit_nak
;-------------------------
        mov     r0,#low nak_timer
        movx    a,@r0
        jnz     tx_continue
        call    rst_nak_timer
;-------------------------
        call    rst_la_timer
        call    rst_window_timer
        mov     a,#ff_nak                   ; send nak id
        call    xd_store
        mov     r0,#low lt_recv_seq         ;? send frame being acked
        movx    a,@r0
        mov     r0,#low t_last_ack
        movx    @r0,a
        call    xd_store
        call    gen_tcredit
        call    xd_store
        setb    send_frame                  ; GO!
        ret
)FI

;       F O R M A T   L I N K   A C K
tx_la:
        mov     c,xmit_nak                  ;** this is probably
        orl     c,xmit_la                   ;** incorrect
        jnc     tx_continue                 ;** should save seq num
        mov     c,xmit_nak                  ;** for 2nd la
        clr     xmit_nak
```

```
        mov     xmit_la,c
;       clr     xmit_la                                 ;** debug

tx_la1: call    rst_la_timer
        call    rst_window_timer
%IF(%KRYPTON) THEN(
        mov     a,#07                                   ; length indicator
        jb      pure_mnp,$+5
        mov     a,#03
        call    xm_store                     ;** check above
        mov     a,#ff_la                     ; send ack id
        call    xd_store

        mov     a,#01                                   ; par code
        call    xm4_store
        mov     a,#01                                   ; par length
        call    xm4_store

        mov     r0,#low lt_recv_seq          ;? send frame being acked
        movx    a,@r0
        mov     r0,#low t_last_ack
        movx    @r0,a
        call    xd_store
        mov     a,#02                                   ; par code
        call    xm4_store
        mov     a,#01                                   ; par length
        call    xm4_store

)ELSE(
        mov     a,#07                                   ; length indicator
        call    xm_store                     ;** check above
        mov     a,#ff_la                     ; send ack id
        call    xd_store

        call    xm_store_1a                             ; par code, length

        mov     r0,#low lt_recv_seq          ;? send frame being acked
        movx    a,@r0
        mov     r0,#low t_last_ack
        movx    @r0,a
        call    xd_store
        mov     a,#02                                   ; par code
        call    xm_store
;       mov     a,#01                                   ; par length
;       call    xm_store
        call    xm_store_1

)FI
        call    gen_tcredit
        call    xd_store
        setb    send_frame                   ; GO!
random_ret:
```

```
            ret

;           I S  T H E R E  C R E D I T ?
; if (current_sseq - last_acked_sseq) < credit amount
;    then we can xmit a data frame
tx_continue:
            jb          ln_busy,random_ret          ; dont tx data while in ln mode
            jb          breaking,random_ret         ; or sending

%IF(%MERCURY) THEN(
            jb          reverse_channel,random_ret
)FI
            mov         r0,#low last_acked_seq
            movx        a,@r0
            mov         r7,a
            mov         r0,#low current_sseq
            movx        a,@r0
            setb        c
            subb        a,r7
            mov         r7,a                                ; r7  =current - last
            mov         r0,#low r_credit
            movx        a,@r0
;----------------------------------------------
;           jnb         block_mode,$+5
;           mov         a,#01
;----------------------------------------------
            jz          tx_ack                              ;** kludgey fix
            clr         c
            subb        a,r7

            jz          tx_ack
            jnb         acc.7,tx_data

tx_ack:
            jbc         xmit_la,$+4
            ret
            jmp         tx_la1


;           D E T E R M I N E  L I N K  D A T A  T Y P E
; clear to send a data frame,  now
; check for original, or retransmitted frame

%IF(%MERCURY) THEN(
tx_retrans_jmp:
            jmp         tx_retrans
)FI

tx_data:
            mov         r0,#low new_sseq            ; if new_sseq =
            movx        a,@r0                               ;    current_sseq
```

```
          mov       b,a                                            ; then xmit new data
          mov       r0,#low current_sseq
          movx      a,@r0
%IF(%KRYPTON) THEN(
          cjne      a,b,tx_retrans
)ELSE(    cjne      a,b,tx_retrans_jmp
)FI
;         H O W  M U C H  N E W  D A T A ?
; ok... set up for brand new data frame
; figure out how many bytes to send
;   count = MIN(ser_in_ptr - last_xmit_ptr, 64)

%IF(%MERCURY) THEN(
          setb      f0
)FI
tx_test:
%IF(%krypton)then (
          mov       r0,#low sih
          clr       ea
          movx      a,@r0
          inc       r0
          mov       r2,a
          movx      a,@r0
          setb      ea
          mov       r3,a                                           ; r3r2 = ser input ptr
)ELSE(    clr       ea
          mov       r2,sih_lp
          mov       r3,sih_hp
          setb      ea
)FI

          mov       r0,#low txbase_ptr                 ; load tx base ptr
          movx      a,@r0
          inc       r0
          mov       dpl,a
          movx      a,@r0
          mov       dph,a                                          ; dptr = tx base ptr

          mov       a,r2                                           ; sih - txbase_ptr
          clr       c
          subb      a,dpl
          mov       r4,a
          mov       a,r3
          subb      a,dph

%IF(%krypton)then (
          mov       r2,#64                                         ; default max frame length
          jnb       large_blocks,$+5
          mov       r2,#max_datasize                   ; max tx frame len = 64
)ELSE(    mov       r2,#max_datasize                   ; max tx frame len = 64
)FI
          jz        tx_small
```

```
            jnb     acc.7,$+5                   ; if neg, add in buf len
            add     a,#high rxsize
            jnz     tx_trans

tx_small:
            cjne    r4,#max_datasize,$+3        ; check lower byte
            jnc     tx_trans
            mov     a,r4
            mov     r2,a                                ; r2 = data length
            jz      tx_ack                              ; exit if no data

;           F O R M A T   N E W   D A T A   F R A M E
tx_trans:
%IF(%MERCURY) THEN(
            mov     r5,#0                               ; flag new frame
            jb      ls_pin,txt1_jmp                     ; if tx backchannel
            jb      tx9600,txt1_jmp                     ; then request ls channel

            jnb     f0,tx_compare                       ; experimental wait
            cjne    r2,#1,tx_compare            ; for a few extra chars
            movx    a,@dptr
            anl     a,#7fh
            cjne    a,#Esc,tx_compare           ; special case for VTxx
            mov     r1,#4                               ; about 2 ms
            djnz    r0,$
            djnz    r1,$-2
            jbc     f0,tx_test
;---------------------------------------------
; scan for repeated block here
tx_compare:
            jb      xmit_la,txtr_1
            mov     r0,#low t_rept_length       ; something to repeat?
            movx    a,@r0
            jz      txtr_1                              ; no

            cjne    r2,#max_datasize,$+3
            jnc     txtr_1

            mov     r3,a                                ; yes, save rept_length
            mov     r1,a

            clr     c                                   ; chars available must be
            subb    a,r2                                ; >= rept length
            jz      $+4
            jnc     txtr_1

            mov     r6,dpl                              ; save copy of tx ptr
            mov     r7,dph

            mov     dptr,#sreg+13                       ;** debug
            movx    a,@dptr
            mov     dpl,r6
```

```
        mov     dph,r7
        jb      acc.0,no_repeat

        call    compare_string
        jnc     no_repeat
; ok... at least one repeat
        mov     r5,#ff_ltr
; now check for double...
        mov     a,r3
        mov     r1,a
        rl      a
        clr     c
        subb    a,r2
        jz      $+4
        jnc     rept1

        call    compare_string
        jnc     rept1
        mov     r5,#ff_ltdr
        mov     a,r3
        add     a,r3
        mov     r3,a
rept1:
        mov     a,r3
        mov     r2,a
        setb    send_rpt
;;;     mov     r5,#2                           ; flag repeat frame
        mov     dpl,r6
        mov     dph,r7
txt1_jmp:
        sjmp    txt1

no_repeat:
        mov     dpl,r6
        mov     dph,r7

;-----------------------------------------------

txtr_1:
;       mov     r0,#low rept_length
;       clr     a
;       movx    @r0,a

        cjne    r2,#max_datasize,txt1   ; check lower byte
        mov     r2,#12                          ;** experimental
        mov     r0,#low reverse_timer   ; check 1 sec timeout
        movx    a,@r0
        jnz     txt1
        setb    xmit_ln
        mov     r0,#low send_ln
        mov     a,#4                            ; signal line turnaround
        movx    @r0,a
```

```
            jmp         tx_ln
txt1:
)FI
            mov         a,r2
            mov         r0,#low txbase_ptr          ; ptr = ptr + len
            add         a,dpl
            movx        @r0,a                            ; resave updated txbase_ptr
            inc         r0
            clr         a
            addc        a,dph
            cjne        a,#high rx_bufend,$+5
            mov         a,#high rx_bufstart
            movx        @r0,a

;           S T O R E   A   D A T A   F R A M E   R E C O R D
            mov         r0,#low new_sseq
            mov         r1,#low current_sseq
            movx        a,@r0
            inc         a
            movx        @r0,a
            movx        @r1,a                            ;* check this
            dec         a
            anl         a,#0fh                           ; credit lim = 16
            rl          a
            rl          a
            add         a,#low txrec
            mov         r0,a
            mov         a,dpl
            movx        @r0,a                            ; save low ptr
            inc         r0
            mov         a,dph
            movx        @r0,a                            ; save high ptr
            inc         r0
            mov         a,r2                             ; save length
            movx        @r0,a
            inc         r0
            clr         a                                ; first try
            movx        @r0,a
%IF(%DIAG) THEN(
            call        tx_lt                            ; set up intr
            mov         dptr,#ld_lts_sent
            call        inc_ld_string
            mov         a,r2
            mov         dptr,#ld_chars_sent
            jmp         add_ld_string
)ELSE(      sjmp        tx_lt
)FI

;           R E T R A N S M I T   O L D   D A T A   F R A M E
```

```
tx_retrans:
        inc     a                               ; inc current_sseq
        movx    @r0,a                           ; resave it
%IF(%DIAG) THEN(
        mov     r5,#1                           ; flag retrans
        mov     dptr,#ld_lts_resent
        call    inc_ld_string
        movx    a,@r0
)FI
        dec     a                               ; back to this frame

        anl     a,#0fh                          ; credit lim = 16
        rl      a                               ; convert seq # into
        rl      a                               ; an offset into the
        add     a,#low txrec                    ; past tx record buffer
        mov     r0,a
        movx    a,@r0                           ; load low(ptr)
        inc     r0
        mov     dpl,a
        movx    a,@r0                           ; load high(ptr)
        inc     r0
        mov     dph,a
        movx    a,@r0                           ; load length
        inc     r0
        mov     r2,a
        movx    a,@r0                           ; inc retry ct
        inc     a
        movx    @r0,a
%IF(%KRYPTON) THEN(
        cjne    a,#12,tx_lt1            ; check for too many retries
)ELSE(  mov     b,#12
        jb      ls_pin,$+6
        mov     b,#48
        cjne    a,b,tx_lt1
)FI

retran_limit:
; more than 12 retries
        mov     a,#dc_retrans
        mov     dptr,#sreg+20
        movx    @dptr,a
        mov     a,#dm_retrans                   ; retry limit reached
        jmp     init_disco
tx_lt1:
        call    rst_lt_timer
%IF(%krypton) THEN(
        call    mnp_off                         ; turn off mnp led
)ELSE(  push    dpl
        push    dph
        call    arq_off
        pop     dph
        pop     dpl
```

```
)FI

; set up lt frame header
; dptr = data ptr
; r2 = data length
; if DPC then check for lta
tx_lt:
        mov     r1,#low theader_buf
        mov     t_hbyte_cnt,#0
        mov     t_xbyte_cnt,r2                          ; set up tx intr
%IF(%krypton) THEN(
        mov     r0,#low tltptr                          ; save tx ptr
        mov     a,dpl
        movx    @r0,a
        inc     r0
        mov     a,dph
        movx    @r0,a
)ELSE(
        mov     _tptr_l,dpl
        mov     _tptr_h,dph
        jb      pure_mnp,tx_lt2
        jnb     xmit_la,tx_lt2                          ; generate an lta
        clr     xmit_la
        call    rst_window_timer
        call    rst_la_timer
        mov     a,#ff_lta                     ; lta
        call    xd_store
        mov     r0,#low current_sseq
        movx    a,@r0
        dec     a                                       ; get this frame seq
        call    xd_store
        mov     r0,#low lt_recv_seq           ;? send frame being acked
        movx    a,@r0
        mov     r0,#low t_last_ack
        movx    @r0,a
        call    xd_store
        call    gen_tcredit
        call    xd_store
        jb      ls_pin,tx_ltnext
        jb      tx9600,tx_ltnext
        cjne    r2,#5,$+3
        jnc     tx_ltnext
        call    save_string
        sjmp    tx_ltnext
)FI
tx_lt2:
%IF(%MERCURY) THEN(
        jb      ls_pin,tx_lt2a
        jb      tx9600,tx_lt2a
        jb      send_rpt,tx_ltr
        cjne    r5,#0,tx_lt2a                           ; retrans?
```

```
            cjne    r2,#01,$+7          ; format compressed frames
            mov     r5,#ff_lt1
            sjmp    tx_ltc
            cjne    r2,#02,$+7
            mov     r5,#ff_lt2
            sjmp    tx_ltc
            cjne    r2,#03,$+7
            mov     r5,#ff_lt3
            sjmp    tx_ltc
            cjne    r2,#04,tx_lt2a                      ; mov r5,something
            call    save_string
            sjmp    tx_lt2b
tx_ltc:
            call    save_string
tx_ltr:
tx_format_compressed:
            mov     r0,#low current_sseq
            movx    a,@r0
            dec     a                                   ; get this frame seq
            anl     a,#0fh
            swap    a
            orl     a,r5
            mov     r1,#low theader_buf
            call    xd_store
            sjmp    tx_ltnext

tx_lt2a:
            clr     a
            mov     r0,#low t_rept_length
            movx    @r0,a
tx_lt2b:
)FI
            mov     r1,#low theader_buf
            mov     a,#04                               ; li
            jb      pure_mnp,$+5
            mov     a,#02                               ; li
            call    xm_store
            mov     a,#ff_lt            ; lt
            call    xd_store

%IF(%KRYPTON) THEN(
            mov     a,#01                               ; par code
            call    xm4_store
            mov     a,#01                               ; par length
            call    xm4_store
)ELSE(
            call    xm_store_1a                         ; par code, length
)FI
            mov     r0,#low current_sseq
            movx    a,@r0
            dec     a                                   ; get this frame seq
            call    xd_store
```

```
tx_ltnext:
%IF(%MERCURY) THEN(
            jb          send_rpt,$+5
)FI         setb        send_data
            setb        send_frame                    ; GO!
            call        ini_lt_timer
            jmp         rst_inack_timer


$EJECT
;************************************************
;
;           D A T A   F R A M E   S C A N N E R
;
; scan for data frames,  called only when serial out is ready
; first do pointer manipulation,
;           rdata_index is a ptr into a small buffer which has frame lengths
;           rdata_ptr is a ptr into the receive frame buffer.
;
; first get the frame length, if there is one
; add the frame length to the frame ptr to get a ptr to the
; next frame, and resave the frame ptr
; dptr = ptr to frame
; r7r6 = ptr to start of frame
; r3r2 = frame length
;
;************************************************


data_scan:
            jnb         print_busy,$+4                        ; check if ready
            ret                                               ; exit if serout busy

;           mov         r0,#low t_credit              ;***
;           movx        a,@r0
;           jnz         ds_not_rts
;           mov         r0,#low rdata_index
;           movx        a,@r0
;           cpl         a
;           inc         a
;           add         a,rxptr
;           add         a,#-15
;           jc          $+3
;           ret

;           mov         a,rxptr                               ; purge records when
;           movx        @r0,a                                 ; overflow
;           ret

ds_not_rts:
            mov         r0,#low rdata_index
            movx        a,@r0                                 ; get offset to len buffer
```

```
        cjne    a,rxptr,$+4             ; check for new frame
        ret                             ; exit if nothing new

%IF(%MERCURY) THEN(
        clr     tempbit2
)FI
        inc     a
        movx    @r0,a                   ; save ptr to next frame
        dec     a                       ; go back to current val
        call    load_recvp

; done with ptr manipulation, so start scanning
; this looks for lts, ltas, or some lns
; seq numbers have been verified by ack_scan
; check frame length
%IF(%MERCURY) THEN(
        jnb     pure_mnp,$+5
)FI     acall   lods                    ; load header li
        acall   lods                    ; load frame type

        cjne    a,#ff_lt,ds_lta         ; check for lt pdu
        call    dgetpar1                ; load send seq #
        sjmp    ds_data

ds_lta:
        jnb     pure_mnp,$+5
        ajmp    ds_ln
        cjne    a,#ff_lta,ds_compress   ; check for lt w ack
        call    lods                    ; get send_seq
        mov     r4,a
        acall   lods2                   ; skip ack
;       call    lods                    ; skip ca
        mov     a,r4

ds_data:
        call    verify_sseq
        jnc     $+3
        ret

; compute block length
;** check sync mode?
        mov     a,#02                   ; subtract crc len
        xch     a,r2                    ; r3r2 := r3r2 -2
        clr     c
        subb    a,r2
        mov     r2,a
        clr     a
        xch     a,r3
        subb    a,r3
        mov     r3,a
%IF(%MERCURY) THEN(
        mov     r6,dpl
```

```
            mov         r7,dph
)FI         call        putblock
            call        ini_la_timer
            call        rst_inack_timer
;
;--- if back channel and length < 4, then copy block to rept buffer
;
%IF(%MERCURY) THEN(
            jb          ls_pin,sr_done
            jnb         tx9600,sr_done
            jbc         tempbit2,sr_done
            mov         a,r2
            jz          sr_done
            cjne        a,#5,$+3
            jnc         sr_done

            call        ds_save

sr_done:
)FI
            mov         r0,#low t_last_ack
            movx        a,@r0
            mov         b,a
            mov         r0,#low lt_recv_seq
            movx        a,@r0
            clr         c
            subb        a,b
            mov         b,a
            mov         r0,#low r_windowsize
            movx        a,@r0
            cjne        a,#01,$+5
            sjmp        ack_now
            clr         c
            rrc         a
            clr         c
            subb        a,b
            jb          acc.7,ack_now                      ;** experimental
%IF(%MERCURY) THEN(
            jb          ls_pin,an_ret
            jb          tx9600,an_ret
            mov         r0,#low lt_timer                ; improve througput on
            movx        a,@r0                                  ; satellite delays
            jz          ack_now

;---------------------------------------------
            mov         r0,#low t_rept_length           ; and when Xmodem is
            movx        a,@r0                                  ; riding on top of us
            cjne        a,#01,an_ret
            mov         r0,#low t_rept_string
            movx        a,@r0
            xrl         a,#Ack                                 ; xmodem hack
            jz          ack_now
```

```
;---------------------------------------------
an_ret:
)FI
                ret
ack_now:
                setb        xmit_la                           ; ack when windowsize = 1
                ret

%IF(%MERCURY) THEN(
ds_compress:
                mov         r5,a
                anl         a,#0fh
                cjne        a,#ff_lt1,ds_lt2
                sjmp        ds_ltgen
ds_lt2:
                cjne        a,#ff_lt2,ds_lt3
                sjmp        ds_ltgen
ds_lt3:
                cjne        a,#ff_lt3,ds_ltdr
                sjmp        ds_ltgen
ds_ltdr:
                cjne        a,#ff_ltdr,ds_ltr
                mov         r0,#low r_rept_length
                movx        a,@r0
                rl          a                                 ; double size
                sjmp        ds_ltr_format

ds_ltr:
                cjne        a,#ff_ltr,ds_lt4
                mov         r0,#low r_rept_length
                movx        a,@r0
ds_ltr_format:
                add         a,#2                              ; for merge with ds_data
                mov         r2,a
                mov         r3,#0
                mov         dptr,#r_rept_string
                setb        tempbit2
ds_ltgen:
                mov         a,r5                              ; fake out verify_sseq
                swap        a
                anl         a,#0fh
                mov         r5,a
                mov         r0,#low lt_recv_seq
                movx        a,@r0
                inc         a
                anl         a,#0f0h
                orl         a,r5
                jmp         ds_data
ds_lt4:
                mov         a,r5

)ELSE(
```

```
ds_compress:
)FI
ds_ln:
        cjne    a,#ff_ln,ds_ret         ; check for BREAK
        call    getpar1                 ; get send seq
        call    getpar2                 ; get type

; look for various kinds of break signals
        cjne    a,#01,ds_ln2            ; destructive, expedited
        ret                             ; handled by ack scan
ds_ln2:
        cjne    a,#02,ds_ln3            ; non_destructive, expedited
        ret
ds_ln3:
        cjne    a,#03,ds_ln4            ; non-destructive, non-exped
do_break:
%IF(%KRYPTON) THEN(
        clr     txd                     ; send break to term
        mov     delay_ct,#5             ; delay 50 ms
        call    delay
        setb    txd
)ELSE(
        setb    breaking
        mov     dptr,#sreg+21           ; load break length
        movx    a,@dptr                 ; in units of 10ms
        jz      do_break_done
        clr     txd                     ; send break to term
        call    wait5
;       movx    a,@dptr
;       call    wait5
do_break_done:
        clr     breaking
        setb    txd
)FI
        setb    xmit_lna
        ret
ds_ln4:
        cjne    a,#04,ds_ret            ; turn line around
        ret
ds_ret:
        ret                             ;**

$EJECT
; some space saving subroutines

lods2:
        acall   lods
lods:
        jb      recv_ov,lods_ov         ; load a byte from
        movx    a,@dptr                 ; modem input buffer
```

```
        inc     dpl
        inc     dpl
        djnz    dpl,lods1
        xch     a,dph
        inc     a
        cjne    a,#high tx_bufend,$+5
        mov     a,#high tx_bufstart
        xch     a,dph
lods1:
        djnz    r2,lods_ret                 ; dec frame length
        cjne    r3,#00h,lods_r3
        setb    recv_ov                     ; flag overflow
        ret
lods_r3:
        dec     r3
lods_ret:
        ret
lods_ov:
        mov     a,#0ffh                     ; frame too short
        ret


%IF(%MERCURY) THEN(
getpar2:
)FI
dgetpar2:
        call    lods                        ; load par code
        jnb     pure_mnp,gp_ret
        cjne    a,#02,badfmt                ; verify it
        sjmp    gp_continue
%IF(%MERCURY) THEN(
getpar1:
)FI
dgetpar1:
        call    lods                        ; load par code
        jnb     pure_mnp,gp_ret
        cjne    a,#01,badfmt                ; verify it
        sjmp    gp_continue


%IF(%KRYPTON) THEN(
getpar2:
        call    lods                        ; load par code
        cjne    a,#02,badfmt                ; verify it
        sjmp    gp_continue
getpar1:
        call    lods                        ; load par code
        cjne    a,#01,badfmt                ; verify it
)FI
gp_continue:
        call    lods                        ; load par len
        mov     r0,a
```

```
gp_loop:
        call    lods                    ; this loads last parm
        djnz    r0,gp_loop      ; if length > 1
gp_ret:
        ret

badfmt:
        pop     acc                     ; <BREAK> up 2 levels
        pop     acc
        setb    xmit_nak
        ret


; dont use r1
load_recvp:
        anl     a,#0fh                  ; convert index to ptr
        rl      a
        rl      a
        add     a,#low rxrec
        mov     r0,a

        movx    a,@r0                   ; load low data ptr
        inc     r0
        mov     dpl,a                   ; dptr = ptr
        mov     r6,a                    ; save copy here

        movx    a,@r0                   ; load high data ptr
        inc     r0
        mov     dph,a
        mov     r7,a                    ; save copy here

        movx    a,@r0                   ; load frame length
        inc     r0
        mov     r2,a

        movx    a,@r0                   ; load high frame length
        mov     r3,a
        clr     recv_ov
        ret


$EJECT
;**************************************************
;
;       C O N T R O L   F R A M E   S C A N N E R
;
; scan for ack frames
; also verify seq numbers in data frames
; this header code is similar to data_scan header
;**************************************************
ack_scan:
```

```
        mov     r0,#low rack_index
        movx    a,@r0                       ; get offset to len buffer
        cjne    a,rxptr,$+4             ; check for new frame
        ret

        inc     a
        movx    @r0,a                       ; save ptr to next frame
        dec     a                           ; go back to current frame
        call    load_recvp


; done with ptr manipulation,  so start scanning pdus
%IF(%MERCURY) THEN(
        jnb     pure_mnp,$+5
)FI     acall   lods                        ; load header length
        acall   lods                        ; load frame type

;       I N T E R P R E T   F R A M E   T Y P E

;** LINK DISCONNECT
        cjne    a,#ff_ld,as_lt              ; check for ld pdu
        call    getpar1                     ; get ld reason code
        mov     dptr,#sreg+17               ; save received ld reason
        movx    @dptr,a
; do something about disconnecting now...
        setb    disco_pending
        ret

as_lt:
;** LINK DATA
        cjne    a,#ff_lt,as_lta             ; link data
;       call    getpar1                     ; load recv seq #
;       call    verify_sseq
;       call    ini_la_timer
        setb    lt_or_la_recv
        ret
as_lta:
        jb      pure_mnp,as_la
        cjne    a,#ff_lta,as_nak        ; check for lt w ack
        acall   lods2                       ; skip send seq
;       call    lods                        ; get ack
        call    verify_rseq
        call    lods                        ; get credit
        sjmp    as_la1

as_nak:
        cjne    a,#ff_nak,as_la
        call    lods                        ; get nak...
        mov     r0,#low last_acked_seq
        movx    @r0,a
        mov     r0,#low current_sseq
        inc     a
```

```
                movx    @r0,a
                call    rst_lt_timer            ;? check this?
                call    lods                              ; get credit
                call    rcredit_amt
%IF(%DIAG) THEN(
                mov     dptr,#ld_naks
                jmp     inc_ld_string
)ELSE(          ret
)FI
as_la:
;** LINK ACK
                cjne    a,#ff_la,as_ln                    ; link ack
                call    dgetpar1                ; load recv seq #
                call    verify_rseq
                call    dgetpar2                ; load credit amount
as_la1:         call    rcredit_amt
                setb    lt_or_la_recv
                ret

as_ln:
;** LINK ATTN
;** to be completed
                cjne    a,#ff_ln,as_lna                   ; link attn
                call    getpar1                           ; load send seq #
                mov     b,a                               ; check this seq number
                mov     r0,#low ln_recv_seq
                movx    a,@r0
                inc     a
                cjne    a,b,bad_ln
                movx    @r0,a
                setb    xmit_lna                ; send a link attn ack
                call    getpar2                           ; load break type

; look for various kinds of break signals
                mov     r0,#low r_brk_type
                movx    @r0,a
                cjne    a,#01,as_ln2                      ; destructive, expedited
                mov     a,rxptr                           ; reset scan indexes
                mov     r0,#low rdata_index
                movx    @r0,a
                mov     r0,#low rack_index
                movx    @r0,a                             ;** correct?
                call    init_lt
                call    scr_txbuf
                jmp     do_break                ; send break to term
as_ln2:
                cjne    a,#02,as_ln3                      ; non-destructive, expedited
;               jb      print_busy,$
                jmp     do_break                ; send break to term
as_ln3:
                cjne    a,#03,as_ln4                      ;non-destructive, non-exped
                ret                                       ; send break to term??
```

```
as_ln4:
%IF(%MERCURY) THEN(
        cjne    a,#04,bad_ln            ; turn line around
        jb      ls_pin,as_hang          ; received req from
        jnb     tx9600,as_hang          ; backchannel
        jb      disco_pending,as_ret
        jb      send_frame,$-3          ; finish current frame
        setb    reverse_channel         ; flag reversal
        jmp     tx_frame                ; send the lna

as_hang:
        mov     dptr,#sreg+17
        mov     a,#dm_peer
        movx    @dptr,a
        setb    disco_pending
)FI
bad_ln:
        mov     dpl,r6                  ; discard invalid ln
        mov     dph,r7
        mov     a,#ff_null-1
        movx    @dptr,a
as_ret:
        ret

as_lna:
;** LINK ATTN ACK
;** to be completed
        cjne    a,#ff_lna,as_lr         ; link attn ack
        call    can_ln_timer
        call    getpar1                 ; load attn seq #
        mov     b,a                     ; different seq space
        mov     r0,#low ln_send_seq     ; verify correct number
        movx    a,@r0
        cjne    a,b,as_lna1
        inc     a                       ; update number
        movx    @r0,a                   ; resave it
%IF(%MERCURY) THEN(
        jb      ls_pin,as_lna_next
        jb      tx9600,as_lna_next
        mov     r0,#low send_ln         ; did we request line reversal
        movx    a,@r0
        cjne    a,#4,as_lna_next
;*** ready to reverse lines
        mov     a,#94h                  ;** debug
        movx    @r0,a
        setb    reverse_channel
        ret
as_lna_next:
)FI
%IF(%krypton) THEN(
        mov     a,morestuf              ; Y-mode in d2d1
        rr      a
```

```
)ELSE(   mov     dptr,#amp_xy
         movx    a,@dptr
)FI
         anl     a,#03h
         cjne    a,#01,lna_ret
; reset lt seq nums
         call    init_lt

lna_ret:
         ret
as_lna1:
         dec     a
         cjne    a,b,lna_error
         setb    xmit_ln                           ; retransmit ln
         clr     ln_busy
         ret
lna_error:
         jmp     va_error               ;** do something

as_lr:
         cjne    a,#ff_lr,as_next       ; link request
         jmp     negotiate

as_next:
         ret


$EJECT
lr_scan:
         mov     r0,#low rack_index
         movx    a,@r0                             ; get offset to len buffer
         cjne    a,rxptr,$+4            ; check for new frame
         ret

         inc     a
         movx    @r0,a                             ; save ptr to next frame
;--------------------
         mov     r0,#low rdata_index
         movx    @r0,a
;--------------------
         dec     a                                 ; go back to current frame
         call    load_recvp
         call    lods                              ; load header length
         call    lods                              ; load frame type

         cjne    a,#ff_lr,ls_ack                   ; check for ld pdu
         sjmp    negotiate

ls_ack:  cjne    a,#ff_la,ls_lt
         setb    lt_or_la_recv
         ret
```

```
ls_lt:      cjne    a,#ff_lt,ls_error
            setb    lt_or_la_recv
            ret

ls_error:
            mov     a,#dc_incompatible
            mov     dptr,#sreg+20
            movx    @dptr,a
            mov     a,#dm_handshake
            jmp     init_disco

$EJECT
;**************************************************
;
;
;           P A R A M E T E R   N E G O T I A T I O N
;
; a link initiator ( originate mode) aborts if extra parameters
;
; a link accepter,  answer mode, ignores extra parameters
;
;**************************************************

negotiate:
%IF(%KRYPTON) THEN(
            jb      o_a_fg,ng_continue
)ELSE(      jnb     orig,ng_continue
)FI
            call    can_lr_timer                    ; if originate mode

ng_continue:
            setb    b.0                                     ; flag pure mnp
            call    lods                                    ; get protocol level
            cjne    a,#01,$+5                       ; must be standard
            setb    block_mode
            call    lods                                    ; get 1st parm
            cjne    a,#01,ng_fmt_jmp                ; must be ser code
            call    lods                                    ; get ser len
            cjne    a,#06,ng_fmt_jmp                ; must be 6
            mov     r0,a                                    ; r0 = 6
            mov     r6,#low received_lr_serial_number
            mov     r7,#high received_lr_serial_number

            mov     r1,#0                                   ; verify checksum
ng_verify:
            call    lods                                    ; load serial digit
            call    save_idcode                             ; for future refernce
;----------------
            cjne    r0,#6,$+5                       ; save first byte
            mov     b,a                                     ; for echo check
;----------------
ng_v1:      mov     r5,a                                    ; save current digit
```

```
        add     a,r1                                    ; add it
        mov     r1,a
        djnz    r0,ng_verify
        cjne    r1,#0,ng_fmt_jmp                ; sum must be 0
        cjne    r5,#usr_serial_num,ng_no_echo   ; a usr modem?
        jnb     b.7,ng_no_echo                          ; yes, look for echo
%IF(%KRYPTON) THEN(
        jb      o_a_fg,ng_no_echo               ; can't echo in answer mode
)ELSE(  jnb     orig,ng_no_echo
)FI
        setb    lr_timeout                      ; its echoing at us
        ret

ng_no_echo:
        call    lods                                    ; get 2nd parm (optional)
        cjne    a,#02,ng_credit                         ; default
        call    lods                                    ; get length
        cjne    a,#01,ng_fmt_jmp                ; bad format
        call    lods                                    ; get service level
        mov     r0,#low sv_level
        movx    @r0,a

        cjne    a,#01,ng_async                          ; async, half dup
        mov     r0,#low r_windowsize
        movx    @r0,a                                   ; window size
        mov     r0,#low r_credit
        movx    @r0,a                                   ; initial credit amount
        call    lods
        sjmp    ng_credit

ng_async:
        cjne    a,#02,ng_sync                           ; async, full dup
        call    lods
        sjmp    ng_credit                       ; no change
ng_fails_jmp:
        jmp     ng_fails                        ; abort unless &M5?
ng_fmt_jmp:
        jmp     ng_fmt

ng_sync:
        cjne    a,#03,ng_unknown                ; sync, full dup
;       jb      fsk,ng_fails
        push    dpl
        push    dph
        mov     dptr,#sreg+13
        movx    a,@dptr
        pop     dph
        pop     dpl
        mov     c,acc.5                                 ; 1 = pure mnp
        mov     b.0,c                                   ; temp flag
        jb      acc.6,$+5                       ; 1 = level 2, 0 = level 3
        setb    level3_pend
```

```
            call        lods
            sjmp        ng_credit

ng_unknown:
%IF(%KRYPTON) THEN(
            jnb         o_a_fg,ng_fails
)ELSE(      jb          orig,ng_fails
)FI
ng_credit:
;-----------------------------------------------
            push        acc
            mov         a,#01
            mov         r0,#low r_windowsize
            movx        @r0,a                           ; window size
            mov         r0,#low r_credit
            movx        @r0,a                           ; initial credit amount
            pop         acc
;-----------------------------------------------
            cjne        a,#03,ng_datasize       ; check for credit code
            call        lods                            ; get length
            cjne        a,#01,ng_fmt                    ; must be 1
            call        lods                            ; get credit amt
            mov         r0,#low r_windowsize
            movx        @r0,a                           ; window size
            mov         r0,#low r_credit
            movx        @r0,a                           ; initial credit amount
            call        lods

ng_datasize:
            cjne        a,#04,ng_extra                  ; check for max user datasize
            call        lods                            ; load datasize len
            cjne        a,#02,ng_fmt                    ; must be 2
            call        lods                            ; check for 64/260?
            call        lods                            ;
            jz          ng_datasize_ok                  ; must be 0
            cjne        a,#01,ng_fails                  ; or 1
ng_datasize_ok:
            call        lods                            ; load next code
ng_extra:
            setb        lr_received             ; successful negotiation
ng_hermes:
;-----------------------------------------------
            cjne        a,#0ffh,$+4
            ret

%IF(%KRYPTON) THEN(
            cjne        a,#08h,ng_ret
            call        lods                            ; get li
            call        lods                            ; load DPO code
            mov         c,acc.0
            mov         large_blocks,c
            mov         r0,#low xmode                   ; store it
```

```
            movx    @r0,a
)ELSE(
ng_hst:     cjne    a,#0c0h,ng_skip          ; check for DPC mode
            call    lods                     ; get li
            cjne    a,#2,ng_ret              ; dont get confused
            call    lods                     ; load extended code
            jb      b.0,ng_ret               ; done if pure mnp
;** go to streamline mode
            mov     r0,#low xmode
            movx    @r0,a
            inc     r0
            call    lods                     ; load speed vector

;           jnb     acc.4,ng_ret
;           call    check_for_9600
;           jnc     ng_ret
            mov     r7,a
            call    gen_speed_vector
            anl     a,r7
            mov     dptr,#common_speeds
            movx    @dptr,a
            anl     a,#00011100b             ; any hs common speeds?
            jz      ng_ret

            mov     a,#01                    ; xmode+1 = flag to
            mov     r0,#low xmode+1
            movx    @r0,a                    ; switch to mercury mode
; connected to a mercury modem
)FI
ng_ret:
            ret

ng_skip:
%IF(%MERCURY) THEN(
            call    lods
            cjne    a,#0ffh,$+4
            ret
            mov     r0,a
ngs_loop:
            call    lods
            djnz    r0,ngs_loop
            sjmp    ng_datasize_ok
)ELSE(
            ret
)FI


ng_fmt:
            mov     a,#dc_incompatible
            mov     dptr,#sreg+20
            movx    @dptr,a
            mov     a,#dm_unknown
```

```
            sjmp     init_disco
ng_fails:
            mov      a,#dc_incompatible
            mov      dptr,#sreg+20
            movx     @dptr,a
            mov      a,#dm_protocol                          ; incompatible level
init_disco:
            setb     lr_timeout
            mov      r0,#low disco_us              ; store reason
            movx     @r0,a
            setb     xmit_ld                                 ; flag it
            ret


xmnp2_code           segment    code
                     rseg       xmnp2_code


scan_rts:
            jb       got_xoff,sr_hold
            mov      dptr,#at_latch
            movx     a,@dptr
            mov      c,rts_bit                ; save rts stat?
            jnc      sr_1                          ; check polarity
%IF(%KRYPTON) THEN(
            jnb      amp_r1,sr_1                   ; rts override
)ELSE(      jb       ignore_rts,sr_1
)FI
sr_hold:
            mov      r0,#low rts_mode
            movx     a,@r0
            jnz      sr_3
            inc      a                             ; a = 1
            movx     @r0,a
            jmp      ini_rts_timer

sr_1:
            mov      r0,#low rts_mode
            clr      a
            movx     @r0,a
            mov      r0,#low t_credit
            mov      a,#12
            movx     @r0,a
            jmp      can_rts_timer

sr_3:
            mov      r0,#low rdata_index
            movx     a,@r0
            cpl      a
            inc      a
            add      a,rxptr
            add      a,#-15
```

```
            jc          $+3
            ret

            mov         a,rxptr                                 ; purge records when
            movx        @r0,a                                   ; overflow
%IF(%MERCURY) THEN(
            jmp         save_block
)FI
sr_ret:
            ret




$EJECT
;**************************************************
;
;
;           V E R I F Y   A C K
;
; processes the received ack
; if ack = last_ack
;           current_sseq = ack + 1
; else if ack < last_ack
;           protocol violation
; else if ack >= new_sseq
;           protocol violation
; else last_ack = ack
;           if ack > current_sseq
;                       current_sseq  =ack + 1
;
;**************************************************
verify_rseq:
            mov         b,a                                     ; temp save the ack
;-----------------------------------------------
;           push        dpl
;           push        dph
;           mov         r0,#low debug2_ptr
;           movx        a,@r0
;           mov         dpl,a
;           inc         a
;           movx        @r0,a
;           mov         dph,#4
;           mov         a,b
;           movx        @dptr,a
;           pop         dph
;           pop         dpl
;-----------------------------------------------
            call        rst_lt_timer                    ;** debug
; if ack+1 = current_sseq then can lt timer
            mov         r1,#low new_sseq
            movx        a,@r1
            dec         a
```

```
        cjne    a,b,va_new
        call    can_lt_timer
va_new:
        mov     r1,#low new_sseq
        movx    a,@r1
        mov     r1,a                        ; r1 = new_sseq
        mov     r0,#low current_sseq
        movx    a,@r0
        cjne    a,01,va_unequal             ; sb ar1

; if ack + 1 > new_sseq then pr_violation
        mov     a,b
        clr     c
        subb    a,r1                        ; ack - new_sseq
        jnb     acc.7,va_error1
        mov     a,r1
        dec     a
        cjne    a,b,va_ack
        mov     r1,#low last_acked_seq
        movx    @r1,a
        sjmp    update_cts
va_ack:
; if ack = last_ack then current_sseq = ack
        mov     r1,#low last_acked_seq
        movx    a,@r1
        cjne    a,b,va_not_nak
        inc     a                           ; yes!
        movx    @r0,a                       ; current_sseq = nak
;-----------
;       dec     a
;       dec     a
;       movx    @r1,a                       ;** experimental
;-----------
        sjmp    update_cts

va_not_nak:
; if ack > last_ack then last_ack = ack
        clr     c
        subb    a,b
        jnb     acc.7,va_error1
        mov     a,b
        movx    @r1,a                       ; last_acked_seq = ack
        sjmp    update_cts

va_unequal:
        mov     r1,#low last_acked_seq
        movx    a,@r1
        cjne    a,b,va_shift
        INC     A
        movx    @r0,a                       ; current_sseq = nak
;-----------
;       dec     a
```

```
;               dec         a
;               movx        @r1,a                                       ;** experimental
;-----------
                sjmp        update_cts

va_shift:
                mov         a,b
                movx        @r1,a                                       ; last_acked_seq = ack
                movx        a,@r0                                       ; a = current_sseq
                clr         c
                subb        a,b
                rlc         a
                jc          update_cts
                mov         a,b
                inc         a
                movx        @r0,a                                       ; current_sseq = ack+1
                sjmp        update_cts

va_error1:
;               mov         dptr,#sreg+17
;               mov         a,#dm_peer
;               movx        @dptr,a
;               setb        disco_pending
;               pop         acc                                         ;* experimental
;               pop         acc                                         ; abort & return up
;---------------------------------------------
;               CLR         EA
;               SJMP        $
;---------------------------------------------
;               ret

va_error:
;;              setb        pr_violation                      ; protocol violation
                mov         a,#dc_incompatible
                mov         dptr,#sreg+20
                movx        @dptr,a
                mov         a,#dm_peer                                  ; peer protocol violation
                jmp         init_disco

scr_txbuf:
                mov         r0,#low txbase_ptr                ; discard pending tx data
%IF(%krypton) THEN(
                mov         r1,#low sih
                clr         ea
                movx        a,@r0
                inc         r0
                movx        @r1,a
                inc         r1
                movx        a,@r0
                movx        @r1,a
                setb        ea
)ELSE(          clr         ea
```

```
        movx    a,@r0
        inc     r0
        mov     sih_lp,a
        movx    a,@r0
        mov     sih_hp,a
        setb    ea
)FI


update_cts:
        mov     r0,#low last_acked_seq       ; compute free space
        movx    a,@r0                        ; in serial input buffer
        anl     a,#0fh
        rl      a
        rl      a
        add     a,#low txrec
        mov     r0,a
        movx    a,@r0
        inc     r0
        mov     r6,a
        movx    a,@r0
        inc     r0
        mov     r7,a                         ; r7r6 = unacked ptr
        movx    a,@r0
        add     a,r6
        mov     r6,a
        clr     a
        addc    a,r7
        cjne    a,#high rx_bufend,$+5
        mov     a,#high rx_bufstart
        mov     r7,a

        clr     c
%IF(%krypton) THEN(
        mov     r0,#low sih
        clr     ea                           ; subtract current
        movx    a,@r0                        ; serial input ptr
        inc     r0
        subb    a,r6
        mov     icountl,a
        movx    a,@r0
        subb    a,r7
        jnb     acc.7,$+5                    ; if < 0, add in offset
        add     a,#high rxsize
        mov     icounth,a
)ELSE(  clr     ea
        mov     a,sih_lp
        subb    a,r6
        mov     icountl,a
        mov     a,sih_hp
        subb    a,r7
        jnb     acc.7,$+5                    ; if < 0, add in offset
```

```
            add       a,#high rxsize
            mov       icounth,a
)FI
            setb      ea

            add       a,#-high rxsize/2          ; free space < 1.2
            jb        acc.7,$+4                  ; then raise cts
            ret

;           R A I S E   C T S  . . .
            push      dpl                                  ; save scan ptr
            push      dph
%IF(%krypton) THEN(
            call      flow_enable
)ELSE(
            call      flow_on
)FI
            pop       dph
            pop       dpl
            ret

$EJECT
;************************************************
;           V E R I F Y   L T   S E Q U E N C E   N U M B E R
;
; verify lt receive sequence number, in recv lts, ltas
; a = new number
;************************************************
verify_sseq:
            mov       b,a                                  ; temp store number
;--------------------------------------------
;           push      dpl
;           push      dph
;           mov       r0,#low debug_ptr
;           movx      a,@r0
;           mov       dpl,a
;           inc       a
;           movx      @r0,a
;           mov       dph,#3
;           mov       a,b
;           movx      @dptr,a
;           pop       dph
;           pop       dpl
;--------------------------------------------
            mov       r0,#low lt_recv_seq        ; ptr to last seq
            movx      a,@r0
            inc       a
            cjne      a,b,vss_notit
; a correctly sequenced number was received
            movx      @r0,a                                ; update seq num
;;          clr       dup_lt                               ; no duplicates here
            clr       c                                    ; return valid status
```

```
        ret                                            ; update la status ?
vss_notit:
        dec     a
        cjne    a,b,vss_invalid
        sjmp    vss_discard                ; ignore dup lts

vss_invalid:
        jb      pure_mnp,vss_error         ; nak
        setb    xmit_nak                   ; out of sequence
        sjmp    vss_discard                ; lts,  and discard them
vss_error:
        setb    xmit_la
;;      setb    dup_lt                                 ; no... discard it
vss_discard:
;       push    dpl                                    ; save dptr
;       push    dph
;       mov     dpl,r6                                 ; load start of frame ptr
;       mov     dph,r7
;       mov     a,#ff_null                 ; zap frame
;       movx    a,@dptr
;       orl     a,#80h
;       movx    @dptr,a
;       pop     dph                                    ; restore dptr
;       pop     dpl

        setb    c                                      ; return invalid status
        ret

$EJECT
;***********************************************
;
;       C O M P U T E   C R E D I T
;
; compute credit for the remote modem
; if local terminal has stopped flow control
;       credit =0
; else if half-dup mode
;       credit =1
; else if async mode
;       credit =12
; else /* sync mode */
;       credit = MAX( 12, (soh - ptr(rdata_index))/64 )
;
; dont use r1
;***********************************************
gen_tcredit:
        mov     r0,#low rts_mode
        movx    a,@r0
        jz      $+4
        clr     a
        ret
```

```
                mov     r0,#low rdata_index
                movx    a,@r0
                mov     r0,a
                mov     a,rxptr
                clr     c
                subb    a,r0
                mov     b,a
                sjmp    gtc_sync                ;** DEBUG
%IF(%krypton) THEN(
;               mov     dptr,#at_latch
;               movx    a,@dptr
;               mov     c,rts_bit               ; save rts stat?
;               jnc     gen_t1                          ; check polarity
;               mov     r0,#low rts_timer
;               movx    a,@r0
;               jnz     $+3
;               ret
;               mov     a,#my_credit-1                  ;** also add code for level 2
;               clr     c
;               subb    a,b
;               jnb     acc.7,$+4
;               clr     a
;               ret
;gen_t1:
;               call    rst_rts_timer
)FI
gtc_x:          mov     a,b
                add     a,#-(my_credit-1)                       ;** check this
                jnc     gtc_next
                clr     a
; set stop flag
                ret

gtc_next:
; clr stop flag
                mov     r0,#low sv_level
                movx    a,@r0
                cjne    a,#01,gtc_async                         ; service class 1
                ret
gtc_async:
;               cjne    a,#02,gtc_sync                          ; service class 2
;               mov     a,#my_credit
;               ret
gtc_sync:
; service class 3
                mov     r0,#low t_credit
                movx    a,@r0
                jz      gtc_ret
                clr     c
                subb    a,b
                jnb     acc.7,$+4
                clr     a
```

```
gtc_ret:
;--------------------------------------
                cjne        a,#13,$+3
                jnc         gtc_hang
;--------------------------------------
                ret

gtc_hang:
                clr         a
                ret


$EJECT
;************************************************
;
;
;           U P D A T E   R E M O T E   C R E D I T
;
; a = received credit
; credit_amt = recv_credit - outstanding lts
;************************************************
rcredit_amt:
                mov         r0,#low r_credit            ; just store it
                movx        @r0,a                                   ; send_lt will decode it
                ret

;               mov         b,a                                     ; save it
;               mov         r0 #low last_acked_seq      ; compute unacked lts
;               movx        a,@r0
;               mov         r1,a
;               mov         r0,#low current_sseq        ; lt_send_seq?
;               movx        a,@r0
;               clr         c
;               subb        a,r1
;               xch         a,b
;               clr         c
;               subb        a,b
;               jnb         acc.7,$+4                   ; adjust -credit to 0
;               clr         a
;               mov         r0,#low r_credit
;               movx        @r0,a                                   ; subtract unacked blocks??
;               ret


$EJECT
;----------------------------------------------


save_idcode:
                xch         a,r6                        ; save dptr
                xch         a,dpl                       ; dptr := r7r6
                xch         a,r6
                xch         a,r7
```

```
        xch     a,dph
        xch     a,r7

        movx    @dptr,a
        inc     dptr                            ; inc r7r6

        xch     a,r6                            ; r7r6 := dptr
        xch     a,dpl                           ; restore dptr
        xch     a,r6
        xch     a,r7
        xch     a,dph
        xch     a,r7
        ret


xmnp3_code          segment     code
                    rseg        xmnp3_code

$EJECT
;-------------------------------------------------
        public  test_mnp

test_mnp:
        call    init_mnp                        ;* also init interrupts
        call    rst_lr_timer
%IF(%KRYPTON) THEN(
        jb      o_a_fg,tta
)ELSE(  jnb     orig,tta
)FI
        mov     r0,#low lr_timer                ;** ORIG MODE
        mov     dptr,#sreg+13                           ; S13.0 is delay flag
        movx    a,@dptr
        rrc     a
        mov     a,#sec_1                        ; small delay before
        jnc     $+4
        mov     a,#sec_2                        ; small delay before
        movx    @r0,a                                   ; sending lr
tto_0:
        jb      disco_pending,tr_exit           ; do normal processing
;       call    update_timers                           ; while waiting
        call    normal
        jnb     lr_timeout,tto_0
        clr     lr_timeout
        setb    xmit_lr                                 ; send lr in orig mode
        call    tx_frame
%if(%krypton) then(
        call    mnp_off)
else(   call    arq_off
)fi
tto_1:
        jb      disco_pending,tr_exit           ; wait for lr received
```

```
        jbc     lr_received,tto_2               ; or a timeout
        jb      lr_timeout,tr_no_mnp
        call    lr_scan
;       call    update_timers
        call    normal
        sjmp    tto_1

tto_2:
        call    normal                          ;- new
        jb      send_frame,tto_2                ; wait for opening
%if(%krypton) then(
        mov     r0,#low xmode
        movx    a,@r0
        jnb     acc.1,$+5                       ; check for fixed format lt/la
        clr     pure_mnp                        ; switch to streamline mode
        setb    xmit_la                         ; start sending la
        call    tx_frame
        call    mnp_off
)else(
        setb    xmit_la                         ; start sending la
        call    tx_frame
        call    arq_off
)fi

tto_3:  jb      disco_pending,tr_exit           ; wait for la to be
        call    normal
        jb      send_frame,tto_3                ; completely sent
tto_4:
%IF(%KRYPTON) THEN(
        mov     delay_ct,#5
        call    delay)
ELSE(   mov     r1,#3                           ; check mercury mode
        jnb     alb_pin,tto_4wait
        mov     r1,#6
tto_4wait:
        mov     a,#1
        call    wait5
        call    normal
        djnz    r1,tto_4wait
        setb    timer_on
)FI
        call    ack_scan                        ; absorb an ack
        sjmp    online_print

;** this code is here because of sjmps
tr_no_mnp:
%IF(%mercury) THEN(
        call    arq_off
        clr     es
        setb    ti
        mov     dptr,#amp_xm                    ; &M5 and remote
        movx    a,@dptr                         ; is not ARQ
```

```
            cjne    a,#4,tr_exit                    ; then hangup
            jmp     print_it                        ;** debug
)ELSE(      call    mnp_off
            jmp     non_mnp_mode
)FI

tr_exit:
%IF(%krypton) THEN(
            jmp     call_over
)ELSE(      jmp     call_over
)FI

; wait for an lr
tta:
            jb      disco_pending,tr_exit           ;** ANSWER MODE
            jbc     lr_received,tta1
            jb      lr_timeout,tr_no_mnp
            call    lr_scan
;           call    update_timers
            call    normal
            sjmp    tta

; respond with an lr
; wait for an ack or lt
tta1:
            call    rst_lr_timer
            setb    xmit_lr
            call    tx_frame
%if(%krypton) then(
            call    mnp_off
            mov     r0,#low xmode
            movx    a,@r0
            jnb     acc.1,$+5                       ; check for fixed format lt/la
            clr     pure_mnp                        ; switch to streamline mode
)else(      call    arq_off
)fi
            clr     lt_or_la_recv
tta1_loop:
            jbc     brokenf,tr_no_mnp               ; exit if not mnp
            jb      disco_pending,tr_exit           ; answer mode
            jb      lt_or_la_recv,online_print
            jb      lr_timeout,tr_no_mnp
            call    ack_scan
;           call    update_timers
            call    normal
            sjmp    tta1_loop

online_print:
%if(%krypton) then(
            call    mnp_on
;           mov     r0,#low xmode
;           movx    a,@r0
```

```
;           jnb     acc.1,$+5                       ; check for fixed format lt/la
;           clr     pure_mnp                        ; switch to streamline mode
            jnb     level3_pend,op_1
            mov     r1,#40
            djnz    r0,$
            djnz    r1,$-2
            call    sync_init                       ; switch to sync mode
)else(
            call    arq_on
            jnb     level3_pend,op_1
            mov     r0,#low xmode
            movx    a,@r0
            jz      $+4
            clr     pure_mnp                        ; switch to streamline mode

            inc     r0
            movx    a,@r0
            jnz     go_fast_jmp
            mov     r1,#40
            djnz    r0,$
            djnz    r1,$-2
            call    sync_init                       ; switch to sync mode
            jmp     op_1

go_fast_jmp:
            jmp     go_fast                                 ; now switch to 9600....
)FI
op_1:
            call    can_lr_timer
            mov     a,#15                                   ; "CONNECT 1200/ARQ"
%IF(%KRYPTON) THEN(
            jb      ls_pin,$+5
)ELSE(      jnb     baud_24,$+5
)FI
            mov     a,#16                                   ; "CONNECT 2400/ARQ"

%IF(%MERCURY) THEN(
            clr     es
            setb    ti
            call    respond
            clr     ti
            setb    es
            call    assert_cd
            mov     dptr,#amp_xb
            movx    a,@dptr
            jnz     op_1b
            mov     th1,#-48                        ; switch to 1200
            jnb     baud_24,$+6
            mov     th1,#-24                        ; switch to 2400
op_1b:
)else(      call    print_connect
)FI
```

```
        call    rst_window_timer
        call    rst_inack_timer
online:
;       call    update_timers                                   ; main online loop
        jb      disco_pending,tta1_loop+3        ;tr_exit
        call    scan_rts
        call    ack_scan
        call    data_scan
        call    tx_frame
        call    normal
        jnb     brokenf,online                                  ; do some filtering?
        clr     brokenf
;;      setb    xmit_nak
        setb    xmit_la
        jmp     online

        END
```

We claim:

1. A modem for connecting digital data terminal equipment to an analog communication link comprising, in combination, frequency division filtering means serially connected with said link for establishing a high speed channel having a bandwidth in a first range of frequencies and a low speed channel having a bandwidth in a second and more limited range of frequencies, digital-to-analog conversion means connected between said equipment and said filtering means for translating digital signals from said equipment into analog signals for transmission over said link in a selected one of said high or low speed channels, analog-to-digital conversion means connected between said equipment and said filtering means for producing digital signals supplied to said equipment from the analog signals received over the other one of said channels, and means operative when said digital-to-analog conversion means is transmitting data over said low speed channel for sending a channel reversal command over said link whenever the amount of data awaiting transmission over said low speed channel exceeds a predetermined amount.

2. A modem as set forth in claim 1 wherein said means for sending a channel reversal command further comprises means for inhibiting the sending of said command whenever said modem has been transmitting over said low speed channel for less than a predetermined minimum interval of time.

3. A modem as set forth in claims 1 or 2 wherein said channel reversal command is transmitted to a remote modem at the other end of said link which then responds with a command acknowledgement signal, whereupon said modem which sent said channel reversal command begins transmitting over said high speed channel and said remote modem begins transmitting over said low speed channel.

4. A modem as set forth in claims 1 or 2 wherein said digital-to-analog conversion means when transmitting over said low speed channel formats the data to be transmitted into fixed length frames which include a frame identifying code which identifies the frame as a data frame and designates the amount of data in said frame and including after said data a cyclic redundancy check value, whereby the modem receiving one of said fixed length frames can perform an error checking operation immediately upon the receipt of said check value.

5. A modem as set forth in claims 1 or 2 wherein said digital-to-analog conversion means when transmitting over said low speed channel includes means for detecting repetitious groups of like data pending transmission and for sending a repeat command signifying to the receiving modem that the previously transmitted group should be repeated a predetermined number of times.

* * * * *